United States Patent
Cheng et al.

(10) Patent No.: US 10,277,363 B2
(45) Date of Patent: Apr. 30, 2019

(54) HYBRID AUTOMATIC REPEAT REQUEST ACKNOWLEDGEMENT TRANSMISSION METHOD, USER EQUIPMENT, AND BASE STATION

(71) Applicant: Huawei Technologies Co., Ltd., Shenzhen, Guangdong (CN)

(72) Inventors: Yan Cheng, Beijing (CN); David Jean-Marie Mazzarese, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 322 days.

(21) Appl. No.: 15/074,463

(22) Filed: Mar. 18, 2016

(65) Prior Publication Data
US 2016/0204906 A1 Jul. 14, 2016

Related U.S. Application Data

(63) Continuation of application No. PCT/CN2014/072743, filed on Feb. 28, 2014.

(30) Foreign Application Priority Data

Sep. 18, 2013 (WO) ................ PCT/CN2013/083798
Jan. 28, 2014 (WO) ................ PCT/CN2014/071691

(51) Int. Cl.
*H04L 1/18* (2006.01)
*H04L 5/14* (2006.01)
(Continued)

(52) U.S. Cl.
CPC .......... *H04L 1/1812* (2013.01); *H04L 1/1854* (2013.01); *H04L 1/1861* (2013.01);
(Continued)

(58) Field of Classification Search
CPC . H04L 1/18; H04L 1/854; H04L 5/14; H04W 72/04
See application file for complete search history.

(56) References Cited

U.S. PATENT DOCUMENTS

2010/0211845 A1  8/2010  Lee et al.
2011/0013613 A1  1/2011  Sung et al.
(Continued)

FOREIGN PATENT DOCUMENTS

CN  101789851 A  7/2010
CN  101925189 A  12/2010
(Continued)

OTHER PUBLICATIONS

"CA-based aspects for FDD-TDD joint operation", LG Electronics, 3GPP TSG RAN WG1 Meeting #74, Aug. 13-23, 2013, 3 pages, R1-133372.

*Primary Examiner* — George C Atkins

(57) ABSTRACT

The present invention provides a hybrid automatic repeat request acknowledgement transmission method, a user equipment, and a base station. The transmission method includes: receiving, by a user equipment, on a first serving cell and in a downlink subframe n−k, PDSCH transmission or a downlink control channel that indicates downlink SPS release, where a duplex mode of the first serving cell is FDD, or all subframes on the first serving cell are downlink subframes, or one radio frame on the first serving cell includes nine downlink subframes and one special subframe; and transmitting, in an uplink subframe n, an HARQ-ACK response corresponding to the first serving cell and the downlink subframe n−k; where n is an integer, k is a positive integer, k belongs to a set K, and the set K is determined according to first HARQ-ACK timing.

14 Claims, 4 Drawing Sheets

(51) Int. Cl.
*H04L 5/00* (2006.01)
*H04W 72/04* (2009.01)
*H04L 5/26* (2006.01)

(52) U.S. Cl.
CPC ............ *H04L 1/1864* (2013.01); *H04L 5/001* (2013.01); *H04L 5/0094* (2013.01); *H04L 5/1469* (2013.01); *H04L 5/26* (2013.01); *H04L 5/0055* (2013.01)

(56) References Cited

U.S. PATENT DOCUMENTS

| | | |
|---|---|---|
| 2013/0044653 A1 | 2/2013 | Yang et al. |
| 2014/0369290 A1 | 12/2014 | Yang et al. |
| 2015/0055519 A1 | 2/2015 | Lin et al. |
| 2015/0085714 A1 | 3/2015 | Liang et al. |
| 2015/0359029 A1* | 12/2015 | Seo .......................... H04L 1/18 370/329 |
| 2016/0013896 A1* | 1/2016 | Sun ....................... H04L 1/1854 370/280 |

FOREIGN PATENT DOCUMENTS

| | | |
|---|---|---|
| CN | 101978636 A | 2/2011 |
| CN | 102098151 A | 6/2011 |
| CN | 102142941 A | 8/2011 |
| CN | 102237990 A | 11/2011 |
| CN | 102347826 A | 2/2012 |
| CN | 102571189 A | 7/2012 |
| CN | 102971981 A | 3/2013 |
| CN | 103188061 A | 7/2013 |
| WO | 2013/131435 A1 | 9/2013 |

* cited by examiner

HYBRID AUTOMATIC REPEAT REQUEST ACKNOWLEDGEMENT TRANSMISSION METHOD, USER EQUIPMENT, AND BASE STATION

CROSS-REFERENCE TO RELATED APPLICATIONS

This application is a continuation of International Application No. PCT/CN2014/072743, filed on Feb. 28, 2014, which claims priority to International Patent Application No. PCT/CN2014/071691, filed on Jan. 28, 2014, and International Patent Application No. PCT/CN2013/083798, filed on Sep. 18, 2013, all of these applications are hereby incorporated by reference in their entireties.

TECHNICAL FIELD

The present invention relates to the field of wireless communications technologies, and specifically, to a hybrid automatic repeat request acknowledgement transmission method, and further relates to a user equipment and a base station that apply the hybrid automatic repeat request acknowledgement transmission method.

BACKGROUND

An LTE-A (Long Term Evolution-Advanced, Long Term Evolution-Advanced) system is a system further evolved and enhanced from a 3GPP (3rd Generation Partnership Project, 3rd Generation Partnership Project) LTE system. In the LTE-A system, to meet a requirement of the International Telecommunication Union for a peak data rate of fourth generation communications technologies, a CA (Carrier Aggregation, carrier aggregation) technology, also known as a spectrum aggregation (Spectrum Aggregation) technology or a bandwidth extension (Bandwidth Extension) technology, is introduced. In the carrier aggregation technology, spectrums of two or more component carriers (Component Carrier) are aggregated to obtain wider transmission bandwidth, where the spectrums of the component carriers may be contiguous continuous spectrums, or may be non-contiguous spectrums in a same frequency band or even discontinuous spectrums in different frequency bands. An LTE Rel-8/9 UE (User Equipment, user equipment) can access only one of the component carriers to receive and send data, but an LTE-A UE can simultaneously access multiple component carriers according to a capability of the LTE-A UE and a service requirement to receive and send data.

To support hybrid automatic repeat, a UE needs to feed back an HARQ-ACK (Hybrid Automatic Repeat request-Acknowledgement, hybrid automatic repeat request acknowledgement) to a base station through a PUCCH (Physical Uplink Control Channel, physical uplink control channel) and a PUSCH (Physical Uplink Shared Channel, physical uplink shared channel), where the hybrid automatic repeat request acknowledgement may also be simply referred to as an ACK (Acknowledgement, acknowledgement)/NACK (Negative Acknowledgement, negative acknowledgement).

In an existing CA system, duplex modes of aggregated carriers are the same, for example, the duplex modes may all be FDD (Frequency Division Duplex, frequency division duplex) or may all be TDD (Time Division Duplex, time division duplex), but in a follow-up LTE system, the duplex modes may evolve to aggregation of different duplex modes, that is, the duplex modes of the aggregated carriers may be different. For example, duplex modes of some carriers are FDD, but duplex modes of other carriers are TDD. In a follow-up LTE system, the duplex modes may also evolve to a mode in which a primary component carrier in aggregated carriers is a carrier whose duplex mode is time division duplex TDD, and a secondary component carrier is a supplemental (Supplemental) downlink carrier, for example, the supplemental downlink carrier may indicate that all subframes on the carrier are downlink subframes. In the existing CA system, an HARQ-ACK is sent only on a primary component carrier. In this evolution direction, if the primary component carrier is a TDD carrier, an HARQ-ACK corresponding to an FDD carrier or a supplemental downlink carrier also needs to be fed back on the TDD carrier. The supplemental downlink carrier may also be referred to as a supplemental downlink serving cell.

However, in an existing LTE system, for an FDD carrier, HARQ-ACK timing is n+4, that is, an HARQ-ACK corresponding to a PDSCH (Physical Downlink Shared Channel, physical downlink shared channel) transmitted in a downlink subframe n is fed back in an uplink subframe n+4. However, if an HARQ-ACK corresponding to an FDD carrier or a supplemental downlink carrier is fed back on a TDD carrier, because on the TDD carrier, only some subframes of one radio frame are used for uplink transmission, if existing FDD HARQ-ACK timing is used, downlink subframes of some FDD carriers or downlink subframes of supplemental downlink carriers have no corresponding uplink subframe in which an HARQ-ACK is fed back, as a result, these downlink subframes cannot be used to schedule downlink data, which results in waste of resources. Therefore, in this case, an HARQ-ACK transmission mechanism of an FDD serving cell or an HARQ-ACK transmission mechanism of a supplemental downlink serving cell needs to be redesigned.

SUMMARY

An embodiment of the present invention designs a method for transmitting an HARQ-ACK of an FDD serving cell or a supplemental downlink serving cell, which resolves a problem as to how a transmission mechanism of an HARQ-ACK of an FDD serving cell or a supplemental downlink serving cell is designed, and avoids a technical problem that in the prior art some subframes on an FDD serving cell or a supplemental downlink serving cell cannot be fully scheduled because these subframes have no corresponding uplink subframe in which an HARQ-ACK is fed back, which causes waste of resources.

In view of this, embodiments of the present invention provide a hybrid automatic repeat request acknowledgement transmission method, a user equipment, and a base station, where by defining a new hybrid automatic repeat request acknowledgement transmission mechanism, subframes can be effectively scheduled for use, and a technical problem of an HARQ-ACK feedback delay can also be effectively avoided.

A first aspect of the present invention provides a hybrid automatic repeat request acknowledgement transmission method, including: receiving, by a user equipment, on a first serving cell and in a downlink subframe n–k, physical downlink shared channel PDSCH transmission or a downlink control channel that indicates downlink semi-persistent scheduling SPS release, where the first serving cell is a serving cell corresponding to the user equipment, and a duplex mode of the first serving cell is frequency division duplex FDD, or all subframes on the first serving cell are downlink subframes, or one radio frame on the first serving cell includes nine downlink subframes and one special subframe, or the first serving cell is a supplemental downlink serving cell, or a duplex mode of the first serving cell is time division duplex TDD and all subframes on the first serving cell are downlink subframes, or a duplex mode of the first serving cell is time division duplex TDD and one radio frame on the first serving cell includes nine downlink subframes and one special subframe, or a duplex mode of the first serving cell is time division duplex TDD and an uplink-downlink configuration of the first serving cell is an uplink-downlink configuration 7; and transmitting, by the user equipment in an uplink subframe n, a hybrid automatic repeat request acknowledgement HARQ-ACK response corresponding to the first serving cell and the downlink subframe n−k; where n is an integer, k is a positive integer, k belongs to a set K, and the set K is determined according to first HARQ-ACK timing. The uplink-downlink configuration 7 may indicate that all subframes of one radio frame are downlink subframes, or may indicate that one radio frame includes nine downlink subframes and one special subframe.

With reference to the first aspect, in a first possible implementation manner, the transmission method further includes: receiving, by the user equipment, on a second serving cell and in a downlink subframe n−k1, PDSCH transmission or a downlink control channel that indicates downlink SPS release, where the second serving cell is a serving cell corresponding to the user equipment, and a duplex mode of the second serving cell is time division duplex TDD; and transmitting, by the user equipment in the uplink subframe n, an HARQ-ACK response corresponding to the second serving cell and the downlink subframe n−k1; where k1 is a positive integer, k1 belongs to a set K1, the set K1 is determined according to second HARQ-ACK timing, and the second HARQ-ACK timing is determined according to an uplink-downlink configuration or a reference uplink-downlink configuration of the second serving cell.

With reference to the first aspect or the first possible implementation manner, in a second possible implementation manner, the first HARQ-ACK timing is determined according to a reference uplink-downlink configuration of the first serving cell.

With reference to the first possible implementation manner of the first aspect, in a third possible implementation manner, the first HARQ-ACK timing is determined according to a reference uplink-downlink configuration of the first serving cell, and the reference uplink-downlink configuration of the first serving cell is the uplink-downlink configuration of the second serving cell or the reference uplink-downlink configuration of the second serving cell.

With reference to the first possible implementation manner or the third possible implementation manner of the first aspect, in a fourth possible implementation manner, the set K includes at least one element that does not belong to the set K1.

With reference to the second possible implementation manner or the third possible implementation manner of the first aspect, in a fifth possible implementation manner, that the set K is determined according to first HARQ-ACK timing, and that the first HARQ-ACK timing is determined according to a reference uplink-downlink configuration of the first serving cell include the following: When the reference uplink-downlink configuration of the first serving cell is an uplink-downlink configuration 0, the uplink subframe n is corresponding to a subframe 2, a subframe 3, a subframe 4, a subframe 7, a subframe 8, and a subframe 9 in one radio frame, and when the uplink subframe n is corresponding to a subframe 2 and a subframe 7 in one radio frame, the set K is {6, 5}, when the uplink subframe n is corresponding to a subframe 3 and a subframe 8 in one radio frame, the set K is {5, 4}, and when the uplink subframe n is corresponding to a subframe 4 and a subframe 9 in one radio frame, the set K is {4}; or when the reference uplink-downlink configuration of the first serving cell is an uplink-downlink configuration 0, the uplink subframe n is corresponding to a subframe 2, a subframe 4, a subframe 7, and a subframe 9 in one radio frame, and when the uplink subframe n is corresponding to a subframe 2 and a subframe 7 in one radio frame, the set K is {10, 9, 6}, and when the uplink subframe n is corresponding to a subframe 4 and a subframe 9 in one radio frame, the set K is {5, 4}. When the reference uplink-downlink configuration of the first serving cell is an uplink-downlink configuration 1, the uplink subframe n is corresponding to a subframe 2, a subframe 3, a subframe 7, and a subframe 8 in one radio frame, and when the uplink subframe n is corresponding to a subframe 2 and a subframe 7 in one radio frame, the set K is {7, 6, 5}, and when the uplink subframe n is corresponding to a subframe 3 and a subframe 8 in one radio frame, the set K is {5, 4}; or when the reference uplink-downlink configuration of the first serving cell is an uplink-downlink configuration 1, the uplink subframe n is corresponding to a subframe 2, a subframe 3, a subframe 7, and a subframe 8 in one radio frame, and when the uplink subframe n is corresponding to a subframe 2 and a subframe 7 in one radio frame, the set K is {9, 7, 6}, and when the uplink subframe n is corresponding to a subframe 3 and a subframe 8 in one radio frame, the set K is {6, 4}. When the reference uplink-downlink configuration of the first serving cell is an uplink-downlink configuration 2, the uplink subframe n is corresponding to a subframe 2 and a subframe 7 in one radio frame, and the set K is {8, 7, 6, 5, 4}. When the reference uplink-downlink configuration of the first serving cell is an uplink-downlink configuration 3, the uplink subframe n is corresponding to a subframe 2, a subframe 3, and a subframe 4 in one radio frame, and when the uplink subframe n is corresponding to a subframe 2 in one radio frame, the set K is {11, 10, 7, 6}, when the uplink subframe n is corresponding to a subframe 3 in a radio frame, the set K is {10, 6, 5}, and when the uplink subframe n is corresponding to a subframe 4 in one radio frame, the set K is {10, 5, 4}; or when the reference uplink-downlink configuration of the first serving cell is an uplink-downlink configuration 3, the uplink subframe n is corresponding to a subframe 2, a subframe 3, and a subframe 4 in one radio frame, and when the uplink subframe n is corresponding to a subframe 2 in one radio frame, the set K is {11, 10, 9, 8} or {10, 9, 8, 11}, when the uplink subframe n is corresponding to a subframe 3 in one radio frame, the set K is {8, 7, 6}, and when the uplink subframe n is corresponding to a subframe 4 in one radio frame, the set K is {6, 5, 4}; or when the reference uplink-downlink configuration of the first serving cell is an uplink-downlink configuration 3, the uplink subframe n is corresponding to a subframe 2, a subframe 3, and a subframe 4 in one radio frame, and when the uplink subframe n is corresponding to a subframe 2 in one radio frame, the set K is {11, 10, 9} or {10, 9, 11}, when the uplink subframe n is corresponding to a subframe 3 in one radio frame, the set K is {9, 8, 7, 6}, and when the uplink subframe n is corresponding to a subframe 4 in one radio frame, the set K is {6, 5, 4}. When the reference uplink-downlink configuration of the first serving cell is an uplink-downlink configuration 4, the uplink subframe n is corresponding to a subframe 2 and a subframe 3 in one radio frame, and when the uplink subframe n is corresponding to a subframe 2 in one radio frame, the set K is {12, 11, 10, 8, 7}, and when the uplink subframe n is corresponding to a subframe 3 in one radio frame, the set K is {10, 7, 6, 5, 4}; or when the reference uplink-downlink configuration of the first serving cell is an uplink-downlink configuration 4, the uplink subframe n is corresponding to a subframe 2 and a subframe 3 in one radio frame, and when the uplink subframe n is corresponding to a subframe 2 in one radio frame, the set K is {12, 11, 10, 9, 8} or {12, 10, 9, 8, 11}, and when the uplink subframe n is corresponding to a subframe 3 in one radio frame, the set K is {8, 7, 6, 5, 4}. When the reference uplink-downlink configuration of the first serving cell is an uplink-downlink configuration 5, the uplink subframe n is corresponding to a subframe 2 in one radio frame, and the set K is {13, 12, 11, 10, 9, 8, 7, 6, 5, 4}. When the reference uplink-downlink configuration of the first serving cell is an uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2, a subframe 3, and a subframe 7 in one radio frame, the set K is {7, 5}, when the uplink subframe n is corresponding to a subframe 4 in one radio frame, the set K is {5}, and when the uplink subframe n is corresponding to a subframe 8 in one radio frame, the set K is {7, 5, 4}; or when the reference uplink-downlink configuration of the first serving cell is an uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2, a subframe 3, a subframe 7, and a subframe 8 in one radio frame, the set K is {10, 7}, and when the uplink subframe n is corresponding to a subframe 4 in one radio frame, the set K is {10, 5}; or when the reference uplink-downlink configuration of the first serving cell is an uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2 in one radio frame, the set K is {10, 9}, when the uplink subframe n is corresponding to a subframe 3 in one radio frame, the set K is {9, 8}, when the uplink subframe n is corresponding to a subframe 4 in one radio frame, the set K is {8, 7}, when the uplink subframe n is corresponding to a subframe 7 in one radio frame, the set K is {9, 8}; and when the uplink subframe n is corresponding to a subframe 8 in one radio frame, the set K is {8, 7}.

With reference to the first aspect or any one of the first to fifth possible implementation manners of the first aspect, in a sixth possible implementation manner, before the transmitting, by the user equipment in an uplink subframe n, an HARQ-ACK response corresponding to the first serving cell and the downlink subframe n-k, the transmission method includes: performing, by the user equipment, HARQ-ACK bundling on an HARQ-ACK response corresponding to the first serving cell and a downlink subframe $n-k_{M-2}$ in the downlink subframe n-k and an HARQ-ACK response corresponding to the first serving cell and a downlink subframe $n-k_{M-1}$ in the downlink subframe n-k, so as to obtain a bundled HARQ-ACK response corresponding to the first serving cell, the downlink subframe $n-k_{M-2}$, and the downlink subframe $n-k_{M-1}$, where $k_{M-2}$ and $k_{M-1}$ are last two elements in the set K, and M is the number of elements in the set K; and determining, by the user equipment according to the bundled HARQ-ACK response corresponding to the first serving cell, the downlink subframe $n-k_{M-2}$, and the downlink subframe $n-k_{M-1}$, the HARQ-ACK response that is corresponding to the first serving cell and the downlink subframe n-k and is transmitted in the uplink subframe n.

With reference to the sixth possible implementation manner of the first aspect, in a seventh possible implementation manner, the performing, by the user equipment, HARQ-ACK bundling on an HARQ-ACK response corresponding to the first serving cell and a downlink subframe $n-k_{M-2}$ in the downlink subframe n-k and an HARQ-ACK response corresponding to the first serving cell and a downlink subframe $n-k_{M-1}$ in the downlink subframe n-k, so as to obtain a bundled HARQ-ACK response corresponding to the first serving cell, the downlink subframe $n-k_{M-2}$, and the downlink subframe $n-k_{M-1}$ includes: performing, by the user equipment according to a value of a transmit power control TPC field in a downlink control information DCI format detected in the downlink subframe $n-k_{M-2}$ and/or the downlink subframe $n-k_{M-1}$, the HARQ-ACK bundling on the HARQ-ACK response corresponding to the first serving cell and the downlink subframe $n-k_{M-2}$ and the HARQ-ACK response corresponding to the first serving cell and the downlink subframe $n-k_{M-1}$, so as to obtain the bundled HARQ-ACK response corresponding to the first serving cell, the downlink subframe $n-k_{M-2}$, and the downlink subframe $n-k_{M-1}$.

With reference to the seventh possible implementation manner of the first aspect, in an eighth possible implementation manner, if the user equipment detects the DCI format in both the downlink subframe $n-k_{M-2}$ and the downlink subframe $n-k_{M-1}$, the value of the TPC field in the DCI format detected in the downlink subframe $n-k_{M-2}$ is the same as the value of the TPC field in the DCI format detected in the downlink subframe $n-k_{M-1}$.

With reference to the seventh or eighth possible implementation manner of the first aspect, in a ninth possible implementation manner, the performing, by the user equipment according to a value of a TPC field in a DCI format detected in the downlink subframe $n-k_{M-2}$ and/or the downlink subframe $n-k_{M-1}$, the HARQ-ACK bundling on the HARQ-ACK response corresponding to the first serving cell and the downlink subframe $n-k_{M-2}$ and the HARQ-ACK response corresponding to the first serving cell and the downlink subframe $n-k_{M-1}$, so as to obtain the bundled HARQ-ACK response corresponding to the first serving cell, the downlink subframe $n-k_{M-2}$, and the downlink subframe $n-k_{M-1}$ includes the following: if the user equipment detects the DCI format only in the downlink subframe $n-k_{M-2}$, and the value of the TPC field in the DCI format is a first value, the bundled HARQ-ACK response corresponding to the first serving cell, the downlink subframe $n-k_{M-2}$, and the downlink subframe $n-k_{M-1}$ is the HARQ-ACK response corresponding to the first serving cell and the downlink subframe $n-k_{M-2}$; if the user equipment detects the DCI format only in the downlink subframe $n-k_{M-1}$, and the value of the TPC field in the DCI format is a first value, the bundled HARQ-ACK response corresponding to the first serving cell, the downlink subframe $n-k_{M-2}$, and the downlink subframe $n-k_{M-1}$ is the HARQ-ACK response corresponding to the first serving cell and the downlink subframe $n-k_{M-1}$; if the user equipment detects the DCI format only in the downlink subframe $n-k_{M-2}$, and the value of the TPC field in the DCI format is a second value, the bundled HARQ-ACK response corresponding to the first serving cell, the downlink subframe $n-k_{M-2}$, and the downlink subframe $n-k_{M-1}$ is discontinuous transmission DTX; and if the user equipment detects the DCI format only in the downlink subframe $n-k_{M-1}$, and the value of the TPC field in the DCI format is a second value, the bundled HARQ-ACK response corresponding to the first serving cell, the downlink subframe n−$k_{M-2}$, and the downlink subframe n−$k_{M-1}$ is DTX; where the first value is unequal to the second value.

With reference to the ninth possible implementation manner of the first aspect, in a tenth possible implementation manner, the first value is corresponding to a first physical uplink control channel PUCCH resource, the second value is corresponding to a second physical uplink control channel PUCCH resource, and the first PUCCH resource and the second PUCCH resource are PUCCH resources configured for the user equipment.

With reference to the tenth possible implementation manner of the first aspect, in an eleventh possible implementation manner, the first PUCCH resource and/or the second PUCCH resource each includes at least two PUCCH resources.

With reference to the first aspect or any one of the first to fifth possible implementation manners of the first aspect, in a twelfth possible implementation manner, before the transmitting, by the user equipment in an uplink subframe n, an HARQ-ACK response corresponding to the first serving cell and the downlink subframe n−k, the transmission method includes: performing, by the user equipment, HARQ-ACK bundling on an HARQ-ACK response corresponding to the first serving cell and a downlink subframe n−$k_0$ in the downlink subframe n−k and an HARQ-ACK response corresponding to the first serving cell and a downlink subframe n−$k_1$ in the downlink subframe n−k, so as to obtain a bundled HARQ-ACK response corresponding to the first serving cell, the downlink subframe n−$k_0$, and the downlink subframe n−$k_1$, where n−$k_0$ and n−$k_1$ are first two elements in the set K; and determining, by the user equipment according to the bundled HARQ-ACK response corresponding to the first serving cell, the downlink subframe n−$k_0$, and the downlink subframe n−$k_1$, the HARQ-ACK response that is corresponding to the first serving cell and the downlink subframe n−k and is transmitted in the uplink subframe n.

With reference to the first aspect or any one of the first to twelfth possible implementation manners of the first aspect, in a thirteenth possible implementation manner, the receiving, by a user equipment, on a first serving cell and in a downlink subframe n−k, physical downlink shared channel PDSCH transmission or a downlink control channel that indicates downlink semi-persistent scheduling SPS release includes: receiving, by the user equipment, on the first serving cell and in the downlink subframe n−k, the downlink control channel, where the downlink control channel is an enhanced physical downlink control channel EPDCCH, the downlink control channel is used for indicating the PDSCH transmission or used for indicating the downlink SPS release, an HARQ-ACK resource offset field in a downlink control information DCI format carried on the downlink control channel is used as a downlink assignment index DAI field, and the DAI is used for indicating an accumulative number of downlink control channels in the downlink subframe n−k.

With reference to any one of the sixth to thirteenth possible implementation manners of the first aspect, in a fourteenth possible implementation manner, the transmitting, by the user equipment in an uplink subframe n, a hybrid automatic repeat request acknowledgement response corresponding to the first serving cell and the downlink subframe n−k includes: transmitting, by the user equipment in the uplink subframe n and in a physical uplink control channel PUCCH format 1b channel selection manner, the HARQ-ACK response corresponding to the first serving cell and the downlink subframe n−k.

With reference to any one of the first to fourteenth possible implementation manners of the first aspect, in a fifteenth possible implementation manner, the first serving cell is a secondary serving cell of the user equipment, and the second serving cell is a primary serving cell of the user equipment.

With reference to any one of the first to fifth possible implementation manners of the first aspect, in a sixteenth possible implementation manner, the transmitting, by the user equipment in an uplink subframe n, a hybrid automatic repeat request acknowledgement response corresponding to the first serving cell and the downlink subframe n−k further includes: transmitting, by the user equipment, on the second serving cell and in the uplink subframe n, the HARQ-ACK response corresponding to the first serving cell and the downlink subframe n−k.

With reference to the first aspect or with reference to the first possible implementation manner of the first aspect, in a seventeenth possible implementation manner, the first HARQ-ACK timing is determined according to a reference uplink-downlink configuration of the first serving cell, where when the number of serving cells configured for the user equipment is 2, the reference uplink-downlink configuration of the first serving cell is an uplink-downlink configuration 5, and when the number of serving cells configured for the user equipment is greater than 2, the reference uplink-downlink configuration of the first serving cell is an uplink-downlink configuration 2 or an uplink-downlink configuration 4.

With reference to the first aspect or with reference to the first possible implementation manner of the first aspect, in an eighteenth possible implementation manner, the first HARQ-ACK timing is determined according to a reference uplink-downlink configuration of the first serving cell, where when the number of serving cells configured for the user equipment is 2, the reference uplink-downlink configuration of the first serving cell is an uplink-downlink configuration 5, and the serving cells configured for the user equipment include one first serving cell and one second serving cell, and when the number of serving cells configured for the user equipment is greater than 2, the reference uplink-downlink configuration of the first serving cell is an uplink-downlink configuration 2 or an uplink-downlink configuration 4, and the serving cells configured for the user equipment include at least one first serving cell or include at least one second serving cell.

With reference to the seventeenth possible implementation manner of the first aspect, or with reference to the eighteenth possible implementation manner of the first aspect, or with reference to the first possible implementation manner to the seventeenth possible implementation manner, or with reference to the first possible implementation manner to the eighteenth possible implementation manner, that the reference uplink-downlink configuration of the first serving cell is an uplink-downlink configuration 2 or an uplink-downlink configuration 4 includes the following: when an uplink-downlink configuration of the primary serving cell of the user equipment is the uplink-downlink configuration 0, the reference uplink-downlink configuration of the first serving cell is the uplink-downlink configuration 2; when an uplink-downlink configuration of the primary serving cell of the user equipment is the uplink-downlink configuration 1, the reference uplink-downlink configuration of the first serving cell is the uplink-downlink configuration 2; when an uplink-downlink configuration of the primary serving cell of the user equipment is the uplink-downlink configuration 2, the reference uplink-downlink configuration of the first serving cell is the uplink-downlink configuration 2; when an uplink-downlink configuration of the primary serving cell of the user equipment is the uplink-downlink configuration 3, the reference uplink-downlink configuration of the first serving cell is the uplink-downlink configuration 4; when an uplink-downlink configuration of the primary serving cell of the user equipment is the uplink-downlink configuration 4, the reference uplink-downlink configuration of the first serving cell is the uplink-downlink configuration 4; and when an uplink-downlink configuration of the primary serving cell of the user equipment is the uplink-downlink configuration 6, the reference uplink-downlink configuration of the first serving cell is the uplink-downlink configuration 2.

Alternatively, with reference to the seventeenth possible implementation manner of the first aspect, or with reference to the eighteenth possible implementation manner of the first aspect, or with reference to the first possible implementation manner to the seventeenth possible implementation manner, or with reference to the first possible implementation manner to the eighteenth possible implementation manner, that the reference uplink-downlink configuration of the first serving cell is an uplink-downlink configuration 2 or an uplink-downlink configuration 4 includes the following: when an uplink-downlink configuration of the primary serving cell of the user equipment is the uplink-downlink configuration 0, the reference uplink-downlink configuration of the first serving cell is the uplink-downlink configuration 4; when an uplink-downlink configuration of the primary serving cell of the user equipment is the uplink-downlink configuration 1, the reference uplink-downlink configuration of the first serving cell is the uplink-downlink configuration 4; when an uplink-downlink configuration of the primary serving cell of the user equipment is the uplink-downlink configuration 2, the reference uplink-downlink configuration of the first serving cell is the uplink-downlink configuration 2; when an uplink-downlink configuration of the primary serving cell of the user equipment is the uplink-downlink configuration 3, the reference uplink-downlink configuration of the first serving cell is the uplink-downlink configuration 4; when an uplink-downlink configuration of the primary serving cell of the user equipment is the uplink-downlink configuration 4, the reference uplink-downlink configuration of the first serving cell is the uplink-downlink configuration 4; and when an uplink-downlink configuration of the primary serving cell of the user equipment is the uplink-downlink configuration 6, the reference uplink-downlink configuration of the first serving cell is the uplink-downlink configuration 4.

Alternatively, with reference to the seventeenth possible implementation manner of the first aspect, or with reference to the eighteenth possible implementation manner of the first aspect, or with reference to the first possible implementation manner to the seventeenth possible implementation manner, or with reference to the first possible implementation manner to the eighteenth possible implementation manner, that the reference uplink-downlink configuration of the first serving cell is an uplink-downlink configuration 2 or an uplink-downlink configuration 4 includes the following: when an uplink-downlink configuration of the primary serving cell of the user equipment is the uplink-downlink configuration 0, the reference uplink-downlink configuration of the first serving cell is the uplink-downlink configuration 2 or the uplink-downlink configuration 4; when an uplink-downlink configuration of the primary serving cell of the user equipment is the uplink-downlink configuration 1, the reference uplink-downlink configuration of the first serving cell is the uplink-downlink configuration 2 or the uplink-downlink configuration 4; when an uplink-downlink configuration of the primary serving cell of the user equipment is the uplink-downlink configuration 2, the reference uplink-downlink configuration of the first serving cell is the uplink-downlink configuration 2; when an uplink-downlink configuration of the primary serving cell of the user equipment is the uplink-downlink configuration 3, the reference uplink-downlink configuration of the first serving cell is the uplink-downlink configuration 4; when an uplink-downlink configuration of the primary serving cell of the user equipment is the uplink-downlink configuration 4, the reference uplink-downlink configuration of the first serving cell is the uplink-downlink configuration 4; and when an uplink-downlink configuration of the primary serving cell of the user equipment is the uplink-downlink configuration 6, the reference uplink-downlink configuration of the first serving cell is the uplink-downlink configuration 2 or the uplink-downlink configuration 4.

A second aspect of the present invention provides a user equipment, including a reception management module, a response transmitting module, and a timing processing module; where the reception management module is configured to receive, on a first serving cell and in a downlink subframe n−k, physical downlink shared channel PDSCH transmission or a downlink control channel that indicates downlink semi-persistent scheduling SPS release, where the first serving cell is a serving cell corresponding to the user equipment, and a duplex mode of the first serving cell is frequency division duplex FDD; the response transmitting module is configured to transmit, in an uplink subframe n, a hybrid automatic repeat request acknowledgement HARQ-ACK response corresponding to the first serving cell and the downlink subframe n−k; and the timing processing module is configured to determine a set K according to first HARQ-ACK timing, where n is an integer, k is a positive integer, and k belongs to the set K.

With reference to the second aspect, in a first possible implementation manner, the reception management module is further configured to receive, on a second serving cell and in a downlink subframe n−k1, PDSCH transmission or a downlink control channel that indicates downlink SPS release, where the second serving cell is a serving cell corresponding to the user equipment, and a duplex mode of the second serving cell is time division duplex TDD; the response transmitting module is further configured to transmit, in the uplink subframe n, an HARQ-ACK response corresponding to the second serving cell and the downlink subframe n−k1; and the timing processing module is further configured to: determine second HARQ-ACK timing according to an uplink-downlink configuration or a reference uplink-downlink configuration of the second serving cell, and determine a set K1 according to the second HARQ-ACK timing, where k1 is a positive integer, and k1 belongs to the set K1.

With reference to the second aspect or the first possible implementation manner, in a second possible implementation manner, the timing processing module is further configured to determine the first HARQ-ACK timing according to a reference uplink-downlink configuration of the first serving cell.

With reference to the first possible implementation manner of the second aspect, in a third possible implementation manner, the timing processing module is specifically configured to determine the first HARQ-ACK timing according to a reference uplink-downlink configuration of the first serving cell, and the reference uplink-downlink configuration of the first serving cell is the uplink-downlink configuration of the second serving cell or the reference uplink-downlink configuration of the second serving cell.

With reference to the first or third possible implementation manner of the second aspect, in a fourth possible implementation manner, the set K includes at least one element that does not belong to the set K1.

With reference to the second or third possible implementation manner of the second aspect, in a fifth possible implementation manner, the timing processing module is specifically configured to: when the reference uplink-downlink configuration of the first serving cell is an uplink-downlink configuration 0, make the uplink subframe n correspond to a subframe 2, a subframe 3, a subframe 4, a subframe 7, a subframe 8, and a subframe 9 in one radio frame, and when the uplink subframe n is corresponding to a subframe 2 and a subframe 7 in one radio frame, make the set K be {6, 5}, when the uplink subframe n is corresponding to a subframe 3 and a subframe 8 in one radio frame, make the set K be {5, 4}, and when the uplink subframe n is corresponding to a subframe 4 and a subframe 9 in one radio frame, make the set K be {4}; or when the reference uplink-downlink configuration of the first serving cell is an uplink-downlink configuration 0, make the uplink subframe n correspond to a subframe 2, a subframe 4, a subframe 7, and a subframe 9 in one radio frame, and when the uplink subframe n is corresponding to a subframe 2 and a subframe 7 in one radio frame, make the set K be {10, 9, 6}, and when the uplink subframe n is corresponding to a subframe 4 and a subframe 9 in one radio frame, make the set K be {5, 4}; when the reference uplink-downlink configuration of the first serving cell is an uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K be {7, 6, 5}, and when the uplink subframe n is corresponding to a subframe 3 and a subframe 8 in one radio frame, make the set K be {5, 4}; or when the reference uplink-downlink configuration of the first serving cell is an uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K be {9, 7, 6}, and when the uplink subframe n is corresponding to a subframe 3 and a subframe 8 in one radio frame, make the set K be {6, 4}; when the reference uplink-downlink configuration of the first serving cell is an uplink-downlink configuration 2, make the uplink subframe n correspond to a subframe 2 and a subframe 7 in one radio frame, and make the set K be {8, 7, 6, 5, 4}; when the reference uplink-downlink configuration of the first serving cell is an uplink-downlink configuration 3, make the uplink subframe n correspond to a subframe 2, a subframe 3, and a subframe 4 in one radio frame, and when the uplink subframe n is corresponding to a subframe 2 in one radio frame, make the set K be {11, 10, 7, 6}, when the uplink subframe n is corresponding to a subframe 3 in a radio frame, make the set K be {10, 6, 5}, and when the uplink subframe n is corresponding to a subframe 4 in one radio frame, make the set K be {10, 5, 4}; or when the reference uplink-downlink configuration of the first serving cell is an uplink-downlink configuration 3, make the uplink subframe n correspond to a subframe 2, a subframe 3, and a subframe 4 in one radio frame, and when the uplink subframe n is corresponding to a subframe 2 in one radio frame, make the set K be {11, 10, 9, 8} or {10, 9, 8, 11}, when the uplink subframe n is corresponding to a subframe 3 in one radio frame, make the set K be {8, 7, 6}, and when the uplink subframe n is corresponding to a subframe 4 in one radio frame, make the set K be {6, 5, 4}; or when the reference uplink-downlink configuration of the first serving cell is an uplink-downlink configuration 3, make the uplink subframe n correspond to a subframe 2, a subframe 3, and a subframe 4 in one radio frame, and when the uplink subframe n is corresponding to a subframe 2 in one radio frame, make the set K be {11, 10, 9} or {10, 9, 11}, when the uplink subframe n is corresponding to a subframe 3 in one radio frame, make the set K be {9, 8, 7, 6}, and when the uplink subframe n is corresponding to a subframe 4 in one radio frame, make the set K be {6, 5, 4}; when the reference uplink-downlink configuration of the first serving cell is an uplink-downlink configuration 4, make the uplink subframe n correspond to a subframe 2 and a subframe 3 in one radio frame, and when the uplink subframe n is corresponding to a subframe 2 in one radio frame, make the set K be {12, 11, 10, 8, 7}, and when the uplink subframe n is corresponding to a subframe 3 in one radio frame, make the set K be {10, 7, 6, 5, 4}; or when the reference uplink-downlink configuration of the first serving cell is an uplink-downlink configuration 4, make the uplink subframe n correspond to a subframe 2 and a subframe 3 in one radio frame, when the uplink subframe n is corresponding to a subframe 2 in one radio frame, make the set K be {12, 11, 10, 9, 8} or {12, 10, 9, 8, 11}, and when the uplink subframe n is corresponding to a subframe 3 in one radio frame, make the set K be {8, 7, 6, 5, 4}; when the reference uplink-downlink configuration of the first serving cell is an uplink-downlink configuration 5, make the uplink subframe n correspond to a subframe 2 in one radio frame, and make the set K be {13, 12, 11, 10, 9, 8, 7, 6, 5, 4}; and when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, and a subframe 7 in one radio frame, make the set K be {7, 5}, when the uplink subframe n is corresponding to a subframe 4 in one radio frame, make the set K be {5}, and when the uplink subframe n is corresponding to a subframe 8 in one radio frame, make the set K be {7, 5, 4}; or when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, a subframe 7, and a subframe 8 in one radio frame, make the set K be {10, 7}, and when the uplink subframe n is corresponding to a subframe 4 in one radio frame, make the set K be {10, 5}; or when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2 in one radio frame, make the set K be {10, 9}, when the uplink subframe n is corresponding to a subframe 3 in one radio frame, make the set K be {9, 8}, when the uplink subframe n is corresponding to a subframe 4 in one radio frame, make the set K be {8, 7}, when the uplink subframe n is corresponding to a subframe 7 in one radio frame, make the set K be {9, 8}, and when the uplink subframe n is corresponding to a subframe 8 in one radio frame, make the set K be {8, 7}.

With reference to the second aspect or any one of the first to fifth possible implementation manners of the second aspect, in a sixth possible implementation manner, the user equipment further includes a bundling processing module, configured to perform HARQ-ACK bundling on an HARQ-ACK response corresponding to the first serving cell and a downlink subframe $n-k_{M-2}$ in the downlink subframe n–k and an HARQ-ACK response corresponding to the first serving cell and a downlink subframe $n-k_{M-1}$ in the downlink subframe n–k before the response transmitting module transmits, in the uplink subframe n, the HARQ-ACK response corresponding to the first serving cell and the downlink subframe n–k, so as to obtain a bundled HARQ-ACK response corresponding to the first serving cell, the downlink subframe $n-k_{M-2}$, and the downlink subframe $n-k_{M-1}$, where $n-k_{M-2}$ and $n-k_{M-1}$ are last two elements in the set K, and M is the number of elements in the set K; and a response determining module, configured to determine, according to the HARQ-ACK response that is bundled by the bundling processing module and is corresponding to the first serving cell, the downlink subframe $n-k_{M-2}$, and the downlink subframe $n-k_{M-1}$, the HARQ-ACK response that is corresponding to the first serving cell and the downlink subframe n–k and is transmitted in the uplink subframe n.

With reference to the sixth possible implementation manner of the second aspect, in a seventh possible implementation manner, the bundling processing module is specifically configured to: perform, according to a value of a transmit power control TPC field in a downlink control information DCI format detected in the downlink subframe $n-k_{M-2}$ and/or the downlink subframe $n-k_{M-1}$, the HARQ-ACK bundling on the HARQ-ACK response corresponding to the first serving cell and the downlink subframe $n-k_{M-2}$ and the HARQ-ACK response corresponding to the first serving cell and the downlink subframe $n-k_{M-1}$, so as to obtain the bundled HARQ-ACK response corresponding to the first serving cell, the downlink subframe $n-k_{M-2}$, and the downlink subframe $n-k_{M-1}$.

With reference to the seventh possible implementation manner of the second aspect, in an eighth possible implementation manner, if the bundling processing module detects the DCI format in both the downlink subframe $n-k_{M-2}$ and the downlink subframe $n-k_{M-1}$, the value of the TPC field in the DCI format detected in the downlink subframe $n-k_{M-2}$ is the same as the value of the TPC field in the DCI format detected in the downlink subframe $n-k_{M-1}$.

With reference to the seventh or eighth possible implementation manner of the second aspect, in a ninth possible implementation manner, if the bundling processing module detects the DCI format only in the downlink subframe $n-k_{M-2}$, and the value of the TPC field in the DCI format is a first value, the bundled HARQ-ACK response corresponding to the first serving cell, the downlink subframe $n-k_{M-2}$, and the downlink subframe $n-k_{M-1}$ is the HARQ-ACK response corresponding to the first serving cell and the downlink subframe $n-k_{M-2}$; if the bundling processing module detects the DCI format only in the downlink subframe $n-k_{M-1}$, and the value of the TPC field in the DCI format is a first value, the bundled HARQ-ACK response corresponding to the first serving cell, the downlink subframe $n-k_{M-2}$, and the downlink subframe $n-k_{M-1}$ is the HARQ-ACK response corresponding to the first serving cell and the downlink subframe $n-k_{M-1}$; if the bundling processing module detects the DCI format only in the downlink subframe $n-k_{M-2}$, and the value of the TPC field in the DCI format is a second value, the bundled HARQ-ACK response corresponding to the first serving cell, the downlink subframe $n-k_{M-2}$, and the downlink subframe $n-k_{M-1}$ is discontinuous transmission DTX; and if the bundling processing module detects the DCI format only in the downlink subframe $n-k_{M-1}$, and the value of the TPC field in the DCI format is a second value, the bundled HARQ-ACK response corresponding to the first serving cell, the downlink subframe $n-k_{M-2}$, and the downlink subframe $n-k_{M-1}$ is DTX; where the first value is unequal to the second value.

With reference to the ninth possible implementation manner of the second aspect, in a tenth possible implementation manner, the first value is corresponding to a first physical uplink control channel PUCCH resource, the second value is corresponding to a second physical uplink control channel PUCCH resource, and the first PUCCH resource and the second PUCCH resource are PUCCH resources configured for the user equipment.

With reference to the tenth possible implementation manner of the second aspect, in an eleventh possible implementation manner, the first PUCCH resource and/or the second PUCCH resource each includes at least two PUCCH resources.

With reference to the second aspect or any one of the first to fifth possible implementation manners of the second aspect, in a twelfth possible implementation manner, the user equipment further includes: a bundling processing module, configured to perform HARQ-ACK bundling on an HARQ-ACK response corresponding to the first serving cell and a downlink subframe $n-k_0$ in the downlink subframe n–k and an HARQ-ACK response corresponding to the first serving cell and a downlink subframe $n-k_1$ in the downlink subframe n–k, so as to obtain a bundled HARQ-ACK response corresponding to the first serving cell, the downlink subframe $n-k_0$, and the downlink subframe $n-k_1$, where $n-k_0$ and $n-k_1$ are first two elements in the set K; and a response determining module, configured to determine, according to the bundled HARQ-ACK response corresponding to the first serving cell, the downlink subframe $n-k_0$, and the downlink subframe $n-k_1$, the HARQ-ACK response that is corresponding to the first serving cell and the downlink subframe n–k and is transmitted in the uplink subframe n.

With reference to the second aspect or any one of the first to twelfth possible implementation manners of the second aspect, in a thirteenth possible implementation manner, the downlink control channel, received by the reception management module on the first serving cell and in the downlink subframe n–k, is an enhanced physical downlink control channel EPDCCH, the downlink control channel is used for indicating the physical downlink shared channel transmission or used for indicating the downlink SPS release, an HARQ-ACK resource offset field in a downlink control information DCI format carried on the downlink control channel is used as a downlink assignment index DAI field, and the DAI is used for indicating an accumulative number of downlink control channels in the downlink subframe n–k.

With reference to any one of the sixth to thirteenth possible implementation manners of the second aspect, in a fourteenth possible implementation manner, the response transmitting module is specifically configured to transmit, in the uplink subframe n and in a physical uplink control channel PUCCH format 1b channel selection manner, the HARQ-ACK response corresponding to the first serving cell and the downlink subframe n–k.

With reference to any one of the first to fourteenth possible implementation manners of the second aspect, in a fifteenth possible implementation manner, the first serving cell is a secondary serving cell of the user equipment, and the second serving cell is a primary serving cell of the user equipment.

With reference to the first to the fifteenth possible implementation manners of the second aspect, in a sixteenth possible implementation manner, the response transmitting module is further configured to transmit, on the second serving cell and in the uplink subframe n, the HARQ-ACK response corresponding to the first serving cell and the downlink subframe n–k.

With reference to the second aspect or with reference to the first possible implementation manner of the second aspect, in a seventeenth possible implementation manner, the timing processing module is specifically configured to: determine the first HARQ-ACK timing according to a reference uplink-downlink configuration of the first serving cell, where when the number of serving cells configured for the user equipment is 2, the reference uplink-downlink configuration of the first serving cell is an uplink-downlink configuration 5, and when the number of serving cells configured for the user equipment is greater than 2, the reference uplink-downlink configuration of the first serving cell is an uplink-downlink configuration 2 or an uplink-downlink configuration 4.

With reference to the second aspect or with reference to the first possible implementation manner of the second aspect, in an eighteenth possible implementation manner, the timing processing module is specifically configured to: determine the first HARQ-ACK timing according to a reference uplink-downlink configuration of the first serving cell, where when the number of serving cells configured for the user equipment is 2, the reference uplink-downlink configuration of the first serving cell is an uplink-downlink configuration 5, and the serving cells configured for the user equipment include one first serving cell and one second serving cell; and when the number of serving cells configured for the user equipment is greater than 2, the reference uplink-downlink configuration of the first serving cell is an uplink-downlink configuration 2 or an uplink-downlink configuration 4, and the serving cells configured for the user equipment include at least one first serving cell or include at least one second serving cell.

A third aspect of the present invention provides a user equipment, including a processor, a receiver, and a transmitter; where the receiver is configured to receive, on a first serving cell and in a downlink subframe n–k, physical downlink shared channel PDSCH transmission or a downlink control channel that indicates downlink semi-persistent scheduling SPS release, where the first serving cell is a serving cell corresponding to the user equipment, and a duplex mode of the first serving cell is frequency division duplex FDD; the transmitter is configured to transmit, in an uplink subframe n, a hybrid automatic repeat request acknowledgement HARQ-ACK response corresponding to the first serving cell and the downlink subframe n–k; and the processor is configured to determine a set K according to first HARQ-ACK timing, where n is an integer, k is a positive integer, and k belongs to the set K.

With reference to the third aspect, in a first possible implementation manner, the receiver is further configured to receive, on a second serving cell and in a downlink subframe n–k1, PDSCH transmission or a downlink control channel that indicates downlink SPS release, where the second serving cell is a serving cell corresponding to the user equipment, and a duplex mode of the second serving cell is time division duplex TDD; the transmitter is further configured to transmit, in the uplink subframe n, an HARQ-ACK response corresponding to the second serving cell and the downlink subframe n–k1; and the processor is further configured to: determine second HARQ-ACK timing according to an uplink-downlink configuration or a reference uplink-downlink configuration of the second serving cell, and determine a set K1 according to the second HARQ-ACK timing, where k1 is a positive integer, and k1 belongs to the set K1.

With reference to the third aspect or the first possible implementation manner, in a second possible implementation manner, the processor is configured to determine the first HARQ-ACK timing according to a reference uplink-downlink configuration of the first serving cell.

With reference to the second possible implementation manner of the third aspect, in a third possible implementation manner, the processor is specifically configured to determine the first HARQ-ACK timing according to the reference uplink-downlink configuration of the first serving cell, and the reference uplink-downlink configuration of the first serving cell is the uplink-downlink configuration of the second serving cell or the reference uplink-downlink configuration of the second serving cell.

With reference to the first or second possible implementation manner of the third aspect, in a fourth possible implementation manner, the processor is specifically configured to: when the reference uplink-downlink configuration of the first serving cell is an uplink-downlink configuration 0, make the uplink subframe n correspond to a subframe 2, a subframe 3, a subframe 4, a subframe 7, a subframe 8, and a subframe 9 in one radio frame, and when the uplink subframe n is corresponding to a subframe 2 and a subframe 7 in one radio frame, make the set K be {6, 5}, when the uplink subframe n is corresponding to a subframe 3 and a subframe 8 in one radio frame, make the set K be {5, 4}, and when the uplink subframe n is corresponding to a subframe 4 and a subframe 9 in one radio frame, make the set K be {4}; or when the reference uplink-downlink configuration of the first serving cell is an uplink-downlink configuration 0, make the uplink subframe n correspond to a subframe 2, a subframe 4, a subframe 7, and a subframe 9 in one radio frame, and when the uplink subframe n is corresponding to a subframe 2 and a subframe 7 in one radio frame, make the set K be {10, 9, 6}, and when the uplink subframe n is corresponding to a subframe 4 and a subframe 9 in one radio frame, make the set K be {5, 4}; when the reference uplink-downlink configuration of the first serving cell is an uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K be {7, 6, 5}, and when the uplink subframe n is corresponding to a subframe 3 and a subframe 8 in one radio frame, make the set K be {5, 4}; or when the reference uplink-downlink configuration of the first serving cell is an uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K be {9, 7, 6}, and when the uplink subframe n is corresponding to a subframe 3 and a subframe 8 in one radio frame, make the set K be {6, 4}; when the reference uplink-downlink configuration of the first serving cell is an uplink-downlink configuration 2, make the uplink subframe n correspond to a subframe 2 and a subframe 7 in one radio frame, and make the set K be {8, 7, 6, 5, 4}; when the reference uplink-downlink configuration of the first serving cell is an uplink-downlink configuration 3, make the uplink subframe n correspond to a subframe 2, a subframe 3, and a subframe 4 in one radio frame, and when the uplink subframe n is corresponding to a subframe 2 in one radio frame, make the set K be {11, 10, 7, 6}, when the uplink subframe n is corresponding to a subframe 3 in a radio frame, make the set K be {10, 6, 5}, and when the uplink subframe n is corresponding to a subframe 4 in one radio frame, make the set K be {10, 5, 4}; or when the reference uplink-downlink configuration of the first serving cell is an uplink-downlink configuration 3, make the uplink subframe n correspond to a subframe 2, a subframe 3, and a subframe 4 in one radio frame, and when the uplink subframe n is corresponding to a subframe 2 in one radio frame, make the set K be {11, 10, 9, 8} or {10, 9, 8, 11}, when the uplink subframe n is corresponding to a subframe 3 in one radio frame, make the set K be {8, 7, 6}, and when the uplink subframe n is corresponding to a subframe 4 in one radio frame, make the set K be {6, 5, 4}; or when the reference uplink-downlink configuration of the first serving cell is an uplink-downlink configuration 3, make the uplink subframe n correspond to a subframe 2, a subframe 3, and a subframe 4 in one radio frame, and when the uplink subframe n is corresponding to a subframe 2 in one radio frame, make the set K be {11, 10, 9} or {10, 9, 11}, when the uplink subframe n is corresponding to a subframe 3 in one radio frame, make the set K be {9, 8, 7, 6}, and when the uplink subframe n is corresponding to a subframe 4 in one radio frame, make the set K be {6, 5, 4}; when the reference uplink-downlink configuration of the first serving cell is an uplink-downlink configuration 4, make the uplink subframe n correspond to a subframe 2 and a subframe 3 in one radio frame, and when the uplink subframe n is corresponding to a subframe 2 in one radio frame, make the set K be {12, 11, 10, 8, 7}, and when the uplink subframe n is corresponding to a subframe 3 in one radio frame, make the set K be {10, 7, 6, 5, 4}; or when the reference uplink-downlink configuration of the first serving cell is an uplink-downlink configuration 4, make the uplink subframe n correspond to a subframe 2 and a subframe 3 in one radio frame, when the uplink subframe n is corresponding to a subframe 2 in one radio frame, make the set K be {12, 11, 10, 9, 8} or {12, 10, 9, 8, 11}, and when the uplink subframe n is corresponding to a subframe 3 in one radio frame, make the set K be {8, 7, 6, 5, 4}; when the reference uplink-downlink configuration of the first serving cell is an uplink-downlink configuration 5, make the uplink subframe n correspond to a subframe 2 in one radio frame, and make the set K be {13, 12, 11, 10, 9, 8, 7, 6, 5, 4}; and when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, and a subframe 7 in one radio frame, make the set K be {7, 5}, when the uplink subframe n is corresponding to a subframe 4 in one radio frame, make the set K be {5}, and when the uplink subframe n is corresponding to a subframe 8 in one radio frame, make the set K be {7, 5, 4}; or when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, a subframe 7, and a subframe 8 in one radio frame, make the set K be {10, 7}, and when the uplink subframe n is corresponding to a subframe 4 in one radio frame, make the set K be {10, 5}; or when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2 in one radio frame, make the set K be {10, 9}, when the uplink subframe n is corresponding to a subframe 3 in one radio frame, make the set K be {9, 8}, when the uplink subframe n is corresponding to a subframe 4 in one radio frame, make the set K be {8, 7}, when the uplink subframe n is corresponding to a subframe 7 in one radio frame, make the set K be {9, 8}, and when the uplink subframe n is corresponding to a subframe 8 in one radio frame, make the set K be {8, 7}.

With reference to the first to fourth possible implementation manners of the third aspect, in a fifth possible implementation manner, the transmitter is further configured to transmit, on the second serving cell and in the uplink subframe n, the HARQ-ACK response corresponding to the first serving cell and the downlink subframe n−k.

A fourth aspect of the present invention provides a hybrid automatic repeat request acknowledgement transmission method, including: sending, by a base station, on a first serving cell and in a downlink subframe n−k, physical downlink shared channel PDSCH transmission or a downlink control channel that indicates downlink semi-persistent scheduling SPS release, to a user equipment, where the first serving cell is a serving cell corresponding to the user equipment, and a duplex mode of the first serving cell is frequency division duplex FDD; and receiving, by the base station in an uplink subframe n, an HARQ-ACK response that is corresponding to the first serving cell and the downlink subframe n−k and is fed back by the user equipment; where n is an integer, k is a positive integer, k belongs to a set K, and the set K is determined according to first HARQ-ACK timing.

With reference to the fourth aspect, in a first possible implementation manner, the transmission method further includes: sending, by the base station, on a second serving cell and in a downlink subframe n−k1, PDSCH transmission or a downlink control channel that indicates downlink SPS release, to the user equipment, where the second serving cell is a serving cell corresponding to the user equipment, and a duplex mode of the second serving cell is frequency division duplex TDD; and receiving, by the base station, in the uplink subframe n, an HARQ-ACK response that is corresponding to the second serving cell and the downlink subframe n−k1 and is fed back by the user equipment; where k1 is a positive integer, k1 belongs to a set K1, the set K1 is determined according to second HARQ-ACK timing, and the second HARQ-ACK timing is determined according to an uplink-downlink configuration or a reference uplink-downlink configuration of the second serving cell.

With reference to the fourth aspect or the first possible implementation manner of the fourth aspect, in a second possible implementation manner, the first HARQ-ACK timing is determined according to a reference uplink-downlink configuration of the first serving cell.

With reference to the first possible implementation manner of the fourth aspect, in a third possible implementation manner, the first HARQ-ACK timing is determined according to a reference uplink-downlink configuration of the first serving cell, and the reference uplink-downlink configuration of the first serving cell is the uplink-downlink configuration of the second serving cell or the reference uplink-downlink configuration of the second serving cell.

With reference to the first or third possible implementation manner of the fourth aspect, in a fourth possible implementation manner, the set K includes at least one element that does not belong to the set K1.

With reference to the second or third possible implementation manner of the fourth aspect, in a fifth possible implementation manner, that the set K is determined according to first HARQ-ACK timing, and that the first HARQ-ACK timing is determined according to a reference uplink-downlink configuration of the first serving cell include the following: When the reference uplink-downlink configuration of the first serving cell is an uplink-downlink configuration 0, the uplink subframe n is corresponding to a subframe 2, a subframe 3, a subframe 4, a subframe 7, a subframe 8, and a subframe 9 in one radio frame, and when the uplink subframe n is corresponding to a subframe 2 and a subframe 7 in one radio frame, the set K is {6, 5}, when the uplink subframe n is corresponding to a subframe 3 and a subframe 8 in one radio frame, the set K is {5, 4}, and when the uplink subframe n is corresponding to a subframe 4 and a subframe 9 in one radio frame, the set K is {4}; or when the reference uplink-downlink configuration of the first serving cell is an uplink-downlink configuration 0, the uplink subframe n is corresponding to a subframe 2, a subframe 4, a subframe 7, and a subframe 9 in one radio frame, and when the uplink subframe n is corresponding to a subframe 2 and a subframe 7 in one radio frame, the set K is {10, 9, 6}, and when the uplink subframe n is corresponding to a subframe 4 and a subframe 9 in one radio frame, the set K is {5, 4}. When the reference uplink-downlink configuration of the first serving cell is an uplink-downlink configuration 1, the uplink subframe n is corresponding to a subframe 2, a subframe 3, a subframe 7, and a subframe 8 in one radio frame, and when the uplink subframe n is corresponding to a subframe 2 and a subframe 7 in one radio frame, the set K is {7, 6, 5}, and when the uplink subframe n is corresponding to a subframe 3 and a subframe 8 in one radio frame, the set K is {5, 4}; or when the reference uplink-downlink configuration of the first serving cell is an uplink-downlink configuration 1, the uplink subframe n is corresponding to a subframe 2, a subframe 3, a subframe 7, and a subframe 8 in one radio frame, and when the uplink subframe n is corresponding to a subframe 2 and a subframe 7 in one radio frame, the set K is {9, 7, 6}, and when the uplink subframe n is corresponding to a subframe 3 and a subframe 8 in one radio frame, the set K is {6, 4}. When the reference uplink-downlink configuration of the first serving cell is an uplink-downlink configuration 2, the uplink subframe n is corresponding to a subframe 2 and a subframe 7 in one radio frame, and the set K is {8, 7, 6, 5, 4}. When the reference uplink-downlink configuration of the first serving cell is an uplink-downlink configuration 3, the uplink subframe n is corresponding to a subframe 2, a subframe 3, and a subframe 4 in one radio frame, and when the uplink subframe n is corresponding to a subframe 2 in one radio frame, the set K is {11, 10, 7, 6}, when the uplink subframe n is corresponding to a subframe 3 in a radio frame, the set K is {10, 6, 5}, and when the uplink subframe n is corresponding to a subframe 4 in one radio frame, the set K is {10, 5, 4}; or when the reference uplink-downlink configuration of the first serving cell is an uplink-downlink configuration 3, the uplink subframe n is corresponding to a subframe 2, a subframe 3, and a subframe 4 in one radio frame, and when the uplink subframe n is corresponding to a subframe 2 in one radio frame, the set K is {11, 10, 9, 8} or {10, 9, 8, 11}, when the uplink subframe n is corresponding to a subframe 3 in one radio frame, the set K is {8, 7, 6}, and when the uplink subframe n is corresponding to a subframe 4 in one radio frame, the set K is {6, 5, 4}; or when the reference uplink-downlink configuration of the first serving cell is an uplink-downlink configuration 3, the uplink subframe n is corresponding to a subframe 2, a subframe 3, and a subframe 4 in one radio frame, and when the uplink subframe n is corresponding to a subframe 2 in one radio frame, the set K is {11, 10, 9} or {10, 9, 11}, when the uplink subframe n is corresponding to a subframe 3 in one radio frame, the set K is {9, 8, 7, 6}, and when the uplink subframe n is corresponding to a subframe 4 in one radio frame, the set K is {6, 5, 4}. When the reference uplink-downlink configuration of the first serving cell is an uplink-downlink configuration 4, the uplink subframe n is corresponding to a subframe 2 and a subframe 3 in one radio frame, and when the uplink subframe n is corresponding to a subframe 2 in one radio frame, the set K is {12, 11, 10, 8, 7}, and when the uplink subframe n is corresponding to a subframe 3 in one radio frame, the set K is {10, 7, 6, 5, 4}; or when the reference uplink-downlink configuration of the first serving cell is an uplink-downlink configuration 4, the uplink subframe n is corresponding to a subframe 2 and a subframe 3 in one radio frame, and when the uplink subframe n is corresponding to a subframe 2 in one radio frame, the set K is {12, 11, 10, 9, 8} or {12, 10, 9, 8, 11}, and when the uplink subframe n is corresponding to a subframe 3 in one radio frame, the set K is {8, 7, 6, 5, 4}. When the reference uplink-downlink configuration of the first serving cell is an uplink-downlink configuration 5, the uplink subframe n is corresponding to a subframe 2 in one radio frame, and the set K is {13, 12, 11, 10, 9, 8, 7, 6, 5, 4}. When the reference uplink-downlink configuration of the first serving cell is an uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2, a subframe 3, and a subframe 7 in one radio frame, the set K is {7, 5}, when the uplink subframe n is corresponding to a subframe 4 in one radio frame, the set K is {5}, and when the uplink subframe n is corresponding to a subframe 8 in one radio frame, the set K is {7, 5, 4}; or when the reference uplink-downlink configuration of the first serving cell is an uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2, a subframe 3, a subframe 7, and a subframe 8 in one radio frame, the set K is {10, 7}, and when the uplink subframe n is corresponding to a subframe 4 in one radio frame, the set K is {10, 5}; or when the reference uplink-downlink configuration of the first serving cell is an uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2 in one radio frame, the set K is {10, 9}, when the uplink subframe n is corresponding to a subframe 3 in one radio frame, the set K is {9, 8}, when the uplink subframe n is corresponding to a subframe 4 in one radio frame, the set K is {8, 7}, when the uplink subframe n is corresponding to a subframe 7 in one radio frame, the set K is {9, 8}, and when the uplink subframe n is corresponding to a subframe 8 in one radio frame, the set K is {8, 7}.

With reference to the fourth aspect or any one of the first to fifth possible implementation manners of the fourth aspect, in a sixth possible implementation manner, the receiving, by the base station in an uplink subframe n, an HARQ-ACK response that is corresponding to the first serving cell and the downlink subframe n−k and is fed back by the user equipment includes: receiving, by the base station in the uplink subframe n, the HARQ-ACK response that is corresponding to the first serving cell and the downlink subframe n−k and is fed back by the user equipment, and determining, according to a manner in which HARQ-ACK bundling is performed on an HARQ-ACK response corresponding to the first serving cell and a downlink subframe n−$k_{M-2}$ in the downlink subframe n−k and an HARQ-ACK response corresponding to the first serving cell and a downlink subframe n−$k_{M-1}$ in the downlink subframe n−k, an HARQ-ACK response corresponding to the first serving cell and each downlink subframe in the downlink subframe n−k; where, if in the downlink subframe n−$k_{M-2}$ and the downlink subframe n−$k_{M-1}$, the base station sends, on the first serving cell and only in the downlink subframe n−$k_{M-2}$ or only in the downlink subframe n−$k_{M-1}$, a downlink control channel to the user equipment, a value of a transmit power control TPC field in a downlink control information DCI format carried on the downlink control channel sent to the user equipment on the first serving cell and only in the downlink subframe n−$k_{M-2}$ or only in the downlink subframe n−$k_{M-1}$ is a first value; and if in the downlink subframe n−$k_{M-2}$ and the downlink subframe n−$k_{M-1}$, the base station sends, on the first serving cell and in both the downlink subframe n−$k_{M-2}$ and the downlink subframe n−$k_{M-1}$, a downlink control channel to the user equipment, and values of TPC fields in DCI formats that are carried on the downlink control channel which is sent to the user equipment on the first serving cell and in the downlink subframe n−$k_{M-2}$, and carried on the downlink control channel which is sent to the user equipment on the first serving cell and in the downlink subframe n−$k_{M-1}$ are a second value, where the first value is unequal to the second value.

With reference to the sixth possible implementation manner of the fourth aspect, in a seventh possible implementation manner, the first value is corresponding to a first physical uplink control channel PUCCH resource, the second value is corresponding to a second physical uplink control channel PUCCH resource, and the first PUCCH resource and the second PUCCH resource are PUCCH resources configured for the user equipment.

With reference to the seventh possible implementation manner of the fourth aspect, in an eighth possible implementation manner, the first PUCCH resource and/or the second PUCCH resource each includes at least two PUCCH resources.

With reference to the fourth aspect or any one of the first to eighth possible implementation manners of the fourth aspect, in a ninth possible implementation manner, the downlink control channel is an enhanced physical downlink control channel EPDCCH, the downlink control channel is used for indicating the PDSCH transmission or used for indicating the downlink SPS release, an HARQ-ACK resource offset field in a downlink control information DCI format carried on the downlink control channel is used as a downlink assignment index DAI field, and the DAI is used for indicating an accumulative number of downlink control channels in the downlink subframe n−k.

With reference to any one of the sixth to ninth possible implementation manners of the fourth aspect, in a tenth possible implementation manner, the receiving, by the base station in an uplink subframe n, a hybrid automatic repeat request acknowledgement response that is corresponding to the first serving cell and the downlink subframe n−k and is fed back by the user equipment includes: receiving, by the base station in the uplink subframe n and in a physical uplink control channel PUCCH format 1b channel selection manner, the HARQ-ACK response that is corresponding to the first serving cell and the downlink subframe n−k and is fed back by the user equipment.

With reference to any one of the first to tenth possible implementation manners of the fourth aspect, in an eleventh possible implementation manner, the first serving cell is a secondary serving cell of the user equipment, and the second serving cell is a primary serving cell of the user equipment.

With reference to any one of the first to eleventh possible implementation manners of the fourth aspect, in a twelfth possible implementation manner, the receiving, by the base station in an uplink subframe n, a hybrid automatic repeat request acknowledgement response that is corresponding to the first serving cell and the downlink subframe n−k and is fed back by the user equipment further includes: receiving, by the base station, on the second serving cell and in the uplink subframe n, the HARQ-ACK response that is corresponding to the first serving cell and the downlink subframe n−k and is fed back by the user equipment.

With reference to the fourth aspect or the first possible implementation manner of the fourth aspect, in a thirteenth possible implementation manner, the first HARQ-ACK timing is determined according to a reference uplink-downlink configuration of the first serving cell, where when the number of serving cells configured for the user equipment is 2, the reference uplink-downlink configuration of the first serving cell is an uplink-downlink configuration 5, and when the number of serving cells configured for the user equipment is greater than 2, the reference uplink-downlink configuration of the first serving cell is an uplink-downlink configuration 2 or an uplink-downlink configuration 4.

With reference to the fourth aspect or the first possible implementation manner of the fourth aspect, in a fourteenth possible implementation manner, the first HARQ-ACK timing is determined according to a reference uplink-downlink configuration of the first serving cell, where when the number of serving cells configured for the user equipment is 2, the reference uplink-downlink configuration of the first serving cell is an uplink-downlink configuration 5, and the serving cells configured for the user equipment include one first serving cell and one second serving cell, and when the number of serving cells configured for the user equipment is greater than 2, the reference uplink-downlink configuration of the first serving cell is an uplink-downlink configuration 2 or an uplink-downlink configuration 4, and the serving cells configured for the user equipment include at least one first serving cell or include at least one second serving cell.

With reference to the thirteenth possible implementation manner of the fourth aspect, or with reference to the fourteenth possible implementation manner of the fourth aspect, or with reference to the first possible implementation manner to the thirteenth possible implementation manner of the fourth aspect, or with reference to the first possible implementation manner to the fourteenth possible implementation manner of the fourth aspect, that the reference uplink-downlink configuration of the first serving cell is an uplink-downlink configuration 2 or an uplink-downlink configuration 4 includes the following: when an uplink-downlink configuration of the primary serving cell of the user equipment is the uplink-downlink configuration 0, the reference uplink-downlink configuration of the first serving cell is the uplink-downlink configuration 2; when an uplink-downlink configuration of the primary serving cell of the user equipment is the uplink-downlink configuration 1, the reference uplink-downlink configuration of the first serving cell is the uplink-downlink configuration 2; when an uplink-downlink configuration of the primary serving cell of the user equipment is the uplink-downlink configuration 2, the reference uplink-downlink configuration of the first serving cell is the uplink-downlink configuration 2; when an uplink-downlink configuration of the primary serving cell of the user equipment is the uplink-downlink configuration 3, the reference uplink-downlink configuration of the first serving cell is the uplink-downlink configuration 4; when an uplink-downlink configuration of the primary serving cell of the user equipment is the uplink-downlink configuration 4, the reference uplink-downlink configuration of the first serving cell is the uplink-downlink configuration 4; and when an uplink-downlink configuration of the primary serving cell of the user equipment is the uplink-downlink configuration 6, the reference uplink-downlink configuration of the first serving cell is the uplink-downlink configuration 2.

Alternatively, with reference to the thirteenth possible implementation manner of the fourth aspect, or with reference to the fourteenth possible implementation manner of the fourth aspect, or with reference to the first possible implementation manner to the thirteenth possible implementation manner of the fourth aspect, or with reference to the first possible implementation manner to the fourteenth possible implementation manner of the fourth aspect, that the reference uplink-downlink configuration of the first serving cell is an uplink-downlink configuration 2 or an uplink-downlink configuration 4 includes the following: when an uplink-downlink configuration of the primary serving cell of the user equipment is the uplink-downlink configuration 0, the reference uplink-downlink configuration of the first serving cell is the uplink-downlink configuration 4; when an uplink-downlink configuration of the primary serving cell of the user equipment is the uplink-downlink configuration 1, the reference uplink-downlink configuration of the first serving cell is the uplink-downlink configuration 4; when an uplink-downlink configuration of the primary serving cell of the user equipment is the uplink-downlink configuration 2, the reference uplink-downlink configuration of the first serving cell is the uplink-downlink configuration 2; when an uplink-downlink configuration of the primary serving cell of the user equipment is the uplink-downlink configuration 3, the reference uplink-downlink configuration of the first serving cell is the uplink-downlink configuration 4; when an uplink-downlink configuration of the primary serving cell of the user equipment is the uplink-downlink configuration 4, the reference uplink-downlink configuration of the first serving cell is the uplink-downlink configuration 4; and when an uplink-downlink configuration of the primary serving cell of the user equipment is the uplink-downlink configuration 6, the reference uplink-downlink configuration of the first serving cell is the uplink-downlink configuration 4.

Alternatively, with reference to the thirteenth possible implementation manner of the fourth aspect, or with reference to the fourteenth possible implementation manner of the fourth aspect, or with reference to the first possible implementation manner to the thirteenth possible implementation manner of the fourth aspect, or with reference to the first possible implementation manner to the fourteenth possible implementation manner of the fourth aspect, that the reference uplink-downlink configuration of the first serving cell is an uplink-downlink configuration 2 or an uplink-downlink configuration 4 includes the following: when an uplink-downlink configuration of the primary serving cell of the user equipment is the uplink-downlink configuration 0, the reference uplink-downlink configuration of the first serving cell is the uplink-downlink configuration 2 or the uplink-downlink configuration 4; when an uplink-downlink configuration of the primary serving cell of the user equipment is the uplink-downlink configuration 1, the reference uplink-downlink configuration of the first serving cell is the uplink-downlink configuration 2 or the uplink-downlink configuration 4; when an uplink-downlink configuration of the primary serving cell of the user equipment is the uplink-downlink configuration 2, the reference uplink-downlink configuration of the first serving cell is the uplink-downlink configuration 2; when an uplink-downlink configuration of the primary serving cell of the user equipment is the uplink-downlink configuration 3, the reference uplink-downlink configuration of the first serving cell is the uplink-downlink configuration 4; when an uplink-downlink configuration of the primary serving cell of the user equipment is the uplink-downlink configuration 4, the reference uplink-downlink configuration of the first serving cell is the uplink-downlink configuration 4; and when an uplink-downlink configuration of the primary serving cell of the user equipment is the uplink-downlink configuration 6, the reference uplink-downlink configuration of the first serving cell is the uplink-downlink configuration 2 or the uplink-downlink configuration 4.

A fifth aspect of the present invention provides a base station, including a sending module, a receiving module, and a timing management module; where the sending module is configured to send, on a first serving cell and in a downlink subframe n–k, physical downlink shared channel PDSCH transmission or a downlink control channel that indicates downlink semi-persistent scheduling SPS release, to a user equipment, where the first serving cell is a serving cell corresponding to the user equipment, and a duplex mode of the first serving cell is frequency division duplex FDD; the receiving module is configured to receive, in the uplink subframe n, an HARQ-ACK response that is corresponding to the first serving cell and the downlink subframe n–k and is fed back by the user equipment; and the timing management module is configured to determine a set K according to first HARQ-ACK timing, where n is an integer, k is a positive integer, and k belongs to the set K.

With reference to the fifth aspect, in a first possible implementation manner, the sending module is further configured to send, on a second serving cell and in a downlink subframe n–k1, PDSCH transmission or a downlink control channel that indicates downlink SPS release, to the user equipment, where the second serving cell is a serving cell corresponding to the user equipment, and a duplex mode of the second serving cell is frequency division duplex TDD; the receiving module is further configured to receive, in the uplink subframe n, an HARQ-ACK response that is corresponding to the second serving cell and the downlink subframe n–k1 and is fed back by the user equipment; and the timing management module is further configured to: determine second HARQ-ACK timing according to an uplink-downlink configuration or a reference uplink-downlink configuration of the second serving cell, and determine a set K1 according to the second HARQ-ACK timing, where k1 is a positive integer, and k1 belongs to the set K1.

With reference to the fifth aspect or the first possible implementation manner of the fifth aspect, in a second possible implementation manner, the timing management module is further configured to determine the first HARQ- ACK timing according to a reference uplink-downlink configuration of the first serving cell.

With reference to the first possible implementation manner of the fifth aspect, in a third possible implementation manner, the timing management module is specifically configured to determine the first HARQ-ACK timing according to a reference uplink-downlink configuration of the first serving cell, and the reference uplink-downlink configuration of the first serving cell is the uplink-downlink configuration of the second serving cell or the reference uplink-downlink configuration of the second serving cell.

With reference to the first or third possible implementation manner of the fifth aspect, in a fourth possible implementation manner, the set K includes at least one element that does not belong to the set K1.

With reference to the second or third possible implementation manner of the fifth aspect, in a fifth possible implementation manner, the timing management module is specifically configured to: when the reference uplink-downlink configuration of the first serving cell is an uplink-downlink configuration 0, make the uplink subframe n correspond to a subframe 2, a subframe 3, a subframe 4, a subframe 7, a subframe 8, and a subframe 9 in one radio frame, and when the uplink subframe n is corresponding to a subframe 2 and a subframe 7 in one radio frame, make the set K be {6, 5}, when the uplink subframe n is corresponding to a subframe 3 and a subframe 8 in one radio frame, make the set K be {5, 4}, and when the uplink subframe n is corresponding to a subframe 4 and a subframe 9 in one radio frame, make the set K be {4}; or when the reference uplink-downlink configuration of the first serving cell is an uplink-downlink configuration 0, make the uplink subframe n correspond to a subframe 2, a subframe 4, a subframe 7, and a subframe 9 in one radio frame, and when the uplink subframe n is corresponding to a subframe 2 and a subframe 7 in one radio frame, make the set K be {10, 9, 6}, and when the uplink subframe n is corresponding to a subframe 4 and a subframe 9 in one radio frame, make the set K be {5, 4}; when the reference uplink-downlink configuration of the first serving cell is an uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K be {7, 6, 5}, and when the uplink subframe n is corresponding to a subframe 3 and a subframe 8 in one radio frame, make the set K be {5, 4}; or when the reference uplink-downlink configuration of the first serving cell is an uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K be {9, 7, 6}, and when the uplink subframe n is corresponding to a subframe 3 and a subframe 8 in one radio frame, make the set K be {6, 4}; when the reference uplink-downlink configuration of the first serving cell is an uplink-downlink configuration 2, make the uplink subframe n correspond to a subframe 2 and a subframe 7 in one radio frame, and make the set K be {8, 7, 6, 5, 4}; when the reference uplink-downlink configuration of the first serving cell is an uplink-downlink configuration 3, make the uplink subframe n correspond to a subframe 2, a subframe 3, and a subframe 4 in one radio frame, and when the uplink subframe n is corresponding to a subframe 2 in one radio frame, make the set K be {11, 10, 7, 6}, when the uplink subframe n is corresponding to a subframe 3 in a radio frame, make the set K be {10, 6, 5}, and when the uplink subframe n is corresponding to a subframe 4 in one radio frame, make the set K be {10, 5, 4}; or when the reference uplink-downlink configuration of the first serving cell is an uplink-downlink configuration 3, make the uplink subframe n correspond to a subframe 2, a subframe 3, and a subframe 4 in one radio frame, and when the uplink subframe n is corresponding to a subframe 2 in one radio frame, make the set K be {11, 10, 9, 8} or {10, 9, 8, 11}, when the uplink subframe n is corresponding to a subframe 3 in one radio frame, make the set K be {8, 7, 6}, and when the uplink subframe n is corresponding to a subframe 4 in one radio frame, make the set K be {6, 5, 4}; or when the reference uplink-downlink configuration of the first serving cell is an uplink-downlink configuration 3, make the uplink subframe n correspond to a subframe 2, a subframe 3, and a subframe 4 in one radio frame, and when the uplink subframe n is corresponding to a subframe 2 in one radio frame, make the set K be {11, 10, 9} or {10, 9, 11}, when the uplink subframe n is corresponding to a subframe 3 in one radio frame, make the set K be {9, 8, 7, 6}, and when the uplink subframe n is corresponding to a subframe 4 in one radio frame, make the set K be {6, 5, 4}; when the reference uplink-downlink configuration of the first serving cell is an uplink-downlink configuration 4, make the uplink subframe n correspond to a subframe 2 and a subframe 3 in one radio frame, and when the uplink subframe n is corresponding to a subframe 2 in one radio frame, make the set K be {12, 11, 10, 8, 7}, and when the uplink subframe n is corresponding to a subframe 3 in one radio frame, make the set K be {10, 7, 6, 5, 4}; or when the reference uplink-downlink configuration of the first serving cell is an uplink-downlink configuration 4, make the uplink subframe n correspond to a subframe 2 and a subframe 3 in one radio frame, when the uplink subframe n is corresponding to a subframe 2 in one radio frame, make the set K be {12, 11, 10, 9, 8} or {12, 10, 9, 8, 11}, and when the uplink subframe n is corresponding to a subframe 3 in one radio frame, make the set K be {8, 7, 6, 5, 4}; when the reference uplink-downlink configuration of the first serving cell is an uplink-downlink configuration 5, make the uplink subframe n correspond to a subframe 2 in one radio frame, and make the set K be {13, 12, 11, 10, 9, 8, 7, 6, 5, 4}; and when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, and a subframe 7 in one radio frame, make the set K be {7, 5}, when the uplink subframe n is corresponding to a subframe 4 in one radio frame, make the set K be {5}, and when the uplink subframe n is corresponding to a subframe 8 in one radio frame, make the set K be {7, 5, 4}; or when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, a subframe 7, and a subframe 8 in one radio frame, make the set K be {10, 7}, and when the uplink subframe n is corresponding to a subframe 4 in one radio frame, make the set K be {10, 5}; or when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2 in one radio frame, make the set K be {10, 9}, when the uplink subframe n is corresponding to a subframe 3 in one radio frame, make the set K be {9, 8}, when the uplink subframe n is corresponding to a subframe 4 in one radio frame, make the set K be {8, 7}, when the uplink subframe n is corresponding to a subframe 7 in one radio frame, make the set K be {9, 8}, and when the uplink subframe n is corresponding to a subframe 8 in one radio frame, make the set K be {8, 7}.

With reference to the fifth aspect or any one of the first to fifth possible implementation manners of the fifth aspect, in a sixth possible implementation manner, the receiving module is further configured to receive, in the uplink subframe n, the HARQ-ACK response that is corresponding to the first serving cell and the downlink subframe n–k and is fed back by the user equipment, and determine, according to a manner in which HARQ-ACK bundling is performed on an HARQ-ACK responses corresponding to the first serving cell and a downlink subframe $n-k_{M-2}$ in the downlink subframe n–k and an HARQ-ACK response corresponding to the first serving cell and a downlink subframe $n-k_{M-1}$ in the downlink subframe n–k, an HARQ-ACK response corresponding to the first serving cell and each downlink subframe in the downlink subframe n–k; where, if in the downlink subframe $n-k_{M-2}$ and the downlink subframe $n-k_{M-1}$, the sending module sends, on the first serving cell and only in the downlink subframe $n-k_{M-2}$ or only in the downlink subframe $n-k_{M-1}$, a downlink control channel to the user equipment, a value of a transmit power control TPC field in a downlink control information DCI format carried on the downlink control channel sent to the user equipment on the first serving cell and only in the downlink subframe $n-k_{M-2}$ or only in the downlink subframe $n-k_{M-1}$ is a first value; and if in the downlink subframe $n-k_{M-2}$ and the downlink subframe $n-k_{M-1}$, the sending module sends, on the first serving cell and in both the downlink subframe $n-k_{M-2}$ and the downlink subframe $n-k_{M-1}$, a downlink control channel to the user equipment, and values of TPC fields in DCI formats that are carried on the downlink control channel which is sent to the user equipment on the first serving cell and the downlink subframe $n-k_{M-2}$, and carried on the downlink control channel which is sent to the user equipment on the first serving cell and in the downlink subframe $n-k_{M-1}$ are a second value, where the first value is unequal to the second value.

With reference to the sixth possible implementation manner of the fifth aspect, in a seventh possible implementation manner, the first value is corresponding to a first physical uplink control channel PUCCH resource, the second value is corresponding to a second physical uplink control channel PUCCH resource, and the first PUCCH resource and the second PUCCH resource are PUCCH resources configured for the user equipment.

With reference to the seventh possible implementation manner of the fifth aspect, in an eighth possible implementation manner, the first PUCCH resource and/or the second PUCCH resource each includes at least two PUCCH resources.

With reference to the fifth aspect or any one of the first to eighth possible implementation manners of the fifth aspect, in a ninth possible implementation manner, the downlink control channel is an enhanced physical downlink control channel EPDCCH, the downlink control channel is used for indicating the PDSCH transmission or used for indicating the downlink SPS release, an HARQ-ACK resource offset field in a downlink control information DCI format carried on the downlink control channel is used as a downlink assignment index DAI field, and the DAI is used for indicating an accumulative number of downlink control channels in the downlink subframe n–k.

With reference to the fifth aspect or any one of the sixth to ninth possible implementation manners of the fifth aspect, in a tenth possible implementation manner, the receiving module is specifically configured to receive, in the uplink subframe n and in a physical uplink control channel PUCCH format 1b channel selection manner, the HARQ-ACK response that is corresponding to the first serving cell and the downlink subframe n–k and is fed back by the user equipment.

With reference to any one of the first to tenth possible implementation manners of the fifth aspect, in an eleventh possible implementation manner, the first serving cell is a secondary serving cell of the user equipment, and the second serving cell is a primary serving cell of the user equipment.

With reference to the first to eleventh possible implementation manners of the fifth aspect, in a twelfth possible implementation manner, receiving module is further configured to receive, on the second serving cell and in the uplink subframe n, the HARQ-ACK response that is corresponding to the first serving cell and the downlink subframe n–k and is fed back by the user equipment.

With reference to the fifth aspect or the first possible implementation manner of the fifth aspect, in a thirteenth possible implementation manner, the timing processing module is further configured to: determine the first HARQ-ACK timing according to a reference uplink-downlink configuration of the first serving cell, where when the number of serving cells configured for the user equipment is 2, the reference uplink-downlink configuration of the first serving cell is an uplink-downlink configuration 5, and when the number of serving cells configured for the user equipment is greater than 2, the reference uplink-downlink configuration of the first serving cell is an uplink-downlink configuration 2 or an uplink-downlink configuration 4.

With reference to the fifth aspect or the first possible implementation manner of the fifth aspect, in a fourteenth possible implementation manner, the timing processing module is further configured to: determine the first HARQ-ACK timing according to a reference uplink-downlink configuration of the first serving cell, where when the number of serving cells configured for the user equipment is 2, the reference uplink-downlink configuration of the first serving cell is an uplink-downlink configuration 5, and the serving cells configured for the user equipment include one first serving cell and one second serving cell; and when the number of serving cells configured for the user equipment is greater than 2, the reference uplink-downlink configuration of the first serving cell is an uplink-downlink configuration 2 or an uplink-downlink configuration 4, and the serving cells configured for the user equipment include at least one first serving cell or include at least one second serving cell.

According to the embodiments of the present invention, a transmission mechanism of an HARQ-ACK of an FDD carrier is defined, and setting of HARQ-ACK timing of an FDD serving cell is changed, which resolves a problem that some downlink subframes on the FDD serving cell have no corresponding uplink subframe in which an HARQ-ACK is fed back, so that a base station can fully schedule and utilize these downlink subframes to send information to a user equipment, thereby improving a resource utilization rate and effectively avoiding a technical problem of an HARQ-ACK feedback delay.

DETAILED DESCRIPTION

Figure 1:
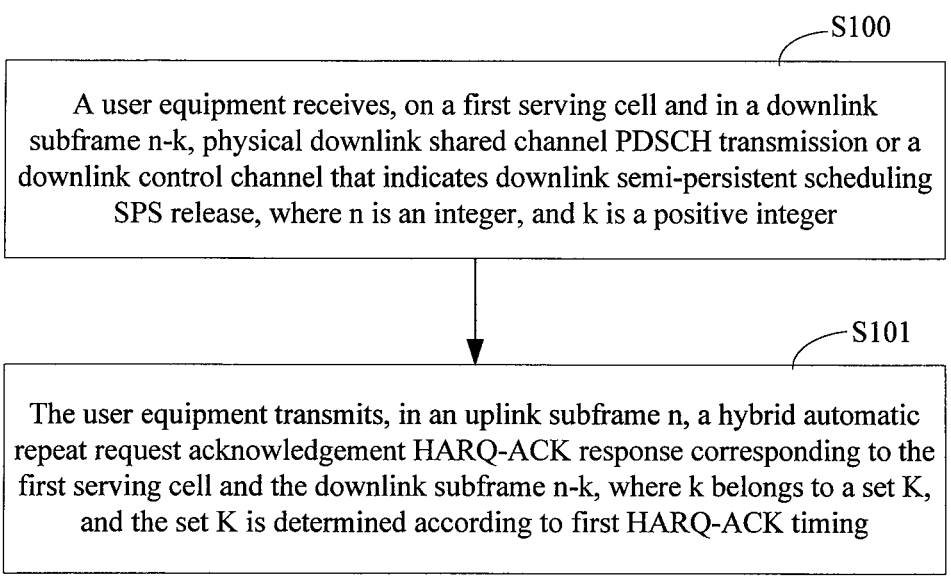
FIG. 1 is a schematic flowchart of a first embodiment of a hybrid automatic repeat request acknowledgement transmission method according to an embodiment of the present invention.

In the following description, to illustrate rather than limit, specific details such as a particular system structure, an interface, and a technology are provided to make a thorough understanding of the present invention. However, it should be understood by persons skilled in the art that the present invention can also be implemented in other embodiments without the specific details. In other cases, detailed descriptions of well known apparatuses, circuits and methods are omitted, so that the present invention is described without being disturbed by the unnecessary details.

Technologies described in this specification may be applied to various communications systems, for example, current 2G and 3G communications systems and a next-generation communications system, for example, a Global System for Mobile Communications (GSM, Global System for Mobile communications), a Code Division Multiple Access (CDMA, Code Division Multiple Access) system, a Time Division Multiple Access (TDMA, Time Division Multiple Access) system, a Wideband Code Division Multiple Access (WCDMA, Wideband Code Division Multiple Access) system, a Frequency Division Multiple Access (FDMA, Frequency Division Multiple Address) system, an Orthogonal Frequency-Division Multiple Access (OFDMA, Orthogonal Frequency-Division Multiple Access) system, a single-carrier FDMA (SC-FDMA) system, a General Packet Radio Service (GPRS, General Packet Radio Service) system, a Long Term Evolution (LTE, Long Term Evolution) system, and other communications systems of this type.

Various aspects are described in this specification in conjunction with a user equipment and/or a base station and/or a base station controller.

The user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (such as RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be called a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), a user device (User Device), or a user equipment (User Equipment).

The base station (for example, an access point) may refer to a device in communication with a wireless terminal by using one or more sectors at an air interface in an access network. The base station may be configured to mutually convert a received over-the-air frame and an IP packet and serve as a router between the wireless terminal and a rest portion of the access network, where the rest portion of the access network may include an Internet protocol (IP) network. The base station may also coordinate attribute management of the air interface.

For example, the base station may be a base station controller (Base Station Controller, BSC) in a 2G network, a radio network controller (Radio Network Controller, RNC) in a 3G network, or an evolved Node B (evolved Node B, eNodeB) in an LTE network. For example, the base station may be a base station (BTS, Base Transceiver Station) in GSM or CDMA, may also be a base station (NodeB) in WCDMA, and may further be an evolved NodeB (NodeB, eNB, or e-NodeB, evolved Node B) in the LTE, which is not limited in the present invention.

The base station controller may be a base station controller (BSC, base station controller) in GSM or CDMA, or a radio network controller (RNC, Radio Network Controller) in WCDMA, which is not limited in the present invention.

In addition, the terms "system" and "network" may be used interchangeably in this specification. The term "and/or" in this specification describes only an association relationship of associated objects and represents that three relationships may exist. For example, A and/or B may represent the following three cases: Only A exists, both A and B exist, and only B exists. In addition, the character "/" in this specification generally indicates an "or" relationship between the associated objects.

Referring to FIG. 1, FIG. 1 is a schematic flowchart of a first embodiment of a hybrid automatic repeat request acknowledgement transmission method according to an embodiment of the present invention, and the hybrid automatic repeat request acknowledgement transmission method in this embodiment includes, but is not limited to, the following steps.

Step S100: A user equipment receives, on a first serving cell and in a downlink subframe n−k, physical downlink shared channel PDSCH transmission or a downlink control channel that indicates downlink semi-persistent scheduling SPS release, where n is an integer, and k is a positive integer.

In step S100, the first serving cell may be a serving cell corresponding to the user equipment, and a duplex mode of the first serving cell may be FDD, or all subframes on the first serving cell are downlink subframes, or one radio frame on the first serving cell includes nine downlink subframes and one special subframe, or the first serving cell is a supplemental downlink serving cell, or a duplex mode of the first serving cell is time division duplex TDD and all subframes on the first serving cell are downlink subframes, or a duplex mode of the first serving cell is time division duplex TDD and one radio frame on the first serving cell includes nine downlink subframes and one special subframe, or a duplex mode of the first serving cell is time division duplex TDD and an uplink-downlink configuration of the first serving cell is an uplink-downlink configuration 7. It should be noted that, in this embodiment, that a user equipment receives, on a first serving cell and in a downlink subframe n–k, PDSCH transmission or a downlink control channel that indicates downlink SPS release may be understood as that the user equipment receives, in the downlink subframe n–k, the PDSCH transmission carried on the first serving cell or the downlink control channel that indicates the downlink SPS release, or may be understood as that the user equipment receives, in the downlink subframe n–k, a PDSCH transmitted on the first serving cell or the downlink control channel that indicates the downlink SPS release. In all embodiments of the present invention, the uplink-downlink configuration 7 may indicate that all subframes of one radio frame are downlink subframes, or may indicate that one radio frame includes nine downlink subframes and one special subframe. In all embodiments of the present invention, a feature of a supplemental downlink serving cell may be that all subframes on the serving cell are downlink subframes, or may be that one radio frame on the serving cell includes nine downlink subframes and one special subframe, or may be that a duplex mode of the serving cell is time division duplex TDD and all subframes on the first serving cell are downlink subframes, or may be that a duplex mode of the serving cell is time division duplex TDD and one radio frame on the first serving cell includes nine downlink subframes and one special subframe, or may be that a duplex mode of the serving cell is time division duplex TDD and an uplink-downlink configuration of the first serving cell is the uplink-downlink configuration 7.

It should be noted that, in step S100, that a user equipment receives, on a first serving cell and in a downlink subframe n–k, PDSCH transmission or a downlink control channel that indicates downlink SPS release may include the following two situations.

Situation 1: The PDSCH transmission has a corresponding downlink control channel in the downlink subframe n–k.

In Situation 1, step S100 may be: A user equipment detects a downlink control channel in a downlink subframe n–k, where the downlink control channel is a PDCCH or an enhanced physical downlink control channel EPDCCH, and the downlink control channel is used for indicating PDSCH transmission transmitted on a first serving cell or used for indicating downlink SPS release.

Alternatively, step S100 may be: A user equipment receives, on a first serving cell and in a downlink subframe n–k, a downlink control channel, where the downlink control channel is an EPDCCH or a PDCCH, the downlink control channel is used for indicating PDSCH transmission or used for indicating downlink SPS release, a downlink control information DCI format carried on the downlink control channel includes a downlink assignment index DAI field, and the DAI is used for indicating an accumulative number of downlink control channels in the downlink subframe n–k.

Alternatively, step S100 may be: A user equipment receives, on a first serving cell and in a downlink subframe n–k, a downlink control channel, where the downlink control channel is an EPDCCH, the downlink control channel is used for indicating PDSCH transmission or used for indicating downlink SPS release, an HARQ-ACK resource offset field in the DCI format carried on the downlink control channel is used as a DAI field, and the DAI is used for indicating an accumulative number of downlink control channels in the downlink subframe n–k.

The downlink DCI format may be a DCI format 1, 1A, 1B, 1D, 2, 2A, 2B, 2C, 2D, or 2E. In addition, the PDSCH transmission and the downlink control channel corresponding to the PDSCH transmission are transmitted in a same downlink subframe.

Situation 2: The PDSCH transmission has no corresponding downlink control channel in the downlink subframe n–k.

In Situation 2, the PDSCH transmission may be SPS transmission, and in this case, a downlink control channel corresponding to the PDSCH is transmitted in a downlink subframe in which SPS is activated, and in this case, the downlink control channel may also carry a DAI field, where for a detailed description of the DAI field, reference may be made to a relevant description in Situation 1, and details are not repeatedly described herein.

It should be noted that, step S100 may further include the following step:

Step 100': The user equipment receives, on a second serving cell and in a downlink subframe n–k1, PDSCH transmission or a downlink control channel that indicates downlink SPS release, where k1 is a positive integer.

In step 100', the second serving cell is a serving cell corresponding to the user equipment, and a difference between step 100' and step S100 lies in that: a duplex mode of the second serving cell may be TDD. A specific process of receiving, by the user equipment, on the second serving cell and in the downlink subframe n–k1, the PDSCH transmission or the downlink control channel that indicates the downlink SPS release is similar to that in the foregoing Situation 1 and Situation 2 and is within an understanding scope of persons skilled in the art, which is not repeatedly described.

It is not difficult to understand that, in step S100 and step 100' of step S100, the serving cell corresponding to the user equipment may refer to a serving cell configured for the user equipment by a network side device, or may refer to a serving cell providing a service for the user equipment, or may refer to a serving cell accessed by the user equipment. A serving cell in this embodiment may also be referred to as a carrier (component carrier). In this embodiment, the first serving cell may be a secondary serving cell (Secondary serving cell) of the user equipment, and the second serving cell is a primary serving cell (Primary serving cell) of the user equipment. Further, in serving cells of the user equipment, the first serving cell may refer to multiple serving cells whose duplex modes are FDD or may refer to multiple supplemental downlink serving cells, and the serving cells of the user equipment may include multiple serving cells whose duplex modes are TDD, but the second serving cell preferably refers only to a specific serving cell, used as the primary serving cell of the user equipment, in the multiple serving cells whose duplex modes are TDD.

In addition, the first serving cell and the second serving cell in this embodiment may be deployed on a same base station, or may be deployed on a same transmission point, or may be deployed in a same physical cell. Certainly, the first serving cell and the second serving cell may also be deployed on different base stations, or may be deployed on different transmission points, or may be deployed in different physical cells: for example, the first serving cell may be deployed in a macro cell, and the second serving cell may be deployed in a micro cell or small cell, or deployment is performed vice versa, which is not limited herein.

Step S101: The user equipment transmits, in an uplink subframe n, a hybrid automatic repeat request acknowledgement HARQ-ACK response corresponding to the first serving cell and the downlink subframe n−k, where k belongs to a set K, and the set K is determined according to first HARQ-ACK timing.

In step S101, the set K may be determined according to the first HARQ-ACK timing, and the first HARQ-ACK timing may be determined according to a reference uplink-downlink configuration of the first serving cell. Further, the reference uplink-downlink configuration of the first serving cell may be an uplink-downlink configuration of the second serving cell or a reference uplink-downlink configuration of the second serving cell; the reference uplink-downlink configuration of the first serving cell may further be an uplink-downlink configuration configured for the user equipment by a higher layer (for example, a base station or a network side device). Certainly, it may further refer to that the user equipment obtains the reference uplink-downlink configuration of the first serving cell by using higher-layer signaling. Further, the reference uplink-downlink configuration of the first serving cell may further be determined in the following manner (determining the reference uplink-downlink configuration of the first serving cell in this manner can not only maximize the number of available downlink subframes on the first serving cell, but also reduce UE implementation complexity and reduce test complexity by limiting available reference uplink-downlink configurations, and ensure that all the available downlink subframes on the first serving cell have corresponding uplink subframes, in which HARQ-ACKs are fed back, on the primary serving cell of the UE).

When the number of serving cells configured for the user equipment is two, the reference uplink-downlink configuration of the first serving cell is an uplink-downlink configuration 5, and when the number of serving cells configured for the user equipment is greater than two, the reference uplink-downlink configuration of the first serving cell is an uplink-downlink configuration 2 or an uplink-downlink configuration 4; or when the number of serving cells configured for the user equipment is two, the reference uplink-downlink configuration of the first serving cell is an uplink-downlink configuration 5 or an uplink-downlink configuration 2, and it is indicated by using higher-layer signaling or RRC signaling whether the reference uplink-downlink configuration of the first serving cell is the uplink-downlink configuration 5 or the uplink-downlink configuration 2. Benefits of this manner lie in that the uplink-downlink configuration 2 can also be configured when only two carriers are aggregated, so that better HARQ-ACK feedback load balance is obtained, and better HARQ-ACK transmission performance is obtained.

Alternatively, when the number of serving cells configured for the user equipment is two, the reference uplink-downlink configuration of the first serving cell is an uplink-downlink configuration 5, and the serving cells configured for the user equipment include one first serving cell and one second serving cell, and when the number of serving cells configured for the user equipment is greater than two, the reference uplink-downlink configuration of the first serving cell is an uplink-downlink configuration 2 or an uplink-downlink configuration 4, and the serving cells configured for the user equipment include at least one first serving cell or include at least one second serving cell.

That the reference uplink-downlink configuration of the first serving cell is an uplink-downlink configuration 2 or an uplink-downlink configuration 4 may further include the following:

When an uplink-downlink configuration of the primary serving cell of the user equipment is an uplink-downlink configuration 0, the reference uplink-downlink configuration of the first serving cell is the uplink-downlink configuration 2; when an uplink-downlink configuration of the primary serving cell of the user equipment is an uplink-downlink configuration 1, the reference uplink-downlink configuration of the first serving cell is the uplink-downlink configuration 2; when an uplink-downlink configuration of the primary serving cell of the user equipment is the uplink-downlink configuration 2, the reference uplink-downlink configuration of the first serving cell is the uplink-downlink configuration 2; when an uplink-downlink configuration of the primary serving cell of the user equipment is an uplink-downlink configuration 3, the reference uplink-downlink configuration of the first serving cell is the uplink-downlink configuration 4; when an uplink-downlink configuration of the primary serving cell of the user equipment is the uplink-downlink configuration 4, the reference uplink-downlink configuration of the first serving cell is the uplink-downlink configuration 4; and when an uplink-downlink configuration of the primary serving cell of the user equipment is an uplink-downlink configuration 6, the reference uplink-downlink configuration of the first serving cell is the uplink-downlink configuration 2.

Alternatively, when an uplink-downlink configuration of the primary serving cell of the user equipment is an uplink-downlink configuration 0, the reference uplink-downlink configuration of the first serving cell is the uplink-downlink configuration 4; when an uplink-downlink configuration of the primary serving cell of the user equipment is an uplink-downlink configuration 1, the reference uplink-downlink configuration of the first serving cell is the uplink-downlink configuration 4; when an uplink-downlink configuration of the primary serving cell of the user equipment is the uplink-downlink configuration 2, the reference uplink-downlink configuration of the first serving cell is the uplink-downlink configuration 2; when an uplink-downlink configuration of the primary serving cell of the user equipment is an uplink-downlink configuration 3, the reference uplink-downlink configuration of the first serving cell is the uplink-downlink configuration 4; when an uplink-downlink configuration of the primary serving cell of the user equipment is the uplink-downlink configuration 4, the reference uplink-downlink configuration of the first serving cell is the uplink-downlink configuration 4; and when an uplink-downlink configuration of the primary serving cell of the user equipment is an uplink-downlink configuration 6, the reference uplink-downlink configuration of the first serving cell is the uplink-downlink configuration 4.

When an uplink-downlink configuration of the primary serving cell of the user equipment is an uplink-downlink configuration 0, the reference uplink-downlink configuration of the first serving cell is an uplink-downlink configuration 2 or an uplink-downlink configuration 4; when an uplink-downlink configuration of the primary serving cell of the user equipment is an uplink-downlink configuration 1, the reference uplink-downlink configuration of the first serving cell is an uplink-downlink configuration 2 or an uplink-downlink configuration 4; when an uplink-downlink configuration of the primary serving cell of the user equipment is the uplink-downlink configuration 2, the reference uplink-downlink configuration of the first serving cell is the uplink-downlink configuration 2; when an uplink-downlink configuration of the primary serving cell of the user equipment is an uplink-downlink configuration 3, the reference uplink-downlink configuration of the first serving cell is the uplink-downlink configuration 4; when an uplink-downlink configuration of the primary serving cell of the user equipment is the uplink-downlink configuration 4, the reference uplink-downlink configuration of the first serving cell is the uplink-downlink configuration 4; and when an uplink-downlink configuration of the primary serving cell of the user equipment is an uplink-downlink configuration 6, the reference uplink-downlink configuration of the first serving cell is an uplink-downlink configuration 2 or an uplink-downlink configuration 4.

For example, if the set K is determined according to the first HARQ-ACK timing, and the first HARQ-ACK timing is determined according to the reference uplink-downlink configuration of the first serving cell, the user equipment may determine that the set K has the following four implementation manners, and any one of the four implementation manners may be used in the embodiment of the present invention.

Manner 1:

When the reference uplink-downlink configuration of the first serving cell is the uplink-downlink configuration 0, the uplink subframe n is corresponding to a subframe 2, a subframe 3, a subframe 4, a subframe 7, a subframe 8, and a subframe 9 in one radio frame, and when the uplink subframe n is corresponding to a subframe 2 and a subframe 7 in one radio frame, the set K includes elements 6 and 5, for example, the set K is {6, 5}, when the uplink subframe n is corresponding to a subframe 3 and a subframe 8 in one radio frame, the set K includes elements 5 and 4, for example, the set K is {5, 4}, and when the uplink subframe n is corresponding to a subframe 4 and a subframe 9 in one radio frame, the set K is {4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

Alternatively, when the reference uplink-downlink configuration of the first serving cell is the uplink-downlink configuration 0, the uplink subframe n is corresponding to a subframe 2, a subframe 3, a subframe 4, a subframe 7, a subframe 8, and a subframe 9 in one radio frame, and when the uplink subframe n is corresponding to a subframe 2 and a subframe 7 in one radio frame, the set K includes elements 6 and 5, for example, the set K is {6, 5}, when the uplink subframe n is corresponding to a subframe 3 and a subframe 8 in one radio frame, the set K is {5}, and when the uplink subframe n is corresponding to a subframe 4 and a subframe 9 in one radio frame, the set K includes elements 5 and 4, for example, the set K is {5, 4}.

Alternatively, when the reference uplink-downlink configuration of the first serving cell is the uplink-downlink configuration 0, the uplink subframe n is corresponding to a subframe 2, a subframe 4, a subframe 7, and a subframe 9 in one radio frame, and when the uplink subframe n is corresponding to a subframe 2 and a subframe 7 in one radio frame, the set K includes elements 6, 5, and 4, for example, the set K is {6, 5, 4}, and when the uplink subframe n is corresponding to a subframe 4 and a subframe 9 in one radio frame, the set K includes elements 5 and 4, for example, the set K is {5, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; on the other hand, a value of an element in the set K is enabled to be as small as possible, that is, it is ensured that a transmission delay of the first serving cell is as small as possible; and further, when this manner is applied to a scenario in which the first serving cell and the second serving cell are configured for the user equipment, an HARQ-ACK is transmitted only in an uplink subframe 2, a subframe 4, a subframe 7, and a subframe 9, that is, an HARQ-ACK of the first serving cell is transmitted only in an uplink subframe in which a corresponding HARQ-ACK of the second serving cell is also transmitted, so that both TPC fields in DCI corresponding to the two serving cells can be used for indicating both TPC and a PUCCH resource, and the HARQ-ACK transmission performance can be improved.

Alternatively, when the reference uplink-downlink configuration of the first serving cell is the uplink-downlink configuration 0, the uplink subframe n is corresponding to a subframe 2, a subframe 4, a subframe 7, and a subframe 9 in one radio frame, and when the uplink subframe n is corresponding to a subframe 2 and a subframe 7 in one radio frame, the set K includes elements 10, 9, and 6, for example, the set K is {10, 9, 6}, when the uplink subframe n is corresponding to a subframe 4 and a subframe 9 in one radio frame, the set K includes elements 5 and 4, for example, the set K is {5, 4}; in this case, on the one hand, when this manner is applied to a scenario in which the first serving cell and the second serving cell are configured for the user equipment, an HARQ-ACK is transmitted only in an uplink subframe 2, a subframe 4, a subframe 7, and a subframe 9, that is, an HARQ-ACK of the first serving cell is transmitted only in an uplink subframe in which a corresponding HARQ-ACK of the second serving cell is also transmitted, so that both TPC fields in DCI corresponding to the two serving cells can be used for indicating both TPC and a PUCCH resource, and the HARQ-ACK transmission performance can be improved; and on the other hand, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH.

Alternatively, when the reference uplink-downlink configuration of the first serving cell is the uplink-downlink configuration 0, the uplink subframe n is corresponding to a subframe 2, a subframe 3, a subframe 4, a subframe 7, a subframe 8, and a subframe 9 in one radio frame, and when the uplink subframe n is corresponding to a subframe 2, a subframe 3, a subframe 7, and a subframe 8 in one radio frame, the set K is {6, 4}, and when the uplink subframe n is corresponding to a subframe 4 and a subframe 9 in one radio frame, the set K is {4}. In this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

When the reference uplink-downlink configuration of the first serving cell is the uplink-downlink configuration 1, the uplink subframe n is corresponding to a subframe 2, a subframe 3, a subframe 7, and a subframe 8 in one radio frame, and when the uplink subframe n is corresponding to a subframe 2 and a subframe 7 in one radio frame, the set K includes elements 7, 6, and 5, for example, the set K is {7, 6, 5}, and when the uplink subframe n is corresponding to a subframe 3 and a subframe 8 in one radio frame, the set K includes elements 5 and 4, for example, the set K is {5, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

Alternatively, when the reference uplink-downlink configuration of the first serving cell is the uplink-downlink configuration 1, the uplink subframe n is corresponding to a subframe 2, a subframe 3, a subframe 7, and a subframe 8 in one radio frame, and when the uplink subframe n is corresponding to a subframe 2 and a subframe 7 in one radio frame, the set K includes elements 9, 7, and 6, for example, the set K is {9, 7, 6}, and when the uplink subframe n is corresponding to a subframe 3 and a subframe 8 in one radio frame, the set K includes elements 6 and 4, for example, the set K is {6, 4}. In this case, when this manner is applied to a scenario in which the first serving cell and the second serving cell are configured for the user equipment, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH.

Alternatively, when the reference uplink-downlink configuration of the first serving cell is the uplink-downlink configuration 1, the uplink subframe n is corresponding to a subframe 2, a subframe 3, a subframe 7, and a subframe 8 in one radio frame, and when the uplink subframe n is corresponding to a subframe 2 and a subframe 7 in one radio frame, the set K includes elements 7, 6, and 4, for example, the set K is {7, 6, 4}, and when the uplink subframe n is corresponding to a subframe 3 and a subframe 8 in one radio frame, the set K includes elements 6 and 4, for example, the set K is {6, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

When the reference uplink-downlink configuration of the first serving cell is the uplink-downlink configuration 2, the uplink subframe n is corresponding to a subframe 2 and a subframe 7 in one radio frame, and the set K includes elements 8, 7, 6, 5, and 4, for example, the set K is {8, 7, 6, 5, 4}. In this case, a value of an element in the set K is enabled to be as small as possible, that is, it is ensured that a transmission delay of the first serving cell is as small as possible.

When the reference uplink-downlink configuration of the first serving cell is the uplink-downlink configuration 3, the uplink subframe n is corresponding to a subframe 2, a subframe 3, and a subframe 4 in one radio frame, and when the uplink subframe n is corresponding to a subframe 2 in one radio frame, the set K includes elements 11, 10, 7, and 6, for example, the set K is {11, 10, 7, 6}, when the uplink subframe n is corresponding to a subframe 3 in one radio frame, the set K includes elements 10, 6, and 5, for example, the set K is {10, 6, 5}, and when the uplink subframe n is corresponding to a subframe 4 in one radio frame, the set K includes elements 10, 5, and 4, for example, the set K is {10, 5, 4}. In this case, a value of an element in the set K is enabled to be as small as possible, that is, it is ensured that a transmission delay of the first serving cell is as small as possible.

Alternatively, when the reference uplink-downlink configuration of the first serving cell is the uplink-downlink configuration 3, the uplink subframe n is corresponding to a subframe 2, a subframe 3, and a subframe 4 in one radio frame, and when the uplink subframe n is corresponding to a subframe 2 in one radio frame, the set K includes elements 11, 10, 9, 8, 7, and 6, for example, the set K is {11, 10, 9, 8, 7, 6}, when the uplink subframe n is corresponding to a subframe 3 in one radio frame, the set K includes elements 6 and 5, for example, the set K is {6, 5}, and when the uplink subframe n is corresponding to a subframe 4 in one radio frame, the set K includes elements 5 and 4, for example, the set K is {5, 4}. In this case, a problem that an HARQ-ACK corresponding to a PDSCH that is scheduled first is not fed back first may be avoided.

Alternatively, when the reference uplink-downlink configuration of the first serving cell is the uplink-downlink configuration 3, the uplink subframe n is corresponding to a subframe 2, a subframe 3, and a subframe 4 in one radio frame, and when the uplink subframe n is corresponding to a subframe 2 in one radio frame, the set K includes elements 11, 10, 9, and 8, for example, the set K is {11, 10, 9, 8} or {10, 9, 8, 11}, when the uplink subframe n is corresponding to a subframe 3 in one radio frame, the set K includes elements 8, 7, and 6, for example, the set K is {8, 7, 6}, and when the uplink subframe n is corresponding to a subframe 4 in one radio frame, the set K includes elements 6, 5, and 4, for example, the set K is {6, 5, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided.

Alternatively, when the reference uplink-downlink configuration of the first serving cell is the uplink-downlink configuration 3, the uplink subframe n is corresponding to a subframe 2, a subframe 3, and a subframe 4 in one radio frame, and when the uplink subframe n is corresponding to a subframe 2 in one radio frame, the set K includes elements 11, 10, and 9, for example, the set K is {11, 10, 9} or {10, 9, 11}, when the uplink subframe n is corresponding to a subframe 3 in one radio frame, the set K includes elements 9, 8, 7, and 6, for example, the set K is {9, 8, 7, 6}, and when the uplink subframe n is corresponding to a subframe 4 in one radio frame, the set K includes elements 6, 5, and 4, for example, the set K is {6, 5, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided.

When the reference uplink-downlink configuration of the first serving cell is the uplink-downlink configuration 4, the uplink subframe n is corresponding to a subframe 2 and a subframe 3 in one radio frame, and when the uplink subframe n is corresponding to a subframe 2 in one radio frame, the set K includes elements 12, 11, 10, 8, and 7, for example, the set K is {12, 11, 10, 8, 7}, and when the uplink subframe n is corresponding to a subframe 3 in one radio frame, the set K includes elements 10, 7, 6, 5, and 4, for example, the set K is {10, 7, 6, 5, 4}. In this case, a value of an element in the set K is enabled to be as small as possible, that is, it is ensured that a transmission delay of the first serving cell is as small as possible.

Alternatively, when the reference uplink-downlink configuration of the first serving cell is the uplink-downlink configuration 4, the uplink subframe n is corresponding to a subframe 2 and a subframe 3 in one radio frame, and when the uplink subframe n is corresponding to a subframe 2 in one radio frame, the set K includes elements 12, 11, 10, 9, 8, and 7, for example, the set K is {12, 11, 10, 9, 8, 7}, and when the uplink subframe n is corresponding to a subframe 3 in one radio frame, the set K includes elements 7, 6, 5, and 4, for example, the set K is {7, 6, 5, 4}. In this case, a problem that an HARQ-ACK corresponding to a PDSCH that is scheduled first is not fed back first may be avoided.

Alternatively, when the reference uplink-downlink configuration of the first serving cell is the uplink-downlink configuration 4, the uplink subframe n is corresponding to a subframe 2 and a subframe 3 in one radio frame, and when the uplink subframe n is corresponding to a subframe 2 in one radio frame, the set K includes elements 12, 11, 10, 9, and 8, for example, the set K is {12, 11, 10, 9, 8} or {12, 10, 9, 8, 11}, and when the uplink subframe n is corresponding to a subframe 3 in one radio frame, the set K includes elements 8, 7, 6, 5, and 4, for example, the set K is {8, 7, 6, 5, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided.

When the reference uplink-downlink configuration of the first serving cell is the uplink-downlink configuration 5, the uplink subframe n is corresponding to a subframe 2 in one radio frame, and the set K includes elements 13, 12, 11, 10, 9, 8, 7, 6, 5, and 4, for example, the set K is {13, 12, 11, 10, 9, 8, 7, 6, 5, 4}.

When the reference uplink-downlink configuration of the first serving cell is the uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2, a subframe 3, and a subframe 7 in one radio frame, the set K includes elements 7 and 5, for example, the set K is {7, 5}, when the uplink subframe n is corresponding to a subframe 4 in one radio frame, the set K is {5}, and when the uplink subframe n is corresponding to a subframe 8 in one radio frame, the set K includes elements 7, 5, and 4, for example, the set K is {7, 5, 4}; and in this case, a value of an element in the set K is enabled to be as small as possible, that is, it is ensured that a transmission delay of the first serving cell is as small as possible.

Alternatively, when the reference uplink-downlink configuration of the first serving cell is the uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2 in one radio frame, the set K includes elements 8 and 7, for example, the set K is {8, 7}, when the uplink subframe n is corresponding to a subframe 3 and a subframe 7 in one radio frame, the set K includes elements 7 and 6, for example, the set K is {7, 6}, and when the uplink subframe n is corresponding to a subframe 4 and a subframe 8 in one radio frame, the set K includes elements 6 and 5, for example, the set K is {6, 5}; in this case, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

Alternatively, when the reference uplink-downlink configuration of the first serving cell is the uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2, a subframe 3, a subframe 7, and a subframe 8 in one radio frame, the set K includes elements 10 and 7, for example, the set K is {10, 7}, and when the uplink subframe n is corresponding to a subframe 4 in one radio frame, the set K includes elements 10 and 5, for example, the set K is {10, 5}. In this case, when this manner is applied to a scenario in which the first serving cell and the second serving cell are configured for the user equipment, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH.

Alternatively, when the reference uplink-downlink configuration of the first serving cell is the uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2, a subframe 3, and a subframe 4 in one radio frame, the set K includes elements 7 and 4, for example, the set K is {7, 4}, and when the uplink subframe n is corresponding to a subframe 7 and an uplink subframe 8 that are in one radio frame, the set K includes elements 6 and 5, for example, the set K is {6, 5}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

Alternatively, when the reference uplink-downlink configuration of the first serving cell is the uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2 in one radio frame, the set K includes elements 10 and 9, for example, the set K is {10, 9}, when the uplink subframe n is corresponding to a subframe 3 in one radio frame, the set K includes elements 9 and 8, for example, the set K is {9, 8}, when the uplink subframe n is corresponding to a subframe 4 in one radio frame, the set K includes elements 8 and 7, for example, the set K is {8, 7}, when the uplink subframe n is corresponding to a subframe 7 in one radio frame, the set K includes elements 9 and 8, for example, the set K is {9, 8}, when the uplink subframe n is corresponding to a subframe 8 in one radio frame, the set K includes elements 8 and 7, for example, the set K is {8, 7}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; on the other hand, a problem that an HARQ-ACK corresponding to a PDSCH that is scheduled first is not fed back first may be avoided; and further, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH.

Uplink-downlink configurations in Manner 1 of this embodiment may refer to uplink-downlink subframe configurations, and may specifically be 7 uplink-downlink configurations in an existing LTE system, as shown in Table 1. According to this embodiment, positions of a downlink subframe, a special subframe, and an uplink subframe that are in one radio frame on a TDD serving cell are defined by using the uplink-downlink configurations. It may be understood that, the reference uplink-downlink configuration in this embodiment may refer to a reference uplink-downlink configuration that is set when HARQ-ACK timing is defined for a TDD serving cell, an FDD serving cell, or a supplemental downlink serving cell, but is not necessarily a real uplink-downlink configuration of a serving cell. For example, in terms of downlink, all subframes of an FDD serving cell are downlink, but HARQ-ACK timing corresponding to the FDD serving cell may be defined with reference to a reference uplink-downlink configuration, that is, according to the reference uplink-downlink configuration and with reference to the corresponding HARQ-ACK timing, an uplink subframe used for transmitting an HARQ-ACK, and a downlink subframe associated with each uplink subframe may be determined.

TABLE 1

Uplink-downlink configuration

| Uplink-downlink configuration | Uplink-downlink transition point period | Subframe n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Manner 2:

The user equipment determines the set K according to the reference uplink-downlink configuration of the first serving cell and an associated set table, where the associated set table is shown in Table 2, and Table 2 includes associated sets k corresponding to subframes n in which HARQ-ACKs are fed back, for each reference uplink-downlink configuration of the first serving cell.

TABLE 2

Downlink associated sets K of an (FDD) serving cell

| Reference uplink-downlink configuration of an FDD serving cell | Subframe n | | | | | | | | |
|---|---|---|---|---|---|---|---|---|---|
| | 0 | 1 | 2 | 3 | 4 | 5 | 6 | 7 | 8 | 9 |
| 0 | | | 6, 5 | 5, 4 | 4 | | | 6, 5 | 5, 4 | 4 |
| 1 | | | 7, 6, 5 | 5, 4 | | | | 7, 6, 5 | 5, 4 | |
| 2 | | | 8, 7, 5, 4, 6 | | | | | 8, 7, 5, 4, 6 | | |
| 3 | | | 7, 6, 10, 11 | 10, 6, 5 | 10, 5, 4 | | | | | |
| 4 | | | 12, 10, 8, 7, 11 | 10, 6, 5, 4, 7 | | | | | | |
| 5 | | | 13, 12, 10, 9, 8, 7, 5, 4, 11, 6 | | | | | | | |
| 6 | | | 7, 5 | 7, 5 | 5 | | | 7, 5 | 7, 5, 4 | |

In addition, if the reference uplink-downlink configuration of the first serving cell is the configuration 0, the user equipment may further determine the set K in a manner shown in the following Table 3, Table 4, Table 5, or Table 6; if the reference uplink-downlink configuration of the first serving cell is the configuration 1, the user equipment may further determine the set K in the manner shown in the following Table 5 or Table 6; if the reference uplink-downlink configuration of the first serving cell is the configuration 6, the user equipment may further determine the set K in the manner shown in the following Table 3, Table 5, or Table 6; if the reference uplink-downlink configuration of the first serving cell is the configuration 3, the user equipment may further determine the set K in the manner shown in the following Table 3 or Table 4; and if the reference uplink-downlink configuration of the first serving cell is the configuration 4, the user equipment may further determine the set K in the manner shown in the following Table 3 or Table 4.

TABLE 3

Downlink associated sets K of an (FDD) serving cell

| Reference uplink-downlink configuration of an FDD serving cell | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6, 5 | 5 | 5, 4 | | | 6, 5 | 5 | 5, 4 |
| 3 | | | 11, 10, 9 8, 7, 6 | 6, 5 | 5, 4 | | | | | |
| 4 | | | 12, 11, 10, 9, 8, 7 | 7, 6, 5, 4 | | | | | | |
| 6 | | | 8, 7 | 7, 6 | 6, 5 | | | 7, 6 | 6, 5 | |

TABLE 4

Downlink associated sets K of an (FDD) serving cell

| Reference uplink-downlink configuration of an FDD serving cell | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6, 5, 4 | | 5, 4 | | | 6, 5, 4 | | 5, 4 |
| 3 | | | 11, 10, 9, 8 | 8, 7, 6 | 6, 5, 4 | | | | | |
| 4 | | | 12, 11, 10, 9, 8 | 8, 7, 6, 5, 4 | | | | | | |

TABLE 5

Downlink associated sets K of an (FDD) serving cell

| Reference uplink-downlink configuration of an FDD serving cell | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 10, 9, 6 | 5, 4 | | | 10, 9, 6 | | | 5, 4 |
| 1 | | 9, 7, 6 | 6, 4 | | | | 9, 7, 6 | 6, 4 | | |
| 6 | | 10, 7 | 10, 7 | | 10, 5 | | 10, 7 | 10, 7 | | |

TABLE 6

Downlink associated sets K of an (FDD) serving cell

| Reference uplink-downlink configuration of an FDD serving cell | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6, 4 | 6, 4 | 4 | | | 6, 4 | 6, 4 | 4 |
| 1 | | | 7, 6, 4 | 6, 4 | | | | 7, 6, 4 | 6, 4 | |
| 6 | | | 7, 4 | 7, 4 | 7, 4 | | | 6, 4 | 6, 4 | |

If the set K is determined in the manner shown in Table 2, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible. If the set K is determined in the manner shown in Table 4, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; on the other hand, a value of an element in the set K is enabled to be as small as possible, that is, it is ensured that a transmission delay of the first serving cell is as small as possible; and further, when this manner is applied to a scenario in which the first serving cell and the second serving cell are configured for the user equipment, an HARQ-ACK is transmitted only in an uplink subframe 2, a subframe 4, a subframe 7, and a subframe 9, that is, an HARQ-ACK of the first serving cell is transmitted only in an uplink subframe in which a corresponding HARQ-ACK of the second serving cell is also transmitted, so that both TPC fields in DCI corresponding to the two serving cells can be used for indicating both TPC and a PUCCH resource, and the HARQ-ACK transmission performance can be improved. If the set K is determined in the manner shown in Table 5, when this manner is applied to a scenario in which the first serving cell and the second serving cell are configured for the user equipment, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH. If the set K is determined in the manner shown in Table 6, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

Manner 3:

The first HARQ-ACK timing is determined according to the reference uplink-downlink configuration of the first serving cell, and the set K is determined according to the first HARQ-ACK timing.

In Manner 3, when reference uplink-downlink configurations of the first serving cell are different, obtained first HARQ-ACK timing is also different, that is, different reference uplink-downlink configurations are corresponding to different HARQ-ACK timing, and therefore, the user equipment needs to determine the reference uplink-downlink configuration of the first serving cell first, and then determine that HARQ-ACK timing corresponding to the reference uplink-downlink configuration is the first HARQ-ACK timing. In a specific implementation process, the HARQ-ACK timing corresponding to different reference uplink-downlink configurations may include the following points:

HARQ-ACK timing corresponding to a reference uplink-downlink configuration 0 (or referred to as HARQ-ACK timing corresponding to the reference uplink-downlink configuration when the reference uplink-downlink configuration is the uplink-downlink configuration 0) may be as follows:

In step S100, the user equipment receives, in the downlink subframe n−k, the PDSCH transmission or the downlink control channel that indicates the downlink SPS release.

In step S101, the user equipment transmits, in the uplink subframe n, the HARQ-ACK response of the downlink subframe n−k.

The uplink subframe n is corresponding to a subframe 2, a subframe 3, a subframe 4, a subframe 7, a subframe 8, and a subframe 9 in one radio frame, and when the uplink subframe n is corresponding to a subframe 2 and a subframe 7 in one radio frame, the set K includes elements 6 and 5, for example, the set K is {6, 5}, when the uplink subframe n is corresponding to a subframe 3 and a subframe 8 in one radio frame, the set K includes elements 5 and 4, for example, the set K is {5, 4}, and when the uplink subframe n is corresponding to a subframe 4 and a subframe 9 in one radio frame, the set K is {4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

Alternatively, the uplink subframe n is corresponding to a subframe 2, a subframe 3, a subframe 4, a subframe 7, a subframe 8, and a subframe 9 in one radio frame, and when the uplink subframe n is corresponding to a subframe 2 and a subframe 7 in one radio frame, the set K includes elements 6 and 5, for example, the set K is {6, 5}, when the uplink subframe n is corresponding to a subframe 3 and a subframe 8 in one radio frame, the set K is {5}, and when the uplink subframe n is corresponding to a subframe 4 and a subframe 9 in one radio frame, the set K includes elements 5 and 4, for example, the set K is {5, 4}.

Alternatively, the uplink subframe n is corresponding to a subframe 2, a subframe 4, a subframe 7, and a subframe 9 in one radio frame, and when the uplink subframe n is corresponding to a subframe 2 and a subframe 7 in one radio frame, the set K includes elements 6, 5, and 4, for example, the set K is {6, 5, 4}, and when the uplink subframe n is corresponding to a subframe 4 and a subframe 9 in one radio frame, the set K includes elements 5 and 4, for example, the set K is {5, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; on the other hand, a value of an element in the set K is enabled to be as small as possible, that is, it is ensured that a transmission delay of the first serving cell is as small as possible; and further, when this manner is applied to a scenario in which the first serving cell and the second serving cell are configured for the user equipment, an HARQ-ACK is transmitted only in an uplink subframe 2, a subframe 4, a subframe 7, and a subframe 9, that is, an HARQ-ACK of the first serving cell is transmitted only in an uplink subframe in which a corresponding HARQ-ACK of the second serving cell is also transmitted, so that both TPC fields in DCI corresponding to the two serving cells can be used for indicating both TPC and a PUCCH resource, and the HARQ-ACK transmission performance can be improved.

Alternatively, the uplink subframe n is corresponding to a subframe 2, a subframe 4, a subframe 7, and a subframe 9 in one radio frame, and when the uplink subframe n is corresponding to a subframe 2 and a subframe 7 in one radio frame, the set K includes elements 10, 9, and 6, for example, the set K is {10, 9, 6}, when the uplink subframe n is corresponding to a subframe 4 and a subframe 9 in one radio frame, the set K includes elements 5 and 4, for example, the set K is {5, 4}; in this case, on the one hand, when this manner is applied to a scenario in which the first serving cell and the second serving cell are configured for the user equipment, an HARQ-ACK is transmitted only in an uplink subframe 2, a subframe 4, a subframe 7, and a subframe 9, that is, an HARQ-ACK of the first serving cell is transmitted only in an uplink subframe in which a corresponding HARQ-ACK of the second serving cell is also transmitted, so that both TPC fields in DCI corresponding to the two serving cells can be used for indicating both TPC and a PUCCH resource, and the HARQ-ACK transmission performance can be improved; and on the other hand, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH.

Alternatively, the uplink subframe n is corresponding to a subframe 2, a subframe 3, a subframe 4, a subframe 7, a subframe 8, and a subframe 9 in one radio frame, and when the uplink subframe n is corresponding to a subframe 2, a subframe 3, a subframe 7, and a subframe 8 in one radio frame, the set K is {6, 4}, and when the uplink subframe n is corresponding to a subframe 4 and a subframe 9 in one radio frame, the set K is {4}. In this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

Alternatively, HARQ-ACK timing corresponding to a reference uplink-downlink configuration 1 (or referred to as HARQ-ACK timing corresponding to the reference uplink-downlink configuration when the reference uplink-downlink configuration is the uplink-downlink configuration 1) may be as follows:

In step S100, the user equipment receives, in the downlink subframe n−k, the PDSCH transmission or the downlink control channel that indicates the downlink SPS release.

In step S101, the user equipment transmits, in the uplink subframe n, the HARQ-ACK response of the downlink subframe n−k.

The uplink subframe n is corresponding to a subframe 2, a subframe 3, a subframe 7, and a subframe 8 in one radio frame, and when the uplink subframe n is corresponding to a subframe 2 and a subframe 7 in one radio frame, the set K includes elements 7, 6, and 5, for example, the set K is {7, 6, 5}, and when the uplink subframe n is corresponding to a subframe 3 and a subframe 8 in one radio frame, the set K includes elements 5 and 4, for example, the set K is {5, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

Alternatively, the uplink subframe n is corresponding to a subframe 2, a subframe 3, a subframe 7, and a subframe 8 in one radio frame, and when the uplink subframe n is corresponding to a subframe 2 and a subframe 7 in one radio frame, the set K includes elements 9, 7, and 6, for example, the set K is {9, 7, 6}, and when the uplink subframe n is corresponding to a subframe 3 and a subframe 8 in one radio frame, the set K includes elements 6 and 4, for example, the set K is {6, 4}. In this case, when this manner is applied to a scenario in which the first serving cell and the second serving cell are configured for the user equipment, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH.

Alternatively, the uplink subframe n is corresponding to a subframe 2, a subframe 3, a subframe 7, and a subframe 8 in one radio frame, and when the uplink subframe n is corresponding to a subframe 2 and a subframe 7 in one radio frame, the set K includes elements 7, 6, and 4, for example, the set K is {7, 6, 4}, and when the uplink subframe n is corresponding to a subframe 3 and a subframe 8 in one radio frame, the set K includes elements 6 and 4, for example, the set K is {6, 4}; and in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

Alternatively, HARQ-ACK timing corresponding to a reference uplink-downlink configuration 2 (or referred to as HARQ-ACK timing corresponding to the reference uplink-downlink configuration when the reference uplink-downlink configuration is the uplink-downlink configuration 2) may be as follows:

In step S100, the user equipment receives, in the downlink subframe n−k, the PDSCH transmission or the downlink control channel that indicates the downlink SPS release.

In step S101, the user equipment transmits, in the uplink subframe n, the HARQ-ACK response of the downlink subframe n−k, where the uplink subframe n is corresponding to a subframe 2 and a subframe 7 in one radio frame, and the set K includes elements 8, 7, 6, 5, and 4, for example, the set K is {8, 7, 6, 5, 4}. In this case, a value of an element in the set K is enabled to be as small as possible, that is, it is ensured that a transmission delay of the first serving cell is as small as possible.

Alternatively, HARQ-ACK timing corresponding to a reference uplink-downlink configuration 3 (or referred to as HARQ-ACK timing corresponding to the reference uplink-downlink configuration when the reference uplink-downlink configuration is the uplink-downlink configuration 3) may be as follows:

In step S100, the user equipment receives, in the downlink subframe n−k, the PDSCH transmission or the downlink control channel that indicates the downlink SPS release.

In step S101, the user equipment transmits, in the uplink subframe n, the HARQ-ACK response of the downlink subframe n−k, where the uplink subframe n is corresponding to a subframe 2, a subframe 3, and a subframe 4 in one radio frame, and when the uplink subframe n is corresponding to a subframe 2 in one radio frame, the set K includes elements 11, 10, 7, and 6, for example, the set K is {11, 10, 7, 6}, when the uplink subframe n is corresponding to a subframe 3 in one radio frame, the set K includes elements 10, 6, and 5, for example, the set K is {10, 6, 5}, and when the uplink subframe n is corresponding to a subframe 4 in one radio frame, the set K includes elements 10, 5, and 4, for example, the set K is {10, 5, 4}. In this case, a value of an element in the set K is enabled to be as small as possible, that is, it is ensured that a transmission delay of the first serving cell is as small as possible.

Alternatively, the uplink subframe n is corresponding to a subframe 2, a subframe 3, and a subframe 4 in one radio frame, and when the uplink subframe n is corresponding to a subframe 2 in one radio frame, the set K includes elements 11, 10, 9, 8, 7, and 6, for example, the set K is {11, 10, 9, 8, 7, 6}, when the uplink subframe n is corresponding to a subframe 3 in one radio frame, the set K includes elements 6 and 5, for example, the set K is {6, 5}, and when the uplink subframe n is corresponding to a subframe 4 in one radio frame, the set K includes elements 5 and 4, for example, the set K is {5, 4}. In this case, a problem that an HARQ-ACK corresponding to a PDSCH that is scheduled first is not fed back first may be avoided.

Alternatively, the uplink subframe n is corresponding to a subframe 2, a subframe 3, and a subframe 4 in one radio frame, and when the uplink subframe n is corresponding to a subframe 2 in one radio frame, the set K is {11, 10, 9, 8} or {10, 9, 8, 11}, when the uplink subframe n is corresponding to a subframe 3 in one radio frame, the set K is {8, 7, 6}, and when the uplink subframe n is corresponding to a subframe 4 in one radio frame, the set K is {6, 5, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided.

Alternatively, the uplink subframe n is corresponding to a subframe 2, a subframe 3, and a subframe 4 in one radio frame, and when the uplink subframe n is corresponding to a subframe 2 in one radio frame, the set K is {11, 10, 9} or {10, 9, 11}, when the uplink subframe n is corresponding to a subframe 3 in one radio frame, the set K is {9, 8, 7, 6}, and when the uplink subframe n is corresponding to a subframe 4 in one radio frame, the set K is {6, 5, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided.

Alternatively, HARQ-ACK timing corresponding to a reference uplink-downlink configuration 4 (or referred to as HARQ-ACK timing corresponding to the reference uplink-downlink configuration when the reference uplink-downlink configuration is the uplink-downlink configuration 4) may be as follows:

In step S100, the user equipment receives, in the downlink subframe n–k, the PDSCH transmission or the downlink control channel that indicates the downlink SPS release.

In step S101, the user equipment transmits, in the uplink subframe n, the HARQ-ACK response of the downlink subframe n–k, where the uplink subframe n is corresponding to a subframe 2 and a subframe 3 in one radio frame, and when the uplink subframe n is corresponding to a subframe 2 in one radio frame, the set K includes elements 12, 11, 10, 8, and 7, for example, the set K is {12, 11, 10, 8, 7}, and when the uplink subframe n is corresponding to a subframe 3 in one radio frame, the set K includes elements 10, 7, 6, 5, and 4, for example, the set K is {10, 7, 6, 5, 4}. In this case, a value of an element in the set K is enabled to be as small as possible, that is, it is ensured that a transmission delay of the first serving cell is as small as possible.

Alternatively, the uplink subframe n is corresponding to a subframe 2 and a subframe 3 in one radio frame, and when the uplink subframe n is corresponding to a subframe 2 in one radio frame, the set K includes elements 12, 11, 10, 9, 8, and 7, for example, the set K is {12, 11, 10, 9, 8, 7}, and when the uplink subframe n is corresponding to a subframe 3 in one radio frame, the set K includes elements 7, 6, 5, and 4, for example, the set K is {7, 6, 5, 4}. In this case, a problem that an HARQ-ACK corresponding to a PDSCH that is scheduled first is not fed back first may be avoided.

Alternatively, the uplink subframe n is corresponding to a subframe 2 and a subframe 3 in one radio frame, and when the uplink subframe n is corresponding to a subframe 2 in one radio frame, the set K is {12, 11, 10, 9, 8} or {12, 10, 9, 8, 11}, and when the uplink subframe n is corresponding to a subframe 3 in one radio frame, the set K is {8, 7, 6, 5, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided.

Alternatively, HARQ-ACK timing corresponding to a reference uplink-downlink configuration 5 (or referred to as HARQ-ACK timing corresponding to the reference uplink-downlink configuration when the reference uplink-downlink configuration is the uplink-downlink configuration 5) may be as follows:

In step S100, the user equipment receives, in the downlink subframe n–k, the PDSCH transmission or the downlink control channel that indicates the downlink SPS release.

In step S101, the user equipment transmits, in the uplink subframe n, the HARQ-ACK response of the downlink subframe n–k, where the uplink subframe n is corresponding to a subframe 2 in one radio frame, and the set K includes elements 13, 12, 11, 10, 9, 8, 7, 6, 5, and 4, for example, the set K is {13, 12, 11, 10, 9, 8, 7, 6, 5, 4}.

Alternatively, HARQ-ACK timing corresponding to a reference uplink-downlink configuration 6 (or referred to as HARQ-ACK timing corresponding to the reference uplink-downlink configuration when the reference uplink-downlink configuration is the uplink-downlink configuration 6) may be as follows:

In step S100, the user equipment receives, in the downlink subframe n–k, the PDSCH transmission or the downlink control channel that indicates the downlink SPS release.

In step S101, the user equipment transmits, in the uplink subframe n, the HARQ-ACK response of the downlink subframe n–k.

The uplink subframe n is corresponding to a subframe 2, a subframe 3, a subframe 4, a subframe 7, and a subframe 8 in one radio frame, and when the uplink subframe n is corresponding to a subframe 2, a subframe 3, and a subframe 7 in one radio frame, the set K includes elements 7 and 5, for example, the set K is {7, 5}, when the uplink subframe n is corresponding to a subframe 4 in one radio frame, the set K is {5}, and when the uplink subframe n is corresponding to a subframe 8 in one radio frame, the set K includes elements 7, 5, and 4, for example, the set K is {7, 5, 4}; and in this case, a value of an element in the set K is enabled to be as small as possible, that is, it is ensured that a transmission delay of the first serving cell is as small as possible.

Alternatively, the uplink subframe n is corresponding to a subframe 2, a subframe 3, a subframe 4, a subframe 7, and a subframe 8 in one radio frame, and when the uplink subframe n is corresponding to a subframe 2 in one radio frame, the set K includes elements 8 and 7, for example, the set K is {8, 7}, when the uplink subframe n is corresponding to a subframe 3 and a subframe 7 in one radio frame, the set K includes elements 7 and 6, for example, the set K is {7, 6}, and when the uplink subframe n is corresponding to a subframe 4 and a subframe 8 in one radio frame, the set K includes elements 6 and 5, for example, the set K is {6, 5}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance;

and on the other hand, a value of an element in the set K is enabled to be as small as possible, that is, it is ensured that a transmission delay of the first serving cell is as small as possible.

Alternatively, the uplink subframe n is corresponding to a subframe 2, a subframe 3, a subframe 4, a subframe 7, and a subframe 8 in one radio frame, and when the uplink subframe n is corresponding to a subframe 2, a subframe 3, a subframe 7, and a subframe 8 in one radio frame, the set K includes elements 10 and 7, for example, the set K is {10, 7}, and when the uplink subframe n is corresponding to a subframe 4 in one radio frame, the set K includes elements 10 and 5, for example, the set K is {10, 5}. In this case, when this manner is applied to a scenario in which the first serving cell and the second serving cell are configured for the user equipment, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH.

Alternatively, the uplink subframe n is corresponding to a subframe 2, a subframe 3, a subframe 4, a subframe 7, and a subframe 8 in one radio frame, and when the uplink subframe n is corresponding to a subframe 2, a subframe 3, and a subframe 4 in one radio frame, the set K includes elements 7 and 4, for example, the set K is {7, 4}, and when the uplink subframe n is corresponding to a subframe 7 and an uplink subframe 8 that are in one radio frame, the set K includes elements 6 and 5, for example, the set K is {6, 5}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

Alternatively, when the reference uplink-downlink configuration of the first serving cell is the uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2 in one radio frame, the set K is {10, 9}, when the uplink subframe n is corresponding to a subframe 3 in one radio frame, the set K is {9, 8}, when the uplink subframe n is corresponding to a subframe 4 in one radio frame, the set K is {8, 7}, when the uplink subframe n is corresponding to a subframe 7 in one radio frame, the set K is {9, 8}, when the uplink subframe n is corresponding to a subframe 8 in one radio frame, the set K is {8, 7}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; on the other hand, a problem that an HARQ-ACK corresponding to a PDSCH that is scheduled first is not fed back first may be avoided; and further, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH.

Manner 4:

When the reference uplink-downlink configuration of the first serving cell is the uplink-downlink configuration 2, the uplink subframe n is corresponding to a subframe 2 and a subframe 7 in one radio frame, and the set K includes elements 8, 7, 6, and 4, for example, the set K is {8, 7, 6, 4}.

When the reference uplink-downlink configuration of the first serving cell is the uplink-downlink configuration 4, the uplink subframe n is corresponding to a subframe 2 and a subframe 3 in one radio frame, and when the uplink subframe n is corresponding to a subframe 2 in one radio frame, the set K includes elements 12, 11, 8, and 7, for example, the set K is {12, 11, 8, 7}, and when the uplink subframe n is corresponding to a subframe 3 in one radio frame, the set K includes elements 7, 6, 5, and 4, for example, the set K is {7, 6, 5, 4}.

When the reference uplink-downlink configuration of the first serving cell is the uplink-downlink configuration 5, the uplink subframe n is corresponding to a subframe 2 in one radio frame, and the set K includes elements 13, 12, 11, 9, 8, 7, 6, 5, and 4, for example, the set K is {13, 12, 11, 9, 8, 7, 6, 5, 4}.

In Manner 4, all first HARQ-ACK timing determined according to the reference uplink-downlink configurations of the first serving cell reuses downlink HARQ-ACK timing of an existing TDD serving cell in a case of a corresponding uplink-downlink configuration, which can save standardization efforts.

It is easy to understand accordingly that, in step 100', k1 is a positive integer, k1 belongs to a set K1, where the set K1 is determined according to second HARQ-ACK timing, the second HARQ-ACK timing is determined according to an uplink-downlink configuration or a reference uplink-downlink configuration of the second serving cell, and the reference uplink-downlink configuration of the second serving cell may be configured for the user equipment by a higher layer. For a specific implementation process, reference may be made to related descriptions of step S100 and step S101, which is within an understanding scope of persons skilled in the art, and no details are repeatedly described.

It should be noted that, the first HARQ-ACK timing and the second HARQ-ACK timing may be different, that is, the set K may include at least one element that does not belong to the set K1, that is, for a specific uplink subframe n, a set K and a set K1 that are associated with the uplink subframe n are different in at least one element. It should be noted, that the first HARQ-ACK timing and the second HARQ-ACK timing may be different may refer to that for at least one uplink subframe, a set K obtained according to the first HARQ-ACK timing is different from a set K1 obtained according to the second HARQ-ACK timing; or at least one of uplink subframes, used for feeding back HARQ-ACKs, in the first HARQ-ACK timing does not belong to uplink subframes, used for feeding back HARQ-ACKs, in the second HARQ-ACK timing; or uplink subframes in which HARQ-ACKs are fed back in the first HARQ-ACK timing are the same as uplink subframes in which HARQ-ACKs are fed back in the second HARQ-ACK timing, but for at least one uplink subframe in which an HARQ-ACK is fed back, the set K obtained according to the first HARQ-ACK timing and the set K1 obtained according to the second HARQ-ACK timing are different in at least one element.

It should be noted that, the downlink control channel in this embodiment may be a PDCCH or an EPDCCH. In the embodiment of the present invention, a subframe number (n) refers to numbers of subframes in multiple radio frames and may be obtained in the following manner: the subframes in the multiple radio frames are numbered from 0 in a monotonically increasing manner according to a time sequence, that is, if a number of a last subframe of a previous radio frame is n', a number of a first subframe of a next radio frame is n'+1. In addition, in the multiple radio frames, each subframe, in a radio frame in which the subframe is located, also has a subframe number, namely, a subframe number of the subframe in the radio frame. For example, a subframe n is a subframe 2 in one radio frame, which may refer to that a subframe number of the subframe n in the radio frame in which the subframe n is located is 2, or may refer to that the subframe n is a third subframe in the radio frame in which the subframe n is located, or may refer to that the subframe n is corresponding to a third subframe in each radio frame, or may refer to that the subframe n is corresponding to a subframe 2 in each radio frame.

In this embodiment, when the set K includes multiple elements, the downlink subframe n–k may refer to all downlink subframes corresponding to the set K, for example, if the set K is $\{k_0, k_1, \ldots k_{M-1}\}$ the downlink subframe n–k may refer to M downlink subframes, namely, a downlink subframe $n-k_0$, a downlink subframe $n-k_1$ . . . , and a downlink subframe $n-k_{M-1}$, and correspondingly, step S100 may be as follows: a user equipment receives, on a first serving cell and in a downlink subframe $n-k_0$, a downlink subframe $n-k_1$ . . . a downlink subframe $n-k_{M-2}$, and a downlink subframe $n-k_{M-1}$, PDSCH transmission or a downlink control channel that indicates downlink SPS release; and on the other hand, step 100' and a k1 and a set K1 related to step 100' may be understood similarly, which is not repeatedly described herein.

In addition, it should be pointed out particularly that, in step S100, the user equipment receives, on the first serving cell and in the downlink subframe n–k, the PDSCH transmission or the downlink control channel that indicates the downlink SPS release, where the downlink subframe n–k may include one downlink subframe or multiple downlink subframes, and when multiple downlink subframes are included, in this embodiment, the S100 may be as follows: a user equipment first receives, on a first serving cell and in multiple downlink subframes, PDSCH transmission and a downlink control channel that indicates downlink SPS release; and in step S101, the user equipment transmits, in the uplink subframe n, HARQ-ACK responses corresponding to the first serving cell and corresponding downlink subframes. It is not difficult to find out that, the user equipment may determine, according to the set K, that an HARQ-ACK response of a corresponding downlink subframe needs to be fed back in each uplink subframe that is capable of transmitting an HARQ-ACK, that is, the user equipment can determine that an HARQ-ACK response of PDSCH transmission received in a downlink subframe or a downlink control channel that indicates downlink SPS release and is received in a downlink subframe is correspondingly fed back in a specified uplink subframe. For example, if the reference uplink-downlink configuration of the first serving cell is the configuration 2, in step S101, HARQ-ACK responses of a downlink subframe n–8, a downlink subframe n–7, a downlink subframe n–6, a downlink subframe n–5, and a downlink subframe n–4 are transmitted in the uplink subframe n, and specifically, the uplink subframe n is corresponding to a subframe 2 and a subframe 7 in one radio frame, and when the uplink subframe n is corresponding to a subframe 2 in one radio frame, HARQ-ACK responses of a downlink subframe 4, a downlink subframe 5, a downlink subframe 6, a downlink subframe 7, and a downlink subframe 8 in one radio frame are fed back in the uplink subframe n, and when the uplink subframe n is corresponding to a subframe 7 in one radio frame, HARQ-ACK responses of a downlink subframe 0, a downlink subframe 1, a downlink subframe 2, a downlink subframe 3, and a downlink subframe 9 in one radio frame are fed back in the uplink subframe n. Correspondingly, a time sequence of execution of step S100 and step 100' may be reversed or may not be limited, which is not described in detail herein.

It should be noted that, in step S101, the HARQ-ACK response corresponding to the first serving cell and the downlink subframe n–k may refer to an HARQ-ACK response of the PDSCH transmission or the downlink control channel that indicates the downlink SPS release, where the PDSCH transmission and the downlink control channel that indicates the downlink SPS release are received, on the first serving cell and in the subframe n–k, by the user equipment in step S100; and when the PDSCH transmission or the downlink control channel that indicates the downlink SPS release is not received on the first serving cell and in a downlink subframe in the downlink subframe n–k, an HARQ-ACK, corresponding to the first serving cell of the downlink subframe in which the PDSCH transmission or the downlink control channel that indicates the downlink SPS release is not received on the first serving cell, may be DTX (Discontinuous Transmission, discontinuous transmission) or a NACK.

In step S101, when the set K in step S100 includes multiple elements, HARQ-ACKs of the first serving cell and multiple downlink subframes are transmitted in the uplink subframe n.

Further, corresponding to step 100', step S101 further includes the following step:

Step 101': The user equipment transmits, in the uplink subframe n, an HARQ-ACK response corresponding to the second serving cell and the downlink subframe n–k1. Similarly, the HARQ-ACK response corresponding to the second serving cell and the downlink subframe n–k1 may refer to an HARQ-ACK response of the PDSCH transmission or the downlink control channel that indicates the downlink SPS release, where the PDSCH transmission and the downlink control channel that indicates the downlink SPS release are received on the second serving cell and in the subframe n–k1 by the user equipment in step S100. When the PDSCH transmission or the downlink control channel that indicates the downlink SPS release is not received on the second serving cell and in a downlink subframe in the downlink subframe n–k1, an HARQ-ACK response corresponding to the second serving cell and the downlink subframe in which the PDSCH transmission or the downlink control channel that indicates the downlink SPS release is not receive on the second serving cell may be DTX or a NACK.

In addition, when step 100 includes step 100', in step S101, the user equipment needs to transmit, in the uplink subframe n, the HARQ-ACK response corresponding to the first serving cell and the downlink subframe n–k and the HARQ-ACK response corresponding to the second serving cell and the downlink subframe n−k1, where the transmission may be performed in a PUCCH format 1b channel selection manner, or the transmission may be performed in a PUCCH format 3 manner. The user equipment may transmit together the HARQ-ACK response corresponding to the first serving cell and the downlink subframe n−k and the HARQ-ACK response corresponding to the second serving cell and the downlink subframe n−k1, or may transmit separately the HARQ-ACK response corresponding to the first serving cell and the downlink subframe n−k and the HARQ-ACK response corresponding to the second serving cell and the downlink subframe n−k1. It should be noted that, when multiple serving cells are configured for the user equipment, if in step S101, the user equipment transmits together HARQ-ACK responses of multiple serving cells, even if the PDSCH transmission or the downlink control channel that indicates the downlink SPS release is not received in a serving cell, in step S101, an HARQ-ACK response, which for example may be a NACK or DTX, of the serving cell on which the PDSCH transmission or the downlink control channel that indicates the downlink SPS release is not received, may also be sent on a premise that the user equipment needs to transmit an HARQ-ACK response of another serving cell.

It should be noted that, in step S101, the user equipment transmits, in the uplink subframe n, the HARQ-ACK response corresponding to the first serving cell and the downlink subframe n−k, where it is assumed that the set K is $\{k_0, k_1, \ldots k_{M-1}\}$, and M is the number of elements in the set K, step S101 may be implemented by means of the following processes.

Example 1

Step 101' may specifically be as follows: The user equipment performs, according to a value of a TPC field in a DCI format detected in a downlink subframe $n-k_i$ and/or a downlink subframe $n-k_j$, HARQ-ACK bundling on an HARQ-ACK response corresponding to the first serving cell and the downlink subframe $n-k_i$ and an HARQ-ACK response corresponding to the first serving cell and the downlink subframe $n-k_j$, so as to obtain a bundled HARQ-ACK response corresponding to the first serving cell, the downlink subframe $n-k_i$, and the downlink subframe $n-k_j$, which may specifically be as follows:

if the user equipment detects the DCI format only in the downlink subframe $n-k_i$, and the value of the TPC field in the DCI format is a first value, the bundled HARQ-ACK response corresponding to the first serving cell, the downlink subframe $n-k_i$, and the downlink subframe $n-k_j$ is the HARQ-ACK response corresponding to the first serving cell and the downlink subframe $n-k_i$;

if the user equipment detects the DCI format only in the downlink subframe $n-k_j$, and the value of the TPC field in the DCI format is a first value, the bundled HARQ-ACK response corresponding to the first serving cell, the downlink subframe $n-k_i$, and the downlink subframe $n-k_j$ is the HARQ-ACK response corresponding to the first serving cell and the downlink subframe $n-k_j$.

if the user equipment detects the DCI format only in the downlink subframe $n-k_i$, and the value of the TPC field in the DCI format is a second value, the bundled HARQ-ACK response corresponding to the first serving cell, the downlink subframe $n-k_i$, and the downlink subframe $n-k_j$ is DTX; and if the user equipment detects the DCI format only in the downlink subframe $n-k_j$, and the value of the TPC field in the DCI format is a second value, the bundled HARQ-ACK response corresponding to the first serving cell, the downlink subframe, and the downlink subframe $n-k_j$ is DTX.

This embodiment does not impose any limitation on which downlink subframes in the downlink subframe n−k the downlink subframe $n-k_i$ and the downlink subframe $n-k_j$ specifically are. For example, the downlink subframes $n-k_i$ and $n-k_j$ may be last two downlink subframes in downlink subframes except a subframe in which a PDSCH without a corresponding downlink control channel is transmitted; and the last two downlink subframes may refer to two downlink subframes corresponding to two smallest elements in the set K except an element, corresponding to the downlink subframe in which the PDSCH without a corresponding downlink control channel is transmitted, in the set K, where the downlink subframe in which the PDSCH without a corresponding downlink control channel is transmitted refers to that PDSCH transmission received in the downlink subframe has no corresponding downlink control channel in the downlink subframe. For example, if the set K is {8, 7, 6, 5, 4}, and a downlink subframe n−5 corresponding to the element 5 in the set K is used for transmitting the PDSCH without a corresponding downlink control channel, the downlink subframe $n-k_i$ and the downlink subframe $n-k_j$ may be a downlink subframe n−6 and a downlink subframe n−4.

Specifically, $k_i$ and $k_j$ may be the last two elements $k_{M-2}$ and $k_{M-1}$ in the set K, and step 101' may specifically be as follows: the user equipment performs, according to a value of a TPC field in a DCI format detected in the downlink subframe $n-k_{M-2}$ and/or the downlink subframe $n-k_{M-1}$, HARQ-ACK bundling on an HARQ-ACK response corresponding to the first serving cell and the downlink subframe $n-k_{M-2}$ and an HARQ-ACK response corresponding to the first serving cell and the downlink subframe $n-k_{M-1}$, so as to obtain a bundled HARQ-ACK response corresponding to the first serving cell, the downlink subframe $n-k_{M-2}$, and the downlink subframe $n-k_{M-1}$; where if the user equipment detects the DCI format only in the downlink subframe $n-k_{M-2}$, and the value of the TPC field in the DCI format is a first value, the bundled HARQ-ACK response corresponding to the first serving cell, the downlink subframe $n-k_{M-2}$, and the downlink subframe $n-k_{M-1}$ is the HARQ-ACK response corresponding to the first serving cell and the downlink subframe $n-k_{M-2}$; if the user equipment detects the DCI format only in the downlink subframe $n-k_{M-1}$, and the value of the TPC field in the DCI format is a first value, the bundled HARQ-ACK response corresponding to the first serving cell, the downlink subframe $n-k_{M-2}$, and the downlink subframe $n-k_{M-1}$ is the HARQ-ACK response corresponding to the first serving cell and the downlink subframe $n-k_{M-1}$, if the user equipment detects the DCI format only in the downlink subframe $n-k_{M-2}$, and the value of the TPC field in the DCI format is a second value, the bundled HARQ-ACK response corresponding to the first serving cell, the downlink subframe $n-k_{M-2}$, and the downlink subframe $n-k_{M-1}$ is DTX; and if the user equipment detects the DCI format only in the downlink subframe $n-k_{M-1}$, and the value of the TPC field in the DCI format is a second value, the bundled HARQ-ACK response corresponding to the first serving cell, the downlink subframe $n-k_{M-2}$, and the downlink subframe $n-k_{M-1}$ is DTX.

The first value is unequal to the second value, the first value may be corresponding to a first physical uplink control channel PUCCH resource, the second value may be corresponding to a second physical uplink control channel PUCCH resource, and the first PUCCH resource and the second PUCCH resource are PUCCH resources configured for the user equipment by a higher layer. The PUCCH resources configured for the user equipment by the higher layer may include 4 or more PUCCH resources, the first PUCCH resource may be a PUCCH resource 1 or a PUCCH resource 2 in the 4 PUCCH resources, and the second PUCCH resource may be a PUCCH resource 3 or a PUCCH resource 4 in the 4 PUCCH resources. It should be noted that the PUCCH resource 1, the PUCCH resource 2, the PUCCH resource 3, and the PUCCH resource 4 do not represent an index sequence of the 4 PUCCH resources. For example, the PUCCH resource 1 may be the first PUCCH resource of the 4 resources configured by the higher layer, the PUCCH resource 2 may be the third PUCCH resource of the 4 PUCCH resources configured by the higher layer, the PUCCH resource 3 may be the second PUCCH resource of the 4 PUCCH resources configured by the higher layer, and the PUCCH 4 may be the fourth PUCCH resource of the 4 PUCCH resources configured by the higher layer. In other words, the first value may be "00" or "10", and the second value may be "01" or "11".

In step 101', the first value indicates that a base station sends, only in one downlink subframe of the downlink subframe $n-k_i$ and the downlink subframe $n-k_j$, PDSCH transmission or a downlink control channel that indicates downlink SPS release, to the user equipment, the second value indicates that the base station sends, in both downlink subframes of the downlink subframe $n-k_i$ and the downlink subframe $n-k_j$, PDSCH transmission or a downlink control channel that indicates downlink SPS release, to the user equipment, and therefore, the value of the TPC field is the second value; however, when the user equipment receives, only in one downlink subframe of the downlink subframe $n-k_i$ and the downlink subframe $n-k_j$, PDSCH transmission or a downlink control channel that indicates downlink SPS release, the user equipment learns that a downlink control channel of one of the downlink subframes is lost, so DTX needs to be fed back when HARQ-ACK responses of the two downlink subframes are bundled. It should be noted, that the user equipment performs the HARQ-ACK bundling on the HARQ-ACK response corresponding to the first serving cell and the downlink subframe $n-k_i$ and the HARQ-ACK response corresponding to the first serving cell and the downlink subframe $n-k_j$ may refer to that the user equipment performs a logical AND operation on the HARQ-ACK responses corresponding to the downlink subframe $n-k_i$ and the downlink subframe $n-k_j$. In addition, the TPC field further indicates PUCCH resources corresponding to the downlink subframe $n-k_i$ and the downlink subframe $n-k_j$, and in addition to indicating the PUCCH resources, the TPC also indicates a scheduling situation of the downlink subframe $n-k_i$ and the downlink subframe $n-k_j$. In this manner, on the one hand, a DTX-to-ACK error is prevented from occurring when the HARQ-ACK bundling is performed on the downlink subframe $n-k_i$ and the downlink subframe $n-k_j$ by the user equipment; and on the other hand, scheduling performed by the base station on the downlink subframe $n-k_i$ and the downlink subframe $n-k_j$ is not limited either.

It should be noted that, the foregoing DTX-to-ACK error may refer to that: if the scheduling situation of the downlink subframe $n-k_i$ and the downlink subframe $n-k_j$ is not indicated by using the TPC field, the user equipment only receives scheduling of the downlink subframe $n-k_i$ and an HARQ-ACK response of the downlink subframe $n-k_i$ is an ACK, the user equipment does not know how a bundled HARQ-ACK response of the downlink subframe $n-k_i$ and the downlink subframe $n-k_j$ is determined, and if it is determined that the HARQ-ACK response is an ACK, the response of the downlink subframe $n-k_j$ is DTX; however, because the user equipment reports the ACK, the base station considers that the HARQ-ACK response of the downlink subframe $n-k_j$ is an ACK, and a DTX-to-ACK problem occurs; in this situation, the base station no longer repeats transmitting data of the downlink subframe $n-k_j$, thereby causing a data loss; and if the user equipment determines that the bundled HARQ-ACK response of the downlink subframe $n-k_i$ and the downlink subframe $n-k_j$ is DTX, and if the base station originally performs scheduling only in the downlink subframe $n-k_i$, but the user equipment feeds back the DTX, as a result, the base station may consider that the data of the downlink subframe $n-k_i$ is lost, and the base station may repeat transmission, thereby leading to repeated transmission.

In addition, if the user equipment detects the DCI format in both the downlink subframe $n-k_{M-2}$ and the downlink subframe $n-k_{M-1}$, the value of the TPC field in the DCI format detected in the downlink subframe $n-k_{M-2}$ is the same as the value of the TPC field in the DCI format detected in the downlink subframe $n-k_{M-1}$.

Step 101″: The user equipment determines, according to the bundled HARQ-ACK response corresponding to the first serving cell, the downlink subframe $n-k_i$, and the downlink subframe $n-k_j$, the HARQ-ACK response that is corresponding to the first serving cell and the downlink subframe $n-k$ and is transmitted in the uplink subframe n.

In Step 101″, the user equipment may determine, according to the bundled HARQ-ACK response corresponding to the first serving cell, the downlink subframe $n-k_i$, and the downlink subframe $n-k_j$, and with reference to an HARQ-ACK response of another downlink subframe, the HARQ-ACK response that is of the first serving cell and the downlink subframe $n-k$ and is transmitted in the uplink subframe n.

If $k_i$ and $k_j$ are the last two elements $n-k_{M-2}$ and $n-k_{M-1}$ in the set K, step 101″ may specifically be as follows: the user equipment determines, according to the bundled HARQ-ACK response corresponding to the first serving cell, the downlink subframe $n-k_{M-2}$, and the downlink subframe $n-k_{M-1}$, the HARQ-ACK response that is corresponding to the first serving cell and the downlink subframe $n-k$ and is transmitted in the uplink subframe n.

For example, it is assumed that the set K is {8, 7, 6, 5, 4}, if the user equipment detects the DCI format only in a downlink subframe n−4, and the value of the TPC field in the DCI format is the second value, a bundled HARQ-ACK response corresponding to the first serving cell, a downlink subframe n−5, and the downlink subframe n−4 is DTX; and if HARQ-ACK responses that are corresponding to the first serving cell and a downlink subframe n−8, a downlink subframe n−7, and a downlink subframe n−6 are an ACK, a NACK, and an ACK respectively, the HARQ-ACK response that is corresponding to the first serving cell and the downlink subframe $n-k$, is transmitted in the uplink subframe n, and is obtained in step 101″ may be an ACK, a NACK, an ACK, or DTX, where the DTX is corresponding to the bundled HARQ-ACK response corresponding to the downlink subframe n−5 and the downlink subframe n−4.

Step 101‴: The user equipment transmits, in the uplink subframe n, the HARQ-ACK response corresponding to the first serving cell and the downlink subframe n−k.

It should be noted that, step S101 may be performed according to Example 1 only when the number of elements in the set K is 5 and a configured HARQ-ACK feedback manner is PUCCH format 1b channel selection. In this example, the HARQ-ACK bundling is performed on the downlink subframe n−$k_i$ and the downlink subframe n−$k_j$, so that when the number of elements included in the set K is 5, that is, when the uplink subframe n is corresponding to 5 downlink subframes, finally obtained HARQ-ACK responses of the first serving cell and the downlink subframe n−k are equivalent to HARQ-ACK responses corresponding to only 4 downlink subframes, so that HARQ-ACKs of the first serving cell can be sent by using an existing channel selection mechanism, which saves standardization efforts and effectively resolves a technical problem that one uplink subframe n can correspond to only 4 downlink subframes at most in an existing PUCCH format 1b channel selection mechanism.

Example 2

Step $101_1$: The user equipment performs HARQ-ACK bundling on an HARQ-ACK response corresponding to the first serving cell and a downlink subframe n−$k_0$ and an HARQ-ACK response corresponding to the first serving cell and a downlink subframe n−$k_1$, so as to obtain a bundled HARQ-ACK response corresponding to the first serving cell, the downlink subframe n−$k_0$, and the downlink subframe n−$k_1$, where $k_0$ and $k_1$ are first two elements in the set K.

In step $101_1$, that the user equipment performs HARQ-ACK bundling on an HARQ-ACK response corresponding to the first serving cell and a downlink subframe n−$k_0$ and an HARQ-ACK response corresponding to the first serving cell and a downlink subframe n−$k_1$ may specifically be as follows: the user equipment performs logical AND operation on the HARQ-ACK response of the downlink subframe n−$k_0$ and the HARQ-ACK response of the downlink subframe n−$k_1$. Because $k_0$ and $k_1$ are the first two elements in the set K, that is, the downlink subframe n−$k_0$ and the downlink subframe n are the first two subframes in the downlink subframe n−k, and because DAI in a downlink DCI format indicates an accumulative number of downlink control channels, a value of DAI in a DCI format received in any downlink subframe from the downlink subframe n−$k_2$ to the downlink subframe n−$k_{M-1}$ in the downlink subframe n−k may be used for determining whether a downlink control channel loss occurs in at least one downlink subframe of the downlink subframe n−$k_0$ and the downlink subframe n−$k_1$, so as to avoid a DTX-to-ACK problem.

The foregoing manner is only applied when a downlink control channel is received in at least one downlink subframe from the downlink subframe n−$k_2$ to the downlink subframe n−$k_{M-1}$; however, if the user equipment does not receive any downlink control channel in the downlink subframe n−$k_2$ to the downlink subframe n−$k_{M-1}$, the user equipment cannot determine whether the downlink control channel loss occurs in at least one downlink subframe from the downlink subframe n−$k_0$ and downlink subframe n−$k_1$. In order to resolve this problem, further, step $101_1$ may further include the following: if the user equipment receives, only in the downlink subframe n−$k_0$, PDSCH transmission or a downlink control channel that indicates downlink SPS release, that is, if no PDSCH transmission or downlink control channel that indicates downlink SPS release is received in the downlink subframe n−$k_1$, the user equipment determines that the bundled HARQ-ACK response corresponding to the first serving cell, the downlink subframe n−$k_0$, and downlink subframe n−$k_1$ is DTX. In this case, in the downlink subframe n−$k_0$ and the downlink subframe n−$k_1$, the downlink subframe n−$k_1$ has a higher scheduling priority, and if the base station needs to schedule only one downlink subframe of the two downlink subframes, the downlink subframe n−$k_1$ should be scheduled, and in this case, a value of DAI in a DCI format carried on a downlink control channel detected in the downlink subframe n−$k_1$ is 1. If the base station sends a downlink control channel in both the downlink subframe n−$k_0$ and the downlink subframe n−$k_1$, but the user equipment loses a downlink control channel of the downlink subframe n−$k_0$, the user equipment may further determine, by using the value of DAI in the downlink DCI format of the downlink subframe n−$k_1$, the downlink control channel whose the downlink subframe n−$k_0$ is lost, so as to determine that the bundled HARQ-ACK response corresponding to the first serving cell, the downlink subframe n−$k_0$, and downlink subframe n−$k_1$ is DTX, which avoids the DTX-to-ACK problem.

A difference between the foregoing Example 1 and Example 2 lies in that, step $101_2$ is as follows: the user equipment determines, according to the bundled HARQ-ACK response corresponding to the first serving cell, the downlink subframe n−$k_0$, and the downlink subframe n−$k_1$, the HARQ-ACK response that is corresponding to the first serving cell and the downlink subframe n−k and is transmitted in the uplink subframe n, but step $101_3$ is as follows: the user equipment transmits, in the uplink subframe n, the HARQ-ACK response corresponding to the first serving cell and the downlink subframe n−k.

Example 3

Step $101_1$: The user equipment determines an HARQ-ACK response HARQ-ACK'(n) corresponding to the first serving cell and the downlink subframe n−k, where 0≤n≤M−1. The HARQ-ACK'(n) is an HARQ-ACK response corresponding to PDSCH transmission, which a value of DAI carried in a downlink DCI format of the downlink control channel corresponding to is n+1, in the PDSCH transmission received in the downlink subframe n−k by the user equipment; or the HARQ-ACK'(n) is an HARQ-ACK response corresponding to the downlink control channel that indicates the downlink SPS release and is received in the downlink subframe n−k by the user equipment, and a value of DAI carried in a downlink DCI format of the downlink control channel that indicates the downlink SPS release is n+1, and otherwise, the HARQ-ACK'(n) is DTX.

In this embodiment, by means of step $101^1$, an HARQ-ACK response corresponding to a downlink subframe, in which the base station does not send any downlink control channel, in the downlink subframe n−k, an HARQ-ACK response corresponding to a downlink subframe, which the base station sends a downlink control channel in but is not detected by the user equipment, in the downlink subframe n−k, and the like are all set as DTX and arranged behind the HARQ-ACK'(n). Alternatively, an HARQ-ACK response corresponding to a downlink subframe, in which the base station does not send any downlink control channel, in the downlink subframe n−k is set as DTX and arranged behind the HARQ-ACK'(n), and an HARQ-ACK response corresponding to a downlink subframe, which the base station sends a downlink control channel in but is not detected by the user equipment, in the downlink subframe n−k is set as DTX and is arranged in a position corresponding to a corresponding DAI value in the HARQ-ACK'(n).

Step 101²: The user equipment performs HARQ-ACK bundling on last two HARQ-ACK responses in the HARQ-ACK'(n), so as to obtain an HARQ-ACK(i), where 0≤j≤M-2.

In step 101², it may be that, the user equipment performs logical AND operation on HARQ-ACK responses HARQ-ACK'(M−2) and HARQ-ACK'(M−1) that are corresponding to the downlink subframes n−$k_{M-2}$ and n−$k_{M-1}$ or the user equipment performs logical AND operation on HARQ-ACK'(M−2) and HARQ-ACK'(M−1) so as to obtain an HARQ-ACK(M−2), where an HARQ-ACK(0) to an HARQ-ACK(M−3) are corresponding to an HARQ-ACK'(0) to an HARQ-ACK'(M−3) respectively. In this embodiment, the HARQ-ACK(j) obtained in step 101² may also be referred to as a bundled HARQ-ACK response corresponding to the first serving cell and the downlink subframe n−k. It should be noted, in this step, that the user equipment performs HARQ-ACK bundling on the last two HARQ-ACK responses in the HARQ-ACK'(n) may also refer to that the bundling is performed on HARQ-ACK responses whose DAI is greater than or equal to 4, in the HARQ-ACK'(n).

In step 101², the HARQ-ACK bundling is performed on the last two HARQ-ACK responses, so that when the number of elements included in the set K is 5, that is, when the uplink subframe n is corresponding to 5 downlink subframes, finally obtained HARQ-ACK responses corresponding to the first serving cell and the downlink subframe n−k are equivalent to HARQ-ACK responses corresponding to only 4 downlink subframes, so that HARQ-ACKs of the first serving cell can be sent by using an existing channel selection mechanism, which saves standardization efforts. In addition, in this embodiment, the HARQ-ACK response corresponding to a downlink subframe, in which the base station does not send any downlink control channel, in the downlink subframe n−k, the HARQ-ACK response corresponding to a downlink subframe, which the base station sends a downlink control channel in but is not detected by the user equipment, in the downlink subframe n−k, and the like are all set as DTX and arranged behind the HARQ-ACK'(n); or the HARQ-ACK response corresponding to a downlink subframe, in which the base station does not send any downlink control channel, in the downlink subframe n−k is set as DTX and arranged behind the HARQ-ACK'(n) and the HARQ-ACK response corresponding to a downlink subframe, which the base station sends a downlink control channel in but is not detected by the user equipment, in the downlink subframe n−k is set as DTX and is arranged in a position corresponding to a corresponding DAI value in the HARQ-ACK'(n), so that when the bundling is performed on the last two HARQ-ACK responses in the HARQ-ACK'(n), a probability of bundling valid HARQ-ACK responses can be reduced, and therefore, performance loss caused by the bundling is reduced.

It should be noted that, if the base station does not send any downlink control channel in one downlink subframe of the downlink subframe n−$k_{M-2}$ and the downlink subframe n−$k_{M-1}$ in the downlink subframe n−k, but the HARQ-ACK bundling is performed on the last two elements in the HARQ-ACK'(n) in step 101², the HARQ-ACK response obtained after the bundling is DTX, and as a result, a valid HARQ-ACK response is also considered as DTX, and the base station re-transmits data corresponding to the valid HARQ-ACK response, thereby resulting in waste of resources. Alternatively, if in the downlink subframe n−$k_{M-2}$ and the downlink subframe n−$k_{M-1}$ in the downlink subframe n−k, the UE detects DCI only in the downlink subframe n−$k_{M-2}$ and a value of DAI in the DCI is M−1, or in other words, PDSCH transmission is detected and a value of DAI in a PDCCH/EPDCCH corresponding to the PDSCH is M−1, the UE cannot identify whether the base station schedules the downlink subframe n−$k_{M-1}$ or the base station does not schedule the downlink subframe n−$k_{M-1}$, in other words, whether the base station sends a downlink control channel in the downlink subframe n−$k_{M-1}$ to the UE but the downlink control channel is lost by the UE or the base station does not send any downlink control channel in the downlink subframe n−$k_{M-1}$, and therefore, if the UE only uses an HARQ-ACK response corresponding to the PDSCH received in the downlink subframe n−$k_{M-2}$ as the bundled HARQ-ACK response, when an actual situation is that the base station sends a downlink control channel in the downlink subframe n−$k_{M-1}$ to the UE but the downlink control channel is lost by the UE, a DTX-to-ACK problem may be caused, and if the UE uses the DTX as a result of the HARQ-ACK bundling, when an actual situation is that the base station does not send any downlink control channel in the downlink subframe n−$k_{M-1}$, unnecessary repeat of the PDSCH transmitted in the downlink subframe n−$k_{M-1}$ is caused, thereby lowering system performance. In order to resolve this technical problem, step 101² may further include the following: the user equipment performs the HARQ-ACK bundling on the last two HARQ-ACK responses in the HARQ-ACK'(n) according to a value of a TPC field in a DCI format detected in the downlink subframe n−$k_{M-2}$ and/or downlink subframe n−$k_{M-1}$, so as to receive the HARQ-ACK(j), where 0≤j≤M−2. A specific process includes the following: if the user equipment detects the DCI format only in the downlink subframe n−$k_{M-2}$, the value of the TPC field in the DCI format is a first value, and the value of the DAI in the DCI format is M−1, the HARQ-ACK(M−2) is the HARQ-ACK response corresponding to the first serving cell and the downlink subframe n−$k_{M-2}$, that is, an HARQ-ACK response that is obtained after performing, by the user equipment, the HARQ-ACK bundling on the last two HARQ-ACK responses of the HARQ-ACK'(n) is the HARQ-ACK response corresponding to the first serving cell and the downlink subframe n−$k_{M-2}$; if the user equipment detects the DCI format only in the downlink subframe n−$k_{M-1}$, the value of the TPC field in the DCI format is a first value, and the value of the DAI in the DCI format is M−1, the HARQ-ACK(M−2) is the HARQ-ACK response corresponding to the first serving cell and the downlink subframe n−$k_{M-1}$, that is, the HARQ-ACK response that is obtained after performing, by the user equipment, the HARQ-ACK bundling on the last two HARQ-ACK responses of the HARQ-ACK'(n) is the HARQ-ACK response corresponding to the first serving cell and the downlink subframe n−$k_{M-1}$, or if the user equipment detects the DCI format in the downlink subframe n−$k_{M-1}$, and the value of the DAI in the DCI format is M−1, the HARQ-ACK(M−2) is the HARQ-ACK response corresponding to the first serving cell and the downlink subframe n−$k_{M-1}$, that is, the HARQ-ACK response that is obtained after performing, by the user equipment, the HARQ-ACK bundling on the last two HARQ-ACK responses of the HARQ-ACK'(n) is the HARQ-ACK response corresponding to the first serving cell and the downlink subframe n−$k_{M-1}$; if the user equipment detects the DCI format only in the downlink subframe n−$k_{M-2}$, and the value of the TPC field in the DCI format is a second value, the HARQ-ACK(M−2) is DTX, and the HARQ-ACK response that is obtained after performing, by the user equipment, the HARQ-ACK bundling on the last two HARQ-ACK responses of the HARQ-ACK'(n) is DTX, or if the user equipment detects the DCI format only in the downlink subframe n−$k_{M-2}$, the value of the TPC field in the DCI format is a second value, and the value of the DAI in the DCI format is M−1, the HARQ-ACK(M−2) is DTX, that is, the HARQ-ACK response that is obtained after performing, by the user equipment, the HARQ-ACK bundling on the last two HARQ-ACK responses of the HARQ-ACK'(n) is DTX; if the user equipment detects the DCI format only in the downlink subframe n−$k_{M-1}$, and the value of the TPC field in the DCI format is a second value, the HARQ-ACK (M−2) is DTX, and the HARQ-ACK response that is obtained after performing, by the user equipment, the HARQ-ACK bundling on the last two HARQ-ACK responses of the HARQ-ACK'(n) is DTX, or if the user equipment detects the DCI format in the downlink subframe n−$k_{M-1}$, and the value of the DAI in the DCI format is M, the HARQ-ACK(M−2) is DTX, that is, the HARQ-ACK response that is obtained after performing, by the user equipment, the HARQ-ACK bundling on the last two HARQ-ACK responses of the HARQ-ACK'(n) is DTX; and if the user equipment detects the DCI format in the downlink subframe n−$k_{M-2}$, and the value of the DAI in the DCI format is M−1, and the user equipment detects the DCI format in the downlink subframe n−$k_{M-1}$, and the value of the DAI in the DCI format is M, the HARQ-ACK(M−2) is a result of a logical AND operation performed on the HARQ-ACK response corresponding to the first serving cell and the downlink subframe n−$k_{M-2}$ and the HARQ-ACK response corresponding to the first serving cell and the downlink subframe n−$k_{M-1}$.

It should be noted that, in the present invention, if the user equipment detects the DCI format only in the downlink subframe n−$k_{M-2}$, it means that in the downlink subframe n−$k_{M-2}$ and the downlink subframe n−$k_{M-1}$, the user equipment detects the DCI format only in the downlink subframe n−$k_{M-2}$, and no limitation is imposed on whether the user equipment detects the DCI format in another downlink subframe except the downlink subframe n−$k_{M-2}$ and the downlink subframe n−$k_{M-1}$; similarly, if the user equipment detects the DCI format only in the downlink subframe n−$k_{M-1}$, it means that in the downlink subframe n−$k_{M-2}$ and the downlink subframe n−$k_{M-1}$, the user equipment detects the DCI format only in the downlink subframe n−$k_{M-1}$, and no limitation is imposed on whether the user equipment detects the DCI format in another downlink subframe except the downlink subframe n−$k_{M-2}$ and the downlink subframe n−$k_{M-1}$.

Step $101^3$: The user equipment transmits, after the HARQ-ACK bundling and in the uplink subframe n, the HARQ-ACK response HARQ-ACK(j) corresponding to the first serving cell and the downlink subframe n−k.

Example 4

Step $101_a$: The user equipment determines an HARQ-ACK response HARQ-ACK'(n) corresponding to the first serving cell and the downlink subframe n−k, where 0≤n≤M−1, an HARQ-ACK'(0) is an HARQ-ACK response corresponding to PDSCH transmission having no corresponding downlink control channel, namely, an HARQ-ACK response corresponding to SPS data; and HARQ-ACK'(n) except the HARQ-ACK'(0) is an HARQ-ACK response corresponding to PDSCH transmission, which a value of DAI carried in a DCI format of a downlink control channel corresponding to is n, in the PDSCH transmission received in the downlink subframe n−k by the user equipment, or the HARQ-ACK'(n) is an HARQ-ACK response corresponding to the downlink control channel that indicates the downlink SPS release and is received in the downlink subframe n−k by the user equipment, and a value of DAI carried in a DCI format of the downlink control channel that indicates the downlink SPS release is n, and otherwise, the HARQ-ACK' (n) is DTX.

Step $101_b$: The user equipment performs HARQ-ACK bundling on last two HARQ-ACK responses in the HARQ-ACK'(n), so as to obtain an HARQ-ACK(i), where 0≤j≤M−2.

In step $101_b$, parts that are the same as those in step $101^2$ in Example 3 are not repeatedly described herein, and a difference between this example and the foregoing examples includes: if in one downlink subframe of two downlink subframes corresponding to the last two HARQ-ACK responses HARQ-ACK'(M−2) and HARQ-ACK'(M−1) in the HARQ-ACK'(n) the base station does not sends any downlink control channel, in this case, in step $101_b$, when the HARQ-ACK bundling is performed on the last two elements in the HARQ-ACK'(n), a bundled HARQ-ACK response is DTX, and as a result, a valid HARQ-ACK response is also considered as DTX, and the base station re-transmits data corresponding to the valid HARQ-ACK response, thereby resulting in waste of resources. It is assumed that a downlink subframe corresponding to the HARQ-ACK'(M−2) is a downlink subframe n−$k_a$, and a downlink subframe corresponding to the HARQ-ACK'(M−1) is a downlink subframe n−$k_b$, and in order to resolve this technical problem, step $101_b$ may specifically include the following: if the user equipment detects the DCI format only in the downlink subframe n−$k_a$, a value of a TPC field in the DCI format is a first value, and a value of DAI in the DCI format is M−2, the HARQ-ACK(M−2) is the HARQ-ACK response corresponding to the first serving cell and the downlink subframe n−$k_a$, that is, an HARQ-ACK response that is obtained after performing, by the user equipment, the HARQ-ACK bundling on the last two HARQ-ACK responses of the HARQ-ACK'(n) is the HARQ-ACK response corresponding to the first serving cell and the downlink subframe n−$k_a$; if the user equipment detects the DCI format only in the downlink subframe n−$k_b$, a value of a TPC field in the DCI format is a first value, and a value of DAI in the DCI format is M−2, the HARQ-ACK(M−2) is the HARQ-ACK response corresponding to the first serving cell and the downlink subframe n−$k_b$, that is, the HARQ-ACK response that is obtained after performing, by the user equipment, the HARQ-ACK bundling on the last two HARQ-ACK responses of the HARQ-ACK'(n) is the HARQ-ACK response corresponding to the first serving cell and the downlink subframe n−$k_b$; if the user equipment detects the DCI format only in the downlink subframe n−$k_a$, and a value of a TPC field in the DCI format is a second value, the HARQ-ACK(M−2) is DTX, and the HARQ-ACK response that is obtained after performing, by the user equipment, the HARQ-ACK bundling on the last two HARQ-ACK responses of the HARQ-ACK'(n) is DTX; and if the user equipment detects the DCI format only in the downlink subframe n−$k_b$, and a value of a TPC field in the DCI format is a second value, the HARQ-ACK(M−2) is DTX, that is, the HARQ-ACK response that is obtained after performing, by the user equipment, the HARQ-ACK bundling on the last two HARQ-ACK responses of the HARQ-ACK'(n) is DTX.

Step $101_c$: The user equipment transmits, after the HARQ-ACK bundling and in the uplink subframe n, the HARQ-ACK response HARQ-ACK(j) corresponding to the first serving cell and the downlink subframe n−k.

In this embodiment, timing of an FDD serving cell is set by the user equipment, which resolves a problem that some downlink subframes on the FDD serving cell have no corresponding uplink subframe in which an HARQ-ACK is fed back, so that the base station can still send information to the user equipment in these downlink subframes, thereby improving a resource utilization rate. In addition, in this embodiment, bundling is performed on HARQ-ACKs corresponding to two downlink subframes in the downlink subframe n–k, so that when the number of elements included in the set K is 5, that is, when the uplink subframe n is corresponding to 5 downlink subframes, finally obtained HARQ-ACK responses of the first serving cell and the downlink subframe n–k are equivalent to HARQ-ACK responses corresponding to only 4 downlink subframes, so that HARQ-ACKs of the first serving cell can be sent by using an existing channel selection mechanism, which saves standardization efforts.

Example 5

Step $101^1$: The user equipment determines an HARQ-ACK response HARQ-ACK'(n) corresponding to the first serving cell and the downlink subframe n–k, where $0 \le n \le M-1$. The HARQ-ACK'(n) is an HARQ-ACK response corresponding to PDSCH transmission, which a value of DAI carried in a downlink DCI format of the downlink control channel corresponding to is n+1, in the PDSCH transmission received in the downlink subframe n–k by the user equipment; or the HARQ-ACK'(n) is an HARQ-ACK response corresponding to the downlink control channel that indicates the downlink SPS release and is received in the downlink subframe n–k by the user equipment, and a value of DAI carried in a downlink DCI format of the downlink control channel that indicates the downlink SPS release is n+1, and otherwise, the HARQ-ACK'(n) is DTX.

In this embodiment, by means of step $101^1$, an HARQ-ACK response corresponding to a downlink subframe, in which the base station does not send any downlink control channel, in the downlink subframe n–k is set as DTX and arranged behind the HARQ-ACK'(n), and an HARQ-ACK response corresponding to a downlink subframe, which the base station sends a downlink control channel in but is not detected by the user equipment, in the downlink subframe n–k, is set as DTX and is arranged in a position corresponding to a corresponding DAI value in the HARQ-ACK'(n).

Step $101^2$: The user equipment performs HARQ-ACK bundling on last three HARQ-ACK responses in the HARQ-ACK'(n), so as to obtain an HARQ-ACK(i), where $0 \le j \le M-3$. Step $101^2$ it may be the following: the user equipment performs logical AND operation on an HARQ-ACK'(M–3), an HARQ-ACK'(M–2), and an HARQ-ACK'(M–1), so as to obtain an HARQ-ACK(M–3), where an HARQ-ACK(0) to an HARQ-ACK(M–4) are corresponding to the HARQ-ACK'(0) to the HARQ-ACK'(M–4) respectively. In this embodiment, the HARQ-ACK(j) obtained in step $101^2$ may also be referred to as a bundled HARQ-ACK response corresponding to the first serving cell and the downlink subframe n–k. It should be noted, in this step, that the user equipment performs HARQ-ACK bundling on the last three HARQ-ACK responses in the HARQ-ACK'(n) may also refer to that the bundling is performed on HARQ-ACK responses whose DAI is greater than or equal to 4, in the HARQ-ACK'(n).

In step $101^2$, the HARQ-ACK bundling is performed on the last three HARQ-ACK responses, so that when the number of elements included in the set K is 6, that is, when the uplink subframe n is corresponding to 6 downlink subframes, finally obtained HARQ-ACK responses of the first serving cell and the downlink subframe n–k are equivalent to HARQ-ACK responses corresponding to only 4 downlink subframes, so that HARQ-ACKs of the first serving cell can be sent by using an existing channel selection mechanism, which saves standardization efforts. In addition, in this embodiment, an HARQ-ACK response corresponding to a downlink subframe, in which the base station does not send any downlink control channel, in the downlink subframe n–k is set as DTX and arranged behind the HARQ-ACK'(n) so that when the bundling is performed on the last three HARQ-ACK responses in the HARQ-ACK'(n), a probability of bundling valid HARQ-ACK responses can be reduced, and therefore, performance loss caused by the bundling is reduced.

It should be noted that, if in a downlink subframe $n-k_{M-3}$, a downlink subframe $n-k_{M-2}$, and a downlink subframe $n-k_{M-1}$ in the downlink subframe n–k, the UE detects DCI only in the downlink subframe $n-k_{M-3}$ and a value of DAI in the DCI is M–2, or in other words, PDSCH transmission is detected and a value of DAI on a PDCCH/EPDCCH corresponding to the PDSCH is M–2, the UE cannot identify whether the base station schedules the downlink subframe $n-k_{M-2}$ and/or downlink subframe $n-k_{M-1}$ or the base station does not schedule the downlink subframe $n-k_{M-2}$ and/or downlink subframe $n-k_{M-1}$, in other words, whether the base station sends a downlink control channel in the downlink subframe $n-k_{M-2}$ and/or downlink subframe $n-k_{M-1}$ to the UE but the downlink control channel is lost by the UE or the base station does not send any downlink control channel in the downlink subframe $n-k_{M-2}$ and/or downlink subframe $n-k_{M-1}$, and therefore, as shown in Example 3, a DTX-to-ACK problem may be caused or unnecessary repeat is caused, thereby lowering system performance. In order to resolve this technical problem, step $101^2$ may further include the following: the user equipment performs, according to a value of a TPC field in the DCI format detected in the downlink subframe $n-k_{M-3}$, the HARQ-ACK bundling on the last three HARQ-ACK responses in the HARQ-ACK'(n), so as to obtain the HARQ-ACK(j), $0 \le j \le M-3$. A specific process includes the following:

if the user equipment detects the DCI format only in the downlink subframe $n-k_{M-3}$, the value of the TPC field in the DCI format is a first value, and the value of the DAI in the DCI format is M–2, the HARQ-ACK(M–3) is the HARQ-ACK response corresponding to the first serving cell and the downlink subframe $n-k_{M-3}$, that is, an HARQ-ACK response that is obtained after performing, by the user equipment, the HARQ-ACK bundling on the last three HARQ-ACK responses of the HARQ-ACK'(N) is the HARQ-ACK response corresponding to the first serving cell and the downlink subframe $n-k_{M-3}$; and if the user equipment detects the DCI format only in the downlink subframe $n-k_{M-3}$, and the value of the TPC field in the DCI format is a second value, a third value, or a fourth value, and the value of the DAI in the DCI format is M–2, the HARQ-ACK(M–3) is DTX, that is, the HARQ-ACK response that is obtained after performing, by the user equipment, the HARQ-ACK bundling on the last three HARQ-ACK responses of the HARQ-ACK'(n) is DTX.

The first value may be "00", and is corresponding to a first PUCCH resource in 4 PUCCH resources configured by using higher-layer signaling; the second value may be "01", and is corresponding to a second PUCCH resource in the 4 PUCCH resources configured by using the higher-layer signaling; the third value may be "10", and is corresponding to a third PUCCH resource in the 4 PUCCH resources configured by using the higher-layer signaling; and the fourth value may be "11", and is corresponding to a fourth PUCCH resource in the 4 PUCCH resources configured by using the higher-layer signaling. It should be noted that, in this case, that the user equipment detects the DCI format only in the downlink subframe n-$k_{M-3}$ may means that in the downlink subframe n-$k_{M-3}$, the downlink subframe n-$k_{M-2}$, and the downlink subframe n-$k_{M-1}$ in the downlink subframe n-k, the user equipment detects the DCI format only in the downlink subframe n-$k_{M-3}$, and the present invention does not impose any limitation on whether the DCI format is detected in another downlink subframe except the downlink subframe n-$k_{M-3}$, the downlink subframe n-$k_{M-2}$, and the downlink subframe n-$k_{M-1}$.

In the downlink subframe n-$k_{M-3}$, the downlink subframe n-$k_{M-2}$, and the downlink subframe n-$k_{M-1}$ in the downlink subframe n-k, if the TPC value in the DCI format detected in the downlink subframe n-$k_{M-3}$ indicates the first value, it may refer to that in the downlink subframe n-$k_{M-3}$, the downlink subframe n-$k_{M-2}$, and the downlink subframe n-$k_{M-1}$ in the downlink subframe n-k, the base station sends a downlink control channel only in the downlink subframe n-$k_{M-3}$; if the TPC value in the DCI format detected in the downlink subframe n-$k_{M-3}$ indicates the second value, it may refer to that in the downlink subframe n-$k_{M-3}$, the downlink subframe n-$k_{M-2}$, and the downlink subframe n-$k_{M-1}$ in the downlink subframe n-k, the base station sends a downlink control channel only in the downlink subframe n-$k_{M-3}$ and the downlink subframe n-$k_{M-2}$; if the TPC value in the DCI format detected in the downlink subframe n-$k_{M-3}$ indicates the third value, it may refer to that in the downlink subframe n-$k_{M-3}$, the downlink subframe n-$k_{M-2}$, and the downlink subframe n-$k_{M-1}$ in the downlink subframe n-k, the base station sends a downlink control channel only in the downlink subframe n-$k_{M-3}$ and the downlink subframe n-$k_{M-1}$; and if the TPC value in the DCI format detected in the downlink subframe n-$k_{M-3}$ indicates the fourth value, it may refer to that in the downlink subframe n-$k_{M-3}$, the downlink subframe n-$k_{M-2}$, and the downlink subframe n-$k_{M-1}$ in the downlink subframe n-k, the base station sends a downlink control channel in all the three downlink subframes.

Similarly, if in the downlink subframe n-$k_{M-2}$ and the downlink subframe n-$k_{M-1}$, the UE detects DCI only in the downlink subframe n-$k_{M-2}$ and the value of DAI in the DCI is M-2, or in other words, PDSCH transmission is detected and a value of DAI on a PDCCH/EPDCCH corresponding to the PDSCH is M-2, the UE cannot identify whether the base station schedules the downlink subframe n-$k_{M-1}$ or the base station does not schedule the downlink subframe n-$k_{M-1}$, in other words, whether the base station sends a downlink control channel in the downlink subframe n-$k_{M-1}$ to the UE but the downlink control channel is lost by the UE or the base station does not send any downlink control channel in the downlink subframe n-$k_{M-1}$, and therefore, as that in Example 3, a DTX-to-ACK problem may be caused or unnecessary repeat is caused, thereby lowering system performance. In order to resolve this technical problem, step $101^2$ may further include the following: the user equipment performs, according to a value of a TPC field in the DCI format detected in the downlink subframe n-$k_{M-2}$, the HARQ-ACK bundling on the last three HARQ-ACK responses in the HARQ-ACK'(n), so as to obtain the HARQ-ACK(j), $0 \leq j \leq M-3$. A specific process includes the following:

if the user equipment detects the DCI format only in the downlink subframe n-$k_{M-2}$, the value of the TPC field in the DCI format is a first value, and the value of the DAI in the DCI format is M-2, the HARQ-ACK(M-3) is the HARQ-ACK response corresponding to the first serving cell and the downlink subframe n-$k_{M-2}$, that is, an HARQ-ACK response that is obtained after performing, by the user equipment, the HARQ-ACK bundling on the last three HARQ-ACK responses of the HARQ-ACK'(n) is the HARQ-ACK response corresponding to the first serving cell and the downlink subframe n-$k_{M-2}$, where the first value may be "00" or "10", and "00" and "10" are respectively corresponding to the first PUCCH resource and the third PUCCH resource that are in the 4 PUCCH resources configured by using the higher-layer signaling; and if the user equipment detects the DCI format only in the downlink subframe n-$k_{M-2}$, the value of the TPC field in the DCI format is a second value, and the value of the DAI in the DCI format is M-2, the HARQ-ACK(M-3) is DTX, that is, the HARQ-ACK response that is obtained after performing, by the user equipment, the HARQ-ACK bundling on the last three HARQ-ACK responses of the HARQ-ACK'(n) is DTX, where the second value may be "01" or "11", and "01" or "11" are respectively corresponding to the second PUCCH resource and the fourth PUCCH resource that are in the 4 PUCCH resources configured by using the higher-layer signaling.

In this case, that the user equipment detects the DCI format only in the downlink subframe n-$k_{M-2}$ may refer to that in the downlink subframe n-$k_{M-3}$, the downlink subframe n-$k_{M-2}$, and the downlink subframe n-$k_{M-1}$ in the downlink subframe n-k, the user equipment detects the DCI format only in the downlink subframe n-$k_{M-2}$, and the present invention imposes no limitation on whether the user equipment detects the DCI format in another downlink subframe except the downlink subframe n-$k_{M-3}$, the downlink subframe n-$k_{M-2}$, and the downlink subframe n-$k_{M-1}$.

Step $101^3$: The user equipment transmits, after the HARQ-ACK bundling and in the uplink subframe n, the HARQ-ACK response HARQ-ACK(j) corresponding to the first serving cell and the downlink subframe n-k.

Example 5 of the present invention may be used in a scenario in which an HARQ-ACK of the first serving cell is fed back by using a channel selection mechanism when the reference uplink-downlink configuration of the first serving cell is the uplink-downlink configuration 3 or 4, or when the uplink-downlink configuration of the second serving cell or the reference uplink-downlink configuration of the second serving cell is the uplink-downlink configuration 3 or 4.

Example 6

When the serving cells configured for a user include only one first serving cell and one second serving cell, in step 100, the HARQ-ACK response corresponding to the first serving cell and the downlink subframe n-k may be transmitted in the uplink subframe n in a PUCCH format 1b channel selection manner. Specifically, when only an HARQ-ACK response corresponding to the first serving cell needs to be transmitted in the uplink subframe n, the HARQ-ACK response corresponding to the first serving cell and the downlink subframe n-k may be transmitted in the uplink subframe n in a PUCCH format 1b channel selection manner that is corresponded to when a single serving cell is configured for the UE in an existing LTE system, and in this case, spatial bundling (spatial bundling) may be prevented from being performed on the HARQ-ACK response corresponding to the first serving cell, thereby improving system performance; and when the HARQ-ACK response corresponding to the first serving cell and an HARQ-ACK response corresponding to the second serving cell need to be transmitted in the uplink subframe n, the HARQ-ACK response corresponding to the first serving cell and the downlink subframe n−k may be transmitted in the uplink subframe n in a PUCCH format 1b channel selection manner that is corresponded to when two serving cells are configured for the UE in the existing LTE system. The existing LTE system refers to LTE version 11, and further, the PUCCH format 1b channel selection manner that is corresponded to when a single serving cell is configured for the UE in the existing LTE system may refer to a PUCCH format 1b channel selection manner defined in Chapter 10.1.3.1 of the protocol 3GPP TS 36.213 v12.0.0; and the PUCCH format 1b channel selection manner that is corresponded to when two serving cells are configured for the UE in the existing LTE system may refer to a PUCCH format 1b channel selection manner defined in Chapter 10.1.3.2. 1 of the protocol 3GPP TS 36.213 v12.0.0.

For example, when the uplink-downlink configuration of the second serving cell is the uplink-downlink configuration 0, or when the reference uplink-downlink configuration of the second serving cell is the uplink-downlink configuration 0, step 100 may specifically be as follows:

Step 101-1: When the uplink subframe n is corresponding to a subframe 2, a subframe 4, a subframe 7, and a subframe 9 in one radio frame, the user equipment transmits, in the uplink subframe n and in the PUCCH format 1b channel selection manner that is corresponded to when a single serving cell is configured for the UE in the existing LTE system, the HARQ-ACK response corresponding to the first serving cell and the downlink subframe n−k; and when the uplink subframe n is corresponding to a subframe 3 and a subframe 8 in one radio frame, the user equipment transmits, in the uplink subframe n and in the PUCCH format 1b channel selection manner that is corresponded to when two serving cells are configured for the UE in the existing LTE system, the HARQ-ACK response corresponding to the first serving cell and the downlink subframe n−k.

In the prior art, if two serving cells are configured for the user equipment, HARQ-ACKs are permanently fed back in the PUCCH format 1b channel selection manner that is corresponded to when two serving cells are configured for the UE in the existing LTE system. In Example 6, in the PUCCH format 1b channel selection manner that is corresponded to when a single serving cell is configured for the UE in the existing LTE system, the spatial bundling does not need to be performed on the HARQ-ACKs, but in the PUCCH format 1b channel selection manner that is corresponded to when two serving cells are configured for the UE in the existing LTE system, the spatial bundling needs to be performed on the HARQ-ACKs, and therefore, in Example 6, when only the HARQ-ACK response corresponding to the first serving cell needs to be transmitted in the uplink subframe n, the HARQ-ACK response corresponding to the first serving cell and the downlink subframe n−k is transmitted in the uplink subframe n in the PUCCH format 1b channel selection manner that is corresponded to when a single serving cell is configured for the UE in the existing LTE system, which may avoid performing the spatial bundling (spatial bundling) on the HARQ-ACK response corresponding to the first serving cell, so as to improve system performance.

Figure 2:
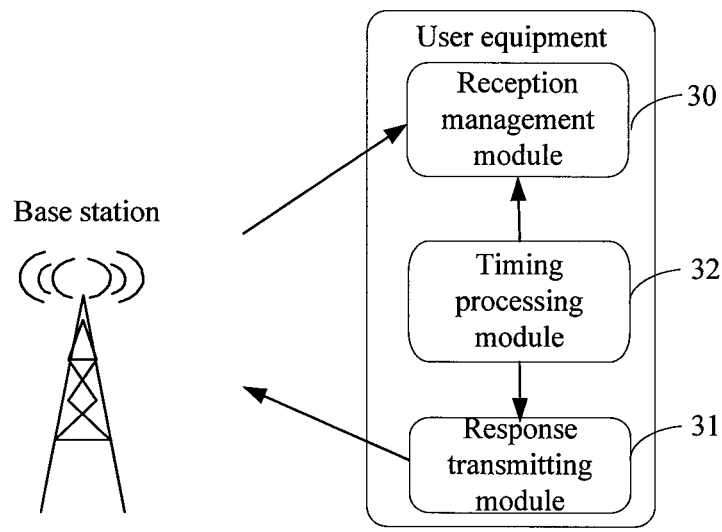
FIG. 2 is a module block diagram of a first embodiment of a user equipment according to an embodiment of the present invention, where a base station connected to the user equipment is also displayed.

Refer to FIG. 2 with reference to FIG. 1 and related descriptions of the embodiment in FIG. 1. This embodiment provides a user equipment, where the user equipment provided in the embodiment includes, but is not limited to, a reception management module 30, a response transmitting module 31, and a timing processing module 32.

The reception management module 30 is configured to receive, on a first serving cell and in a downlink subframe n−k, physical downlink shared channel PDSCH transmission or a downlink control channel that indicates downlink semi-persistent scheduling SPS release, where the first serving cell is a serving cell corresponding to the user equipment, and a duplex mode of the first serving cell is frequency division duplex FDD, or all subframes on the first serving cell are downlink subframes, or one radio frame on the first serving cell includes nine downlink subframes and one special subframe, or the first serving cell is a supplemental downlink serving cell, or a duplex mode of the first serving cell is time division duplex TDD and all subframes on the first serving cell are downlink subframes, or a duplex mode of the first serving cell is time division duplex TDD and one radio frame on the first serving cell includes nine downlink subframes and one special subframe, or a duplex mode of the first serving cell is time division duplex TDD and an uplink-downlink configuration of the first serving cell is an uplink-downlink configuration 7. As shown in the foregoing embodiment, the downlink control channel, received on the first serving cell and in the downlink subframe n−k by the reception management module 30, is an enhanced physical downlink control channel EPDCCH, the downlink control channel is used for indicating the physical downlink shared channel transmission or used for indicating the downlink SPS release, an HARQ-ACK resource offset field in a downlink DCI format carried on the downlink control channel is used as a downlink assignment index DAI field, and the DAI is used for indicating an accumulative number of downlink control channels in the downlink subframe n−k.

The response transmitting module 31 is configured to transmit, in an uplink subframe n, a hybrid automatic repeat request acknowledgement HARQ-ACK response corresponding to the first serving cell and the downlink subframe n−k. The response transmitting module 31 is specifically configured to transmit, in the uplink subframe n and in a physical uplink control channel PUCCH format 1b channel selection manner, the HARQ-ACK response corresponding to the first serving cell and the downlink subframe n−k. Further, with reference to related descriptions in the foregoing Example 6, the response transmitting module 31 may further be configured to: when only an HARQ-ACK response corresponding to the first serving cell needs to be transmitted in the uplink subframe n, transmit, in the uplink subframe n and in a PUCCH format 1b channel selection manner that is corresponded to when a single serving cell is configured for the UE in an existing LTE system, the HARQ-ACK response corresponding to the first serving cell and the downlink subframe n−k; and when the HARQ-ACK response corresponding to the first serving cell and an HARQ-ACK response corresponding to the second serving cell need to be transmitted in the uplink subframe n, transmit, in the uplink subframe n and in a PUCCH format 1b channel selection manner that is corresponded to when two serving cells are configured for the UE in the existing LTE system, the HARQ-ACK response corresponding to the first serving cell and the downlink subframe n−k. For example, when an uplink-downlink configuration of the second serving cell is an uplink-downlink configuration 0, or when a reference uplink-downlink configuration of the second serving cell is an uplink-downlink configuration 0, further, the response transmitting module 31 may further be configured to: when the uplink subframe n is corresponding to a subframe 2, a subframe 4, a subframe 7, and a subframe 9 in one radio frame, transmit, in the uplink subframe n and in the PUCCH format 1b channel selection manner that is corresponded to when a single serving cell is configured for the UE in the existing LTE system, the HARQ-ACK response corresponding to the first serving cell and the downlink subframe n−k; and when the uplink subframe n is corresponding to a subframe 3 and a subframe 8 in one radio frame, transmit, in the uplink subframe n and in the PUCCH format 1b channel selection manner that is corresponded to when two serving cells are configured for the UE in the existing LTE system, the HARQ-ACK response corresponding to the first serving cell and the downlink subframe n−k. Other descriptions are like those in Example 6 and are not repeated herein.

The timing processing module 32 is configured to determine a set K according to first HARQ-ACK timing, where n is an integer, k is a positive integer, and k belongs to the set K.

It should be noted that in another embodiment, the reception management module 30 is further configured to receive, on a second serving cell and in a downlink subframe n−k1, PDSCH transmission or a downlink control channel that indicates downlink SPS release, where the second serving cell is a serving cell corresponding to the user equipment, and a duplex mode of the second serving cell is time division duplex TDD. The response transmitting module 31 is further configured to transmit, in the uplink subframe n, an HARQ-ACK response corresponding to the second serving cell and the downlink subframe n−k1. The timing processing module 32 is further configured to: determine second HARQ-ACK timing according to an uplink-downlink configuration or a reference uplink-downlink configuration of the second serving cell, and determine a set K1 according to the second HARQ-ACK timing, where k1 is a positive integer, and k1 belongs to the set K1, and preferably, the set K includes at least one element that does not belong to the set K1. The first serving cell is a secondary serving cell of the user equipment, the second serving cell is a primary serving cell of the user equipment, and the response transmitting module 31 is further configured to transmit, on the second serving cell and in the uplink subframe n, the HARQ-ACK response corresponding to the first serving cell and the downlink subframe n−k.

It should be noted that, the timing processing module 32 is further configured to determine the first HARQ-ACK timing according to a reference uplink-downlink configuration of the first serving cell. The timing processing module 32 may be specifically configured to determine the first HARQ-ACK timing according to a reference uplink-downlink configuration of the first serving cell, and the reference uplink-downlink configuration of the first serving cell is the uplink-downlink configuration of the second serving cell or the reference uplink-downlink configuration of the second serving cell. The timing processing module 32 may specifically further be configured to:

determine the first HARQ-ACK timing according to the reference uplink-downlink configuration of the first serving cell, where when the number of serving cells configured for the user equipment is 2, the reference uplink-downlink configuration of the first serving cell is an uplink-downlink configuration 5, and when the number of serving cells configured for the user equipment is greater than 2, the reference uplink-downlink configuration of the first serving cell is an uplink-downlink configuration 2 or an uplink-downlink configuration 4.

Alternatively, the timing processing module 32 may specifically further be configured to: determine the first HARQ-ACK timing according to the reference uplink-downlink configuration of the first serving cell, where when the number of serving cells configured for the user equipment is 2, the reference uplink-downlink configuration of the first serving cell is an uplink-downlink configuration 5, and the serving cells configured for the user equipment include one first serving cell and one second serving cell; and when the number of serving cells configured for the user equipment is greater than 2, the reference uplink-downlink configuration of the first serving cell is an uplink-downlink configuration 2 or an uplink-downlink configuration 4, and the serving cells configured for the user equipment include at least one first serving cell or include at least one second serving cell.

That the reference uplink-downlink configuration of the first serving cell is an uplink-downlink configuration 2 or an uplink-downlink configuration 4 may specifically be as follows: when an uplink-downlink configuration of the primary serving cell of the user equipment is the uplink-downlink configuration 0, the reference uplink-downlink configuration of the first serving cell is the uplink-downlink configuration 2; when an uplink-downlink configuration of the primary serving cell of the user equipment is an uplink-downlink configuration 1, the reference uplink-downlink configuration of the first serving cell is the uplink-downlink configuration 2; when an uplink-downlink configuration of the primary serving cell of the user equipment is the uplink-downlink configuration 2, the reference uplink-downlink configuration of the first serving cell is the uplink-downlink configuration 2; when an uplink-downlink configuration of the primary serving cell of the user equipment is an uplink-downlink configuration 3, the reference uplink-downlink configuration of the first serving cell is the uplink-downlink configuration 4; when an uplink-downlink configuration of the primary serving cell of the user equipment is the uplink-downlink configuration 4, the reference uplink-downlink configuration of the first serving cell is the uplink-downlink configuration 4; and when an uplink-downlink configuration of the primary serving cell of the user equipment is an uplink-downlink configuration 6, the reference uplink-downlink configuration of the first serving cell is the uplink-downlink configuration 2.

Alternatively, that the reference uplink-downlink configuration of the first serving cell is an uplink-downlink configuration 2 or an uplink-downlink configuration 4 may specifically be as follows: when an uplink-downlink configuration of the primary serving cell of the user equipment is the uplink-downlink configuration 0, the reference uplink-downlink configuration of the first serving cell is the uplink-downlink configuration 4; when an uplink-downlink configuration of the primary serving cell of the user equipment is an uplink-downlink configuration 1, the reference uplink-downlink configuration of the first serving cell is the uplink-downlink configuration 4; when an uplink-downlink configuration of the primary serving cell of the user equipment is the uplink-downlink configuration 2, the reference uplink-downlink configuration of the first serving cell is the uplink-downlink configuration 2; when an uplink-downlink configuration of the primary serving cell of the user equipment is an uplink-downlink configuration 3, the reference uplink-downlink configuration of the first serving cell is the uplink-downlink configuration 4; when an uplink-downlink configuration of the primary serving cell of the user equipment is the uplink-downlink configuration 4, the reference uplink-downlink configuration of the first serving cell is the uplink-downlink configuration 4; and when an uplink-downlink configuration of the primary serving cell of the user equipment is an uplink-downlink configuration 6, the reference uplink-downlink configuration of the first serving cell is the uplink-downlink configuration 4.

Alternatively, that the reference uplink-downlink configuration of the first serving cell is an uplink-downlink configuration 2 or an uplink-downlink configuration 4 includes the following: when an uplink-downlink configuration of the primary serving cell of the user equipment is the uplink-downlink configuration 0, the reference uplink-downlink configuration of the first serving cell is an uplink-downlink configuration 2 or an uplink-downlink configuration 4; when an uplink-downlink configuration of the primary serving cell of the user equipment is an uplink-downlink configuration 1, the reference uplink-downlink configuration of the first serving cell is an uplink-downlink configuration 2 or an uplink-downlink configuration 4; when an uplink-downlink configuration of the primary serving cell of the user equipment is the uplink-downlink configuration 2, the reference uplink-downlink configuration of the first serving cell is the uplink-downlink configuration 2; when an uplink-downlink configuration of the primary serving cell of the user equipment is an uplink-downlink configuration 3, the reference uplink-downlink configuration of the first serving cell is the uplink-downlink configuration 4; when an uplink-downlink configuration of the primary serving cell of the user equipment is the uplink-downlink configuration 4, the reference uplink-downlink configuration of the first serving cell is the uplink-downlink configuration 4; and when an uplink-downlink configuration of the primary serving cell of the user equipment is an uplink-downlink configuration 6, the reference uplink-downlink configuration of the first serving cell is an uplink-downlink configuration 2 or an uplink-downlink configuration 4.

With reference to the HARQ-ACK transmission method in the foregoing embodiment, it is not difficult to find out that the timing processing module 32 is specifically configured to:

when the reference uplink-downlink configuration of the first serving cell is the uplink-downlink configuration 0, make the uplink subframe n correspond to a subframe 2, a subframe 3, a subframe 4, a subframe 7, a subframe 8, and a subframe 9 in one radio frame, and when the uplink subframe n is corresponding to a subframe 2 and a subframe 7 in one radio frame, make the set K include elements 6 and 5, for example, make the set K be {6, 5}, when the uplink subframe n is corresponding to a subframe 3 and a subframe 8 in one radio frame, make the set K include elements 5 and 4, for example, make the set K be {5, 4}, and when the uplink subframe n is corresponding to a subframe 4 and a subframe 9 in one radio frame, make the set K be {4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

alternatively, when the reference uplink-downlink configuration of the first serving cell is the uplink-downlink configuration 0, make the uplink subframe n correspond to a subframe 2, a subframe 3, a subframe 4, a subframe 7, a subframe 8, and a subframe 9 in one radio frame, and when the uplink subframe n is corresponding to a subframe 2 and a subframe 7 in one radio frame, make the set K include elements 6 and 5, for example, make the set K be {6, 5}, when the uplink subframe n is corresponding to a subframe 3 and a subframe 8 in one radio frame, make the set K be {5}, and when the uplink subframe n is corresponding to a subframe 4 and a subframe 9 in one radio frame, make the set K include elements 5 and 4, for example, make the set K be {5, 4};

alternatively, when the reference uplink-downlink configuration of the first serving cell is the uplink-downlink configuration 0, make the uplink subframe n correspond to a subframe 2, a subframe 4, a subframe 7, and a subframe 9 in one radio frame, and when the uplink subframe n is corresponding to a subframe 2 and a subframe 7 in one radio frame, make the set K include elements 6, 5, and 4, for example, make the set K be {6, 5, 4}, and when the uplink subframe n is corresponding to a subframe 4 and a subframe 9 in one radio frame, make the set K include elements 5 and 4, for example, make the set K be {5, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; on the other hand, a value of an element in the set K is enabled to be as small as possible, that is, it is ensured that a transmission delay of the first serving cell is as small as possible; and further, when this manner is applied to a scenario in which the first serving cell and the second serving cell are configured for the user equipment, an HARQ-ACK is transmitted only in an uplink subframe 2, a subframe 4, a subframe 7, and a subframe 9, that is, an HARQ-ACK of the first serving cell is transmitted only in an uplink subframe in which a corresponding HARQ-ACK of the second serving cell is also transmitted, so that both TPC fields in DCI corresponding to the two serving cells can be used for indicating both TPC and a PUCCH resource, and the HARQ-ACK transmission performance can be improved;

alternatively, when the reference uplink-downlink configuration of the first serving cell is the uplink-downlink configuration 0, make the uplink subframe n correspond to a subframe 2, a subframe 4, a subframe 7, and a subframe 9 in one radio frame, and when the uplink subframe n is corresponding to a subframe 2 and a subframe 7 in one radio frame, make the set K include elements 10, 9, and 6, for example, make the set K be {10, 9, 6}, when the uplink subframe n is corresponding to a subframe 4 and a subframe 9 in one radio frame, make the set K include elements 5 and 4, for example, make the set K be {5, 4}; where in this case, on the one hand, when this manner is applied to a scenario in which the first serving cell and the second serving cell are configured for the user equipment, an HARQ-ACK is transmitted only in an uplink subframe 2, a subframe 4, a subframe 7, and a subframe 9, that is, an HARQ-ACK of the first serving cell is transmitted only in an uplink subframe in which a corresponding HARQ-ACK of the second serving cell is also transmitted, so that both TPC fields in DCI corresponding to the two serving cells can be used for indicating both TPC and a PUCCH resource, and the HARQ-ACK transmission performance can be improved; and on the other hand, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH;

alternatively, when the reference uplink-downlink configuration of the first serving cell is the uplink-downlink configuration 0, make the uplink subframe n correspond to a subframe 2, a subframe 3, a subframe 4, a subframe 7, a subframe 8, and a subframe 9 in one radio frame, and when the uplink subframe n is corresponding to a subframe 2, a subframe 3, a subframe 7, and a subframe 8 in one radio frame, make the set K be {6, 4}, and when the uplink subframe n is corresponding to a subframe 4 and a subframe 9 in one radio frame, make the set K be {4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

when the reference uplink-downlink configuration of the first serving cell is the uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K include elements 7, 6, and 5, for example, make the set K be {7, 6, 5}, and when the uplink subframe n is corresponding to a subframe 3 and a subframe 8 in one radio frame, make the set K include elements 5 and 4, for example, make the set K be {5, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

alternatively, when the reference uplink-downlink configuration of the first serving cell is the uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K include elements 9, 7, and 6, for example, make the set K be {9, 7, 6}, and when the uplink subframe n is corresponding to a subframe 3 and a subframe 8 in one radio frame, make the set K include elements 6 and 4, for example, make the set K be {6, 4}; where in this case, when this manner is applied to a scenario in which the first serving cell and the second serving cell are configured for the user equipment, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH;

alternatively, when the reference uplink-downlink configuration of the first serving cell is the uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K include elements 7, 6, and 4, for example, make the set K be {7, 6, 4}, and when the uplink subframe n is corresponding to a subframe 3 and a subframe 8 in one radio frame, make the set K include elements 6 and 4, for example, make the set K be {6, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

when the reference uplink-downlink configuration of the first serving cell is the uplink-downlink configuration 2, make the uplink subframe n correspond to a subframe 2 and a subframe 7 in one radio frame, and make the set K include elements 8, 7, 6, 5, and 4, for example, make the set K be {8, 7, 6, 5, 4}; where in this case, a value of an element in the set K is enabled to be as small as possible, that is, it is ensured that a transmission delay of the first serving cell is as small as possible;

alternatively, when the reference uplink-downlink configuration of the first serving cell is the uplink-downlink configuration 2, make the uplink subframe n correspond to a subframe 2 and a subframe 7 in one radio frame, and make the set K include elements 8, 7, 6, and 4, for example, make the set K be {8, 7, 6, 4};

when the reference uplink-downlink configuration of the first serving cell is the uplink-downlink configuration 3, make the uplink subframe n correspond to a subframe 2, a subframe 3, and a subframe 4 in one radio frame, and when the uplink subframe n is corresponding to a subframe 2 in one radio frame, make the set K include elements 11, 10, 7, and 6, for example, make the set K be {11, 10, 7, 6}, when the uplink subframe n is corresponding to a subframe 3 in one radio frame, make the set K include elements 10, 6, and 5, for example, make the set K be {10, 6, 5}, and when the uplink subframe n is corresponding to a subframe 4 in one radio frame, make the set K include elements 10, 5, and 4, for example, make the set K be {10, 5, 4}; where in this case, a value of an element in the set K is enabled to be as small as possible, that is, it is ensured that a transmission delay of the first serving cell is as small as possible;

alternatively, when the reference uplink-downlink configuration of the first serving cell is the uplink-downlink configuration 3, make the uplink subframe n correspond to a subframe 2, a subframe 3, and a subframe 4 in one radio frame, and when the uplink subframe n is corresponding to a subframe 2 in one radio frame, make the set K include elements 11, 10, 9, 8, 7, and 6, for example, make the set K be {11, 10, 9, 8, 7, 6}, when the uplink subframe n is corresponding to a subframe 3 in one radio frame, make the set K include elements 6 and 5, for example, make the set K be {6, 5}, and when the uplink subframe n is corresponding to a subframe 4 in one radio frame, make the set K include elements 5 and 4, for example, make the set K be {5, 4}, where in this case, a problem that an HARQ-ACK corresponding to a PDSCH that is scheduled first is not fed back first may be avoided;

alternatively, when the reference uplink-downlink configuration of the first serving cell is the uplink-downlink configuration 3, make the uplink subframe n correspond to a subframe 2, a subframe 3, and a subframe 4 in one radio frame, and when the uplink subframe n is corresponding to a subframe 2 in one radio frame, make the set K include elements 11, 10, 9, and 8, for example, make the set K be {11, 10, 9, 8} or {10, 9, 8, 11}, when the uplink subframe n is corresponding to a subframe 3 in one radio frame, make the set K include elements 8, 7, and 6, for example, make the set K be {8, 7, 6}, and when the uplink subframe n is corresponding to a subframe 4 in one radio frame, make the set K include elements 6, 5, and 4, for example, make the set K be {6, 5, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided;

alternatively, when the reference uplink-downlink configuration of the first serving cell is the uplink-downlink configuration 3, make the uplink subframe n correspond to a subframe 2, a subframe 3, and a subframe 4 in one radio frame, and when the uplink subframe n is corresponding to a subframe 2 in one radio frame, make the set K include elements 11, 10, and 9, for example, make the set K be {11, 10, 9} or {10, 9, 11}, when the uplink subframe n is corresponding to a subframe 3 in one radio frame, make the set K include elements 9, 8, 7, and 6, for example, make the set K be {9, 8, 7, 6}, and when the uplink subframe n is corresponding to a subframe 4 in one radio frame, make the set K include elements 6, 5, and 4, for example, make the set K be {6, 5, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided;

when the reference uplink-downlink configuration of the first serving cell is the uplink-downlink configuration 4, make the uplink subframe n correspond to a subframe 2 and a subframe 3 in one radio frame, and when the uplink subframe n is corresponding to a subframe 2 in one radio frame, make the set K include elements 12, 11, 10, 8, and 7, for example, make the set K be {12, 11, 10, 8, 7}, and when the uplink subframe n is corresponding to a subframe 3 in one radio frame, make the set K include elements 10, 7, 6, 5, and 4, for example, make the set K be {10, 7, 6, 5, 4}; where in this case, a value of an element in the set K is enabled to be as small as possible, that is, it is ensured that a transmission delay of the first serving cell is as small as possible;

alternatively, when the reference uplink-downlink configuration of the first serving cell is the uplink-downlink configuration 4, make the uplink subframe n correspond to a subframe 2 and a subframe 3 in one radio frame, and when the uplink subframe n is corresponding to a subframe 2 in one radio frame, make the set K include elements 12, 11, 10, 9, 8, and 7, for example, make the set K be {12, 11, 10, 9, 8, 7}, and when the uplink subframe n is corresponding to a subframe 3 in one radio frame, make the set K include elements 7, 6, 5, and 4, for example, make the set K be {7, 6, 5, 4}; where in this case, a problem that an HARQ-ACK corresponding to a PDSCH that is scheduled first is not fed back first may be avoided;

alternatively, when the reference uplink-downlink configuration of the first serving cell is the uplink-downlink configuration 4, make the uplink subframe n correspond to a subframe 2 and a subframe 3 in one radio frame, and when the uplink subframe n is corresponding to a subframe 2 in one radio frame, make the set K include elements 12, 11, 8, and 7, for example, make the set K be {12, 11, 8, 7}, and when the uplink subframe n is corresponding to a subframe 3 in one radio frame, make the set K include elements 7, 6, 5, and 4, for example, make the set K be {7, 6, 5, 4};

alternatively, when the reference uplink-downlink configuration of the first serving cell is the uplink-downlink configuration 4, make the uplink subframe n correspond to a subframe 2 and a subframe 3 in one radio frame, and when the uplink subframe n is corresponding to a subframe 2 in one radio frame, make the set K include elements 12, 11, 10, 9, and 8, for example, make the set K be {12, 11, 10, 9, 8} or {12, 10, 9, 8, 11}, and when the uplink subframe n is corresponding to a subframe 3 in one radio frame, make the set K include elements 8, 7, 6, 5, and 4, for example, make the set K be {8, 7, 6, 5, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided;

when the reference uplink-downlink configuration of the first serving cell is the uplink-downlink configuration 5, make the uplink subframe n correspond to a subframe 2 in one radio frame, and make the set K include elements 13, 12, 11, 10, 9, 8, 7, 6, 5, and 4, for example, make the set K be {13, 12, 11, 10, 9, 8, 7, 6, 5, 4};

alternatively, when the reference uplink-downlink configuration of the first serving cell is the uplink-downlink configuration 5, make the uplink subframe n correspond to a subframe 2 in one radio frame, and make the set K include elements 13, 12, 11, 9, 8, 7, 6, 5, and 4, for example, make the set K be {13, 12, 11, 9, 8, 7, 6, 5, 4};

when the reference uplink-downlink configuration of the first serving cell is the uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, and a subframe 7 in one radio frame, make the set K include elements 7 and 5, for example, make the set K be {7, 5}, when the uplink subframe n is corresponding to a subframe 4 in one radio frame, make the set K be {5}, and when the uplink subframe n is corresponding to a subframe 8 in one radio frame, make the set K include elements 7, 5, and 4, for example, make the set K be {7, 5, 4}; where in this case, a value of an element in the set K is enabled to be as small as possible, that is, it is ensured that a transmission delay of the first serving cell is as small as possible;

alternatively, when the reference uplink-downlink configuration of the first serving cell is the uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2 in one radio frame, make the set K include elements 8 and 7, for example, make the set K be {8, 7}, when the uplink subframe n is corresponding to a subframe 3 and a subframe 7 in one radio frame, make the set K include elements 7 and 6, for example, make the set K be {7, 6}, and when the uplink subframe n is corresponding to a subframe 4 and subframe 8 in one radio frame, make the set K include elements 6 and 5, for example, make the set K be {6, 5}; where in this case, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

alternatively, when the reference uplink-downlink configuration of the first serving cell is the uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, a subframe 7, and a subframe 8 in one radio frame, make the set K include elements 10 and 7, for example, make the set K be {10, 7}, and when the uplink subframe n is corresponding to a subframe 4 in one radio frame, make the set K include elements 10 and 5, for example, make the set K be {10, 5}, where in this case, when this manner is applied to a scenario in which the first serving cell and the second serving cell are configured for the user equipment, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH;

alternatively, when the reference uplink-downlink configuration of the first serving cell is the uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, and a subframe 4 in one radio frame, make the set K include elements 7 and 4, for example, make the set K be {7, 4}, and when the uplink subframe n is corresponding to a subframe 7 and an uplink subframe 8 that are in one radio frame, make the set K include elements 6 and 5, for example, make the set K be {6, 5}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

alternatively, when the reference uplink-downlink configuration of the first serving cell is the uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2 in one radio frame, make the set K include elements 10 and 9, for example, make the set K be {10, 9}, when the uplink subframe n is corresponding to a subframe 3 in one radio frame, make the set K include elements 9 and 8, for example, make the set K be {9, 8}, when the uplink subframe n is corresponding to a subframe 4 in one radio frame, make the set K include elements 8 and 7, for example, make the set K be {8, 7}, when the uplink subframe n is corresponding to a subframe 7 in one radio frame, make the set K include elements 9 and 8, for example, make the set K be {9, 8}, when the uplink subframe n is corresponding to a subframe 8 in one radio frame, make the set K include elements 8 and 7, for example, make the set K be {8, 7}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; on the other hand, a problem that an HARQ-ACK corresponding to a PDSCH that is scheduled first is not fed back first may be avoided; and further, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH.

Figure 3:
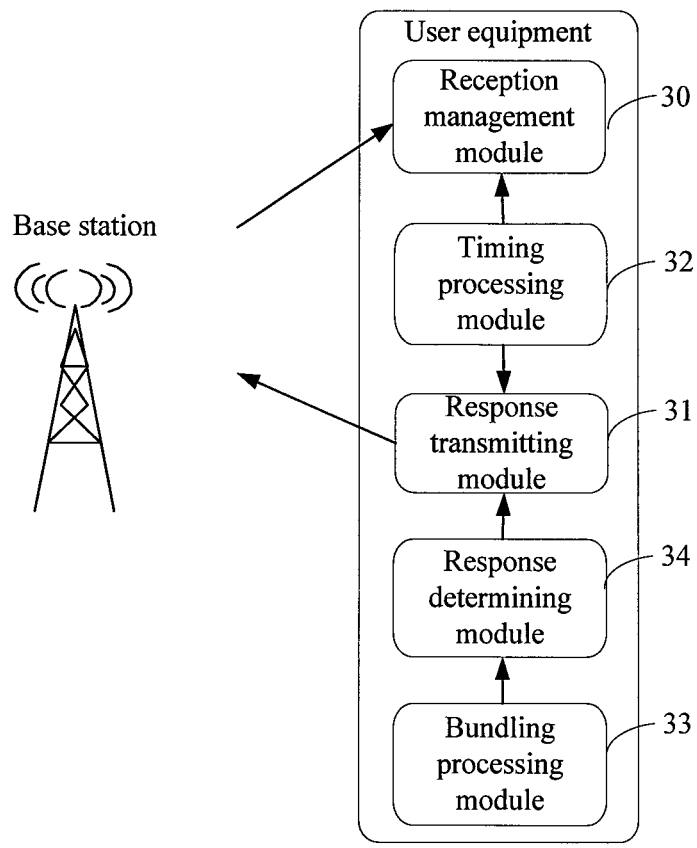
FIG. 3 is a module block diagram of a second embodiment of a user equipment according to an embodiment of the present invention, where a base station connected to the user equipment is also displayed.

Refer to FIG. 3 with reference to related descriptions of Examples 1 to 4 of the foregoing embodiment. The user equipment of this embodiment may further include a bundling processing module 33 and a response determining module 34.

The bundling processing module 33 is configured to perform HARQ-ACK bundling on an HARQ-ACK response corresponding to the first serving cell and a downlink subframe $n-k_{M-2}$ in the downlink subframe n−k and an HARQ-ACK response corresponding to the first serving cell and a downlink subframe $n-k_{M-1}$ in the downlink subframe n−k before the response transmitting module 31 transmits, in the uplink subframe n, the HARQ-ACK response corresponding to the first serving cell and the downlink subframe n−k, so as to obtain a bundled HARQ-ACK response corresponding to the first serving cell, the downlink subframe $n-k_{M-2}$, and the downlink subframe $n-k_{M-1}$, where $k_{M-2}$ and $k_{M-1}$ are last two elements in the set K, and M is the number of elements in the set K. The bundling processing module 33 is specifically configured to perform, according to a value of a transmit power control TPC field in a downlink control information DCI format detected in the downlink subframe $n-k_{M-2}$ and/or the downlink subframe $n-k_{M-1}$, the HARQ-ACK bundling on the HARQ-ACK response corresponding to the first serving cell and the downlink subframe $n-k_{M-2}$ and the HARQ-ACK response corresponding to the first serving cell and the downlink subframe n-$k_{M-1}$, so as to obtain the bundled HARQ-ACK response corresponding to the first serving cell, the downlink subframe n-$k_{M-2}$ and the downlink subframe n-$k_{M-1}$.

The response determining module 34 is configured to determine, according to the HARQ-ACK response that is bundled by the bundling processing module 33 and is corresponding to the first serving cell, the downlink subframe n-$k_{M-2}$, and the downlink subframe n-$k_{M-1}$, the HARQ-ACK response that is corresponding to the first serving cell and the downlink subframe n-k and is transmitted in the uplink subframe n.

It should be noted that, if the bundling processing module 33 detects the DCI format in both the downlink subframe n-$k_{M-2}$ and the downlink subframe n-$k_{M-1}$, the value of the TPC field in the DCI format detected in the downlink subframe n-$k_{M-2}$ is the same as the value of the TPC field in the DCI format detected in the downlink subframe n-$k_{M-1}$. Further, if the bundling processing module 33 detects the DCI format only in the downlink subframe n-$k_{M-2}$ and the value of the TPC field in the DCI format is a first value, the bundled HARQ-ACK response corresponding to the first serving cell, the downlink subframe n-$k_{M-2}$, and the downlink subframe n-$k_{M-1}$ is the HARQ-ACK response corresponding to the first serving cell and the downlink subframe n-$k_{M-2}$; if the bundling processing module 33 detects the DCI format only in the downlink subframe n-$k_{M-1}$, and the value of the TPC field in the DCI format is a first value, the bundled HARQ-ACK response corresponding to the first serving cell, the downlink subframe n-$k_{M-2}$, and the downlink subframe n-$k_{M-1}$ is the HARQ-ACK response corresponding to the first serving cell and the downlink subframe n-$k_{M-1}$; if the bundling processing module 33 detects the DCI format only in the downlink subframe n-$k_{M-2}$, and the value of the TPC field in the DCI format is a second value, the bundled HARQ-ACK response corresponding to the first serving cell, the downlink subframe n-$k_{M-2}$, and the downlink subframe n-$k_{M-1}$ is discontinuous transmission DTX; and if the bundling processing module 33 detects the DCI format only in the downlink subframe n-$k_{M-1}$, and the value of the TPC field in the DCI format is a second value, the bundled HARQ-ACK response corresponding to the first serving cell, the downlink subframe n-$k_{M-2}$, and the downlink subframe n-$k_{M-1}$ is DTX; where the first value is unequal to the second value.

In addition, as shown in the foregoing description, the first value is corresponding to a first physical uplink control channel PUCCH resource, the second value is corresponding to a second physical uplink control channel PUCCH resource, and the first PUCCH resource and the second PUCCH resource are PUCCH resources configured for the user equipment; and preferably, the first PUCCH resource and/or the second PUCCH resource each includes at least two PUCCH resources.

Certainly, in another embodiment, the bundling processing module 33 is further configured to perform HARQ-ACK bundling on an HARQ-ACK response corresponding to the first serving cell and a downlink subframe n-$k_0$ in the downlink subframe n-k and an HARQ-ACK response corresponding to the first serving cell and a downlink subframe n-$k_1$ in the downlink subframe n-k, so as to obtain a bundled HARQ-ACK response corresponding to the first serving cell, the downlink subframe n-$k_0$, and the downlink subframe n-$k_1$, where n-$k_0$ and n-$k_1$ are first two elements in the set K. The response determining module 34 is further configured to determine, according to the bundled HARQ-ACK response corresponding to the first serving cell, the downlink subframe n-$k_0$, and the downlink subframe n-$k_1$, the HARQ-ACK response that is corresponding to the first serving cell and the downlink subframe n-k and is transmitted in the uplink subframe n.

Certainly, in another embodiment, the bundling processing module 33 may further be configured to perform the HARQ-ACK bundling on last two HARQ-ACK responses in an HARQ-ACK'(n), so as to obtain an HARQ-ACK(i), where 0≤j≤M-2; and descriptions of the HARQ-ACK'(n) are like those in Example 3, and are not repeated herein; and for how the bundling processing module 33 performs the HARQ-ACK bundling on the last two HARQ-ACK responses in the HARQ-ACK'(n) reference may be made to Example 3, which is not repeatedly described herein.

Certainly, in another embodiment, the bundling processing module 33 may further be configured to perform HARQ-ACK bundling on last three HARQ-ACK responses in an HARQ-ACK'(n), so as to obtain an HARQ-ACK(i), where 0≤j≤M-3; and descriptions of the HARQ-ACK'(n) are like those in Example 5, and are not repeated herein; and for how the bundling processing module 33 performs the HARQ-ACK bundling on the last three HARQ-ACK responses in the HARQ-ACK'(n), reference may be made to Example 5, which is not repeatedly described herein.

In addition, in this embodiment, the bundling is performed on HARQ-ACKs corresponding to two downlink subframes in the downlink subframe n-k, so that when the number of elements included in the set K is 5, which is equivalent to an HARQ-ACK response including 4 elements, and therefore, HARQ-ACKs of the first serving cell can be sent by using an existing channel selection mechanism. For specific implementation or related expansion, reference may be made to related descriptions in the foregoing embodiments, and no details are repeatedly described herein.

It should be noted that, in this embodiment, process steps and examples executed and/or implemented by one or more modules of the user equipment and technical effects brought by the process steps and examples are similar to or more than those in the embodiment of the foregoing HARQ-ACK transmission method, and for details, reference may be made to related descriptions of the foregoing embodiment, which are within the scope that is easy to be accordingly understood by persons skilled in the art and are not repeatedly described herein.

In this embodiment, timing of an FDD serving cell or of a supplemental downlink serving cell is set by a user equipment, which resolves a problem that some downlink subframes on the FDD serving cell or the supplemental downlink serving cell have no corresponding uplink subframe in which an HARQ-ACK is fed back, so that a base station can still send information to the user equipment in these downlink subframes, thereby improving a resource utilization rate. In addition, in this embodiment, bundling may be performed on HARQ-ACKs corresponding to two downlink subframes in the downlink subframe n-k, so that an HARQ-ACK can be sent by using an existing channel selection mechanism, which saves standardization efforts.

Figure 4:
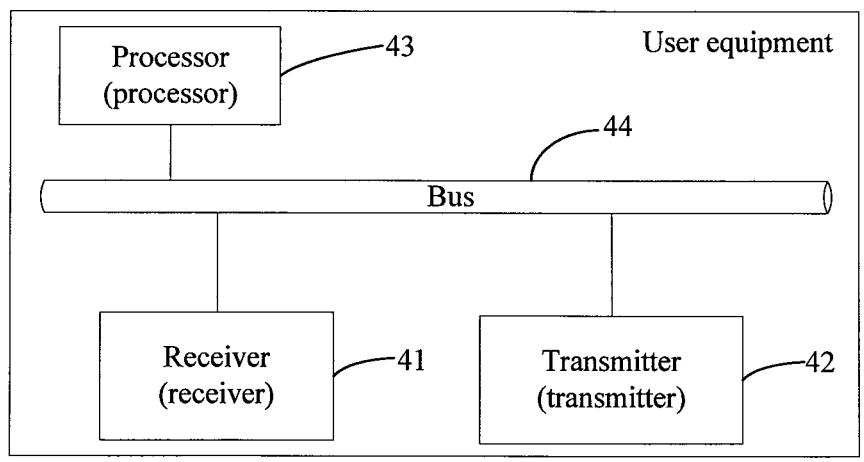
FIG. 4 is a module block diagram of a third embodiment of a user equipment according to an embodiment of the present invention.

Refer to FIG. 4 with reference to the foregoing embodiments. The present invention provides a user equipment, where the user equipment includes a receiver 41, a transmitter 42, a processor 43, and a bus 44, and the receiver 41, the transmitter 42, and the processor 43 are connected by using the bus 44.

The receiver 41 is configured to receive, on a first serving cell and in a downlink subframe n-k, physical downlink shared channel PDSCH transmission or a downlink control channel that indicates downlink semi-persistent scheduling SPS release, where the first serving cell is a serving cell corresponding to the user equipment, and a duplex mode of the first serving cell is frequency division duplex FDD, or all subframes on the first serving cell are downlink subframes, or one radio frame on the first serving cell includes nine downlink subframes and one special subframe, or the first serving cell is a supplemental downlink serving cell, or a duplex mode of the first serving cell is time division duplex TDD and all subframes on the first serving cell are downlink subframes, or a duplex mode of the first serving cell is time division duplex TDD and one radio frame on the first serving cell includes nine downlink subframes and one special subframe, or a duplex mode of the first serving cell is time division duplex TDD and an uplink-downlink configuration of the first serving cell is an uplink-downlink configuration 7.

The transmitter 42 is configured to transmit, in an uplink subframe n, a hybrid automatic repeat request acknowledgement HARQ-ACK response corresponding to the first serving cell and the downlink subframe n−k.

The processor 43 is configured to determine a set K according to first HARQ-ACK timing, where n is an integer, k is a positive integer, and k belongs to the set K.

Similar to the user equipment in the foregoing embodiment, the receiver 41 is further configured to receive, on a second serving cell and in a downlink subframe n−k1, PDSCH transmission or a downlink control channel that indicates downlink SPS release, where the second serving cell is a serving cell corresponding to the user equipment, and a duplex mode of the second serving cell is time division duplex TDD; the transmitter 42 is further configured to transmit, in the uplink subframe n, an HARQ-ACK response corresponding to the second serving cell and the downlink subframe n−k1; and the processor 43 is further configured to: determine second HARQ-ACK timing according to an uplink-downlink configuration or a reference uplink-downlink configuration of the second serving cell, and determine a set K1 according to the second HARQ-ACK timing, where k1 is a positive integer, and k1 belongs to the set K1. In addition, the transmitter 42 is further configured to transmit, on the second serving cell and in the uplink subframe n, the HARQ-ACK response corresponding to the first serving cell and the downlink subframe n−k. Further, with reference to related descriptions in the foregoing Example 6, the transmitter 42 may further be configured to: when only an HARQ-ACK response corresponding to the first serving cell needs to be transmitted in the uplink subframe n, transmit, in the uplink subframe n and in a PUCCH format 1b channel selection manner that is corresponded to when a single serving cell is configured for the UE in an existing LTE system, the HARQ-ACK response corresponding to the first serving cell and the downlink subframe n−k, and when the HARQ-ACK response corresponding to the first serving cell and an HARQ-ACK response corresponding to the second serving cell need to be transmitted in the uplink subframe n, transmit, in the uplink subframe n and in a PUCCH format 1b channel selection manner that is corresponded to when two serving cells are configured for the UE in the existing LTE system, the HARQ-ACK response corresponding to the first serving cell and the downlink subframe n−k. For example, when an uplink-downlink configuration of the second serving cell is an uplink-downlink configuration 0 or when a reference uplink-downlink configuration of the second serving cell is an uplink-downlink configuration 0, further, the transmitter 42 may further be configured to: when the uplink subframe n is corresponding to a subframe 2, a subframe 4, a subframe 7, and a subframe 9 in one radio frame, the user equipment transmits, in the uplink subframe n and in the PUCCH format 1b channel selection manner that is corresponded to when a single serving cell is configured for the UE in the existing LTE system, the HARQ-ACK response corresponding to the first serving cell and the downlink subframe n−k; and when the uplink subframe n is corresponding to a subframe 3 and a subframe 8 in one radio frame, the user equipment transmits, in the uplink subframe n and in the PUCCH format 1b channel selection manner that is corresponded to when two serving cells are configured for the UE in the existing LTE system, the HARQ-ACK response corresponding to the first serving cell and the downlink subframe n−k. Other descriptions are like those in Example 6 and are not repeated herein.

The processor 43 is configured to determine the first HARQ-ACK timing according to a reference uplink-downlink configuration of the first serving cell. Specifically, the processor 43 may be configured to determine the first HARQ-ACK timing according to the reference uplink-downlink configuration of the first serving cell, and the reference uplink-downlink configuration of the first serving cell is the uplink-downlink configuration or the reference uplink-downlink configuration of the second serving cell.

It should be noted that a specific implementation process of the processor 43 includes the following:

when the reference uplink-downlink configuration of the first serving cell is the uplink-downlink configuration 0, make the uplink subframe n correspond to a subframe 2, a subframe 3, a subframe 4, a subframe 7, a subframe 8, and a subframe 9 in one radio frame, and when the uplink subframe n is corresponding to a subframe 2 and a subframe 7 in one radio frame, make the set K include elements 6 and 5, for example, make the set K be {6, 5}, when the uplink subframe n is corresponding to a subframe 3 and a subframe 8 in one radio frame, make the set K include elements 5 and 4, for example, make the set K be {5, 4}, and when the uplink subframe n is corresponding to a subframe 4 and a subframe 9 in one radio frame, make the set K be {4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

alternatively, when the reference uplink-downlink configuration of the first serving cell is the uplink-downlink configuration 0, make the uplink subframe n correspond to a subframe 2, a subframe 3, a subframe 4, a subframe 7, a subframe 8, and a subframe 9 in one radio frame, and when the uplink subframe n is corresponding to a subframe 2 and a subframe 7 in one radio frame, make the set K include elements 6 and 5, for example, make the set K be {6, 5}, when the uplink subframe n is corresponding to a subframe 3 and a subframe 8 in one radio frame, make the set K be {5}, and when the uplink subframe n is corresponding to a subframe 4 and a subframe 9 in one radio frame, make the set K include elements 5 and 4, for example, make the set K be {5, 4};

alternatively, when the reference uplink-downlink configuration of the first serving cell is the uplink-downlink configuration 0, make the uplink subframe n correspond to a subframe 2, a subframe 4, a subframe 7, and a subframe 9 in one radio frame, and when the uplink subframe n is corresponding to a subframe 2 and a subframe 7 in one radio frame, make the set K include elements 6, 5, and 4, for example, make the set K be {6, 5, 4}, and when the uplink subframe n is corresponding to a subframe 4 and a subframe 9 in one radio frame, make the set K include elements 5 and 4, for example, make the set K be {5, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; on the other hand, a value of an element in the set K is enabled to be as small as possible, that is, it is ensured that a transmission delay of the first serving cell is as small as possible; and further, when this manner is applied to a scenario in which the first serving cell and the second serving cell are configured for the user equipment, an HARQ-ACK is transmitted only in an uplink subframe 2, a subframe 4, a subframe 7, and a subframe 9, that is, an HARQ-ACK of the first serving cell is transmitted only in an uplink subframe in which a corresponding HARQ-ACK of the second serving cell is also transmitted, so that both TPC fields in DCI corresponding to the two serving cells can be used for indicating both TPC and a PUCCH resource, and the HARQ-ACK transmission performance can be improved;

alternatively, when the reference uplink-downlink configuration of the first serving cell is the uplink-downlink configuration 0, make the uplink subframe n correspond to a subframe 2, a subframe 4, a subframe 7, and a subframe 9 in one radio frame, and when the uplink subframe n is corresponding to a subframe 2 and a subframe 7 in one radio frame, make the set K include elements 10, 9, and 6, for example, make the set K be {10, 9, 6}, when the uplink subframe n is corresponding to a subframe 4 and a subframe 9 in one radio frame, make the set K include elements 5 and 4, for example, make the set K be {5, 4}; where in this case, on the one hand, when this manner is applied to a scenario in which the first serving cell and the second serving cell are configured for the user equipment, an HARQ-ACK is transmitted only in an uplink subframe 2, a subframe 4, a subframe 7, and a subframe 9, that is, an HARQ-ACK of the first serving cell is transmitted only in an uplink subframe in which a corresponding HARQ-ACK of the second serving cell is also transmitted, so that both TPC fields in DCI corresponding to the two serving cells can be used for indicating both TPC and a PUCCH resource, and the HARQ-ACK transmission performance can be improved; and on the other hand, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH;

alternatively, when the reference uplink-downlink configuration of the first serving cell is the uplink-downlink configuration 0, make the uplink subframe n correspond to a subframe 2, a subframe 3, a subframe 4, a subframe 7, a subframe 8, and a subframe 9 in one radio frame, and when the uplink subframe n is corresponding to a subframe 2, a subframe 3, a subframe 7, and a subframe 8 in one radio frame, make the set K be {6, 4}, and when the uplink subframe n is corresponding to a subframe 4 and a subframe 9 in one radio frame, make the set K be {4}, where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

when the reference uplink-downlink configuration of the first serving cell is an uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K include elements 7, 6, and 5, for example, make the set K be {7, 6, 5}, and when the uplink subframe n is corresponding to a subframe 3 and a subframe 8 in one radio frame, make the set K include elements 5 and 4, for example, make the set K be {5, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

alternatively, when the reference uplink-downlink configuration of the first serving cell is an uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K include elements 9, 7, and 6, for example, make the set K be {9, 7, 6}, and when the uplink subframe n is corresponding to a subframe 3 and a subframe 8 in one radio frame, make the set K include elements 6 and 4, for example, make the set K be {6, 4}, where in this case, when this manner is applied to a scenario in which the first serving cell and the second serving cell are configured for the user equipment, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH;

alternatively, when the reference uplink-downlink configuration of the first serving cell is an uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K include elements 7, 6, and 4, for example, make the set K be {7, 6, 4}, and when the uplink subframe n is corresponding to a subframe 3 and a subframe 8 in one radio frame, make the set K include elements 6 and 4, for example, make the set K be {6, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

when the reference uplink-downlink configuration of the first serving cell is an uplink-downlink configuration 2, make the uplink subframe n correspond to a subframe 2 and a subframe 7 in one radio frame, and make the set K include elements 8, 7, 6, 5, and 4, for example, make the set K be {8, 7, 6, 5, 4}; where in this case, a value of an element in the set K is enabled to be as small as possible, that is, it is ensured that a transmission delay of the first serving cell is as small as possible;

when the reference uplink-downlink configuration of the first serving cell is an uplink-downlink configuration 3, make the uplink subframe n correspond to a subframe 2, a subframe 3, and a subframe 4 in one radio frame, and when the uplink subframe n is corresponding to a subframe 2 in one radio frame, make the set K include elements 11, 10, 7, and 6, for example, make the set K be {11, 10, 7, 6}, when the uplink subframe n is corresponding to a subframe 3 in one radio frame, make the set K include elements 10, 6, and 5, for example, make the set K be {10, 6, 5}, and when the uplink subframe n is corresponding to a subframe 4 in one radio frame, make the set K include elements 10, 5, and 4, for example, make the set K be {10, 5, 4}; where in this case, a value of an element in the set K is enabled to be as small as possible, that is, it is ensured that a transmission delay of the first serving cell is as small as possible;

alternatively, when the reference uplink-downlink configuration of the first serving cell is an uplink-downlink configuration 3, make the uplink subframe n correspond to a subframe 2, a subframe 3, and a subframe 4 in one radio frame, and when the uplink subframe n is corresponding to a subframe 2 in one radio frame, make the set K include elements 11, 10, 9, and 8, for example, make the set K be {11, 10, 9, 8} or {10, 9, 8, 11}, when the uplink subframe n is corresponding to a subframe 3 in one radio frame, make the set K include elements 8, 7, and 6, for example, make the set K be {8, 7, 6}, and when the uplink subframe n is corresponding to a subframe 4 in one radio frame, make the set K include elements 6, 5, and 4, for example, make the set K be {6, 5, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided;

alternatively, when the reference uplink-downlink configuration of the first serving cell is an uplink-downlink configuration 3, make the uplink subframe n correspond to a subframe 2, a subframe 3, and a subframe 4 in one radio frame, and when the uplink subframe n is corresponding to a subframe 2 in one radio frame, make the set K include elements 11, 10, and 9, for example, make the set K be {11, 10, 9} or {10, 9, 11}, when the uplink subframe n is corresponding to a subframe 3 in one radio frame, make the set K include elements 9, 8, 7, and 6, for example, make the set K be {9, 8, 7, 6}, and when the uplink subframe n is corresponding to a subframe 4 in one radio frame, make the set K include elements 6, 5, and 4, for example, make the set K be {6, 5, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided;

when the reference uplink-downlink configuration of the first serving cell is an uplink-downlink configuration 4, make the uplink subframe n correspond to a subframe 2 and a subframe 3 in one radio frame, and when the uplink subframe n is corresponding to a subframe 2 in one radio frame, make the set K include elements 12, 11, 10, 8, and 7, for example, make the set K be {12, 11, 10, 8, 7}, and when the uplink subframe n is corresponding to a subframe 3 in one radio frame, make the set K include elements 10, 7, 6, 5, and 4, for example, make the set K be {10, 7, 6, 5, 4}; where in this case, a value of an element in the set K is enabled to be as small as possible, that is, it is ensured that a transmission delay of the first serving cell is as small as possible;

alternatively, when the reference uplink-downlink configuration of the first serving cell is an uplink-downlink configuration 4, make the uplink subframe n correspond to a subframe 2 and a subframe 3 in one radio frame, and when the uplink subframe n is corresponding to a subframe 2 in one radio frame, make the set K include elements 12, 11, 10, 9, and 8, for example, make the set K be {12, 11, 10, 9, 8} or {12, 10, 9, 8, 11}, and when the uplink subframe n is corresponding to a subframe 3 in one radio frame, make the set K include elements 8, 7, 6, 5, and 4, for example, make the set K be {8, 7, 6, 5, 4}; where in this case, on the one hand, HARQ-ACKs corresponding to multiple downlink subframes on the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided;

when the reference uplink-downlink configuration of the first serving cell is an uplink-downlink configuration 5, make the uplink subframe n correspond to a subframe 2 in one radio frame, and make the set K include elements 13, 12, 11, 10, 9, 8, 7, 6, 5, and 4, for example, make the set K be {13, 12, 11, 10, 9, 8, 7, 6, 5, 4};

when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, and a subframe 7 in one radio frame, make the set K include elements 7 and 5, for example, make the set K be {7, 5}, when the uplink subframe n is corresponding to a subframe 4 in one radio frame, make the set K be {5}, and when the uplink subframe n is corresponding to a subframe 8 in one radio frame, make the set K include elements 7, 5, and 4, for example, make the set K be {7, 5, 4}; where in this case, a value of an element in the set K is enabled to be as small as possible, that is, it is ensured that a transmission delay of the first serving cell is as small as possible;

alternatively, when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2 in one radio frame, make the set K include elements 8 and 7, for example, make the set K be {8, 7}, when the uplink subframe n is corresponding to a subframe 3 and a subframe 7 in one radio frame, make the set K include elements 7 and 6, for example, make the set K be {7, 6}, and when the uplink subframe n is corresponding to a subframe 4 and a subframe 8 in one radio frame, make the set K include elements 6 and 5, for example, make the set K be {6, 5}; where in this case, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

alternatively, when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, a subframe 7, and a subframe 8 in one radio frame, make the set K include elements 10 and 7, for example, make the set K be {10, 7}, and when the uplink subframe n is corresponding to a subframe 4 in one radio frame, make the set K include elements 10 and 5, for example, make the set K be {10, 5}, where in this case, when this manner is applied to a scenario in which the first serving cell and the second serving cell are configured for the user equipment, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH;

alternatively, when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, and a subframe 4 in one radio frame, make the set K include elements 7 and 4, for example, make the set K be {7, 4}, and when the uplink subframe n is corresponding to a subframe 7 and an uplink subframe 8 that are in one radio frame, make the set K include elements 6 and 5, for example, make the set K be {6, 5}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

alternatively, when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2 in one radio frame, make the set K include elements 10 and 9, for example, make the set K be {10, 9}, when the uplink subframe n is corresponding to a subframe 3 in one radio frame, make the set K include elements 9 and 8, for example, make the set K be {9, 8}, when the uplink subframe n is corresponding to a subframe 4 in one radio frame, make the set K include elements 8 and 7, for example, make the set K be {8, 7}, when the uplink subframe n is corresponding to a subframe 7 in one radio frame, make the set K include elements 9 and 8, for example, make the set K be {9, 8}, when the uplink subframe n is corresponding to a subframe 8 in one radio frame, make the set K include elements 8 and 7, for example, make the set K be {8, 7}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; on the other hand, a problem that an HARQ-ACK corresponding to a PDSCH that is scheduled first is not fed back first may be avoided; and further, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH.

It should be noted that, in this embodiment, the bundling may also be performed on HARQ-ACKs corresponding to two downlink subframes in the downlink subframe n–k, so that an HARQ-ACK can be sent by using an existing channel selection mechanism, which saves standardization efforts. For a specific implementation process, reference may be made to related descriptions of one or more of the foregoing embodiments, and no details are repeatedly described herein.

In this embodiment, process steps and examples executed and/or implemented by the receiver 41, the transmitter 42, and the processor 43 of the user equipment and technical effects brought by the process steps and examples are similar to or more than the technical effects of the foregoing HARQ-ACK transmission method or user equipment, and for details, reference may be made to related descriptions of the foregoing one or more embodiments, which are within the scope that is easy to be accordingly understood by persons skilled in the art and are not repeatedly described herein.

In this embodiment, timing of an FDD serving cell or of a supplemental downlink serving cell is set by a user equipment, which resolves a problem that some downlink subframes on the FDD serving cell or the supplemental downlink serving cell have no corresponding uplink subframe in which an HARQ-ACK is fed back, so that a base station can still send information to the user equipment in these downlink subframes, thereby improving a resource utilization rate.

Figure 5:
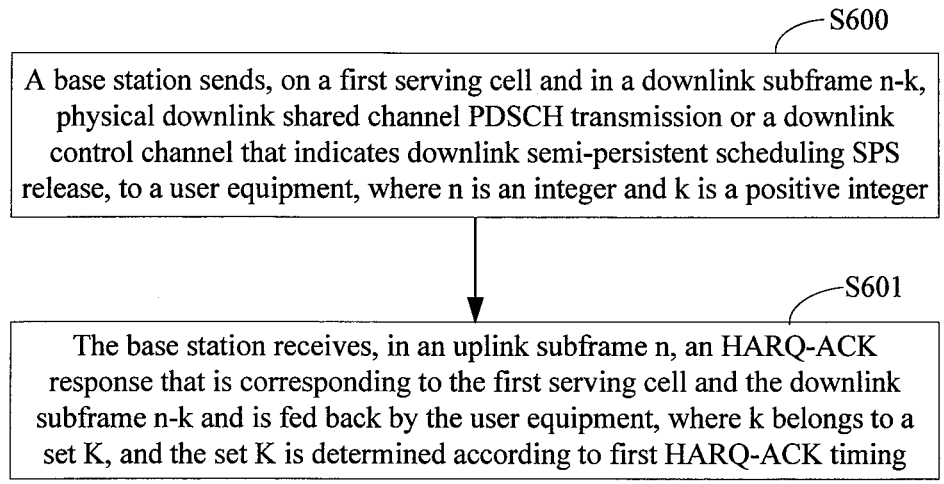
FIG. 5 is a schematic flowchart of a second embodiment of a hybrid automatic repeat request acknowledgement transmission method according to an embodiment of the present invention.

Referring to FIG. 5, FIG. 5 is a schematic flowchart of a second embodiment of a hybrid automatic repeat request acknowledgement transmission method according to an embodiment of the present invention, and the HARQ-ACK transmission method in this embodiment includes, but is not limited to, the following steps.

Step S600: A base station sends, on a first serving cell and in a downlink subframe n−k, physical downlink shared channel PDSCH transmission or a downlink control channel that indicates downlink semi-persistent scheduling SPS release, to a user equipment, where n is an integer and k is a positive integer.

In step S600, the first serving cell is a serving cell corresponding to the user equipment, and preferably, a duplex mode of the first serving cell may be frequency division duplex FDD, or all subframes on the first serving cell are downlink subframes, or one radio frame on the first serving cell includes nine downlink subframes and one special subframe, or the first serving cell is a supplemental downlink serving cell, or a duplex mode of the first serving cell is time division duplex TDD and all subframes on the first serving cell are downlink subframes, or a duplex mode of the first serving cell is time division duplex TDD and one radio frame on the first serving cell includes nine downlink subframes and one special subframe, or a duplex mode of the first serving cell is time division duplex TDD and an uplink-downlink configuration of the first serving cell is an uplink-downlink configuration 7.

It should be noted, that a base station sends, on a first serving cell and in a downlink subframe n−k, physical downlink shared channel PDSCH transmission or a downlink control channel that indicates downlink SPS release, to a user equipment may refer to that the base station sends, in the downlink subframe n−k, the PDSCH transmission or the downlink control channel that indicates the downlink SPS release, to the user equipment, and the PDSCH transmission or the downlink control channel that indicates the downlink SPS release is carried on the first serving cell.

It should be noted, that a base station sends, on a first serving cell and in a downlink subframe n−k, physical downlink shared channel PDSCH transmission, to a user equipment may include Situation 1 and Situation 2.

Situation 1: The PDSCH transmission has a corresponding downlink control channel in the downlink subframe n−k. Correspondingly, step S600 may be as follows: A base station sends, in a downlink subframe n−k, a downlink control channel to a user equipment, where the downlink control channel is a PDCCH or an EPDCCH, and the downlink control channel is used for indicating PDSCH transmission transmitted on a first serving cell or used for indicating downlink SPS release; or a base station sends, on a first serving cell and in a downlink subframe n−k, a downlink control channel to a user equipment, where the downlink control channel is an EPDCCH or a PDCCH, the downlink control channel is used for indicating PDSCH transmission or used for indicating downlink SPS release, a downlink DCI format carried on the downlink control channel includes a downlink assignment index DAI field, and the DAI is used for indicating an accumulative number of downlink control channels in the downlink subframe n−k; or a base station sends, on a first serving cell and in a downlink subframe n−k, a downlink control channel to a user equipment, where the downlink control channel is an EPDCCH, the downlink control channel is used for indicating PDSCH transmission or used for indicating downlink SPS release, an HARQ-ACK resource offset field in downlink DCI format carried on the downlink control channel is used as a downlink assignment index DAI field, and the DAI is used for indicating an accumulative number of downlink control channels in the downlink subframe n−k. As described above, the downlink DCI format may be a DCI format 1, 1A, 1B, 1D, 2, 2A, 2B, 2C, 2D, 2E, or the like.

Preferably, in this embodiment, the PDSCH transmission and the downlink control channel corresponding to the PDSCH transmission are transmitted in a same downlink subframe.

Situation 2: The PDSCH transmission has no corresponding downlink control channel in the downlink subframe n−k, that is, no corresponding downlink control channel exists. In Situation 2, the PDSCH transmission may be SPS transmission, and in this case, a downlink control channel corresponding to the PDSCH is transmitted in a downlink subframe in which SPS is activated, and in this case, the downlink control channel may also carry a DAI field.

In addition, step S600 may further include the following step:

Step 600': The base station sends, on a second serving cell and in a downlink subframe n−k1, PDSCH transmission or a downlink control channel that indicates downlink SPS release, to the user equipment, where k1 is a positive integer.

In step 600', the second serving cell is a serving cell corresponding to the user equipment, and a duplex mode of the second serving cell may be time division duplex TDD.

It should be noted that, situations of sending, by the base station, on the second serving cell and in the downlink subframe n−k1, the PDSCH transmission or the downlink control channel that indicates the downlink SPS release, to the user equipment are similar to the two situations in step S600, which are within an understanding scope of persons skilled in the art, and are not repeatedly described. Similarly, for specific implementation manners of the serving cell corresponding to the user equipment, the first serving cell, and the second serving cell, reference may be made to related descriptions in the foregoing embodiments, which are within the understanding scope of persons skilled in the art and are not repeatedly described.

Step S601: The base station receives, in an uplink subframe n, an HARQ-ACK response that is corresponding to the first serving cell and the downlink subframe n−k and is fed back by the user equipment, where k belongs to a set K, and the set K is determined according to first HARQ-ACK timing.

In step S601, the HARQ-ACK response corresponding to the first serving cell and the downlink subframe n−k may refer to an HARQ-ACK response of the PDSCH transmission or the downlink control channel that indicates the downlink SPS release, where the PDSCH transmission or the downlink control channel that indicates the downlink SPS release is sent on the first serving cell and in the subframe n−k to the user equipment by the base station in step S600. When PDSCH transmission or a downlink control channel that indicates downlink SPS release is not sent on the first serving cell and in a downlink subframe in the downlink subframe n−k to the user equipment, the base station may determine that an HARQ-ACK corresponding to the first serving cell and the downlink subframe, in which the PDSCH transmission or the downlink control channel that indicates the downlink SPS release is not sent on the first serving cell to the user equipment, may be DTX or a NACK.

When the set K in step S600 includes multiple elements, in step S601, HARQ-ACKs of the first serving cell and multiple downlink subframes are received in the uplink subframe n.

As described above, the first HARQ-ACK timing may be determined according to a reference uplink-downlink configuration of the first serving cell, and the reference uplink-downlink configuration of the first serving cell may be an uplink-downlink configuration of the second serving cell or a reference uplink-downlink configuration of the second serving cell, the reference uplink-downlink configuration of the first serving cell may further be an uplink-downlink configuration configured for the user equipment by a higher layer (for example, a base station or a network side device), or in other words, the user equipment obtains the reference uplink-downlink configuration of the first serving cell by using higher-layer signaling; further, the reference uplink-downlink configuration of the first serving cell may further be determined in the following manner (determining the reference uplink-downlink configuration of the first serving cell in this manner can not only maximize the number of available downlink subframes on the first serving cell, but also reduce UE implementation complexity and reduce test complexity by limiting available reference uplink-downlink configurations, and ensure that all the available downlink subframes on the first serving cell have corresponding uplink subframes, in which HARQ-ACKs are fed back, on the primary serving cell of the UE).

When the number of serving cells configured for the user equipment is two, the reference uplink-downlink configuration of the first serving cell is an uplink-downlink configuration 5, and when the number of serving cells configured for the user equipment is greater than two, the reference uplink-downlink configuration of the first serving cell is an uplink-downlink configuration 2 or an uplink-downlink configuration 4; or when the number of serving cells configured for the user equipment is two, the reference uplink-downlink configuration of the first serving cell is an uplink-downlink configuration 5 or an uplink-downlink configuration 2, and it is indicated by using higher-layer signaling or RRC signaling whether the reference uplink-downlink configuration of the first serving cell is the uplink-downlink configuration 5 or the uplink-downlink configuration 2. Benefits of this manner lie in that the uplink-downlink configuration 2 can also be configured when only two carriers are aggregated, so that better HARQ-ACK feedback load balance is obtained, and better HARQ-ACK transmission performance is obtained.

Alternatively, when the number of serving cells configured for the user equipment is two, the reference uplink-downlink configuration of the first serving cell is an uplink-downlink configuration 5, and the serving cells configured for the user equipment include one first serving cell and one second serving cell, and when the number of serving cells configured for the user equipment is greater than two, the reference uplink-downlink configuration of the first serving cell is an uplink-downlink configuration 2 or an uplink-downlink configuration 4, and the serving cells configured for the user equipment include at least one first serving cell or include at least one second serving cell.

That the reference uplink-downlink configuration of the first serving cell is an uplink-downlink configuration 2 or an uplink-downlink configuration 4 may further include the following:

When an uplink-downlink configuration of the primary serving cell of the user equipment is an uplink-downlink configuration 0, the reference uplink-downlink configuration of the first serving cell is the uplink-downlink configuration 2; when an uplink-downlink configuration of the primary serving cell of the user equipment is an uplink-downlink configuration 1, the reference uplink-downlink configuration of the first serving cell is the uplink-downlink configuration 2; when an uplink-downlink configuration of the primary serving cell of the user equipment is the uplink-downlink configuration 2, the reference uplink-downlink configuration of the first serving cell is the uplink-downlink configuration 2; when an uplink-downlink configuration of the primary serving cell of the user equipment is an uplink-downlink configuration 3, the reference uplink-downlink configuration of the first serving cell is the uplink-downlink configuration 4; when an uplink-downlink configuration of the primary serving cell of the user equipment is the uplink-downlink configuration 4, the reference uplink-downlink configuration of the first serving cell is the uplink-downlink configuration 4; and when an uplink-downlink configuration of the primary serving cell of the user equipment is an uplink-downlink configuration 6, the reference uplink-downlink configuration of the first serving cell is the uplink-downlink configuration 2.

Alternatively, when an uplink-downlink configuration of the primary serving cell of the user equipment is an uplink-downlink configuration 0, the reference uplink-downlink configuration of the first serving cell is the uplink-downlink configuration 4; when an uplink-downlink configuration of the primary serving cell of the user equipment is an uplink-downlink configuration 1, the reference uplink-downlink configuration of the first serving cell is the uplink-downlink configuration 4; when an uplink-downlink configuration of the primary serving cell of the user equipment is the uplink-downlink configuration 2, the reference uplink-downlink configuration of the first serving cell is the uplink-downlink configuration 2; when an uplink-downlink configuration of the primary serving cell of the user equipment is an uplink-downlink configuration 3, the reference uplink-downlink configuration of the first serving cell is the uplink-downlink configuration 4; when an uplink-downlink configuration of the primary serving cell of the user equipment is the uplink-downlink configuration 4, the reference uplink-downlink configuration of the first serving cell is the uplink-downlink configuration 4; and when an uplink-downlink configuration of the primary serving cell of the user equipment is an uplink-downlink configuration 6, the reference uplink-downlink configuration of the first serving cell is the uplink-downlink configuration 4.

When an uplink-downlink configuration of the primary serving cell of the user equipment is an uplink-downlink configuration 0, the reference uplink-downlink configuration of the first serving cell is an uplink-downlink configuration 2 or an uplink-downlink configuration 4; when an uplink-downlink configuration of the primary serving cell of the user equipment is an uplink-downlink configuration 1, the reference uplink-downlink configuration of the first serving cell is an uplink-downlink configuration 2 or an uplink-downlink configuration 4; when an uplink-downlink configuration of the primary serving cell of the user equipment is the uplink-downlink configuration 2, the reference uplink-downlink configuration of the first serving cell is the uplink-downlink configuration 2; when an uplink-downlink configuration of the primary serving cell of the user equipment is an uplink-downlink configuration 3, the reference uplink-downlink configuration of the first serving cell is the uplink-downlink configuration 4; when an uplink-downlink configuration of the primary serving cell of the user equipment is the uplink-downlink configuration 4, the reference uplink-downlink configuration of the first serving cell is the uplink-downlink configuration 4; and when an uplink-downlink configuration of the primary serving cell of the user equipment is an uplink-downlink configuration 6, the reference uplink-downlink configuration of the first serving cell is an uplink-downlink configuration 2 or an uplink-downlink configuration 4.

It should be noted that, if the set K is determined according to the first HARQ-ACK timing, and the first HARQ-ACK timing is determined according to the reference uplink-downlink configuration of the first serving cell, the base station may determine that the set K has the following four implementation manners, and any one of the four implementation manners may be used in the embodiment of the present invention.

Implementation Manner 1:

When the reference uplink-downlink configuration of the first serving cell is the uplink-downlink configuration 0, the uplink subframe n is corresponding to a subframe 2, a subframe 3, a subframe 4, a subframe 7, a subframe 8, and a subframe 9 in one radio frame, and when the uplink subframe n is corresponding to a subframe 2 and a subframe 7 in one radio frame, the set K includes elements 6 and 5, for example, the set K is {6, 5}, when the uplink subframe n is corresponding to a subframe 3 and a subframe 8 in one radio frame, the set K includes elements 5 and 4, for example, the set K is {5, 4}, and when the uplink subframe n is corresponding to a subframe 4 and a subframe 9 in one radio frame, the set K is {4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

Alternatively, when the reference uplink-downlink configuration of the first serving cell is the uplink-downlink configuration 0, the uplink subframe n is corresponding to a subframe 2, a subframe 3, a subframe 4, a subframe 7, a subframe 8, and a subframe 9 in one radio frame, and when the uplink subframe n is corresponding to a subframe 2 and a subframe 7 in one radio frame, the set K includes elements 6 and 5, for example, the set K is {6, 5}, when the uplink subframe n is corresponding to a subframe 3 and a subframe 8 in one radio frame, the set K is {5}, and when the uplink subframe n is corresponding to a subframe 4 and a subframe 9 in one radio frame, the set K includes elements 5 and 4, for example, the set K is {5, 4}.

Alternatively, when the reference uplink-downlink configuration of the first serving cell is the uplink-downlink configuration 0, the uplink subframe n is corresponding to a subframe 2, a subframe 4, a subframe 7, and a subframe 9 in one radio frame, and when the uplink subframe n is corresponding to a subframe 2 and a subframe 7 in one radio frame, the set K includes elements 6, 5, and 4, for example, the set K is {6, 5, 4}, and when the uplink subframe n is corresponding to a subframe 4 and a subframe 9 in one radio frame, the set K includes elements 5 and 4, for example, the set K is {5, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; on the other hand, a value of an element in the set K is enabled to be as small as possible, that is, it is ensured that a transmission delay of the first serving cell is as small as possible; and further, when this manner is applied to a scenario in which the first serving cell and the second serving cell are configured for the user equipment, an HARQ-ACK is transmitted only in an uplink subframe 2, a subframe 4, a subframe 7, and a subframe 9, that is, an HARQ-ACK of the first serving cell is transmitted only in an uplink subframe in which a corresponding HARQ-ACK of the second serving cell is also transmitted, so that both TPC fields in DCI corresponding to the two serving cells can be used for indicating both TPC and a PUCCH resource, and the HARQ-ACK transmission performance can be improved.

Alternatively, when the reference uplink-downlink configuration of the first serving cell is the uplink-downlink configuration 0, the uplink subframe n is corresponding to a subframe 2, a subframe 4, a subframe 7, and a subframe 9 in one radio frame, and when the uplink subframe n is corresponding to a subframe 2 and a subframe 7 in one radio frame, the set K includes elements 10, 9, and 6, for example, the set K is {10, 9, 6}, when the uplink subframe n is corresponding to a subframe 4 and a subframe 9 in one radio frame, the set K includes elements 5 and 4, for example, the set K is {5, 4}; in this case, on the one hand, when this manner is applied to a scenario in which the first serving cell and the second serving cell are configured for the user equipment, an HARQ-ACK is transmitted only in an uplink subframe 2, a subframe 4, a subframe 7, and a subframe 9, that is, an HARQ-ACK of the first serving cell is transmitted only in an uplink subframe in which a corresponding HARQ-ACK of the second serving cell is also transmitted, so that both TPC fields in DCI corresponding to the two serving cells can be used for indicating both TPC and a PUCCH resource, and the HARQ-ACK transmission performance can be improved; and on the other hand, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH.

Alternatively, when the reference uplink-downlink configuration of the first serving cell is the uplink-downlink configuration 0, the uplink subframe n is corresponding to a subframe 2, a subframe 3, a subframe 4, a subframe 7, a subframe 8, and a subframe 9 in one radio frame, and when the uplink subframe n is corresponding to a subframe 2, a subframe 3, a subframe 7, and a subframe 8 in one radio frame, the set K is {6, 4}, and when the uplink subframe n is corresponding to a subframe 4 and a subframe 9 in one radio frame, the set K is {4}. In this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

When the reference uplink-downlink configuration of the first serving cell is the uplink-downlink configuration 1, the uplink subframe n is corresponding to a subframe 2, a subframe 3, a subframe 7, and a subframe 8 in one radio frame, and when the uplink subframe n is corresponding to a subframe 2 and a subframe 7 in one radio frame, the set K includes elements 7, 6, and 5, for example, the set K is {7, 6, 5}, and when the uplink subframe n is corresponding to a subframe 3 and a subframe 8 in one radio frame, the set K includes elements 5 and 4, for example, the set K is {5, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

Alternatively, when the reference uplink-downlink configuration of the first serving cell is the uplink-downlink configuration 1, the uplink subframe n is corresponding to a subframe 2, a subframe 3, a subframe 7, and a subframe 8 in one radio frame, and when the uplink subframe n is corresponding to a subframe 2 and a subframe 7 in one radio frame, the set K includes elements 9, 7, and 6, for example, the set K is {9, 7, 6}, and when the uplink subframe n is corresponding to a subframe 3 and a subframe 8 in one radio frame, the set K includes elements 6 and 4, for example, the set K is {6, 4}. In this case, when this manner is applied to a scenario in which the first serving cell and the second serving cell are configured for the user equipment, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH.

Alternatively, when the reference uplink-downlink configuration of the first serving cell is the uplink-downlink configuration 1, the uplink subframe n is corresponding to a subframe 2, a subframe 3, a subframe 7, and a subframe 8 in one radio frame, and when the uplink subframe n is corresponding to a subframe 2 and a subframe 7 in one radio frame, the set K includes elements 7, 6, and 4, for example, the set K is {7, 6, 4}, and when the uplink subframe n is corresponding to a subframe 3 and a subframe 8 in one radio frame, the set K includes elements 6 and 4, for example, the set K is {6, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

When the reference uplink-downlink configuration of the first serving cell is the uplink-downlink configuration 2, the uplink subframe n is corresponding to a subframe 2 and a subframe 7 in one radio frame, and the set K includes elements 8, 7, 6, 5, and 4, for example, the set K is {8, 7, 6, 5, 4}. In this case, a value of an element in the set K is enabled to be as small as possible, that is, it is ensured that a transmission delay of the first serving cell is as small as possible.

When the reference uplink-downlink configuration of the first serving cell is the uplink-downlink configuration 3, the uplink subframe n is corresponding to a subframe 2, a subframe 3, and a subframe 4 in one radio frame, and when the uplink subframe n is corresponding to a subframe 2 in one radio frame, the set K includes elements 11, 10, 7, and 6, for example, the set K is {11, 10, 7, 6}, when the uplink subframe n is corresponding to a subframe 3 in one radio frame, the set K includes elements 10, 6, and 5, for example, the set K is {10, 6, 5}, and when the uplink subframe n is corresponding to a subframe 4 in one radio frame, the set K includes elements 10, 5, and 4, for example, the set K is {10, 5, 4}. In this case, a value of an element in the set K is enabled to be as small as possible, that is, it is ensured that a transmission delay of the first serving cell is as small as possible.

Alternatively, when the reference uplink-downlink configuration of the first serving cell is the uplink-downlink configuration 3, the uplink subframe n is corresponding to a subframe 2, a subframe 3, and a subframe 4 in one radio frame, and when the uplink subframe n is corresponding to a subframe 2 in one radio frame, the set K includes elements 11, 10, 9, and 8, for example, the set K is {11, 10, 9, 8} or {10, 9, 8, 11}, when the uplink subframe n is corresponding to a subframe 3 in one radio frame, the set K includes elements 8, 7, and 6, for example, the set K is {8, 7, 6}, and when the uplink subframe n is corresponding to a subframe 4 in one radio frame, the set K includes elements 6, 5, and 4, for example, the set K is {6, 5, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided.

Alternatively, when the reference uplink-downlink configuration of the first serving cell is the uplink-downlink configuration 3, the uplink subframe n is corresponding to a subframe 2, a subframe 3, and a subframe 4 in one radio frame, and when the uplink subframe n is corresponding to a subframe 2 in one radio frame, the set K includes elements 11, 10, and 9, for example, the set K is {11, 10, 9} or {10, 9, 11}, when the uplink subframe n is corresponding to a subframe 3 in one radio frame, the set K includes elements 9, 8, 7, and 6, for example, the set K is {9, 8, 7, 6}, and when the uplink subframe n is corresponding to a subframe 4 in one radio frame, the set K includes elements 6, 5, and 4, for example, the set K is {6, 5, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided.

When the reference uplink-downlink configuration of the first serving cell is the uplink-downlink configuration 4, the uplink subframe n is corresponding to a subframe 2 and a subframe 3 in one radio frame, and when the uplink subframe n is corresponding to a subframe 2 in one radio frame, the set K includes elements 12, 11, 10, 8, and 7, for example, the set K is {12, 11, 10, 8, 7}, and when the uplink subframe n is corresponding to a subframe 3 in one radio frame, the set K includes elements 10, 7, 6, 5, and 4, for example, the set K is {10, 7, 6, 5, 4}. In this case, a value of an element in the set K is enabled to be as small as possible, that is, it is ensured that a transmission delay of the first serving cell is as small as possible.

Alternatively, when the reference uplink-downlink configuration of the first serving cell is the uplink-downlink configuration 4, the uplink subframe n is corresponding to a subframe 2 and a subframe 3 in one radio frame, and when the uplink subframe n is corresponding to a subframe 2 in one radio frame, the set K includes elements 12, 11, 10, 9, and 8, for example, the set K is {12, 11, 10, 9, 8} or {12, 10, 9, 8, 11}, and when the uplink subframe n is corresponding to a subframe 3 in one radio frame, the set K includes elements 8, 7, 6, 5, and 4, for example, the set K is {8, 7, 6, 5, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided.

When the reference uplink-downlink configuration of the first serving cell is the uplink-downlink configuration 5, the uplink subframe n is corresponding to a subframe 2 in one radio frame, and the set K includes elements 13, 12, 11, 10, 9, 8, 7, 6, 5, and 4, for example, the set K is {13, 12, 11, 10, 9, 8, 7, 6, 5, 4}.

When the reference uplink-downlink configuration of the first serving cell is the uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2, a subframe 3, and a subframe 7 in one radio frame, the set K includes elements 7 and 5, for example, the set K is {7, 5}, when the uplink subframe n is corresponding to a subframe 4 in one radio frame, the set K is {5}, and when the uplink subframe n is corresponding to a subframe 8 in one radio frame, the set K includes elements 7, 5, and 4, for example, the set K is {7, 5, 4}; and in this case, a value of an element in the set K is enabled to be as small as possible, that is, it is ensured that a transmission delay of the first serving cell is as small as possible.

Alternatively, when the reference uplink-downlink configuration of the first serving cell is the uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2 in one radio frame, the set K includes elements 8 and 7, for example, the set K is {8, 7}, when the uplink subframe n is corresponding to a subframe 3 and a subframe 7 in one radio frame, the set K includes elements 7 and 6, for example, the set K is {7, 6}, and when the uplink subframe n is corresponding to a subframe 4 and a subframe 8 in one radio frame, the set K includes elements 6 and 5, for example, the set K is {6, 5}; in this case, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

Alternatively, when the reference uplink-downlink configuration of the first serving cell is the uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2, a subframe 3, a subframe 7, and a subframe 8 in one radio frame, the set K includes elements 10 and 7, for example, the set K is {10, 7}, and when the uplink subframe n is corresponding to a subframe 4 in one radio frame, the set K includes elements 10 and 5, for example, the set K is {10, 5}. In this case, when this manner is applied to a scenario in which the first serving cell and the second serving cell are configured for the user equipment, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH.

Alternatively, when the reference uplink-downlink configuration of the first serving cell is the uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2, a subframe 3, and a subframe 4 in one radio frame, the set K includes elements 7 and 4, for example, the set K is {7, 4}, and when the uplink subframe n is corresponding to a subframe 7 and an uplink subframe 8 that are in one radio frame, the set K includes elements 6 and 5, for example, the set K is {6, 5}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

Alternatively, when the reference uplink-downlink configuration of the first serving cell is the uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2 in one radio frame, the set K includes elements 10 and 9, for example, the set K is {10, 9}, when the uplink subframe n is corresponding to a subframe 3 in one radio frame, the set K includes elements 9 and 8, for example, the set K is {9, 8}, when the uplink subframe n is corresponding to a subframe 4 in one radio frame, the set K includes elements 8 and 7, for example, the set K is {8, 7}, when the uplink subframe n is corresponding to a subframe 7 in one radio frame, the set K includes elements 9 and 8, for example, the set K is {9, 8}, when the uplink subframe n is corresponding to a subframe 8 in one radio frame, the set K includes elements 8 and 7, for example, the set K is {8, 7}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; on the other hand, a problem that an HARQ-ACK corresponding to a PDSCH that is scheduled first is not fed back first may be avoided; and further, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH.

Implementation Manner 2: The base station determines the set K according to the reference uplink-downlink configuration of the first serving cell and an associated set table.

The base station determines the set K according to the reference uplink-downlink configuration of the first serving cell and the associated set table, where the associated set table is shown in the foregoing Table 2, and Table 2 includes associated sets k corresponding to subframes n in which HARQ-ACKs are fed back, for each reference uplink-downlink configuration of the first serving cell.

In addition, if the reference uplink-downlink configuration of the first serving cell is the configuration 0, the set K may further be determined in a manner of the foregoing Table 3, Table 4, Table 5, or Table 6; if the reference uplink-downlink configuration of the first serving cell is the configuration 1, the base station may further determine the set K in the manner of the foregoing Table 5 or Table 6; and if the reference uplink-downlink configuration of the first serving cell is the configuration 6, the base station may further determine the set K in the manner of the foregoing Table 3, Table 5, or Table 6.

Implementation Manner 3: The first HARQ-ACK timing is determined according to the reference uplink-downlink configuration of the first serving cell, and the set K is determined according to the first HARQ-ACK timing.

It should be noted that, when reference uplink-downlink configurations of the first serving cell are different, obtained first HARQ-ACK timing is also different, that is, different reference uplink-downlink configurations are corresponding to different HARQ-ACK timing, and therefore, the base station needs to determine the reference uplink-downlink configuration of the first serving cell first, and then determine that HARQ-ACK timing corresponding to the reference uplink-downlink configuration is the first HARQ-ACK timing.

Specifically, the HARQ-ACK timing corresponding to difference reference uplink-downlink configurations may include the following situations:

HARQ-ACK timing corresponding to a reference uplink-downlink configuration 0 (or referred to as HARQ-ACK timing corresponding to the reference uplink-downlink configuration when the reference uplink-downlink configuration is the uplink-downlink configuration 0) may be as follows:

The base station sends, in the downlink subframe n-k, the PDSCH transmission or the downlink control channel that indicates the downlink SPS release, to the user equipment; and the base station receives, in the uplink subframe n, the hybrid automatic repeat request acknowledgement response fed back by the user equipment.

The uplink subframe n is corresponding to a subframe 2, a subframe 3, a subframe 4, a subframe 7, a subframe 8, and a subframe 9 in one radio frame, and when the uplink subframe n is corresponding to a subframe 2 and a subframe 7 in one radio frame, the set K includes elements 6 and 5, for example, the set K is {6, 5}, when the uplink subframe n is corresponding to a subframe 3 and a subframe 8 in one radio frame, the set K includes elements 5 and 4, for example, the set K is {5, 4}, and when the uplink subframe n is corresponding to a subframe 4 and a subframe 9 in one radio frame, the set K is {4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

Alternatively, the uplink subframe n is corresponding to a subframe 2, a subframe 3, a subframe 4, a subframe 7, a subframe 8, and a subframe 9 in one radio frame, and when the uplink subframe n is corresponding to a subframe 2 and a subframe 7 in one radio frame, the set K includes elements 6 and 5, for example, the set K is {6, 5}, when the uplink subframe n is corresponding to a subframe 3 and a subframe 8 in one radio frame, the set K is {5}, and when the uplink subframe n is corresponding to a subframe 4 and a subframe 9 in one radio frame, the set K includes elements 5 and 4, for example, the set K is {5, 4}.

Alternatively, the uplink subframe n is corresponding to a subframe 2, a subframe 4, a subframe 7, and a subframe 9 in one radio frame, and when the uplink subframe n is corresponding to a subframe 2 and a subframe 7 in one radio frame, the set K includes elements 6, 5, and 4, for example, the set K is {6, 5, 4}, and when the uplink subframe n is corresponding to a subframe 4 and a subframe 9 in one radio frame, the set K includes elements 5 and 4, for example, the set K is {5, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; on the other hand, a value of an element in the set K is enabled to be as small as possible, that is, it is ensured that a transmission delay of the first serving cell is as small as possible; and further, when this manner is applied to a scenario in which the first serving cell and the second serving cell are configured for the user equipment, an HARQ-ACK is transmitted only in an uplink subframe 2, a subframe 4, a subframe 7, and a subframe 9, that is, an HARQ-ACK of the first serving cell is transmitted only in an uplink subframe in which a corresponding HARQ-ACK of the second serving cell is also transmitted, so that both TPC fields in DCI corresponding to the two serving cells can be used for indicating both TPC and a PUCCH resource, and the HARQ-ACK transmission performance can be improved.

Alternatively, the uplink subframe n is corresponding to a subframe 2, a subframe 4, a subframe 7, and a subframe 9 in one radio frame, and when the uplink subframe n is corresponding to a subframe 2 and a subframe 7 in one radio frame, the set K includes elements 10, 9, and 6, for example, the set K is {10, 9, 6}, when the uplink subframe n is corresponding to a subframe 4 and a subframe 9 in one radio frame, the set K includes elements 5 and 4, for example, the set K is {5, 4}; in this case, on the one hand, when this manner is applied to a scenario in which the first serving cell and the second serving cell are configured for the user equipment, an HARQ-ACK is transmitted only in an uplink subframe 2, a subframe 4, a subframe 7, and a subframe 9, that is, an HARQ-ACK of the first serving cell is transmitted only in an uplink subframe in which a corresponding HARQ-ACK of the second serving cell is also transmitted, so that both TPC fields in DCI corresponding to the two serving cells can be used for indicating both TPC and a PUCCH resource, and the HARQ-ACK transmission performance can be improved; and on the other hand, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH.

Alternatively, the uplink subframe n is corresponding to a subframe 2, a subframe 3, a subframe 4, a subframe 7, a subframe 8, and a subframe 9 in one radio frame, and when the uplink subframe n is corresponding to a subframe 2, a subframe 3, a subframe 7, and a subframe 8 in one radio frame, the set K is {6, 4}, and when the uplink subframe n is corresponding to a subframe 4 and a subframe 9 in one radio frame, the set K is {4}. In this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

Alternatively, HARQ-ACK timing corresponding to a reference uplink-downlink configuration 1 (or referred to as HARQ-ACK timing corresponding to the reference uplink-downlink configuration when the reference uplink-downlink configuration is the uplink-downlink configuration 1) may be as follows:

In step S600, the base station sends, in the downlink subframe n−k, the PDSCH transmission or the downlink control channel that indicates the downlink SPS release, to the user equipment.

In step S601, the base station receives, in the uplink subframe n, the HARQ-ACK response that is of the downlink subframe n−k and is fed back by the user equipment.

The uplink subframe n is corresponding to a subframe 2, a subframe 3, a subframe 7, and a subframe 8 in one radio frame, and when the uplink subframe n is corresponding to a subframe 2 and a subframe 7 in one radio frame, the set K includes elements 7, 6, and 5, for example, the set K is {7, 6, 5}, and when the uplink subframe n is corresponding to a subframe 3 and a subframe 8 in one radio frame, the set K includes elements 5 and 4, for example, the set K is {5, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

Alternatively, the uplink subframe n is corresponding to a subframe 2, a subframe 3, a subframe 7, and a subframe 8 in one radio frame, and when the uplink subframe n is corresponding to a subframe 2 and a subframe 7 in one radio frame, the set K includes elements 9, 7, and 6, for example, the set K is {9, 7, 6}, and when the uplink subframe n is corresponding to a subframe 3 and a subframe 8 in one radio frame, the set K includes elements 6 and 4, for example, the set K is {6, 4}. In this case, when this manner is applied to a scenario in which the first serving cell and the second serving cell are configured for the user equipment, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH.

Alternatively, the uplink subframe n is corresponding to a subframe 2, a subframe 3, a subframe 7, and a subframe 8 in one radio frame, and when the uplink subframe n is corresponding to a subframe 2 and a subframe 7 in one radio frame, the set K includes elements 7, 6, and 4, for example, the set K is {7, 6, 4}, and when the uplink subframe n is corresponding to a subframe 3 and a subframe 8 in one radio frame, the set K includes elements 6 and 4, for example, the set K is {6, 4}; and in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

Alternatively, HARQ-ACK timing corresponding to a reference uplink-downlink configuration 2 (or referred to as HARQ-ACK timing corresponding to the reference uplink-downlink configuration when the reference uplink-downlink configuration is the uplink-downlink configuration 2) may be as follows:

In step S600, the base station sends, in the downlink subframe n−k, the PDSCH transmission or the downlink control channel that indicates the downlink SPS release, to the user equipment.

In step S601, the base station receives, in the uplink subframe n, the HARQ-ACK response that is of the downlink subframe n−k and is fed back by the user equipment.

The uplink subframe n is corresponding to a subframe 2 and a subframe 7 in one radio frame, the set K includes elements 8, 7, 6, 5, and 4, for example, the set K is {8, 7, 6, 5, 4}. In this case, a value of an element in the set K is enabled to be as small as possible, that is, it is ensured that a transmission delay of the first serving cell is as small as possible.

Alternatively, HARQ-ACK timing corresponding to a reference uplink-downlink configuration 3 (or referred to as HARQ-ACK timing corresponding to the reference uplink-downlink configuration when the reference uplink-downlink configuration is the uplink-downlink configuration 3) may be as follows:

In step S600, the base station sends, in the downlink subframe n−k, the PDSCH transmission or the downlink control channel that indicates the downlink SPS release, to the user equipment.

In step S601, the base station receives, in the uplink subframe n, the HARQ-ACK response that is of the downlink subframe n−k and is fed back by the user equipment.

The uplink subframe n is corresponding to a subframe 2, a subframe 3, and a subframe 4 in one radio frame, and when the uplink subframe n is corresponding to a subframe 2 in one radio frame, the set K includes elements 11, 10, 7, and 6, for example, the set K is {11, 10, 7, 6}, when the uplink subframe n is corresponding to a subframe 3 in one radio frame, the set K includes elements 10, 6, and 5, for example, the set K is {10, 6, 5}, and when the uplink subframe n is corresponding to a subframe 4 in one radio frame, the set K includes elements 10, 5, and 4, for example, the set K is {10, 5, 4}. In this case, a value of an element in the set K is enabled to be as small as possible, that is, it is ensured that a transmission delay of the first serving cell is as small as possible.

Alternatively, the uplink subframe n is corresponding to a subframe 2, a subframe 3, and a subframe 4 in one radio frame, and when the uplink subframe n is corresponding to a subframe 2 in one radio frame, the set K is {11, 10, 9, 8} or {10, 9, 8, 11}, when the uplink subframe n is corresponding to a subframe 3 in one radio frame, the set K is {8, 7, 6}, and when the uplink subframe n is corresponding to a subframe 4 in one radio frame, the set K is {6, 5, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided.

Alternatively, the uplink subframe n is corresponding to a subframe 2, a subframe 3, and a subframe 4 in one radio frame, and when the uplink subframe n is corresponding to a subframe 2 in one radio frame, the set K is {11, 10, 9} or {10, 9, 11}, when the uplink subframe n is corresponding to a subframe 3 in one radio frame, the set K is {9, 8, 7, 6}, and when the uplink subframe n is corresponding to a subframe 4 in one radio frame, the set K is {6, 5, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided.

Alternatively, HARQ-ACK timing corresponding to a reference uplink-downlink configuration 4 (or referred to as HARQ-ACK timing corresponding to the reference uplink-downlink configuration when the reference uplink-downlink configuration is the uplink-downlink configuration 4) may be as follows:

In step S600, the base station sends, in the downlink subframe n−k, the PDSCH transmission or the downlink control channel that indicates the downlink SPS release, to the user equipment.

In step S601, the base station receives, in the uplink subframe n, the HARQ-ACK response that is of the downlink subframe n−k and is fed back by the user equipment, where the uplink subframe n is corresponding to a subframe 2 and a subframe 3 in one radio frame, and when the uplink subframe n is corresponding to a subframe 2 in one radio frame, the set K includes elements 12, 11, 10, 8, and 7, for example, the set K is {12, 11, 10, 8, 7}, and when the uplink subframe n is corresponding to a subframe 3 in one radio frame, the set K includes elements 10, 7, 6, 5, and 4, for example, the set K is {10, 7, 6, 5, 4}. In this case, a value of an element in the set K is enabled to be as small as possible, that is, it is ensured that a transmission delay of the first serving cell is as small as possible.

Alternatively, the uplink subframe n is corresponding to a subframe 2 and a subframe 3 in one radio frame, and when the uplink subframe n is corresponding to a subframe 2 in one radio frame, the set K is {12, 11, 10, 9, 8} or {12, 10, 9, 8, 11}, and when the uplink subframe n is corresponding to a subframe 3 in one radio frame, the set K is {8, 7, 6, 5, 4}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided.

Alternatively, HARQ-ACK timing corresponding to a reference uplink-downlink configuration 5 (or referred to as HARQ-ACK timing corresponding to the reference uplink-downlink configuration when the reference uplink-downlink configuration is the uplink-downlink configuration 5) may be as follows:

In step S600, the base station sends, in the downlink subframe n−k, the PDSCH transmission or the downlink control channel that indicates the downlink SPS release, to the user equipment.

In step S601, the base station receives, in the uplink subframe n, the HARQ-ACK response that is of the downlink subframe n−k and is fed back by the user equipment, where the uplink subframe n is corresponding to a subframe 2 in one radio frame, and the set K includes elements 13, 12, 11, 10, 9, 8, 7, 6, 5, and 4, for example, the set K is {13, 12, 11, 10, 9, 8, 7, 6, 5, 4}.

Alternatively, HARQ-ACK timing corresponding to a reference uplink-downlink configuration 6 (or referred to as HARQ-ACK timing corresponding to the reference uplink-downlink configuration when the reference uplink-downlink configuration is the uplink-downlink configuration 6) may be as follows:

In step S600, the base station sends, in the downlink subframe n–k, the physical downlink shared channel PDSCH transmission or the downlink control channel that indicates the downlink SPS release, to the user equipment.

In step S601, the base station receives, in the uplink subframe n, the HARQ-ACK response that is of the downlink subframe n–k and is fed back by the user equipment.

The uplink subframe n is corresponding to a subframe 2, a subframe 3, a subframe 4, a subframe 7, and a subframe 8 in one radio frame, and when the uplink subframe n is corresponding to a subframe 2, a subframe 3, and a subframe 7 in one radio frame, the set K includes elements 7 and 5, for example, the set K is {7, 5}, when the uplink subframe n is corresponding to a subframe 4 in one radio frame, the set K is {5}, and when the uplink subframe n is corresponding to a subframe 8 in one radio frame, the set K includes elements 7, 5, and 4, for example, the set K is {7, 5, 4}; and in this case, a value of an element in the set K is enabled to be as small as possible, that is, it is ensured that a transmission delay of the first serving cell is as small as possible.

Alternatively, the uplink subframe n is corresponding to a subframe 2, a subframe 3, a subframe 4, a subframe 7, and a subframe 8 in one radio frame, and when the uplink subframe n is corresponding to a subframe 2 in one radio frame, the set K includes elements 8 and 7, for example, the set K is {8, 7}, when the uplink subframe n is corresponding to a subframe 3 and a subframe 7 in one radio frame, the set K includes elements 7 and 6, for example, the set K is {7, 6}, and when the uplink subframe n is corresponding to a subframe 4 and a subframe 8 in one radio frame, the set K includes elements 6 and 5, for example, the set K is {6, 5}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

Alternatively, the uplink subframe n is corresponding to a subframe 2, a subframe 3, a subframe 4, a subframe 7, and a subframe 8 in one radio frame, and when the uplink subframe n is corresponding to a subframe 2, a subframe 3, a subframe 7, and a subframe 8 in one radio frame, the set K includes elements 10 and 7, for example, the set K is {10, 7}, and when the uplink subframe n is corresponding to a subframe 4 in one radio frame, the set K includes elements 10 and 5, for example, the set K is {10, 5}. In this case, when this manner is applied to a scenario in which the first serving cell and the second serving cell are configured for the user equipment, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH.

Alternatively, the uplink subframe n is corresponding to a subframe 2, a subframe 3, a subframe 4, a subframe 7, and a subframe 8 in one radio frame, and when the uplink subframe n is corresponding to a subframe 2, a subframe 3, and a subframe 4 in one radio frame, the set K includes elements 7 and 4, for example, the set K is {7, 4}, and when the uplink subframe n is corresponding to a subframe 7 and an uplink subframe 8 that are in one radio frame, the set K includes elements 6 and 5, for example, the set K is {6, 5}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible.

Alternatively, when the reference uplink-downlink configuration of the first serving cell is the uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2 in one radio frame, the set K is {10, 9}, when the uplink subframe n is corresponding to a subframe 3 in one radio frame, the set K is {9, 8}, when the uplink subframe n is corresponding to a subframe 4 in one radio frame, the set K is {8, 7}, when the uplink subframe n is corresponding to a subframe 7 in one radio frame, the set K is {9, 8}, when the uplink subframe n is corresponding to a subframe 8 in one radio frame, the set K is {8, 7}; in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; on the other hand, a problem that an HARQ-ACK corresponding to a PDSCH that is scheduled first is not fed back first may be avoided; and further, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH.

Implementation Manner 4:

When the reference uplink-downlink configuration of the first serving cell is the uplink-downlink configuration 2, the uplink subframe n is corresponding to a subframe 2 and a subframe 7 in one radio frame, and the set K includes elements 8, 7, 6, and 4, for example, the set K is {8, 7, 6, 4}.

When the reference uplink-downlink configuration of the first serving cell is the uplink-downlink configuration 4, the uplink subframe n is corresponding to a subframe 2 and a subframe 3 in one radio frame, and when the uplink subframe n is corresponding to a subframe 2 in one radio frame, the set K includes elements 12, 11, 8, and 7, for example, the set K is {12, 11, 8, 7}, and when the uplink subframe n is corresponding to a subframe 3 in one radio frame, the set K includes elements 7, 6, 5, and 4, for example, the set K is {7, 6, 5, 4}.

When the reference uplink-downlink configuration of the first serving cell is the uplink-downlink configuration 5, the uplink subframe n is corresponding to a subframe 2 in one radio frame, and the set K includes elements 13, 12, 11, 9, 8, 7, 6, 5, and 4, for example, the set K is {13, 12, 11, 9, 8, 7, 6, 5, 4}.

In Manner 4, all first HARQ-ACK timing determined according to the reference uplink-downlink configuration of the first serving cell reuses downlink HARQ-ACK timing of an existing TDD serving cell in a case of a corresponding uplink-downlink configuration, which can save standardization efforts.

In this embodiment, when the set K includes multiple elements, the downlink subframe n−k may refer to all downlink subframes corresponding to the set K, for example, if the set K is {$k_0, k_1, \ldots k_{M-1}$}, the downlink subframe n−k may refer to M downlink subframes, namely, a downlink subframe n−$k_0$, a downlink subframe n−$k_1$ ..., and a downlink subframe n−$k_{M-1}$; in this case, in step S600, that a base station sends, on a first serving cell and in a downlink subframe n−k, PDSCH transmission or a downlink control channel that indicates downlink SPS release, to a user equipment may also refer to that the base station sends, on the first serving cell and in a downlink subframe n−$k_0$, a downlink subframe n−$k_1$ ... a downlink subframe n−$k_{M-2}$ and a downlink subframe n−$k_{M-1}$, the PDSCH transmission or the downlink control channel that indicates the downlink SPS release, to the user equipment.

It is not difficult to understand that, in step S600, the base station sends, on the first serving cell and in the downlink subframe n−k, the PDSCH transmission or the downlink control channel that indicates the downlink SPS release, to the user equipment, and according to the set K, the downlink subframe n−k may include one downlink subframe or multiple downlink subframes, and when multiple downlink subframes are included, in this embodiment, the base station may first send, on the first serving cell and in the multiple downlink subframes, the PDSCH transmission and the downlink control channel that indicates the downlink SPS release, to the user equipment; and then, by means of step S601, the base station receives, in the uplink subframe n, HARQ-ACK responses that are corresponding to the first serving cell and these downlink subframes and are fed back by the user equipment.

The base station may determine, according to the set K, HARQ-ACK responses of which downlink subframes can be received in each uplink subframe that is capable of transmitting an HARQ-ACK, that is, determine that an HARQ-ACK response of PDSCH transmission or a downlink control channel that indicates downlink SPS release is correspondingly received in an uplink subframe, where the PDSCH transmission or the downlink control channel that indicates downlink SPS release is sent in a downlink subframe. For example, if the reference uplink-downlink configuration of the first serving cell is the configuration 2, in step S601, HARQ-ACK responses of a downlink subframe n−8, a downlink subframe n−7, a downlink subframe n−6, a downlink subframe n−5, and a downlink subframe n−4 are transmitted in the uplink subframe n; and specifically, the uplink subframe n is corresponding to a subframe 2 and a subframe 7 in one radio frame, and when the uplink subframe n is corresponding to a subframe 2 in one radio frame, hybrid automatic repeat request acknowledgement responses of a downlink subframe 4, a downlink subframe 5, a downlink subframe 6, a downlink subframe 7, and a downlink subframe 8 in one radio frame are fed back in the uplink subframe n, and when the uplink subframe n is corresponding to a subframe 7 in one radio frame, HARQ-ACK responses of a downlink subframe 0, a downlink subframe 1, a downlink subframe 2, a downlink subframe 3, and a downlink subframe 9 in one radio frame are fed back in the uplink subframe n. It should be noted that, in this embodiment, the "one" radio frame is not intended to limit that an uplink subframe and a downlink subframe, which are mentioned, are in a same radio frame but is only to differentiate numbers of subframes in one radio frame.

In addition, when step S600 includes step 600', step S601 in this embodiment further includes the following: the base station receives, in the uplink subframe n, the HARQ-ACK response that is corresponding to the second serving cell and the downlink subframe n−k1 and is fed back by the user equipment. Correspondingly, the HARQ-ACK response corresponding to the second serving cell and the downlink subframe n−k1 may refer to an HARQ-ACK response of the PDSCH transmission or the downlink control channel that indicates the downlink SPS release, where the PDSCH transmission or the downlink control channel that indicates the downlink SPS release are sent by the base station on the second serving cell and in the subframe n−k1 to the user equipment in step S600. In this embodiment, when the PDSCH transmission or the downlink control channel that indicates the downlink SPS release is not sent, on the second serving cell and in a downlink subframe in the downlink subframe n−k1, to the user equipment, the base station determines that an HARQ-ACK response corresponding to the second serving cell and the downlink subframe in which the PDSCH transmission or the downlink control channel that indicates the downlink SPS release is not sent on the second serving cell to the user equipment may be DTX or a NACK.

Further, the base station needs to receive, in the uplink subframe n, the HARQ-ACK response corresponding to the first serving cell and the downlink subframe n−k and the HARQ-ACK response corresponding to the second serving cell and the downlink subframe n−k1 that are fed back by the user equipment, and specifically the two HARQ-ACK responses may be received in a PUCCH format 1b channel selection manner, or may also be received in a PUCCH format 3 manner, which is not limited herein.

It should be noted that, in step S601, the base station receives, in the uplink subframe n, the HARQ-ACK response that is corresponding to the first serving cell and the downlink subframe n−k and is fed back by the user equipment. It is assumed that the set K is {$k_0, k_1, \ldots k_{M-1}$}, and M is the number of elements in the set K, specific implementation processes of which include the following:

Example 1

The base station receives, in the uplink subframe n, the HARQ-ACK response that is corresponding to the first serving cell and the downlink subframe n−k and is fed back by the user equipment, and determines, according to a manner in which HARQ-ACK bundling is performed on an HARQ-ACK response corresponding to the first serving cell and a downlink subframe n−$k_i$ and an HARQ-ACK response corresponding to the first serving cell and a downlink subframe n−$k_j$, an HARQ-ACK response corresponding to the first serving cell and each downlink subframe in the downlink subframe n−k.

It should be noted that, Example 1 does not impose any limitation on which downlink subframes in the downlink subframe n−k the downlink subframe n−$k_i$ and the downlink subframe n−$k_j$ specifically are. For example, the downlink subframes n−$k_i$ and n−$k_j$ may be last two downlink subframes in downlink subframes except a subframe in which a PDSCH without a corresponding downlink control channel is transmitted; and the last two downlink subframes may refer to two downlink subframes corresponding to two smallest elements in the set K except an element, corresponding to the downlink subframe in which the PDSCH without a corresponding downlink control channel is transmitted, in the set K, where the downlink subframe in which the PDSCH without a corresponding downlink control channel is transmitted refers to that PDSCH transmission received in the downlink subframe has no corresponding downlink control channel in the downlink subframe. For example, if the set K is {8, 7, 6, 5, 4}, and a downlink subframe n−5 corresponding to the element 5 in the set K is used for transmitting the PDSCH without a corresponding downlink control channel, the downlink subframe n−$k_i$ and the downlink subframe n−$k_j$ may be a downlink subframe n−6 and a downlink subframe n−4.

Certainly, in another embodiment, $k_i$ and $k_j$ may be last two elements $k_{M-2}$ and $k_{M-1}$ in the set K, and the base station receives, in the uplink subframe n, the HARQ-ACK response that is corresponding to the first serving cell and the downlink subframe n−k and is fed back by the user equipment, and determines, according to a manner in which HARQ-ACK bundling is performed on an HARQ-ACK response corresponding to the first serving cell and a downlink subframe n−$k_{M-2}$ and an HARQ-ACK response corresponding to the first serving cell and a downlink subframe n−$k_{M-1}$, an HARQ-ACK response corresponding to the first serving cell and each downlink subframe in the downlink subframe n−k.

The base station sends, on the first serving cell and in the downlink subframe n−k, the downlink control channel to the user equipment, the downlink control channel is a PDCCH or an EPDCCH, and the downlink control channel is used for indicating the PDSCH or used for indicating the downlink SPS release, where if in the downlink subframe n−$k_i$ and the downlink subframe n−$k_j$, the base station sends, on the first serving cell and only in the downlink subframe n−$k_i$ or only in the downlink subframe n−$k_j$, the downlink control channel to the user equipment, a value of a TPC field in a DCI format carried on the downlink control channel sent, on the first serving cell and only in the downlink n−$k_i$ or only in the downlink subframe n−$k_j$, to the user equipment is a first value; and if in the downlink subframe n−$k_i$ and the downlink subframe n−$k_j$, the base station sends, on the first serving cell and in both the downlink subframe n−$k_i$ and the downlink subframe n−$k_j$, the downlink control channel to the user equipment, both values of TPC fields in DCI formats that are carried on the downlink control channel which is sent to the user equipment on the first serving cell and in the downlink n−$k_i$, and carried on the downlink control channel which is sent to the user equipment on the first serving cell and in the downlink subframe n−$k_j$ are a second value.

The first value is different from the second value, the first value may be corresponding to a first PUCCH resource, the second value may be corresponding to a second PUCCH resource, and the first PUCCH resource and the second PUCCH resource are PUCCH resources configured for the user equipment by a higher layer (for example, a base station), where the PUCCH resources configured for the user equipment by the higher layer may include 4 PUCCH resources, the first PUCCH resource may be a PUCCH resource 1 or a PUCCH resource 2 in the 4 PUCCH resources, and the second PUCCH resource may be a PUCCH resource 3 or a PUCCH resource 4 in the 4 PUCCH resources. It should be noted that the PUCCH resource 1, the PUCCH resource 2, the PUCCH resource 3, and the PUCCH resource 4 do not represent an index sequence of the 4 PUCCH resources. For example, the PUCCH resource 1 may be the first PUCCH resource of the 4 resources configured by the higher layer, the PUCCH resource 2 may be the third PUCCH resource of the 4 PUCCH resources configured by the higher layer, the PUCCH resource 3 may be the second PUCCH resource of the 4 PUCCH resources configured by the higher layer, and the PUCCH 4 may be the fourth PUCCH resource of the 4 PUCCH resources configured by the higher layer.

It should be noted that the first value indicates that the base station sends, only in one downlink subframe of the downlink subframe n−$k_i$ and the downlink subframe n−$k_j$, the PDSCH transmission or the downlink control channel that indicates the downlink SPS release, to the user equipment, and the second value indicates that the base station sends, in both downlink subframes of the downlink subframe n−$k_i$ and the downlink subframe n−$k_j$, the PDSCH transmission or the downlink control channel that indicates downlink SPS release, to the user equipment. Therefore, the value of the TPC field is the second value, so that when the user equipment receives, only in one downlink subframe of the downlink subframe n−$k_i$ and the downlink subframe n−$k_j$, the PDSCH transmission or the downlink control channel that indicates the downlink SPS release, the user equipment learns that a downlink control channel of one of the downlink subframes is lost, so DTX needs to be fed back when HARQ-ACK responses of the two downlink subframes are bundled. It should be noted, that the user equipment performs the HARQ-ACK bundling on the HARQ-ACK response corresponding to the first serving cell and the downlink subframe n−$k_i$ and the HARQ-ACK response corresponding to the first serving cell and the downlink subframe n−$k_j$ may refer to that the user equipment performs a logical AND operation on the HARQ-ACK responses corresponding to the downlink subframe n−$k_i$ and the downlink subframe n−$k_j$. In addition, the TPC field further indicates PUCCH resources corresponding to the downlink subframe n−$k_i$ and the downlink subframe n−$k_j$, and in addition to indicating the PUCCH resources, the TPC is used for indicating a scheduling situation of the downlink subframe n−$k_i$, and the downlink subframe n−$k_j$. In this manner, in Example 1, a DTX-to-ACK error is prevented from occurring when the HARQ-ACK bundling is performed on the downlink subframe n−$k_i$ and the downlink subframe n−$k_j$ by the user equipment; and in addition, limitation on scheduling performed by the base station on the downlink subframe n−$k_i$ and the downlink subframe n−$k_j$ may further be effectively avoided.

In addition, if the base station sends, in both the downlink subframe n−$k_{M-2}$ and the downlink subframe n−$k_{M-1}$, the DCI format to the user equipment, the value of the TPC field in the DCI format sent in the downlink subframe n−$k_{M-2}$ is the same as the value of the TPC field in the DCI format sent in the downlink subframe n−$k_{M-1}$.

Example 2

The base station receives, in the uplink subframe n, the HARQ-ACK response that is corresponding to the first serving cell and the downlink subframe n−k and is fed back by the user equipment, and determines, according to a manner in which HARQ-ACK bundling is performed on an HARQ-ACK response corresponding to the first serving cell and a downlink subframe n−$k_0$ and an HARQ-ACK response corresponding to the first serving cell and a downlink subframe n−$k_1$, an HARQ-ACK response corresponding to the first serving cell and each downlink subframe in the downlink subframe n−k, where $k_0$ and $k_1$ are first two elements in the set K. If the base station schedules only one of the downlink subframes, the scheduling needs to be performed in the downlink subframe n−$k_1$.

Example 3

Step $601^1$: The base station determines two downlink subframes, namely, a downlink subframe n−$k_c$ and a downlink subframe n−$k_d$, on which the HARQ-ACK bundling is performed, which may specifically include the following: the base station sorts M downlink subframes according to the DAI value, and determines that the two downlink subframes on which the HARQ-ACK bundling is performed are last two downlink subframes. For example, specifically, the base station sorts the M downlink subframes, and it is assumed that a sequence is n, and 0≤n≤M−1, n is corresponding to a downlink subframe, where a DAI value of a downlink control channel sent in the downlink subframe is n+1; otherwise, n is corresponding to another subframe without a DAI value, and may, for example, be selected in ascending order according to subframe numbers. In this case, the downlink subframes n−$k_c$ and n−$k_d$ are two downlink subframes arranged in positions of M−2 and M−1.

Correspondingly, if in the downlink subframe n−$k_{M-2}$ and the downlink subframe n−$k_{M-1}$, the base station sends, on the first serving cell and only in the downlink subframe n−$k_{M-2}$ or only in the downlink subframe n−$k_{M-1}$, a downlink control channel to the user equipment, a value of a TPC field in a DCI format carried on the downlink control channel sent, on the first serving cell and only in the downlink subframe n−$k_{M-2}$ or only in the downlink subframe n−$k_{M-1}$, to the user equipment is a first value; and if in the downlink subframe n−$k_{M-2}$ and the downlink subframe n−$k_{M-1}$, the base station sends, on the first serving cell and in both the downlink subframe n−$k_{M-2}$ and the downlink subframe n−$k_{M-1}$, the downlink control channel to the user equipment, both values of TPC fields in DCI formats that are carried on the downlink control channel which is sent to the user equipment on the first serving cell and in the downlink subframe n−$k_{M-2}$, and carried on the downlink control channel which is sent to the user equipment on the first serving cell and in the downlink subframe n−$k_{M-1}$, are a second value.

Step $601''$: The base station receives, in the uplink subframe n, the HARQ-ACK response that is corresponding to the first serving cell and the downlink subframe n−k and is fed back by the user equipment, and determines, according to a manner in which HARQ-ACK bundling is performed on an HARQ-ACK response corresponding to the first serving cell and a downlink subframe n−$k_c$ and an HARQ-ACK response corresponding to the first serving cell and a downlink subframe n−$k_d$, an HARQ-ACK response corresponding to the first serving cell and each downlink subframe in the downlink subframe n−k.

Example 4

Step $601^1$: The base station determines two downlink subframes, namely, a downlink subframe n−$k_a$ and a downlink subframe n−$k_b$, on which HARQ-ACK bundling is performed. A specific process includes the following: the base station sorts M downlink subframes according to the DAI value, and determines that the two downlink subframes on which the HARQ-ACK bundling is performed are last two downlink subframes.

For example, the base station sorts the M downlink subframes, and it is assumed that a sequence is n and 0≤n≤M−1, firstly, 0 is corresponding to a downlink subframe of PDSCH transmission having no corresponding downlink control channel, and the other n is corresponding to a downlink subframe, where a DAI value of a downlink control channel sent in the downlink subframe is n; otherwise, n is corresponding to another subframe without a DAI value, and may, for example, be selected in ascending order according to subframe numbers. The downlink subframes n−$k_a$ and n−$k_b$ are two downlink subframes arranged in positions of M−2 and M−1. Correspondingly, if in the downlink subframe n−$k_a$ and the downlink subframe n−$k_b$, the base station sends, on the first serving cell and only in the downlink subframe n−$k_a$ or only in the downlink subframe n−$k_b$, the downlink control channel to the user equipment, a value of a transmit power control TPC field in a DCI format carried on the downlink control channel sent, on the first serving cell and only in the downlink subframe n−$k_a$ or only in the downlink subframe n−$k_b$, to the user equipment is a first value; and if in the downlink subframe n−$k_a$ and the downlink subframe n−$k_b$, the base station sends, on the first serving cell and in both the downlink subframe n−$k_a$ and the downlink subframe n−$k_b$, the downlink control channel to the user equipment, both values of TPC fields in DCI formats that are carried on the downlink control channel which is sent to the user equipment on the first serving cell and in the downlink subframe n−$k_a$, and carried on the downlink control channel which is sent to the user equipment on the first serving cell and in the downlink subframe n−$k_b$, are a second value.

Step $601^2$: The base station receives, in the uplink subframe n, the HARQ-ACK response that is corresponding to the first serving cell and the downlink subframe n−k and is fed back by the user equipment, and determines, according to a manner in which HARQ-ACK bundling is performed on an HARQ-ACK response corresponding to the first serving cell and a downlink subframe n−$k_a$ and an HARQ-ACK response corresponding to the first serving cell and a downlink subframe n−$k_b$, an HARQ-ACK response corresponding to the first serving cell and each downlink subframe in the downlink subframe n−k.

Example 5

When the serving cells configured for the user equipment include only one first serving cell and one second serving cell, in step S601, the base station may receive, in the uplink subframe n and in a PUCCH format 1b channel selection manner, an HARQ-ACK response that is corresponding to the first serving cell and the downlink subframe n−k and is fed back by the user equipment. Specifically, when in the uplink subframe n, the user equipment needs to transmit only an HARQ-ACK response corresponding to the first serving cell, the HARQ-ACK response that is corresponding to the first serving cell and the downlink subframe n−k and is fed back by the user equipment may be received in the uplink subframe n in a PUCCH format 1b channel selection manner that is corresponded to when a single serving cell is configured for the UE in an existing LTE system, and in this case, spatial bundling (spatial bundling) may be prevented from being performed on the HARQ-ACK response corresponding to the first serving cell, thereby improving system performance; and when in the uplink subframe n the user equipment needs to transmit the HARQ-ACK response corresponding to the first serving cell and an HARQ-ACK response corresponding to the second serving cell, the HARQ-ACK response that is corresponding to the first serving cell and the downlink subframe n−k and is fed back by the user equipment may be received in the uplink subframe n in a PUCCH format 1b channel selection manner that is corresponded to when two serving cells are configured for the UE in the existing LTE system. The existing LTE system refers to LTE version 11, and further, the PUCCH format 1b channel selection manner that is corresponded to when a single serving cell is configured for the UE in the existing LTE system may refer to a PUCCH format 1b channel selection manner defined in Chapter 10.1.3.1 of the protocol 3GPP TS 36.213 v12.0.0; and the PUCCH format 1b channel selection manner that is corresponded to when two serving cells are configured for the UE in the existing LTE system may refer to a PUCCH format 1b channel selection manner defined in Chapter 10.1.3.2.1 of the protocol 3GPP TS 36.213 v12.0.0.

For example, when the uplink-downlink configuration of the second serving cell configured for the user equipment is the uplink-downlink configuration 0, or when the reference uplink-downlink configuration of the second serving cell configured for the user equipment is the uplink-downlink configuration 0, step S601 may specifically be as follows:

Step 601-1: When the uplink subframe n is corresponding to a subframe 2, a subframe 4, a subframe 7, and a subframe 9 in one radio frame, the base station receives, in the uplink subframe n and in the PUCCH format 1b channel selection manner that is corresponded to when a single serving cell is configured for the UE in the existing LTE system, the HARQ-ACK response that is corresponding to the first serving cell and the downlink subframe n−k and is fed back by the user equipment; and when the uplink subframe n is corresponding to a subframe 3 and a subframe 8 in one radio frame, the base station receives, in the uplink subframe n and in the PUCCH format 1b channel selection manner that is corresponded to when two serving cells are configured for the UE in the existing LTE system, the HARQ-ACK response that is corresponding to the first serving cell and the downlink subframe n−k and is fed back by the user equipment.

In the prior art, if two serving cells are configured for the user equipment, HARQ-ACKs are permanently received in the PUCCH format 1b channel selection manner that is corresponded to when two serving cells are configured for the UE in the existing LTE system. In Example 6, in the PUCCH format 1b channel selection manner that is corresponded to when a single serving cell is configured for the UE in the existing LTE system, the spatial bundling does not need to be performed on the HARQ-ACKs, but in the PUCCH format 1b channel selection manner that is corresponded to when two serving cells are configured for the UE in the existing LTE system, the spatial bundling needs to be performed on the HARQ-ACKs, and therefore, in Example 6, when only the HARQ-ACK response corresponding to the first serving cell needs to be transmitted in the uplink subframe n, the HARQ-ACK that is response corresponding to the first serving cell and the downlink subframe n−k and is fed back by the user equipment is received in the uplink subframe n and in the PUCCH format 1b channel selection manner that is corresponded to when a single serving cell is configured for the UE in the existing LTE system, which may avoid performing the spatial bundling (spatial bundling) on the HARQ-ACK response corresponding to the first serving cell, so as to improve system performance.

Besides the foregoing examples, for another specific implementation manner of this embodiment, refer to related descriptions about the user equipment and the transmission method of the user equipment in the foregoing embodiments, and is not repeatedly described in case of being easily and accordingly understood by persons skilled in the art.

According to the user equipment of this embodiment, timing of an FDD serving cell or of a supplemental downlink serving cell is designed, which resolves a problem that some downlink subframes on the FDD serving cell or the supplemental downlink serving cell have no corresponding uplink subframe in which an HARQ-ACK is fed back, so that the base station can still send information to the user equipment in these downlink subframes, thereby improving a resource utilization rate. In addition, in this embodiment, bundling is performed on HARQ-ACKs corresponding to two downlink subframes in the downlink subframe n−k, so that when the number of elements included in the set K is 5, that is, when the uplink subframe n is corresponding to 5 downlink subframes, finally obtained HARQ-ACK responses of the first serving cell and the downlink subframe n−k are equivalent to HARQ-ACK responses corresponding to only 4 downlink subframes, so that HARQ-ACKs of the first serving cell can be sent by using an existing channel selection mechanism, which saves standardization efforts.

Figure 6:
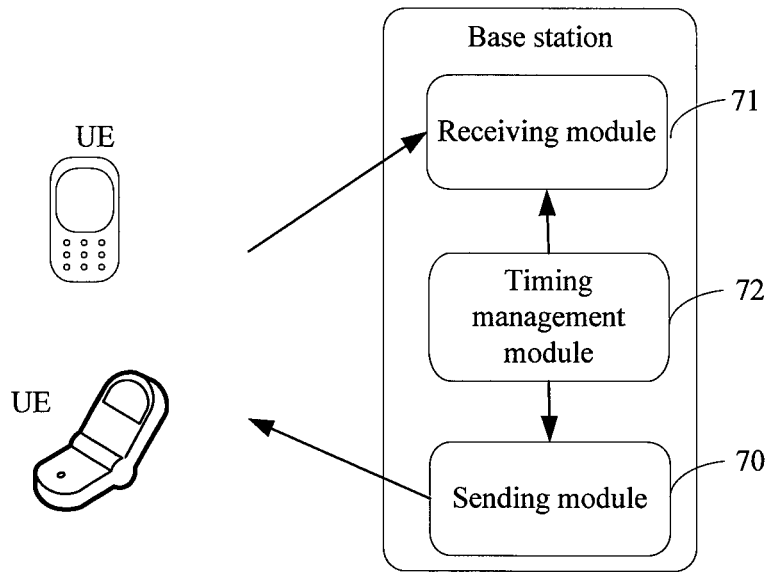
FIG. 6 is a module block diagram of a first embodiment of a base station according to an embodiment of the present invention, where a user equipment connected to the base station is also displayed.

Refer to FIG. 6 with reference to the foregoing embodiments. This embodiment provides a base station, where the base station includes, but is not limited to, a sending module 70, a receiving module 71, and a timing management module 72.

The sending module 70 is configured to send, on a first serving cell and in a downlink subframe n−k, physical downlink shared channel PDSCH transmission or a downlink control channel that indicates downlink semi-persistent scheduling SPS release, to a user equipment, where the first serving cell is a serving cell corresponding to the user equipment, and a duplex mode of the first serving cell is frequency division duplex FDD, or all subframes on the first serving cell are downlink subframes, or one radio frame on the first serving cell includes nine downlink subframes and one special subframe, or the first serving cell is a supplemental downlink serving cell, or a duplex mode of the first serving cell is time division duplex TDD and all subframes on the first serving cell are downlink subframes, or a duplex mode of the first serving cell is time division duplex TDD and one radio frame on the first serving cell includes nine downlink subframes and one special subframe, or a duplex mode of the first serving cell is time division duplex TDD and an uplink-downlink configuration of the first serving cell is an uplink-downlink configuration 7.

The receiving module 71 is configured to receive, in the uplink subframe n, an HARQ-ACK response that is corresponding to the first serving cell and the downlink subframe n−k and is fed back by the user equipment. The receiving module 71 may be configured to receive, in the uplink subframe n and in a physical uplink control channel PUCCH format 1b channel selection manner, the HARQ-ACK response that is corresponding to the first serving cell and the downlink subframe n−k and is fed back by the user equipment. Further, with reference to related descriptions in the foregoing Example 5, the receiving module 71 may further be configured to: when in the uplink subframe n the user equipment needs to transmit only an HARQ-ACK response corresponding to the first serving cell, receive, in the uplink subframe n and in a PUCCH format 1b channel selection manner that is corresponded to when a single serving cell is configured for the UE in an existing LTE system, the HARQ-ACK response that is corresponding to the first serving cell and the downlink subframe n−k and is fed back by the user equipment, and when in the uplink subframe n the user equipment needs to transmit the HARQ-ACK response corresponding to the first serving cell and an HARQ-ACK response corresponding to the second serving cell, receive, in the uplink subframe n and in a PUCCH format 1b channel selection manner that is corresponded to when two serving cells are configured for the UE in the existing LTE system, the HARQ-ACK response that is corresponding to the first serving cell and the downlink subframe n–k and is fed back by the user equipment. For example, when an uplink-downlink configuration of the second serving cell configured for the user equipment is an uplink-downlink configuration 0, or when a reference uplink-downlink configuration of the second serving cell configured for the user equipment is an uplink-downlink configuration 0, further, the receiving module 71 may further be configured to: when the uplink subframe n is corresponding to a subframe 2, a subframe 4, a subframe 7, and a subframe 9 in one radio frame, receive, in the uplink subframe n and in the PUCCH format 1b channel selection manner that is corresponded to when a single serving cell is configured for the UE in the existing LTE system, the HARQ-ACK response that is corresponding to the first serving cell and the downlink subframe n–k and is fed back by the user equipment; and when the uplink subframe n is corresponding to a subframe 3 and a subframe 8 in one radio frame, receive, in the uplink subframe n and in the PUCCH format 1b channel selection manner that is corresponded to when two serving cells are configured for the UE in the existing LTE system, the HARQ-ACK response that is corresponding to the first serving cell and the downlink subframe n–k and is fed back by the user equipment. Other descriptions are like those in Example 6 and are not repeated herein.

The timing management module 72 is configured to determine a set K according to first HARQ-ACK timing, where n is an integer, k is a positive integer, and k belongs to the set K. The timing management module 72 may be configured to determine the first HARQ-ACK timing according to a reference uplink-downlink configuration of the first serving cell. Certainly, in another embodiment, the timing management module 72 may determine the first HARQ-ACK timing according to the reference uplink-downlink configuration of the first serving cell, where the reference uplink-downlink configuration of the first serving cell is an uplink-downlink configuration or a reference uplink-downlink configuration of the second serving cell.

Certainly, in another embodiment, the timing management module 72 may determine the first HARQ-ACK timing according to the reference uplink-downlink configuration of the first serving cell, where when the number of serving cells configured for the user equipment is 2, the reference uplink-downlink configuration of the first serving cell is an uplink-downlink configuration 5, and when the number of serving cells configured for the user equipment is greater than 2, the reference uplink-downlink configuration of the first serving cell is an uplink-downlink configuration 2 or an uplink-downlink configuration 4.

Alternatively, in another embodiment, the timing management module 72 may determine the first HARQ-ACK timing according to the reference uplink-downlink configuration of the first serving cell, where when the number of serving cells configured for the user equipment is 2, the reference uplink-downlink configuration of the first serving cell is an uplink-downlink configuration 5, and the serving cells configured for the user equipment include one first serving cell and one second serving cell; and when the number of serving cells configured for the user equipment is greater than 2, the reference uplink-downlink configuration of the first serving cell is an uplink-downlink configuration 2 or an uplink-downlink configuration 4, and the serving cells configured for the user equipment include at least one first serving cell or include at least one second serving cell.

That the reference uplink-downlink configuration of the first serving cell is an uplink-downlink configuration 2 or an uplink-downlink configuration 4 may specifically be as follows: when an uplink-downlink configuration of a primary serving cell of the user equipment is the uplink-downlink configuration 0, the reference uplink-downlink configuration of the first serving cell is the uplink-downlink configuration 2; when an uplink-downlink configuration of a primary serving cell of the user equipment is an uplink-downlink configuration 1, the reference uplink-downlink configuration of the first serving cell is the uplink-downlink configuration 2; when an uplink-downlink configuration of a primary serving cell of the user equipment is the uplink-downlink configuration 2, the reference uplink-downlink configuration of the first serving cell is the uplink-downlink configuration 2; when an uplink-downlink configuration of a primary serving cell of the user equipment is an uplink-downlink configuration 3, the reference uplink-downlink configuration of the first serving cell is the uplink-downlink configuration 4; when an uplink-downlink configuration of a primary serving cell of the user equipment is the uplink-downlink configuration 4, the reference uplink-downlink configuration of the first serving cell is the uplink-downlink configuration 4; and when an uplink-downlink configuration of a primary serving cell of the user equipment is an uplink-downlink configuration 6, the reference uplink-downlink configuration of the first serving cell is the uplink-downlink configuration 2.

Alternatively, that the reference uplink-downlink configuration of the first serving cell is an uplink-downlink configuration 2 or an uplink-downlink configuration 4 may specifically be as follows: when an uplink-downlink configuration of a primary serving cell of the user equipment is the uplink-downlink configuration 0, the reference uplink-downlink configuration of the first serving cell is the uplink-downlink configuration 4; when an uplink-downlink configuration of a primary serving cell of the user equipment is an uplink-downlink configuration 1, the reference uplink-downlink configuration of the first serving cell is the uplink-downlink configuration 4; when an uplink-downlink configuration of a primary serving cell of the user equipment is the uplink-downlink configuration 2, the reference uplink-downlink configuration of the first serving cell is the uplink-downlink configuration 2; when an uplink-downlink configuration of a primary serving cell of the user equipment is an uplink-downlink configuration 3, the reference uplink-downlink configuration of the first serving cell is the uplink-downlink configuration 4; when an uplink-downlink configuration of a primary serving cell of the user equipment is the uplink-downlink configuration 4, the reference uplink-downlink configuration of the first serving cell is the uplink-downlink configuration 4; and when an uplink-downlink configuration of a primary serving cell of the user equipment is an uplink-downlink configuration 6, the reference uplink-downlink configuration of the first serving cell is the uplink-downlink configuration 4.

Alternatively, that the reference uplink-downlink configuration of the first serving cell is an uplink-downlink configuration 2 or an uplink-downlink configuration 4 includes the following: when an uplink-downlink configuration of a primary serving cell of the user equipment is the uplink-downlink configuration 0, the reference uplink-downlink configuration of the first serving cell is an uplink-downlink configuration 2 or an uplink-downlink configuration 4; when an uplink-downlink configuration of a primary serving cell of the user equipment is an uplink-downlink configuration 1, the reference uplink-downlink configuration of the first serving cell is an uplink-downlink configuration 2 or an uplink-downlink configuration 4; when an uplink-downlink configuration of a primary serving cell of the user equipment is the uplink-downlink configuration 2, the reference uplink-downlink configuration of the first serving cell is the uplink-downlink configuration 2; when an uplink-downlink configuration of a primary serving cell of the user equipment is an uplink-downlink configuration 3, the reference uplink-downlink configuration of the first serving cell is the uplink-downlink configuration 4; when an uplink-downlink configuration of a primary serving cell of the user equipment is the uplink-downlink configuration 4, the reference uplink-downlink configuration of the first serving cell is the uplink-downlink configuration 4; and when an uplink-downlink configuration of a primary serving cell of the user equipment is an uplink-downlink configuration 6, the reference uplink-downlink configuration of the first serving cell is an uplink-downlink configuration 2 or an uplink-downlink configuration 4.

It should be noted that, the timing management module 72 is specifically configured to:

when the reference uplink-downlink configuration of the first serving cell is the uplink-downlink configuration 0, make the uplink subframe n correspond to a subframe 2, a subframe 3, a subframe 4, a subframe 7, a subframe 8, and a subframe 9 in one radio frame, and when the uplink subframe n is corresponding to a subframe 2 and a subframe 7 in one radio frame, make the set K include elements 6 and 5, for example, make the set K be {6, 5}, when the uplink subframe n is corresponding to a subframe 3 and a subframe 8 in one radio frame, make the set K include elements 5 and 4, for example, make the set K be {5, 4}, and when the uplink subframe n is corresponding to a subframe 4 and a subframe 9 in one radio frame, make the set K be {4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

alternatively, when the reference uplink-downlink configuration of the first serving cell is the uplink-downlink configuration 0, make the uplink subframe n correspond to a subframe 2, a subframe 3, a subframe 4, a subframe 7, a subframe 8, and a subframe 9 in one radio frame, and when the uplink subframe n is corresponding to a subframe 2 and a subframe 7 in one radio frame, make the set K include elements 6 and 5, for example, make the set K be {6, 5}, when the uplink subframe n is corresponding to a subframe 3 and a subframe 8 in one radio frame, make the set K be {5}, and when the uplink subframe n is corresponding to a subframe 4 and a subframe 9 in one radio frame, make the set K include elements 5 and 4, for example, make the set K be {5, 4};

alternatively, when the reference uplink-downlink configuration of the first serving cell is the uplink-downlink configuration 0, make the uplink subframe n correspond to a subframe 2, a subframe 4, a subframe 7, and a subframe 9 in one radio frame, and when the uplink subframe n is corresponding to a subframe 2 and a subframe 7 in one radio frame, make the set K include elements 6, 5, and 4, for example, make the set K be {6, 5, 4}, and when the uplink subframe n is corresponding to a subframe 4 and a subframe 9 in one radio frame, make the set K include elements 5 and 4, for example, make the set K be {5, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; on the other hand, a value of an element in the set K is enabled to be as small as possible, that is, it is ensured that a transmission delay of the first serving cell is as small as possible; and further, when this manner is applied to a scenario in which the first serving cell and the second serving cell are configured for the user equipment, an HARQ-ACK is transmitted only in an uplink subframe 2, a subframe 4, a subframe 7, and a subframe 9, that is, an HARQ-ACK of the first serving cell is transmitted only in an uplink subframe in which a corresponding HARQ-ACK of the second serving cell is also transmitted, so that both TPC fields in DCI corresponding to the two serving cells can be used for indicating both TPC and a PUCCH resource, and the HARQ-ACK transmission performance can be improved;

alternatively, when the reference uplink-downlink configuration of the first serving cell is the uplink-downlink configuration 0, make the uplink subframe n correspond to a subframe 2, a subframe 4, a subframe 7, and a subframe 9 in one radio frame, and when the uplink subframe n is corresponding to a subframe 2 and a subframe 7 in one radio frame, make the set K include elements 10, 9, and 6, for example, make the set K be {10, 9, 6}, when the uplink subframe n is corresponding to a subframe 4 and a subframe 9 in one radio frame, make the set K include elements 5 and 4, for example, make the set K be {5, 4}; where in this case, on the one hand, when this manner is applied to a scenario in which the first serving cell and the second serving cell are configured for the user equipment, an HARQ-ACK is transmitted only in an uplink subframe 2, a subframe 4, a subframe 7, and a subframe 9, that is, an HARQ-ACK of the first serving cell is transmitted only in an uplink subframe in which a corresponding HARQ-ACK of the second serving cell is also transmitted, so that both TPC fields in DCI corresponding to the two serving cells can be used for indicating both TPC and a PUCCH resource, and the HARQ-ACK transmission performance can be improved; and on the other hand, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH;

alternatively, when the reference uplink-downlink configuration of the first serving cell is the uplink-downlink configuration 0, make the uplink subframe n correspond to a subframe 2, a subframe 3, a subframe 4, a subframe 7, a subframe 8, and a subframe 9 in one radio frame, and when the uplink subframe n is corresponding to a subframe 2, a subframe 3, a subframe 7, and a subframe 8 in one radio frame, make the set K include elements 6 and 4, for example, make the set K be {6, 4}, and when the uplink subframe n is corresponding to a subframe 4 and a subframe 9 in one radio frame, make the set K be {4}, where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

when the reference uplink-downlink configuration of the first serving cell is the uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K include elements 7, 6, and 5, for example, make the set K be {7, 6, 5}, and when the uplink subframe n is corresponding to a subframe 3 and a subframe 8 in one radio frame, make the set K include elements 5 and 4, for example, make the set K be {5, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

alternatively, when the reference uplink-downlink configuration of the first serving cell is the uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K include elements 9, 7, and 6, for example, make the set K be {9, 7, 6}, and when the uplink subframe n is corresponding to a subframe 3 and a subframe 8 in one radio frame, make the set K include elements 6 and 4, for example, make the set K be {6, 4}, where in this case, when this manner is applied to a scenario in which the first serving cell and the second serving cell are configured for the user equipment, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH;

alternatively, when the reference uplink-downlink configuration of the first serving cell is the uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K include elements 7, 6, and 4, for example, make the set K be {7, 6, 4}, and when the uplink subframe n is corresponding to a subframe 3 and a subframe 8 in one radio frame, make the set K include elements 6 and 4, for example, make the set K be {6, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

when the reference uplink-downlink configuration of the first serving cell is the uplink-downlink configuration 2, make the uplink subframe n correspond to a subframe 2 and a subframe 7 in one radio frame, and make the set K include elements 8, 7, 6, 5, and 4, for example, make the set K be {8, 7, 6, 5, 4}, where in this case, a value of an element in the set K is enabled to be as small as possible, that is, it is ensured that a transmission delay of the first serving cell is as small as possible;

alternatively, when the reference uplink-downlink configuration of the first serving cell is the uplink-downlink configuration 2, make the uplink subframe n correspond to a subframe 2 and a subframe 7 in one radio frame, and make the set K include elements 8, 7, 6, and 4, for example, make the set K be {8, 7, 6, 4};

when the reference uplink-downlink configuration of the first serving cell is the uplink-downlink configuration 3, make the uplink subframe n correspond to a subframe 2, a subframe 3, and a subframe 4 in one radio frame, and when the uplink subframe n is corresponding to a subframe 2 in one radio frame, make the set K include elements 11, 10, 7, and 6, for example, make the set K be {11, 10, 7, 6}, when the uplink subframe n is corresponding to a subframe 3 in one radio frame, make the set K include elements 10, 6, and 5, for example, make the set K be {10, 6, 5}, and when the uplink subframe n is corresponding to a subframe 4 in one radio frame, make the set K include elements 10, 5, and 4, for example, make the set K be {10, 5, 4}, where in this case, a value of an element in the set K is enabled to be as small as possible, that is, it is ensured that a transmission delay of the first serving cell is as small as possible;

alternatively, when the reference uplink-downlink configuration of the first serving cell is the uplink-downlink configuration 3, make the uplink subframe n correspond to a subframe 2, a subframe 3, and a subframe 4 in one radio frame, and when the uplink subframe n is corresponding to a subframe 2 in one radio frame, make the set K include elements 11, 10, 9, and 8, for example, make the set K be {11, 10, 9, 8} or {10, 9, 8, 11}, when the uplink subframe n is corresponding to a subframe 3 in one radio frame, make the set K include elements 8, 7, and 6, for example, make the set K be {8, 7, 6}, and when the uplink subframe n is corresponding to a subframe 4 in one radio frame, make the set K include elements 6, 5, and 4, for example, make the set K be {6, 5, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided;

alternatively, when the reference uplink-downlink configuration of the first serving cell is the uplink-downlink configuration 3, make the uplink subframe n correspond to a subframe 2, a subframe 3, and a subframe 4 in one radio frame, and when the uplink subframe n is corresponding to a subframe 2 in one radio frame, make the set K include elements 11, 10, and 9, for example, make the set K be {11, 10, 9} or {10, 9, 11}, when the uplink subframe n is corresponding to a subframe 3 in one radio frame, make the set K include elements 9, 8, 7, and 6, for example, make the set K be {9, 8, 7, 6}, and when the uplink subframe n is corresponding to a subframe 4 in one radio frame, make the set K include elements 6, 5, and 4, for example, make the set K be {6, 5, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided;

when the reference uplink-downlink configuration of the first serving cell is the uplink-downlink configuration 4, make the uplink subframe n correspond to a subframe 2 and a subframe 3 in one radio frame, and when the uplink subframe n is corresponding to a subframe 2 in one radio frame, make the set K include elements 12, 11, 10, 8, and 7, for example, make the set K be {12, 11, 10, 8, 7}, and when the uplink subframe n is corresponding to a subframe 3 in one radio frame, make the set K include elements 10, 7, 6, 5, and 4, for example, make the set K be {10, 7, 6, 5, 4}, where in this case, a value of an element in the set K is enabled to be as small as possible, that is, it is ensured that a transmission delay of the first serving cell is as small as possible;

alternatively, when the reference uplink-downlink configuration of the first serving cell is the uplink-downlink configuration 4, make the uplink subframe n correspond to a subframe 2 and a subframe 3 in one radio frame, and when the uplink subframe n is corresponding to a subframe 2 in one radio frame, make the set K include elements 12, 11, 8, and 7, for example, make the set K be {12, 11, 8, 7}, and when the uplink subframe n is corresponding to a subframe 3 in one radio frame, make the set K include elements 7, 6, 5, and 4, for example, make the set K be {7, 6, 5, 4};

alternatively, when the reference uplink-downlink configuration of the first serving cell is the uplink-downlink configuration 4, make the uplink subframe n correspond to a subframe 2 and a subframe 3 in one radio frame, and when the uplink subframe n is corresponding to a subframe 2 in one radio frame, make the set K include elements 12, 11, 10, 9, and 8, for example, make the set K be {12, 11, 10, 9, 8} or {12, 10, 9, 8, 11}, and when the uplink subframe n is corresponding to a subframe 3 in one radio frame, make the set K include elements 8, 7, 6, 5, and 4, for example, make the set K be {8, 7, 6, 5, 4}; where in this case, on the one hand, HARQ-ACKs corresponding to multiple downlink subframes on the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided;

when the reference uplink-downlink configuration of the first serving cell is the uplink-downlink configuration 5, make the uplink subframe n correspond to a subframe 2 in one radio frame, and make the set K include elements 13, 12, 11, 10, 9, 8, 7, 6, 5, and 4, for example, make the set K be {13, 12, 11, 10, 9, 8, 7, 6, 5, 4};

alternatively, when the reference uplink-downlink configuration of the first serving cell is the uplink-downlink configuration 5, make the uplink subframe n correspond to a subframe 2 in one radio frame, and make the set K include elements 13, 12, 11, 9, 8, 7, 6, 5, and 4, for example, make the set K be {13, 12, 11, 9, 8, 7, 6, 5, 4};

when the reference uplink-downlink configuration of the first serving cell is the uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, and a subframe 7 in one radio frame, make the set K include elements 7 and 5, for example, make the set K be {7, 5}, when the uplink subframe n is corresponding to a subframe 4 in one radio frame, make the set K be {5}, and when the uplink subframe n is corresponding to a subframe 8 in one radio frame, make the set K include elements 7, 5, and 4, for example, make the set K be {7, 5, 4}, where in this case, a value of an element in the set K is enabled to be as small as possible, that is, it is ensured that a transmission delay of the first serving cell is as small as possible;

alternatively, when the reference uplink-downlink configuration of the first serving cell is the uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2 in one radio frame, make the set K include elements 8 and 7, for example, make the set K be {8, 7}, when the uplink subframe n is corresponding to a subframe 3 and a subframe 7 in one radio frame, make the set K include elements 7 and 6, for example, make the set K be {7, 6}, and when the uplink subframe n is corresponding to a subframe 4 and a subframe 8 in one radio frame, make the set K include elements 6 and 5, for example, make the set K be {6, 5}; where in this case, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

alternatively, when the reference uplink-downlink configuration of the first serving cell is the uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, a subframe 7, and a subframe 8 in one radio frame, make the set K include elements 10 and 7, for example, make the set K be {10, 7}, and when the uplink subframe n is corresponding to a subframe 4 in one radio frame, make the set K include elements 10 and 5, for example, make the set K be {10, 5}, where in this case, when this manner is applied to a scenario in which the first serving cell and the second serving cell are configured for the user equipment, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH;

alternatively, when the reference uplink-downlink configuration of the first serving cell is the uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, and a subframe 4 in one radio frame, make the set K include elements 7 and 4, for example, make the set K be {7, 4}, and when the uplink subframe n is corresponding to a subframe 7 and an uplink subframe 8 that are in one radio frame, make the set K include elements 6 and 5, for example, make the set K be {6, 5}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

alternatively, when the reference uplink-downlink configuration of the first serving cell is the uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2 in one radio frame, make the set K include elements 10 and 9, for example, make the set K be {10, 9}, when the uplink subframe n is corresponding to a subframe 3 in one radio frame, make the set K include elements 9 and 8, for example, make the set K be {9, 8}, when the uplink subframe n is corresponding to a subframe 4 in one radio frame, make the set K include elements 8 and 7, for example, make the set K be {8, 7}, when the uplink subframe n is corresponding to a subframe 7 in one radio frame, make the set K include elements 9 and 8, for example, make the set K be {9, 8}, when the uplink subframe n is corresponding to a subframe 8 in one radio frame, make the set K include elements 8 and 7, for example, make the set K be {8, 7}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; on the other hand, a problem that an HARQ-ACK corresponding to a PDSCH that is scheduled first is not fed back first may be avoided; and further, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH.

It should be noted that, in another embodiment, the sending module 70 is further configured to send, on a second serving cell and in a downlink subframe n-k1, PDSCH transmission or a downlink control channel that indicates downlink SPS release, to the user equipment, where the second serving cell is a serving cell corresponding to the user equipment, and a duplex mode of the second serving cell is frequency division duplex TDD; correspondingly, the receiving module 71 is further configured to receive, in the uplink subframe n, an HARQ-ACK response that is corresponding to the second serving cell and the downlink subframe n-k1 and is fed back by the user equipment; and similarly, the timing management module 72 is further configured to determine second HARQ-ACK timing according to the uplink-downlink configuration or the reference uplink-downlink configuration of the second serving cell, and determine a set K1 according to the second HARQ-ACK timing, where k1 is a positive integer, k1 belongs to the set K1, and preferably, the set K includes at least one element that does not belong to the set K1.

In this embodiment, the first serving cell is a secondary serving cell of the user equipment, and the second serving cell is a primary serving cell of the user equipment; where the receiving module 71 may further be configured to receive, on the second serving cell and in the uplink subframe n, the HARQ-ACK response that is corresponding to the first serving cell and the downlink subframe n-k and is fed back by the user equipment.

As described in a related embodiment of the foregoing transmission method, in another embodiment, the receiving module 71 is further configured to receive, in the uplink subframe n, the HARQ-ACK response that is corresponding to the first serving cell and the downlink subframe n-k and is fed back by the user equipment, and determine, according to a manner in which HARQ-ACK bundling is performed on an HARQ-ACK response corresponding to the first serving cell and a downlink subframe $n-k_{M-2}$ in the downlink subframe n-k and an HARQ-ACK response corresponding to the first serving cell and a downlink subframe $n-k_{M-1}$ in the downlink subframe n-k, an HARQ-ACK response corresponding to the first serving cell and each downlink subframe in the downlink subframe n-k. If in the downlink subframe $n-k_{M-2}$ and the downlink subframe $n-k_{M-1}$, the sending module 70 sends, on the first serving cell and only in the downlink subframe $n-k_{M-2}$ or only in the downlink subframe $n-k_{M-1}$, a downlink control channel to the user equipment, a value of a transmit power control TPC field in a downlink control information DCI format carried on the downlink control channel sent to the user equipment on the first serving cell and only in the downlink subframe $n-k_{M-2}$ for only in the downlink subframe $n-k_{M-1}$ is a first value; and if in the downlink subframe $n-k_{M-2}$ and the downlink subframe $n-k_{M-1}$, the sending module 70 sends, on the first serving cell and in both the downlink subframe $n-k_{M-2}$ and the downlink subframe $n-k_{M-1}$, a downlink control channel to the user equipment, and values of TPC fields in DCI formats that are carried on the downlink control channel which is sent to the user equipment on the first serving cell and in the downlink subframe $n-k_{M-2}$ and carried on the downlink control channel which is sent to the user equipment on the first serving cell and in the downlink subframe $n-k_{M-1}$, are a second value, where the first value is unequal to the second value.

The first value is corresponding to a first physical uplink control channel PUCCH resource, the second value is corresponding to a second physical uplink control channel PUCCH resource, and the first PUCCH resource and the second PUCCH resource are PUCCH resources configured for the user equipment. In addition, the first PUCCH resource and/or the second PUCCH resource each includes at least two PUCCH resources.

As described above, the downlink control channel is an EPDCCH, the downlink control channel is used for indicating the PDSCH transmission or used for indicating the downlink SPS release, an HARQ-ACK resource offset field in the DCI format carried on the downlink control channel is used as a DAI field, and the DAI is used for indicating an accumulative number of downlink control channels in the downlink subframe n−k.

As described in a related embodiment of the foregoing transmission method, in another embodiment, the receiving module 71 is further configured to receive, in the uplink subframe n, the HARQ-ACK response that is corresponding to the first serving cell and the downlink subframe n−k and is fed back by the user equipment, and determine, according to a manner in which HARQ-ACK bundling is performed on last two HARQ-ACK responses in an HARQ-ACK'(n), an HARQ-ACK response corresponding to the first serving cell and each downlink subframe in the downlink subframe n−k; where descriptions of the HARQ-ACK'(n) are like those in Example 3, and are not repeated herein; and as for how the bundling processing module 33 performs the HARQ-ACK bundling on the last two HARQ-ACK responses in the HARQ-ACK'(n) reference may be made to Example 3, which is not repeatedly described herein.

As described in a related embodiment of the foregoing transmission method, in another embodiment, the receiving module 71 is further configured to receive, in the uplink subframe n, the HARQ-ACK response that is corresponding to the first serving cell and the downlink subframe n−k and is fed back by the user equipment, and determine, according to a manner in which HARQ-ACK bundling is performed on last three HARQ-ACK responses in an HARQ-ACK'(n) an HARQ-ACK response corresponding to the first serving cell and each downlink subframe in the downlink subframe n−k; where descriptions of the HARQ-ACK'(n) are like those in Example 5, and are not repeated herein; and as for how the bundling processing module 33 performs the HARQ-ACK bundling on the three two HARQ-ACK responses in the HARQ-ACK'(n) reference may be made to Example 5, which is not repeatedly described herein.

It should be noted that, in this embodiment, process steps and examples executed and/or implemented by the base station and by specific functional modules of the base station and technical effects brought by the process steps and examples are similar to or more than technical effects of the foregoing HARQ-ACK transmission method, and for details, reference may be made to related descriptions of one or more of the foregoing embodiments, which are within the scope that is easy to be accordingly understood by persons skilled in the art and are not repeatedly described. In addition, in this embodiment, bundling is performed on HARQ-ACKs corresponding to two downlink subframes in the downlink subframe n−k, so that HARQ-ACKs can be sent by using an existing channel selection mechanism, and standardization efforts are saved. For a specific implementation process, reference may be made to related descriptions of one or more of the foregoing embodiments, and details are not repeatedly described herein.

In this embodiment, timing of an FDD serving cell is set by the user equipment, which resolves a problem that some downlink subframes on the FDD serving cell have no corresponding uplink subframe in which an HARQ-ACK is fed back, so that the base station can still send information to the user equipment in these downlink subframes, thereby improving a resource utilization rate.

Figure 7:
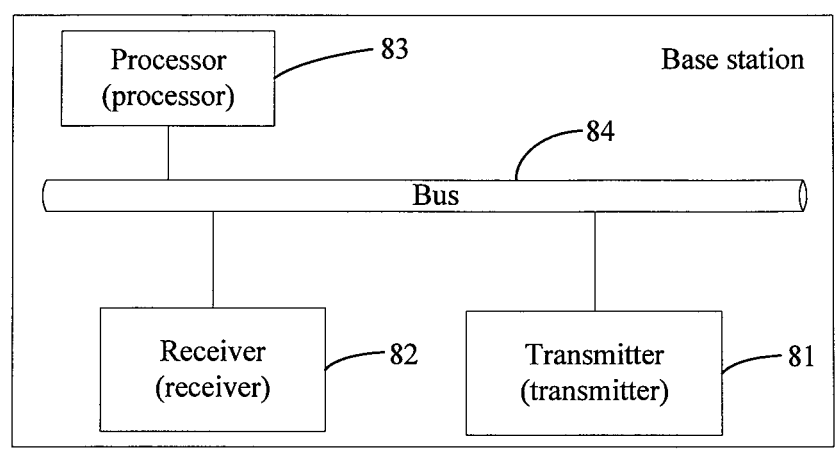
FIG. 7 is a module block diagram of a second embodiment of a base station according to an embodiment of the present invention.

Refer to FIG. 7 with reference to the foregoing embodiments. This embodiment provides a base station, where the base station includes, but is not limited to, a transmitter 81, a receiver 82, a processor 83, and a bus 84, and the transmitter 81, the receiver 82, and the processor 83 are connected by using the bus 84.

The transmitter 81 is configured to send, on a first serving cell and in a downlink subframe n−k, physical downlink shared channel PDSCH transmission or a downlink control channel that indicates downlink semi-persistent scheduling SPS release, to a user equipment, where the first serving cell is a serving cell corresponding to the user equipment, and a duplex mode of the first serving cell is frequency division duplex FDD, or all subframes on the first serving cell are downlink subframes, or one radio frame on the first serving cell includes nine downlink subframes and one special subframe, or the first serving cell is a supplemental downlink serving cell, or a duplex mode of the first serving cell is time division duplex TDD and all subframes on the first serving cell are downlink subframes, or a duplex mode of the first serving cell is time division duplex TDD and one radio frame on the first serving cell includes nine downlink subframes and one special subframe, or a duplex mode of the first serving cell is time division duplex TDD and an uplink-downlink configuration of the first serving cell is an uplink-downlink configuration 7.

The receiver 82 is configured to receive, in the uplink subframe n, an HARQ-ACK response that is corresponding to the first serving cell and the downlink subframe n−k and is fed back by the user equipment. The receiver 82 may be configured to receive, in the uplink subframe n and in a physical uplink control channel PUCCH format 1b channel selection manner, the HARQ-ACK response that is corresponding to the first serving cell and the downlink subframe n−k and is fed back by the user equipment.

The processor 83 is configured to determine a set K according to first HARQ-ACK timing, where n is an integer, k is a positive integer, and k belongs to the set K. The processor 83 may be configured to determine the first HARQ-ACK timing according to a reference uplink-downlink configuration of the first serving cell. Certainly, in another embodiment, the processor 83 may be configured to determine the first HARQ-ACK timing according to the reference uplink-downlink configuration of the first serving cell, where the reference uplink-downlink configuration of the first serving cell is an uplink-downlink configuration or a reference uplink-downlink configuration of the second serving cell.

It should be noted that the processor 83 is specifically configured to:

when the reference uplink-downlink configuration of the first serving cell is an uplink-downlink configuration 0, make the uplink subframe n correspond to a subframe 2, a subframe 3, a subframe 4, a subframe 7, a subframe 8, and a subframe 9 in one radio frame, and when the uplink subframe n is corresponding to a subframe 2 and a subframe 7 in one radio frame, make the set K include elements 6 and 5, for example, make the set K be {6, 5}, when the uplink subframe n is corresponding to a subframe 3 and a subframe 8 in one radio frame, make the set K include elements 5 and 4, for example, make the set K be {5, 4}, and when the uplink subframe n is corresponding to a subframe 4 and a subframe 9 in one radio frame, make the set K be {4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

alternatively, when the reference uplink-downlink configuration of the first serving cell is an uplink-downlink configuration 0, make the uplink subframe n correspond to a subframe 2, a subframe 3, a subframe 4, a subframe 7, a subframe 8, and a subframe 9 in one radio frame, and when the uplink subframe n is corresponding to a subframe 2 and a subframe 7 in one radio frame, make the set K include elements 6 and 5, for example, make the set K be {6, 5}, when the uplink subframe n is corresponding to a subframe 3 and a subframe 8 in one radio frame, make the set K be {5}, and when the uplink subframe n is corresponding to a subframe 4 and a subframe 9 in one radio frame, make the set K include elements 5 and 4, for example, make the set K be {5, 4};

alternatively, when the reference uplink-downlink configuration of the first serving cell is an uplink-downlink configuration 0, make the uplink subframe n correspond to a subframe 2, a subframe 4, a subframe 7, and a subframe 9 in one radio frame, and when the uplink subframe n is corresponding to a subframe 2 and a subframe 7 in one radio frame, make the set K include elements 6, 5, and 4, for example, make the set K be {6, 5, 4}, and when the uplink subframe n is corresponding to a subframe 4 and a subframe 9 in one radio frame, make the set K include elements 5 and 4, for example, make the set K be {5, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; on the other hand, a value of an element in the set K is enabled to be as small as possible, that is, it is ensured that a transmission delay of the first serving cell is as small as possible; and further, when this manner is applied to a scenario in which the first serving cell and the second serving cell are configured for the user equipment, an HARQ-ACK is transmitted only in an uplink subframe 2, a subframe 4, a subframe 7, and a subframe 9, that is, an HARQ-ACK of the first serving cell is transmitted only in an uplink subframe in which a corresponding HARQ-ACK of the second serving cell is also transmitted, so that both TPC fields in DCI corresponding to the two serving cells can be used for indicating both TPC and a PUCCH resource, and the HARQ-ACK transmission performance can be improved;

alternatively, when the reference uplink-downlink configuration of the first serving cell is an uplink-downlink configuration 0, make the uplink subframe n correspond to a subframe 2, a subframe 4, a subframe 7, and a subframe 9 in one radio frame, and when the uplink subframe n is corresponding to a subframe 2 and a subframe 7 in one radio frame, make the set K include elements 10, 9, and 6, for example, make the set K be {10, 9, 6}, when the uplink subframe n is corresponding to a subframe 4 and a subframe 9 in one radio frame, make the set K include elements 5 and 4, for example, make the set K be {5, 4}; where in this case, on the one hand, when this manner is applied to a scenario in which the first serving cell and the second serving cell are configured for the user equipment, an HARQ-ACK is transmitted only in an uplink subframe 2, a subframe 4, a subframe 7, and a subframe 9, that is, an HARQ-ACK of the first serving cell is transmitted only in an uplink subframe in which a corresponding HARQ-ACK of the second serving cell is also transmitted, so that both TPC fields in DCI corresponding to the two serving cells can be used for indicating both TPC and a PUCCH resource, and the HARQ-ACK transmission performance can be improved; and on the other hand, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH;

alternatively, when the reference uplink-downlink configuration of the first serving cell is an uplink-downlink configuration 0, make the uplink subframe n correspond to a subframe 2, a subframe 3, a subframe 4, a subframe 7, a subframe 8, and a subframe 9 in one radio frame, and when the uplink subframe n is corresponding to a subframe 2, a subframe 3, a subframe 7, and a subframe 8 in one radio frame, make the set K include elements 6 and 4, for example, make the set K be {6, 4}, and when the uplink subframe n is corresponding to a subframe 4 and a subframe 9 in one radio frame, make the set K be {4}, where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

when the reference uplink-downlink configuration of the first serving cell is an uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K include elements 7, 6, and 5, for example, make the set K be {7, 6, 5}, and when the uplink subframe n is corresponding to a subframe 3 and a subframe 8 in one radio frame, make the set K include elements 5 and 4, for example, make the set K be {5, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

alternatively, when the reference uplink-downlink configuration of the first serving cell is an uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K include elements 9, 7, and 6, for example, make the set K be {9, 7, 6}, and when the uplink subframe n is corresponding to a subframe 3 and a subframe 8 in one radio frame, make the set K include elements 6 and 4, for example, make the set K be {6, 4}, where in this case, when this manner is applied to a scenario in which the first serving cell and the second serving cell are configured for the user equipment, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH;

alternatively, when the reference uplink-downlink configuration of the first serving cell is an uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K include elements 7, 6, and 4, for example, make the set K be {7, 6, 4}, and when the uplink subframe n is corresponding to a subframe 3 and a subframe 8 in one radio frame, make the set K include elements 6 and 4, for example, make the set K be {6, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

when the reference uplink-downlink configuration of the first serving cell is an uplink-downlink configuration 2, make the uplink subframe n correspond to a subframe 2 and a subframe 7 in one radio frame, and make the set K include elements 8, 7, 6, 5, and 4, for example, make the set K be {8, 7, 6, 5, 4}, where in this case, a value of an element in the set K is enabled to be as small as possible, that is, it is ensured that a transmission delay of the first serving cell is as small as possible;

when the reference uplink-downlink configuration of the first serving cell is an uplink-downlink configuration 3, make the uplink subframe n correspond to a subframe 2, a subframe 3, and a subframe 4 in one radio frame, and when the uplink subframe n is corresponding to a subframe 2 in one radio frame, make the set K include elements 11, 10, 7, and 6, for example, make the set K be {11, 10, 7, 6}, when the uplink subframe n is corresponding to a subframe 3 in one radio frame, make the set K include elements 10, 6, and 5, for example, make the set K be {10, 6, 5}, and when the uplink subframe n is corresponding to a subframe 4 in one radio frame, make the set K include elements 10, 5, and 4, for example, make the set K be {10, 5, 4}, where in this case, a value of an element in the set K is enabled to be as small as possible, that is, it is ensured that a transmission delay of the first serving cell is as small as possible;

alternatively, when the reference uplink-downlink configuration of the first serving cell is an uplink-downlink configuration 3, make the uplink subframe n correspond to a subframe 2, a subframe 3, and a subframe 4 in one radio frame, and when the uplink subframe n is corresponding to a subframe 2 in one radio frame, make the set K include elements 11, 10, 9, and 8, for example, make the set K be {11, 10, 9, 8} or {10, 9, 8, 11}, when the uplink subframe n is corresponding to a subframe 3 in one radio frame, make the set K include elements 8, 7, and 6, for example, make the set K be {8, 7, 6}, and when the uplink subframe n is corresponding to a subframe 4 in one radio frame, make the set K include elements 6, 5, and 4, for example, make the set K be {6, 5, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided;

alternatively, when the reference uplink-downlink configuration of the first serving cell is an uplink-downlink configuration 3, make the uplink subframe n correspond to a subframe 2, a subframe 3, and a subframe 4 in one radio frame, and when the uplink subframe n is corresponding to a subframe 2 in one radio frame, make the set K include elements 11, 10, and 9, for example, make the set K be {11, 10, 9} or {10, 9, 11}, when the uplink subframe n is corresponding to a subframe 3 in one radio frame, make the set K include elements 9, 8, 7, and 6, for example, make the set K be {9, 8, 7, 6}, and when the uplink subframe n is corresponding to a subframe 4 in one radio frame, make the set K include elements 6, 5, and 4, for example, make the set K be {6, 5, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided;

when the reference uplink-downlink configuration of the first serving cell is an uplink-downlink configuration 4, make the uplink subframe n correspond to a subframe 2 and a subframe 3 in one radio frame, and when the uplink subframe n is corresponding to a subframe 2 in one radio frame, make the set K include elements 12, 11, 10, 8, and 7, for example, make the set K be {12, 11, 10, 8, 7}, and when the uplink subframe n is corresponding to a subframe 3 in one radio frame, make the set K include elements 10, 7, 6, 5, and 4, for example, make the set K be {10, 7, 6, 5, 4}, where in this case, a value of an element in the set K is enabled to be as small as possible, that is, it is ensured that a transmission delay of the first serving cell is as small as possible;

alternatively, when the reference uplink-downlink configuration of the first serving cell is an uplink-downlink configuration 4, make the uplink subframe n correspond to a subframe 2 and a subframe 3 in one radio frame, and when the uplink subframe n is corresponding to a subframe 2 in one radio frame, make the set K include elements 12, 11, 10, 9, and 8, for example, make the set K be {12, 11, 10, 9, 8} or {12, 10, 9, 8, 11}, and when the uplink subframe n is corresponding to a subframe 3 in one radio frame, make the set K include elements 8, 7, 6, 5, and 4, for example, make the set K be {8, 7, 6, 5, 4}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a problem that an HARQ-ACK corresponding to a PDSCH that is scheduled first is not fed back first may be avoided;

when the reference uplink-downlink configuration of the first serving cell is an uplink-downlink configuration 5, make the uplink subframe n correspond to a subframe 2 in one radio frame, and make the set K include elements 13, 12, 11, 10, 9, 8, 7, 6, 5, and 4, for example, make the set K be {13, 12, 11, 10, 9, 8, 7, 6, 5, 4};

when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, and a subframe 7 in one radio frame, make the set K include elements 7 and 5, for example, make the set K be {7, 5}, when the uplink subframe n is corresponding to a subframe 4 in one radio frame, make the set K be {5}, and when the uplink subframe n is corresponding to a subframe 8 in one radio frame, make the set K include elements 7, 5, and 4, for example, make the set K be {7, 5, 4}, where in this case, a value of an element in the set K is enabled to be as small as possible, that is, it is ensured that a transmission delay of the first serving cell is as small as possible;

alternatively, when the reference uplink-downlink configuration of the first serving cell is an uplink-downlink configuration 6, make the uplink subframe n correspond to a subframe 2, a subframe 3, and a subframe 4, a subframe 7, and a subframe 8 in one radio frame, and when the uplink subframe n is corresponding to a subframe 2 in one radio frame, make the set K include elements 8 and 7, for example, make the set K be {8, 7}, when the uplink subframe n is corresponding to a subframe 3 and a subframe 7 in one radio frame, make the set K include elements 7 and 6, for example, make the set K be {7, 6}, and when the uplink subframe n is corresponding to a subframe 4 and a subframe 8 in one radio frame, make the set K include elements 6 and 5, for example, make the set K be {6, 5}; where in this case, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

alternatively, when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, a subframe 7, and a subframe 8 in one radio frame, make the set K include elements 10 and 7, for example, make the set K be {10, 7}, and when the uplink subframe n is corresponding to a subframe 4 in one radio frame, make the set K include elements 10 and 5, for example, make the set K be {10, 5}, where in this case, when this manner is applied to a scenario in which the first serving cell and the second serving cell are configured for the user equipment, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH;

alternatively, when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, and a subframe 4 in one radio frame, make the set K include elements 7 and 4, for example, make the set K be {7, 4}, and when the uplink subframe n is corresponding to a subframe 7 and an uplink subframe 8 that are in one radio frame, make the set K include elements 6 and 5, for example, make the set K be {6, 5}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; and on the other hand, a value of an element in the set K is enabled to be as small as possible, that is, it is ensured that a transmission delay of the first serving cell is as small as possible;

alternatively, when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2 in one radio frame, make the set K include elements 10 and 9, for example, make the set K be {10, 9}, when the uplink subframe n is corresponding to a subframe 3 in one radio frame, make the set K include elements 9 and 8, for example, make the set K be {9, 8}, when the uplink subframe n is corresponding to a subframe 4 in one radio frame, make the set K include elements 8 and 7, for example, make the set K be {8, 7}, when the uplink subframe n is corresponding to a subframe 7 in one radio frame, make the set K include elements 9 and 8, for example, make the set K be {9, 8}, when the uplink subframe n is corresponding to a subframe 8 in one radio frame, make the set K include elements 8 and 7, for example, make the set K be {8, 7}; where in this case, on the one hand, HARQ-ACKs corresponding to multiple downlink subframes of the first serving cell are distributed as evenly as possible to available uplink subframes for transmission, so that HARQ-ACK feedback load of multiple uplink subframes is relatively balanced, thereby helping to improve HARQ-ACK transmission performance; on the other hand, a problem that an HARQ-ACK corresponding to a PDSCH that is scheduled first is not fed back first may be avoided; and further, it can be ensured that a smallest value of elements in a set K corresponding to the first serving cell is the same as a smallest value of elements in a set K corresponding to the second serving cell, so that when an HARQ-ACK is transmitted on a PUSCH, a DAI field in a DCI format corresponding to the PUSCH can accurately indicate that a maximum number of downlink subframes, in which a PDSCH or PDCCH SPS release is scheduled, of the two serving cells, and therefore, for an HARQ-ACK, waste of a PUSCH resource caused by transmitting an invalid HARQ-ACK bit may be avoided on the PUSCH.

It should be noted that, in another embodiment, the transmitter 81 is further configured to send, on a second serving cell and in a downlink subframe n−k1, PDSCH transmission or a downlink control channel that indicates downlink SPS release, to the user equipment, where the second serving cell is a serving cell corresponding to the user equipment, and a duplex mode of the second serving cell is frequency division duplex TDD; correspondingly, the receiver 82 is further configured to receive, in the uplink subframe n, an HARQ-ACK response that is corresponding to the second serving cell and the downlink subframe n−k1 and is fed back by the user equipment; and similarly, the processor 83 is further configured to determine second HARQ-ACK timing according to the uplink-downlink configuration or the reference uplink-downlink configuration of the second serving cell, and determine a set K1 according to the second HARQ-ACK timing, where k1 is a positive integer, k1 belongs to the set K1, and preferably, the set K includes at least one element that does not belong to the set K1.

In this embodiment, the first serving cell is a secondary serving cell of the user equipment, and the second serving cell is a primary serving cell of the user equipment; where the receiver 82 may further be configured to receive, on the second serving cell and in the uplink subframe n, the HARQ-ACK response that is corresponding to the first serving cell and the downlink subframe n−k and is fed back by the user equipment. Further, with reference to related descriptions in the foregoing Example 5, the receiver 82 may further be configured to: when in the uplink subframe n the user equipment needs to transmit only an HARQ-ACK response corresponding to the first serving cell, receive, in the uplink subframe n and in a PUCCH format 1b channel selection manner that is corresponded to when a single serving cell is configured for the UE in an existing LTE system, the HARQ-ACK response that is corresponding to the first serving cell and the downlink subframe n−k and is fed back by the user equipment, and when in the uplink subframe n the user equipment needs to transmit the HARQ-ACK response corresponding to the first serving cell and an HARQ-ACK response corresponding to the second serving cell, receive, in the uplink subframe n and in a PUCCH format 1b channel selection manner that is corresponded to when two serving cells are configured for the UE in the existing LTE system, the HARQ-ACK response that is corresponding to the first serving cell and the downlink subframe n−k and is fed back by the user equipment. For example, when an uplink-downlink configuration of the second serving cell configured for the user equipment is an uplink-downlink configuration 0, or when a reference uplink-downlink configuration of the second serving cell configured for the user equipment is an uplink-downlink configuration 0, further, the receiver 82 may further be configured to: when the uplink subframe n is corresponding to a subframe 2, a subframe 4, a subframe 7, and a subframe 9 in one radio frame, receive, in the uplink subframe n and in the PUCCH format 1b channel selection manner that is corresponded to when a single serving cell is configured for the UE in the existing LTE system, the HARQ-ACK response that is corresponding to the first serving cell and the downlink subframe n−k and is fed back by the user equipment; and when the uplink subframe n is corresponding to a subframe 3 and a subframe 8 in one radio frame, receive, in the uplink subframe n and in the PUCCH format 1b channel selection manner that is corresponded to when two serving cells are configured for the UE in the existing LTE system, the HARQ-ACK response that is corresponding to the first serving cell and the downlink subframe n−k and is fed back by the user equipment. Other descriptions are like those in Example 6 and are not repeated herein.

As described in a related embodiment of the foregoing transmission method, in another embodiment, the receiver 82 is further configured to receive, in the uplink subframe n, the HARQ-ACK response that is corresponding to the first serving cell and the downlink subframe n−k and is fed back by the user equipment, and determine, according to a manner in which HARQ-ACK bundling is performed on an HARQ-ACK response corresponding to the first serving cell and a downlink subframe $n-k_{M-2}$ in the downlink subframe n−k and an HARQ-ACK response corresponding to the first serving cell and a downlink subframe $n-k_{M-1}$ in the downlink subframe n−k, an HARQ-ACK response corresponding to the first serving cell and each downlink subframe in the downlink subframe n−k. If in the downlink subframe $n-k_{M-2}$ and the downlink subframe $n-k_{M-1}$, the transmitter 81 sends, on the first serving cell and only in the downlink subframe $n-k_{M-2}$ or only in the downlink subframe $n-k_{M-1}$, a downlink control channel to the user equipment, a value of a transmit power control TPC field in a downlink control information DCI format carried on the downlink control channel sent, on the first serving cell and only in the downlink subframe $n-k_{M-2}$ or only in the downlink subframe $n-k_{M-1}$, to the user equipment is a first value; and if in the downlink subframe $n-k_{M-2}$ and the downlink subframe $n-k_{M-1}$, the transmitter 81 sends, on the first serving cell and in both the downlink subframe $n-k_{M-2}$ and the downlink subframe $n-k_{M-1}$, a downlink control channel to the user equipment, and values of TPC fields in DCI formats that are carried on the downlink control channel which is sent to the user equipment on the first serving cell and in the downlink subframe $n-k_{M-2}$, and carried on the downlink control channel which is sent to the user equipment on the first serving cell and in the downlink subframe $n-k_{M-1}$, are a second value, where the first value is unequal to the second value.

The first value is corresponding to a first physical uplink control channel PUCCH resource, the second value is corresponding to a second physical uplink control channel PUCCH resource, and the first PUCCH resource and the second PUCCH resource are PUCCH resources configured for the user equipment. In addition, the first PUCCH resource and/or the second PUCCH resource each includes at least two PUCCH resources.

As described above, the downlink control channel is an EPDCCH, the downlink control channel is used for indicating the PDSCH transmission or used for indicating the downlink SPS release, an HARQ-ACK resource offset field in the DCI format carried on the downlink control channel is used as a DAI field, and the DAI is used for indicating an accumulative number of downlink control channels in the downlink subframe n−k.

It should be noted that, in this embodiment, process steps and examples executed and/or implemented by the base station and by specific functional modules of the base station and technical effects brought by the process steps and examples are similar to or more than technical effects of the foregoing HARQ-ACK transmission method, and for details, reference may be made to related descriptions of one or more of the foregoing embodiments, which are within the scope that is easy to be accordingly understood by persons skilled in the art and are not repeatedly described. In addition, in this embodiment, bundling is performed on HARQ-ACKs corresponding to two downlink subframes in the downlink subframe n−k, so that HARQ-ACKs can be sent by using an existing channel selection mechanism, and standardization efforts are saved. For a specific implementation process, reference may be made to related descriptions of one or more of the foregoing embodiments, and details are not repeatedly described herein.

In this embodiment, timing of an FDD serving cell is set by the user equipment, which resolves a problem that some downlink subframes in the FDD serving cell have no corresponding uplink subframe in which an HARQ-ACK is fed back, so that the base station can still send information to the user equipment in these downlink subframes, thereby improving a resource utilization rate.

In the several embodiments provided in the present invention, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely embodiments of the present invention, and the protection scope of the present invention is not limited thereto. All equivalent structure or process changes enabled to be according to the content of this specification and accompanying drawings in the present invention or by directly or indirectly applying the present invention in other related technical fields shall fall within the protection scope of the present invention.

What is claimed is:

1. A hybrid automatic repeat request acknowledgement transmission method, comprising:
   receiving, by a user equipment, on a first serving cell and in a downlink subframe n−k, physical downlink shared channel (PDSCH) transmission or a downlink control channel that indicates downlink semi-persistent scheduling (SPS) release, wherein the first serving cell is a serving cell corresponding to the user equipment, and a duplex mode of the first serving cell is frequency division duplex (FDD), or all subframes on the first serving cell are downlink subframes, or one radio frame on the first serving cell comprises nine downlink subframes and one special subframe; and
   transmitting, by the user equipment in an uplink subframe n, a hybrid automatic repeat request acknowledgement (HARQ-ACK) response corresponding to the first serving cell and the downlink subframe n−k, wherein n is an integer, k is a positive integer, k belongs to a set K, and the set K is determined according to first HARQ-ACK timing; and
   wherein the first HARQ-ACK timing is determined according to a reference uplink-downlink configuration of the first serving cell; and
   further comprising:
   when the reference uplink-downlink configuration of the first serving cell is an uplink-downlink configuration 0, the uplink subframe n is corresponding to a subframe 2, a subframe 3, a subframe 4, a subframe 7, a subframe 8, and a subframe 9 in one radio frame, and when the uplink subframe n is corresponding to a subframe 2 and a subframe 7 in one radio frame, the set K is {6, 5}, when the uplink subframe n is corresponding to a subframe 3 and a subframe 8 in one radio frame, the set K is {5, 4}, and when the uplink subframe n is corresponding to a subframe 4 and a subframe 9 in one radio frame, the set K is {4}; or when the reference uplink-downlink configuration of the first serving cell is an uplink-downlink configuration 0, the uplink subframe n is corresponding to a subframe 2, a subframe 4, a subframe 7, and a subframe 9 in one radio frame, and when the uplink subframe n is corresponding to a subframe 2 and a subframe 7 in one radio frame, the set K is {10, 9, 6}, and when the uplink subframe n is corresponding to a subframe 4 and a subframe 9 in one radio frame, the set K is {5, 4};
   when the reference uplink-downlink configuration of the first serving cell is an uplink-downlink configuration 1, the uplink subframe n is corresponding to a subframe 2, a subframe 3, a subframe 7, and a subframe 8 in one radio frame, and when the uplink subframe n is corresponding to a subframe 2 and a subframe 7 in one radio frame, the set K is {7, 6, 5}, and when the uplink subframe n is corresponding to a subframe 3 and a subframe 8 in one radio frame, the set K is {5, 4}; or when the reference uplink-downlink configuration of the first serving cell is an uplink-downlink configuration 1, the uplink subframe n is corresponding to a subframe 2, a subframe 3, a subframe 7, and a subframe 8 in one radio frame, and when the uplink subframe n is corresponding to a subframe 2 and a subframe 7 in one radio frame, the set K is {9, 7, 6}, and when the uplink subframe n is corresponding to a subframe 3 and a subframe 8 in one radio frame, the set K is {6, 4};
   when the reference uplink-downlink configuration of the first serving cell is an uplink-downlink configuration 2, the uplink subframe n is corresponding to a subframe 2 and a subframe 7 in one radio frame, and the set K is {8, 7, 6, 5, 4};

when the reference uplink-downlink configuration of the first serving cell is an uplink-downlink configuration 3, the uplink subframe n is corresponding to a subframe 2, a subframe 3, and a subframe 4 in one radio frame, and when the uplink subframe n is corresponding to a subframe 2 in one radio frame, the set K is {11, 10, 7, 6}, when the uplink subframe n is corresponding to a subframe 3 in one radio frame, the set K is {10, 6, 5}, and when the uplink subframe n is corresponding to a subframe 4 in one radio frame, the set K is {10, 5, 4};

when the reference uplink-downlink configuration of the first serving cell is an uplink-downlink configuration 4, the uplink subframe n is corresponding to a subframe 2 and a subframe 3 in one radio frame, and when the uplink subframe n is corresponding to a subframe 2 in one radio frame, the set K is {12, 11, 10, 8, 7}, and when the uplink subframe n is corresponding to a subframe 3 in one radio frame, the set K is {10, 7, 6, 5, 4};

when the reference uplink-downlink configuration of the first serving cell is an uplink-downlink configuration 5, the uplink subframe n is corresponding to a subframe 2 in one radio frame, and the set K is {13, 12, 11, 10, 9, 8, 7, 6, 5, 4}; and when the reference uplink-downlink configuration of the first serving cell is an uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2, a subframe 3, and a subframe 7 in one radio frame, the set K is {7, 5}, when the uplink subframe n is corresponding to a subframe 4 in one radio frame, the set K is {5}, and when the uplink subframe n is corresponding to a subframe 8 in one radio frame, the set K is {7, 5, 4}; or when the reference uplink-downlink configuration of the first serving cell is an uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2, a subframe 3, a subframe 7, and a subframe 8 in one radio frame, the set K is {10, 7}, and when the uplink subframe n is corresponding to a subframe 4 in one radio frame, the set K is {10, 5}.

2. A hybrid automatic repeat request acknowledgement transmission method, comprising:

receiving, by a user equipment, on a first serving cell and in a downlink subframe n–k, physical downlink shared channel (PDSCH) transmission or a downlink control channel that indicates downlink semi-persistent scheduling (SPS) release, wherein the first serving cell is a serving cell corresponding to the user equipment, and a duplex mode of the first serving cell is frequency division duplex (FDD), or all subframes on the first serving cell are downlink subframes, or one radio frame on the first serving cell comprises nine downlink subframes and one special subframe; and transmitting, by the user equipment in an uplink subframe n, a hybrid automatic repeat request acknowledgement (HARQ-ACK) response corresponding to the first serving cell and the downlink subframe n–k, wherein n is an integer, k is a positive integer, k belongs to a set K, and the set K is determined according to first HARQ-ACK timing;

wherein before transmitting, by the user equipment in an uplink subframe n, an HARQ-ACK response corresponding to the first serving cell and the downlink subframe n–k, the method further comprises:

performing, by the user equipment, HARQ-ACK bundling on an HARQ-ACK response corresponding to the first serving cell and a downlink subframe $n-k_{M-2}$ in the downlink subframe n–k and an HARQ-ACK response corresponding to the first serving cell and a downlink subframe $n-k_{M-1}$ in the downlink subframe n–k, so as to obtain a bundled HARQ-ACK response corresponding to the first serving cell, the downlink subframe $n-k_{M-2}$, and the downlink subframe $n-k_{M-1}$, wherein $k_{M-2}$ and $k_{M-1}$ are last two elements in the set K, and M is the number of elements in the set K; and determining, by the user equipment according to the bundled HARQ-ACK response corresponding to the first serving cell, the downlink subframe $n-k_{M-2}$, and the downlink subframe $n-k_{M-1}$, the HARQ-ACK response that is corresponding to the first serving cell and the downlink subframe n–k and is transmitted in the uplink subframe n.

3. The transmission method according to claim 2, wherein performing, by the user equipment, HARQ-ACK bundling on an HARQ-ACK response corresponding to the first serving cell and a downlink subframe $n-k_{M-2}$ in the downlink subframe n–k and an HARQ-ACK response corresponding to the first serving cell and a downlink subframe $n-k_{M-1}$ in the downlink subframe n–k, so as to obtain a bundled HARQ-ACK response corresponding to the first serving cell, the downlink subframe $n-k_{M-2}$, and the downlink subframe $n-k_{M-1}$ comprises:

performing, by the user equipment according to a value of a transmit power control (TPC) field in a downlink control information (DCI) format detected in the downlink subframe $n-k_{M-2}$ and/or the downlink subframe $n-k_{M-1}$, the HARQ-ACK bundling on the HARQ-ACK response corresponding to the first serving cell and the downlink subframe $n-k_{M-2}$ and the HARQ-ACK response corresponding to the first serving cell and the downlink subframe $n-k_{M-1}$, so as to obtain the bundled HARQ-ACK response corresponding to the first serving cell, the downlink subframe $n-k_{M-2}$, and the downlink subframe $n-k_{M-1}$.

4. The transmission method according to claim 3, wherein:

if the user equipment detects the DCI format in both the downlink subframe $n-k_{M-2}$ and the downlink subframe $n-k_{M-1}$, the value of the TPC field in the DCI format detected in the downlink subframe $n-k_{M-2}$ is the same as the value of the TPC field in the DCI format detected in the downlink subframe $n-k_{M-1}$.

5. The transmission method according to claim 3, wherein performing, by the user equipment according to a value of a TPC field in a DCI format detected in the downlink subframe $n-k_{M-2}$ and/or the downlink subframe $n-k_{M-1}$, the HARQ-ACK bundling on the HARQ-ACK response corresponding to the first serving cell and the downlink subframe $n-k_{M-2}$ and the HARQ-ACK response corresponding to the first serving cell and the downlink subframe $n-k_{M-1}$, so as to obtain the bundled HARQ-ACK response corresponding to the first serving cell, the downlink subframe $n-k_{M-2}$, and the downlink subframe $n-k_{M-1}$ comprises:

if the user equipment detects the DCI format only in the downlink subframe $n-k_{M-2}$, and the value of the TPC field in the DCI format is a first value, the bundled HARQ-ACK response corresponding to the first serving cell, the downlink subframe $n-k_{M-2}$, and the downlink subframe $n-k_{M-1}$ is the HARQ-ACK response corresponding to the first serving cell and the downlink subframe $n-k_{M-2}$;

if the user equipment detects the DCI format only in the downlink subframe $n-k_{M-1}$, and the value of the TPC field in the DCI format is a first value, the bundled HARQ-ACK response corresponding to the first serving cell, the downlink subframe $n-k_{M-2}$ and the downlink subframe $n-k_{M-1}$ is the HARQ-ACK response corresponding to the first serving cell and the downlink subframe $n-k_{M-2}$;

if the user equipment detects the DCI format only in the downlink subframe $n-k_{M-2}$, and the value of the TPC field in the DCI format is a second value, the bundled HARQ-ACK response corresponding to the first serving cell, the downlink subframe $n-k_{M-2}$, and the downlink subframe $n-k_{M-1}$ is discontinuous transmission (DTX);

if the user equipment detects the DCI format only in the downlink subframe $n-k_{M-1}$, and the value of the TPC field in the DCI format is a second value, the bundled HARQ-ACK response corresponding to the first serving cell, the downlink subframe $n-k_{M-2}$, and the downlink subframe $n-k_{M-1}$ is DTX; and wherein the first value is corresponding to a first physical uplink control channel (PUCCH) resource, the second value is corresponding to a second physical uplink control channel PUCCH resource, and the first PUCCH resource and the second PUCCH resource are PUCCH resources configured for the user equipment; the first value is unequal to the second value.

6. A user equipment, comprising:

a receiver configured to receive, on a first serving cell and in a downlink subframe n−k, physical downlink shared channel (PDSCH) transmission or a downlink control channel that indicates downlink semi-persistent scheduling (SPS) release, wherein the first serving cell is a serving cell corresponding to the user equipment, and a duplex mode of the first serving cell is frequency division duplex (FDD), or all subframes on the first serving cell are downlink subframes, or one radio frame on the first serving cell comprises nine downlink subframes and one special subframe;

a transmitter configured to transmit, in an uplink subframe n, a hybrid automatic repeat request acknowledgement (HARQ-ACK) response corresponding to the first serving cell and the downlink subframe n−k; and a processors configured to determine a set K according to first HARQ-ACK timing, wherein n is an integer, k is a positive integer, and k belongs to the set K; and wherein:

the receiver is further configured to receive, on a second serving cell and in a downlink subframe n−k1, PDSCH transmission or a downlink control channel that indicates downlink SPS release, wherein the second serving cell is a serving cell corresponding to the user equipment, and a duplex mode of the second serving cell is time division duplex (TDD);

the transmitter is further configured to transmit, in the uplink subframe n, an HARQ-ACK response corresponding to the second serving cell and the downlink subframe n−k1; and the processor is further configured to: determine second HARQ-ACK timing according to an uplink-downlink configuration or a reference uplink-downlink configuration of the second serving cell, and determine a set K1 according to the second HARQ-ACK timing, wherein k1 is a positive integer, and k1 belongs to the set K1; and wherein the processor is configured to:

when the reference uplink-downlink configuration of the first serving cell is an uplink-downlink configuration 0, make the uplink subframe n correspond to a subframe 2, a subframe 3, a subframe 4, a subframe 7, a subframe 8, and a subframe 9 in one radio frame, and when the uplink subframe n is corresponding to a subframe 2 and a subframe 7 in one radio frame, make the set K be {6, 5}, when the uplink subframe n is corresponding to a subframe 3 and a subframe 8 in one radio frame, make the set K be {5, 4}, and when the uplink subframe n is corresponding to a subframe 4 and a subframe 9 in one radio frame, make the set K be {4}; or when the reference uplink-downlink configuration of the first serving cell is an uplink-downlink configuration 0, make the uplink subframe n correspond to a subframe 2, a subframe 4, a subframe 7, and a subframe 9 in one radio frame, and when the uplink subframe n is corresponding to a subframe 2 and a subframe 7 in one radio frame, make the set K be {10, 9, 6}, and when the uplink subframe n is corresponding to a subframe 4 and a subframe 9 in one radio frame, make the set K be {5, 4};

when the reference uplink-downlink configuration of the first serving cell is an uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K be {7, 6, 5}, and when the uplink subframe n is corresponding to a subframe 3 and a subframe 8 in one radio frame, make the set K be {5, 4}; or when the reference uplink-downlink configuration of the first serving cell is an uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K be {9, 7, 6}, and when the uplink subframe n is corresponding to a subframe 3 and a subframe 8 in one radio frame, make the set K be {6, 4};

when the reference uplink-downlink configuration of the first serving cell is an uplink-downlink configuration 2, make the uplink subframe n correspond to a subframe 2 and a subframe 7 in one radio frame, and make the set K be {8, 7, 6, 5, 4};

when the reference uplink-downlink configuration of the first serving cell is an uplink-downlink configuration 3, make the uplink subframe n correspond to a subframe 2, a subframe 3, and a subframe 4 in one radio frame, and when the uplink subframe n is corresponding to a subframe 2 in one radio frame, make the set K be {11, 10, 7, 6}, when the uplink subframe n is corresponding to a subframe 3 in one radio frame, make the set K be {10, 6, 5}, and when the uplink subframe n is corresponding to a subframe 4 in one radio frame, make the set K be {10, 5, 4};

when the reference uplink-downlink configuration of the first serving cell is an uplink-downlink configuration 4, make the uplink subframe n correspond to a subframe 2 and a subframe 3 in one radio frame, and when the uplink subframe n is corresponding to a subframe 2 in one radio frame, make the set K be {12, 11, 10, 8, 7}, and when the uplink subframe n is corresponding to a subframe 3 in one radio frame, make the set K be {10, 7, 6, 5, 4};

when the reference uplink-downlink configuration of the first serving cell is an uplink-downlink configuration 5, make the uplink subframe n correspond to a subframe 2 in one radio frame, and make the set K be {13, 12, 11, 10, 9, 8, 7, 6, 5, 4}; and when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, and a subframe 7 in one radio frame, make the set K be {7, 5}, when the uplink subframe n is corresponding to a subframe 4 in one radio frame, make the set K be {5}, and when the uplink subframe n is corresponding to a subframe 8 in one radio frame, make the set K be {7, 5, 4}; or when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, a subframe 7, and a subframe 8 in one radio frame, make the set K be {10, 7}, and when the uplink subframe n is corresponding to a subframe 4 in one radio frame, make the set K be {10, 5}.

7. A hybrid automatic repeat request acknowledgement transmission method, comprising:
  sending, by a base station, on a first serving cell and in a downlink subframe physical downlink shared channel (PDSCH) transmission or a downlink control channel that indicates downlink semi-persistent scheduling (SPS) release, to a user equipment, wherein the first serving cell is a serving cell corresponding to the user equipment, and a duplex mode of the first serving cell is frequency division duplex (FDD), or all subframes on the first serving cell are downlink subframes, or one radio frame on the first serving cell comprises nine downlink subframes and one special subframe; and
  receiving, by the base station in an uplink subframe n, a hybrid automatic repeat request acknowledgement HARQ-ACK response that is corresponding to the first serving cell and the downlink subframe n−k and is fed back by the user equipment;
  wherein n is an integer, k is a positive integer, k belongs to a set K, and the set K is determined according to first HARQ-ACK timing; and
  wherein the first HARQ-ACK timing is determined according to a reference uplink-downlink configuration of the first serving cell; and
  further comprising:
  when the reference uplink-downlink configuration of the first serving cell is an uplink-downlink configuration 0, the uplink subframe n is corresponding to a subframe 2, a subframe 3, a subframe 4, a subframe 7, a subframe 8, and a subframe 9 in one radio frame, and when the uplink subframe n is corresponding to a subframe 2 and a subframe 7 in one radio frame, the set K is {6, 5}, when the uplink subframe n is corresponding to a subframe 3 and a subframe 8 in one radio frame, the set K is {5, 4}, and when the uplink subframe n is corresponding to a subframe 4 and a subframe 9 in one radio frame, the set K is {4}; or when the reference uplink-downlink configuration of the first serving cell is an uplink-downlink configuration 0, the uplink subframe n is corresponding to a subframe 2, a subframe 4, a subframe 7, and a subframe 9 in one radio frame, and when the uplink subframe n is corresponding to a subframe 2 and a subframe 7 in one radio frame, the set K is {10, 9, 6}, and when the uplink subframe n is corresponding to a subframe 4 and a subframe 9 in one radio frame, the set K is {5, 4};

when the reference uplink-downlink configuration of the first serving cell is an uplink-downlink configuration 1, the uplink subframe n is corresponding to a subframe 2, a subframe 3, a subframe 7, and a subframe 8 in one radio frame, and when the uplink subframe n is corresponding to a subframe 2 and a subframe 7 in one radio frame, the set K is {7, 6, 5}, and when the uplink subframe n is corresponding to a subframe 3 and a subframe 8 in one radio frame, the set K is {5, 4}; or when the reference uplink-downlink configuration of the first serving cell is an uplink-downlink configuration 1, the uplink subframe n is corresponding to a subframe 2, a subframe 3, a subframe 7, and a subframe 8 in one radio frame, and when the uplink subframe n is corresponding to a subframe 2 and a subframe 7 in one radio frame, the set K is {9, 7, 6}, and when the uplink subframe n is corresponding to a subframe 3 and a subframe 8 in one radio frame, the set K is {6, 4};

when the reference uplink-downlink configuration of the first serving cell is an uplink-downlink configuration 2, the uplink subframe n is corresponding to a subframe 2 and a subframe 7 in one radio frame, and the set K is {8, 7, 6, 5, 4};

when the reference uplink-downlink configuration of the first serving cell is an uplink-downlink configuration 3, the uplink subframe n is corresponding to a subframe 2, a subframe 3, and a subframe 4 in one radio frame, and when the uplink subframe n is corresponding to a subframe 2 in one radio frame, the set K is {11, 10, 7, 6}, when the uplink subframe n is corresponding to a subframe 3 in one radio frame, the set K is {10, 6, 5}, and when the uplink subframe n is corresponding to a subframe 4 in one radio frame, the set K is {10, 5, 4};

when the reference uplink-downlink configuration of the first serving cell is an uplink-downlink configuration 4, the uplink subframe n is corresponding to a subframe 2 and a subframe 3 in one radio frame, and when the uplink subframe n is corresponding to a subframe 2 in one radio frame, the set K is {12, 11, 10, 8, 7}, and when the uplink subframe n is corresponding to a subframe 3 in one radio frame, the set K is {10, 7, 6, 5, 4};

when the reference uplink-downlink configuration of the first serving cell is an uplink-downlink configuration 5, the uplink subframe n is corresponding to a subframe 2 in one radio frame, and the set K is {13, 12, 11, 10, 9, 8, 7, 6, 5, 4}; and when the reference uplink-downlink configuration of the first serving cell is an uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2, a subframe 3, and a subframe 7 in one radio frame, the set K is {7, 5}, when the uplink subframe n is corresponding to a subframe 4 in one radio frame, the set K is {5}, and when the uplink subframe n is corresponding to a subframe 8 in one radio frame, the set K is {7, 5, 4}; or when the reference uplink-downlink configuration of the first serving cell is an uplink-downlink configuration 6, the uplink subframe n is corresponding to a subframe 2, a subframe 3, a subframe 4, a subframe 7, and a subframe 8 in one radio frame, and when the uplink subframe n is corresponding to a subframe 2, a subframe 3, a subframe 7, and a subframe 8 in one radio frame, the set K is {10, 7}, and when the uplink subframe n is corresponding to a subframe 4 in one radio frame, the set K is {10, 5}.

8. A hybrid automatic repeat request acknowledgement transmission method, comprising:
sending, by a base station, on a first serving cell and in a downlink subframe n−k, physical downlink shared channel (PDSCH) transmission or a downlink control channel that indicates downlink semi-persistent scheduling (SPS) release, to a user equipment, wherein the first serving cell is a serving cell corresponding to the user equipment, and a duplex mode of the first serving cell is frequency division duplex (FDD), or all subframes on the first serving cell are downlink subframes, or one radio frame on the first serving cell comprises nine downlink subframes and one special subframe; and
receiving, by the base station in an uplink subframe n, a hybrid automatic repeat request acknowledgement HARQ-ACK response that is corresponding to the first serving cell and the downlink subframe n−k and is fed back by the user equipment;
wherein n is an integer, k is a positive integer, k belongs to a set K, and the set K is determined according to first HARQ-ACK timing; and
wherein:
receiving, by the base station in the uplink subframe n, an HARQ-ACK response that is corresponding to the first serving cell and the downlink subframe n−k and is fed back by the user equipment comprises:
receiving, by the base station in the uplink subframe n, the HARQ-ACK response that is corresponding to the first serving cell and the downlink subframe n−k and is fed back by the user equipment, and determining, according to a manner in which HARQ-ACK bundling is performed on an HARQ-ACK response corresponding to the first serving cell and a downlink subframe $n-k_{M-2}$ in the downlink subframe n−k and an HARQ-ACK response corresponding to the first serving cell and a downlink subframe $n-k_{M-1}$ in the downlink subframe n−k, an HARQ-ACK response corresponding to the first serving cell and each downlink subframe in the downlink subframe n−k; and
wherein if in the downlink subframe $n-k_{M-2}$ and the downlink subframe $n-k_{M-1}$, the base station sends, on the first serving cell and only in the downlink subframe $n-k_{M-2}$ or only in the downlink subframe $n-k_{M-1}$, a downlink control channel to the user equipment, a value of a transmit power control TPC field in a downlink control information DCI format carried on the downlink control channel sent to the user equipment on the first serving cell and only in the downlink subframe $n-k_{M-2}$ or only in the downlink subframe $n-k_{M-1}$ is a first value; and if in the downlink subframe $n-k_{M-2}$ and the downlink subframe $n-k_{M-1}$, the base station sends, on the first serving cell and in both the downlink subframe $n-k_{M-2}$ and the downlink subframe $n-k_{M-1}$, a downlink control channel to the user equipment, and values of TPC fields in DCI formats that are carried on the downlink control channel which is sent to the user equipment on the first serving cell and in the downlink subframe $n-k_{M-2}$, and carried on the downlink control channel which is sent to the user equipment on the first serving cell and in the downlink subframe $n-k_{M-1}$ are a second value, wherein the first value is corresponding to a first physical uplink control channel PUCCH resource, the second value is corresponding to a second physical uplink control channel PUCCH resource, and the first PUCCH resource and the second PUCCH resource are PUCCH resources configured for the user equipment, the first value is unequal to the second value.

9. A base station, comprising a transmitter, a receiver, and a processor, wherein:
a transmitter configured to send, on a first serving cell and in a downlink subframe n−k, physical downlink shared channel (PDSCH) transmission or a downlink control channel that indicates downlink semi-persistent scheduling (SPS) release, to a user equipment, wherein the first serving cell is a serving cell corresponding to the user equipment, and a duplex mode of the first serving cell is frequency division duplex (FDD), or all subframes on the first serving cell are downlink subframes, or one radio frame on the first serving cell comprises nine downlink subframes and one special subframe;
a receiver configured to receive, in the uplink subframe n, a hybrid automatic repeat request acknowledgement (HARQ-ACK) response that is corresponding to the first serving cell and the downlink subframe n−k and is fed back by the user equipment; and
a processor configured to determine a set K according to first HARQ-ACK timing, wherein n is an integer, k is a positive integer, and k belongs to the set K; and
wherein the processor is further configured to determine the first HARQ-ACK timing according to a reference uplink-downlink configuration of the first serving cell; and
wherein the processor is configured to:
when the reference uplink-downlink configuration of the first serving cell is an uplink-downlink configuration 0, make the uplink subframe n correspond to a subframe 2, a subframe 3, a subframe 4, a subframe 7, a subframe 8, and a subframe 9 in one radio frame, and when the uplink subframe n is corresponding to a subframe 2 and a subframe 7 in one radio frame, make the set K be {6, 5}, when the uplink subframe n is corresponding to a subframe 3 and a subframe 8 in one radio frame, make the set K be {5, 4}, and when the uplink subframe n is corresponding to a subframe 4 and a subframe 9 in one radio frame, make the set K be {4}; or when the reference uplink-downlink configuration of the first serving cell is an uplink-downlink configuration 0, make the uplink subframe n correspond to a subframe 2, a subframe 4, a subframe 7, and a subframe 9 in one radio frame, and when the uplink subframe n is corresponding to a subframe 2 and a subframe 7 in one radio frame, make the set K be {10, 9, 6}, and when the uplink subframe n is corresponding to a subframe 4 and a subframe 9 in one radio frame, make the set K be {5, 4};
when the reference uplink-downlink configuration of the first serving cell is an uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K be {7, 6, 5}, and when the uplink subframe n is corresponding to a subframe 3 and a subframe 8 in one radio frame, make the set K be {5, 4}; or when the reference uplink-downlink configuration of the first serving cell is an uplink-downlink configuration 1, make the uplink subframe n correspond to a subframe 2, a subframe 3, a subframe 7, and a subframe 8 in one radio frame, and when the uplink subframe n is corresponding to a subframe 2 and a subframe 7 in one radio frame, make the set K be {9, 7, 6}, and when the uplink subframe n is corresponding to a subframe 3 and a subframe 8 in one radio frame, make the set K be {6, 4};

when the reference uplink-downlink configuration of the first serving cell is an uplink-downlink configuration 2, make the uplink subframe n correspond to a subframe 2 and a subframe 7 in one radio frame, and make the set K be {8, 7, 6, 5, 4};

when the reference uplink-downlink configuration of the first serving cell is an uplink-downlink configuration 3, make the uplink subframe n correspond to a subframe 2, a subframe 3, and a subframe 4 in one radio frame, and when the uplink subframe n is corresponding to a subframe 2 in one radio frame, make the set K be {11, 10, 7, 6}, when the uplink subframe n is corresponding to a subframe 3 in one radio frame, make the set K be {10, 6, 5}, and when the uplink subframe n is corresponding to a subframe 4 in one radio frame, make the set K be {10, 5, 4};

when the reference uplink-downlink configuration of the first serving cell is an uplink-downlink configuration 4, make the uplink subframe n correspond to a subframe 2 and a subframe 3 in one radio frame, and when the uplink subframe n is corresponding to a subframe 2 in one radio frame, make the set K be {12, 11, 10, 8, 7}, and when the uplink subframe n is corresponding to a subframe 3 in one radio frame, make the set K be {10, 7, 6, 5, 4};

when the reference uplink-downlink configuration of the first serving cell is an uplink-downlink configuration 5, make the uplink subframe n correspond to a subframe 2 in one radio frame, and make the set K be {13, 12, 11, 10, 9, 8, 7, 6, 5, 4}; and when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, and a subframe 7 in one radio frame, make the set K be {7, 5}, when the uplink subframe n is corresponding to a subframe 4 in one radio frame, make the set K be {5}, and when the uplink subframe n is corresponding to a subframe 8 in one radio frame, make the set K be {7, 5, 4}; or when the reference uplink-downlink configuration of the first serving cell is an uplink-downlink configuration 6, make the uplink subframe n correspond to a subframe 2, a subframe 3, a subframe 4, a subframe 7, and a subframe 8 in one radio frame, and when the uplink subframe n is corresponding to a subframe 2, a subframe 3, a subframe 7, and a subframe 8 in one radio frame, make the set K be {10, 7}, and when the uplink subframe n is corresponding to a subframe 4 in one radio frame, make the set K be {10, 5}.

10. A base station, comprising a transmitter, a receiver, and a processor, wherein:

a transmitter configured to send, on a first serving cell and in a downlink subframe n−k, physical downlink shared channel (PDSCH) transmission or a downlink control channel that indicates downlink semi-persistent scheduling (SPS) release, to a user equipment, wherein the first serving cell is a serving cell corresponding to the user equipment, and a duplex mode of the first serving cell is frequency division duplex (FDD), or all subframes on the first serving cell are downlink subframes, or one radio frame on the first serving cell comprises nine downlink subframes and one special subframe;

a receiver configured to receive, in the uplink subframe n, a hybrid automatic repeat request acknowledgement (HARQ-ACK) response that is corresponding to the first serving cell and the downlink subframe n−k and is fed back by the user equipment; and a processor configured to determine a set K according to first HARQ-ACK timing, wherein n is an integer, k is a positive integer, and k belongs to the set K; and wherein the receiver is further configured to:

receive, in the uplink subframe n, the HARQ-ACK response that is corresponding to the first serving cell and the downlink subframe n−k and is fed back by the user equipment, and determine, according to a manner in which HARQ-ACK bundling is performed on an HARQ-ACK response corresponding to the first serving cell and a downlink subframe $n-k_{M-2}$ in the downlink subframe n−k and an HARQ-ACK response corresponding to the first serving cell and a downlink subframe $n-k_{M-1}$ in the downlink subframe n−k, an HARQ-ACK response corresponding to the first serving cell and each downlink subframe in the downlink subframe n−k; and wherein if in the downlink subframe $n-k_{M-2}$ and the downlink subframe $n-k_{M-1}$, the transmitter sends, on the first serving cell and only in the downlink subframe $n-k_{M-2}$ or only in the downlink subframe $n-k_{M-1}$, a downlink control channel to the user equipment, a value of a transmit power control TPC field in a downlink control information DCI format carried on the downlink control channel sent to the user equipment on the first serving cell and only in the downlink subframe $n-k_{M-2}$ or only in the downlink subframe $n-k_{M-1}$ is a first value; and if in the downlink subframe $n-k_{M-2}$ and the downlink subframe $n-k_{M-1}$, the transmitter sends, on the first serving cell and in both the downlink subframe $n-k_{M-2}$ and the downlink subframe $n-k_{M-1}$, a downlink control channel to the user equipment, and values of TPC fields in DCI formats that are carried on the downlink control channel which is sent to the user equipment on the first serving cell and in the downlink subframe $n-k_{M-2}$, and carried on the downlink control channel which is sent to the user equipment on the first serving cell and in the downlink subframe $n-k_{M-1}$ are a second value, wherein the first value is corresponding to a first physical uplink control channel PUCCH resource, the second value is corresponding to a second physical uplink control channel PUCCH resource, and the first PUCCH resource and the second PUCCH resource are PUCCH resources configured for the user equipment, the first value is unequal to the second value.

11. A user equipment, comprising:
a receiver configured to receive, on a first serving cell and in a downlink subframe n–k, physical downlink shared channel (PDSCH) transmission or a downlink control channel that indicates downlink semi-persistent scheduling (SPS) release, wherein the first serving cell is a serving cell corresponding to the user equipment, and a duplex mode of the first serving cell is frequency division duplex (FDD), or all subframes on the first serving cell are downlink subframes, or one radio frame on the first serving cell comprises nine downlink subframes and one special subframe;
a transmitter configured to transmit, in an uplink subframe n, a hybrid automatic repeat request acknowledgement (HARQ-ACK) response corresponding to the first serving cell and the downlink subframe n–k; and
a processor configured to determine a set K according to first HARQ-ACK timing, wherein n is an integer, k is a positive integer, and k belongs to the set K; and
wherein the processor is further configured to:
perform, before transmitting in the uplink subframe n, the HARQ-ACK response corresponding to the first serving cell and the downlink subframe n–k, HARQ-ACK bundling on an HARQ-ACK response corresponding to the first serving cell and a downlink subframe $n-k_{M-2}$ in the downlink subframe n–k and an HARQ-ACK response corresponding to the first serving cell and a downlink subframe $n-k_{M-1}$ in the downlink subframe n–k, so as to obtain a bundled HARQ-ACK response corresponding to the first serving cell, the downlink subframe $n-k_{M-2}$, and the downlink subframe $n-k_{M-1}$, wherein $k_{M-2}$ and $k_{M-1}$ are last two elements in the set K, and M is the number of elements in the set K; and
determine, according to the bundled HARQ-ACK response corresponding to the first serving cell, the downlink subframe $n-k_{M-2}$, and the downlink subframe $n-k_{M-1}$, the HARQ-ACK response that is corresponding to the first serving cell and the downlink subframe n–k and is transmitted in the uplink subframe n.

12. The user equipment according to claim 11, wherein the processor is further configured to perform HARQ-ACK bundling on an HARQ-ACK response corresponding to the first serving cell and a downlink subframe $n-k_{M-2}$ in the downlink subframe n–k and an HARQ-ACK response corresponding to the first serving cell and a downlink subframe $n-k_{M-1}$ in the downlink subframe n–k, so as to obtain a bundled HARQ-ACK response corresponding to the first serving cell, the downlink subframe $n-k_{M-2}$, and the downlink subframe $n-k_{M-1}$ comprises:
the processor is further configured to perform, according to a value of a transmit power control (TPC) field in a downlink control information (DCI) format detected in the downlink subframe $n-k_{M-2}$ and/or the downlink subframe $n-k_{M-1}$, the HARQ-ACK bundling on the HARQ-ACK response corresponding to the first serving cell and the downlink subframe $n-k_{M-2}$ and the HARQ-ACK response corresponding to the first serving cell and the downlink subframe $n-k_{M-1}$, so as to obtain the bundled HARQ-ACK response corresponding to the first serving cell, the downlink subframe $n-k_{M-2}$, and the downlink subframe $n-k_{M-1}$.

13. The user equipment according to claim 12, wherein the processor is further configured to:
if the processor detects the DCI format in both the downlink subframe $n-k_{M-2}$ and the downlink subframe $n-k_{M-1}$, the value of the TPC field in the DCI format detected in the downlink subframe $n-k_{M-2}$ is the same as the value of the TPC field in the DCI format detected in the downlink subframe $n-k_{M-1}$.

14. The user equipment according to claim 12, wherein the processor is further configured to perform, according to a value of a transmit power control (TPC) field in a downlink control information (DCI) format detected in the downlink subframe $n-k_{M-2}$ and/or the downlink subframe $n-k_{M-1}$, the HARQ-ACK bundling on the HARQ-ACK response corresponding to the first serving cell and the downlink subframe $n-k_{M-2}$ and the HARQ-ACK response corresponding to the first serving cell and the downlink subframe $n-k_{M-1}$, so as to obtain the bundled HARQ-ACK response corresponding to the first serving cell, the downlink subframe $n-k_{M-2}$, and the downlink subframe $n-k_{M-1}$ comprises:
if the processor detects the DCI format only in the downlink subframe $n-k_{M-2}$, and the value of the TPC field in the DCI format is a first value, the bundled HARQ-ACK response corresponding to the first serving cell, the downlink subframe $n-k_{M-2}$, and the downlink subframe $n-k_{M-1}$ is the HARQ-ACK response corresponding to the first serving cell and the downlink subframe $n-k_{M-2}$;
if the processor detects the DCI format only in the downlink subframe $n-k_{M-1}$, and the value of the TPC field in the DCI format is a first value, the bundled HARQ-ACK response corresponding to the first serving cell, the downlink subframe $n-k_{M-2}$, and the downlink subframe $n-k_{M-1}$ is the HARQ-ACK response corresponding to the first serving cell and the downlink subframe $n-k_{M-1}$;
if the processor detects the DCI format only in the downlink subframe $n-k_{M-2}$, and the value of the TPC field in the DCI format is a second value, the bundled HARQ-ACK response corresponding to the first serving cell, the downlink subframe $n-k_{M-2}$, and the downlink subframe $n-k_{M-1}$ is discontinuous transmission (DTX);
if the processor detects the DCI format only in the downlink subframe $n-k_{M-1}$, and the value of the TPC field in the DCI format is a second value, the bundled HARQ-ACK response corresponding to the first serving cell, the downlink subframe $n-k_{M-2}$, and the downlink subframe $n-k_{M-1}$ is DTX; and
wherein the first value is corresponding to a first physical uplink control channel (PUCCH) resource, the second value is corresponding to a second physical uplink control channel PUCCH resource, and the first PUCCH resource and the second PUCCH resource are PUCCH resources configured for the user equipment; the first value is unequal to the second value.

* * * * *